United States Patent
Chong et al.

(10) Patent No.: US 7,917,888 B2
(45) Date of Patent: Mar. 29, 2011

(54) SYSTEM AND METHOD FOR BUILDING MULTI-MODAL AND MULTI-CHANNEL APPLICATIONS

(75) Inventors: Kelvin Chong, San Jose, CA (US); Srinivas Mandyam, San Jose, CA (US); Krishna Vedati, Sunnyvale, CA (US); Vikranth Katpally Reddy, Mountain View, CA (US); Winston Wang, Santa Clara, CA (US); Cynthia Kuo, Pittsburgh, PA (US)

(73) Assignee: Symbol Technologies, Inc., Holtsville, NY (US)

( * ) Notice: Subject to any disclaimer, the term of this patent is extended or adjusted under 35 U.S.C. 154(b) by 2122 days.

(21) Appl. No.: 10/054,623

(22) Filed: Jan. 18, 2002

(65) Prior Publication Data
US 2002/0184610 A1 Dec. 5, 2002

Related U.S. Application Data

(60) Provisional application No. 60/263,574, filed on Jan. 22, 2001.

(51) Int. Cl.
*G06F 9/44* (2006.01)
(52) U.S. Cl. ......................... 717/102; 717/103
(58) Field of Classification Search .................. 717/102, 717/103
See application file for complete search history.

(56) References Cited

U.S. PATENT DOCUMENTS

| 5,418,728 | A | * | 5/1995 | Yada ............................. 700/97 |
| 5,630,069 | A | * | 5/1997 | Flores et al. ..................... 705/7 |
| 5,787,283 | A | * | 7/1998 | Chin et al. ..................... 717/101 |
| 6,041,306 | A | * | 3/2000 | Du et al. .......................... 705/8 |
| 6,044,217 | A | * | 3/2000 | Brealey et al. ................ 717/107 |
| 6,058,413 | A | * | 5/2000 | Flores et al. ..................... 705/7 |
| 6,067,477 | A | * | 5/2000 | Wewalaarachchi et al. .... 700/83 |
| 6,225,998 | B1 | * | 5/2001 | Okita et al. .................... 707/102 |
| 6,272,672 | B1 | * | 8/2001 | Conway ....................... 717/107 |
| 6,393,456 | B1 | * | 5/2002 | Ambler et al. ................ 709/200 |
| 6,430,538 | B1 | * | 8/2002 | Bacon et al. ..................... 705/9 |
| 6,728,947 | B1 | * | 4/2004 | Bengston ..................... 717/103 |
| 2002/0138617 | A1 | * | 9/2002 | Christfort et al. ............. 709/225 |

* cited by examiner

*Primary Examiner* — Wei Y Zhen
*Assistant Examiner* — Qamrun Nahar

(57) ABSTRACT

A system and method are provided for visually building multi-channel and multi-modal applications. The system includes a process design module for designing application workflow, an integration design module for integrating data sources into the application; a presentation design module for designing application views; a media library; and a componentization module, for packaging designed workflow into reusable components. The system further includes an interactive development/design environment (IDE). The IDE provides a graphical user interface for allowing a developer to visually interact with and operate modules. The system allows a developer to design a single application that can operate across multiple network standards, devices, browsers and languages, and that operate in one or more modes, such as real-time, off-line and asynchronous modes.

22 Claims, 97 Drawing Sheets

| File | Destination |
|---|---|
| beanimages/* | beanimages |
| *.class | classes |
| *.java | classes_to_compile |
| *.ag | distiller |
| global.def | templates |
| alerts/*.topic | alerts |
| templates/* | templates |
| filesrcs/* | filesrcs |
| sync/* | sync |
| grammars/* | media |
| images/* | media |
| wavs/* | media |
| *.properties | properties |

SYSTEM AND METHOD FOR BUILDING MULTI-MODAL AND MULTI-CHANNEL APPLICATIONS

CROSS-REFERENCE TO RELATED APPLICATIONS

This application claims priority from U.S. Provisional Patent Application No. 60/263,574, filed on Jan. 22, 2001, entitled "SYSTEM AND METHOD FOR DESIGNING, DEPLOYING AND MANAGING MOBILE APPLICATIONS."

FIELD OF THE INVENTION

The present invention generally relates to a system and method for visually building applications and more particularly, to a system and method that enables the rapid development of scalable, multi-channel workflow-based applications that may operate in a multi-modal environment.

BACKGROUND OF THE INVENTION

Computing models have changed dramatically over the last two decades. The paradigm shifts from mainframes to personal computing to pervasive computing drive the need for significantly different programming models. Today we are in the era of personal computing, where a desktop computer is the primary computing device. FIG. 1 illustrates the current paradigm of connecting to the Internet using a personal computer. As shown in FIG. 1, clients 10 (i.e., a user and access terminal) may utilize or interact with applications 12 (and the application run-time system 13 needed to support the applications) stored on remote computer systems 14 over a network 16, such as the internet. The application 12 and run-time system 13 may access, utilize and communicate data 18 that is stored within local or remote locations or databases. As we move to the pervasive computing era of "anytime, anywhere access," access to information from different terminals in a variety of different channels and modes becomes important. In the following discussion, the terms terminal, channel, mode, multi-channel application, and multi-modal application are defined as follows:

1. A terminal refers to the device that is operated by the user. It generally comprises an input device, such as a keyboard, a processing unit such as a CPU, a computer program such as a browser and an output device, such as a display screen or printer. In addition to the traditional networked desktop, a terminal can refer to devices such as PDAs, Internet-enabled phones, handheld pads, 2-way pagers and voice recognition terminals. FIG. 2 illustrates how different access terminals 10a-c (e.g., web browsers) can be used to access the same applications 12 over a network 16. FIG. 2 further illustrates how applications 12 may access different types of data 18a-c stored at various remote locations.
2. A channel refers to the medium, or the "pipe" over which the interaction takes place. The main channels of access are: wireline access over the Internet using physical connection cables or telephone cables; wireless access over cellular and other over-the-air networks such as satellite links, radio frequency waves, or infrared connections; and voice access over analog PSTN networks. FIG. 3 illustrates how different access terminals 10d-h can use different channels 16a-c to access the same applications 12.
3. A mode refers to the way a user interacts with the application. For example, the present invention offers development of applications that can be operated in three modes by the end users: real-time, disconnected, and asynchronous. In real-time mode, shown in FIG. 1, users request information from an online, server-side application run-time system 12 over the network 16. In disconnected mode, users 20 may interact with an offline application 22 and offline run-time system 26 stored on a client device 24, as shown in FIG. 4. The user 20 may also connect to a synchronization application 30 (and online run-time system 31) on a remote computer system 32 through a conventional network 28 in order to update or synchronize data 34 by various methods. In asynchronous mode, the application may notify users of an event, pushing real-time data via alerts, and the users may choose to respond when they are available. FIG. 5 illustrates how alerts are pushed to a user 40. The alerts are triggered by an external event 50 that is detected by an alert management system 46 (and run-time system 47) on a remote computer 48, and are pushed over a network 44 to the user's client device 42.
4. A multi-channel application is an application that can be accessed via two or more channels, including but not limited to wireline access by web browser, wireless access by internet-enabled phone, wireless access by PDA (Personal Digital Assistant), and voice access by telephone. The content and functionality may be the same or differ across channels.
5. A multi-modal application is an application that can be operated via two or more modes, including but not limited to real-time, disconnected, and asynchronous access.

The use of multiple modes and channels is desirable for mobile business users. For example, suppose a salesperson needs to access corporate information while traveling. The salesperson makes a voice call into the company's enterprise voice portal. He quickly gets to his personalized menu, and asks for the status on a specific customer account. Instead of listening to all the information, he asks that the information be sent to his WAP phone (changing channels). He hangs up, and immediately receives a WAP alert on his phone (changing modes). He continues to interact from the WAP channel of his phone. He quickly scans the information and forwards the relevant information to the customer as an e-mail summary, and also as an SMS message.

With the growing popularity of cellular devices, personal digital assistants, voice technologies and the Internet, there is a need for developing software applications that support operation in multiple modes over multiple channels. Developing an application that is capable of providing the seamless user experience described above requires a highly integrated application that supports interaction in multiple modes and channels.

Current approaches involve developing separate custom applications for each variation in mode, channel, browser, and/or device. This approach is expensive and time intensive, as the developer is essentially building the application multiple times, rather than once. Maintenance becomes cumbersome; one change necessitates making changes in multiple locations. In addition, it is impossible to deliver a seamless user experience.

Conventional approaches also include several visual or graphical techniques that allow programmers to build applications rapidly. With tools such as Microsoft Visual Basic™, visual programming paradigm has entered mainstream programming. The goal of such environments is to make programming in various languages easier for developers, and sometimes, accessible to non-programmers. However, the resulting programs built using such development environments are typically single-channel or single-mode.

The task of developing highly usable multi-channel, multi-modal applications becomes more daunting with the constant emergence of new technologies. To create a multi-channel multi-modal application that delivers optimal user experience in all modes and channels, developers have to learn and use diverse technologies and standards including XHTML, WAP, WML, XSLT, HTTP, WSDL, SOAP, location-based computing, SMS messaging, 3G, speech recognition, and Web Services.

SUMMARY OF THE INVENTION

The present invention provides a system and method for design and development of multi-channel applications using a Model-View-Controller paradigm.

The present invention provides a visual development tool for rapidly building voice and data applications that may operate across multiple network standards, devices, browsers and languages. The present invention may be part of an overall system for developing, running and analyzing multi-modal applications that includes a development platform, run-time engine, and data-mining module.

Furthermore, the present invention provides a system and method for building scalable, object-oriented type applications for use in a multi-channel environment. In view of the unique needs of multi-channel applications, the present invention provides the basis for a simplified development environment that specifically allows the rapid building of multi-channel, multi-modal applications. This simplified environment allows a developer to consolidate the design of various custom applications into a single application that can handle multiple modes, channels, and device capabilities. As such, the present invention eliminates the need to design separate custom applications for each variation in mode, channel, browser, and/or device.

In one embodiment, the development system of the present invention generates an application descriptor for a run-time engine that provides a robust environment designed for executing multi-channel multi-modal applications. The application descriptors are preferably based on the "Model-View-Controller" (MVC) standard, as enforced by the development system. The run-time engine may provide a single, comprehensive architecture for delivering such applications and services over multiple channels and modes of operation. The run-time engine may based on standards and preferable implemented using XML (eXtensible Markup Language) and Java Programming Language in computer software executing on a desktop, network server computer or pervasive computing system. However, alternative embodiments may be based on differing standards without departing from the invention. The preferred run-time engine is described in detail in U.S. patent application Ser. No. 10/053,767 of Kelvin Chong et al., entitled "Efficient System and Method for Running and Analyzing Multi-Channel, Multi-Modal Applications", filed on Jan. 18, 2002, which is assigned to the present assignee, and which is fully and completely incorporated herein by reference (hereinafter referred to as "Chong et al.").

The process of building multi-modal, multi-channel applications using the development environment of the present invention provides many advantages including but not limited to the ones listed below:

1. One application development environment can be used to create real-time, disconnected, and asynchronous applications for various channels.
2. The environment shields developers from having to learn every technology thoroughly.
3. The environment allows developers to build, evolve, extend, and maintain multi-channel applications easily and quickly.
4. The environment allows developers to incorporate new technologies, while easily integrating legacy technologies as well.
5. The behavior of applications created in this environment may differ, depending on the needs of the channel, mode, device, or user.
6. The environment allows for building easily interuationalizable applications.
7. The environment facilitates the development of object-oriented, highly modular applications. These modules allow for reuse of work and for easy modifications.
8. The method of the present invention allows for selective deployment of certain functionalities of the applications created in various channels, or modes.
9. Applications created in the environment are able to maintain state and context information. This information is used to transfer the user between channels or modes as required during the running of the application.

According to one aspect of this invention, a unified visual environment is provided for building applications using a model-view-controller programming paradigm. These applications are preferably state-based multi-channel, multi-modal applications that are transactional in nature.

According to another aspect of the present invention, a system for visually building applications is provided. The system includes a first module adapted to allow a developer to visually design workflow for an application; a second module adapted to allow a developer to design views for the application; and a third module adapted to allow a developer to integrate data sources within the application.

According to a another aspect of the present invention, a system for visually building multi-channel applications is provided. The system includes an interactive development environment for visually designing workflow for a multi-channel application, the environment being adapted to allow a developer to independently design the workflow in a plurality of layers, each of the layers corresponding to at least one channel of the application.

According to another aspect of the present invention, a system for visually building applications is provided. The system includes a graphical user interface adapted to allow a user to visually build a workflow for an application; and a module for converting the visually built workflow into a markup language (e.g., an XML-based markup language).

According to another aspect of the present invention, a method of building an application is provided. The method includes the steps of: providing a visual development environment; designing an application workflow within the visual development environment, the application workflow describing certain business logic and comprising a plurality of states and a plurality of transitions, linking the states; and converting the application workflow into an application descriptor.

According to another aspect of this invention, a system and method is provided for the internationalization of such multi-channel applications. Multi-channel applications have a variety of resources such as strings, images, voice grammar files, audio files that may be internationalized.

Another aspect of this invention is to provide techniques that help building and maintaining applications hundreds of business processes with thousands of steps. Specifically, a technique is presented to support a hierarchical state based visual programming model with the introduction of the sub-model concept. Further, a method of encapsulating these multi-channel, multi-modal applications, which will hereinafter be referred to as "componentization" is also presented. A system and method for encapsulating and packaging entire applications, including presentation, business logic and workflow is provided. Another such technique that helps building large application is the concept of n-dimensional process planes, hereinafter referred to as "layers." Programming using layers allows developers to create different experiences for different devices for the same business process.

Still another aspect is to provide a system for persisting such application designs into a project and providing a method to deploy such ready-to-run application projects preferably to a runtime system over a computer network.

These and other features and advantages of the invention will become apparent by reference to the following specification and drawings.

BRIEF DESCRIPTION OF THE DRAWINGS

FIG. 74 illustrates an example of a graphical interface associated with the IDE described in the current invention for configuring the files that are to be deployed to the server.

FIGS. 77-79 illustrate some non-limiting embodiments of preliminary user interface screens associated with the IDE described in the current invention when a developer creates a new project for a currency converter application.

FIG. 100 illustrates an embodiment of the actions palette user interface with a 'set' action.

FIG. 101 illustrates an embodiment of the actions palette user interface with an 'if' action.

DETAILED DESCRIPTION OF A PREFERRED EMBODIMENT OF THE INVENTION

Figure 1:
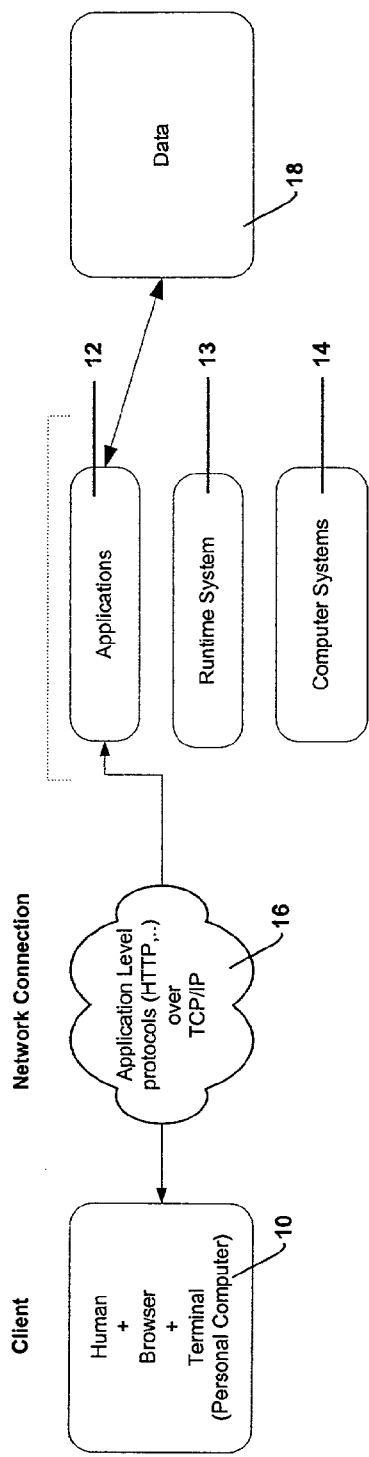
FIG. 1 is a flow diagram illustrating the current client-server computing paradigm in real-time mode in accordance with the prior art.
Figure 2:
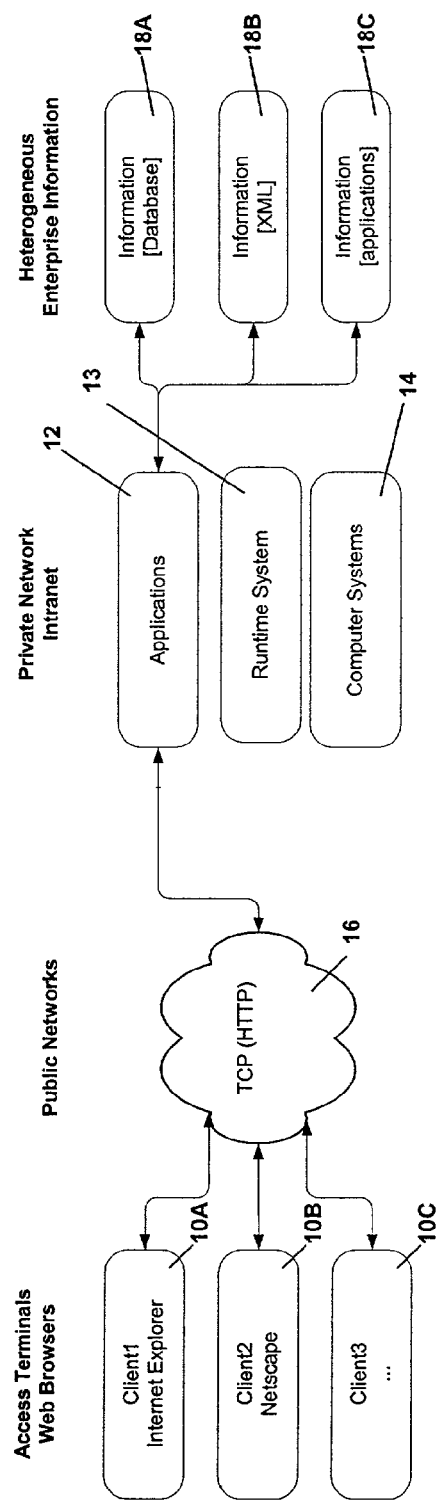
FIG. 2 is a flow diagram illustrating the use of different terminals by clients to access the same application, in real-time mode, along wireline channels in accordance with the prior art.
Figure 3:
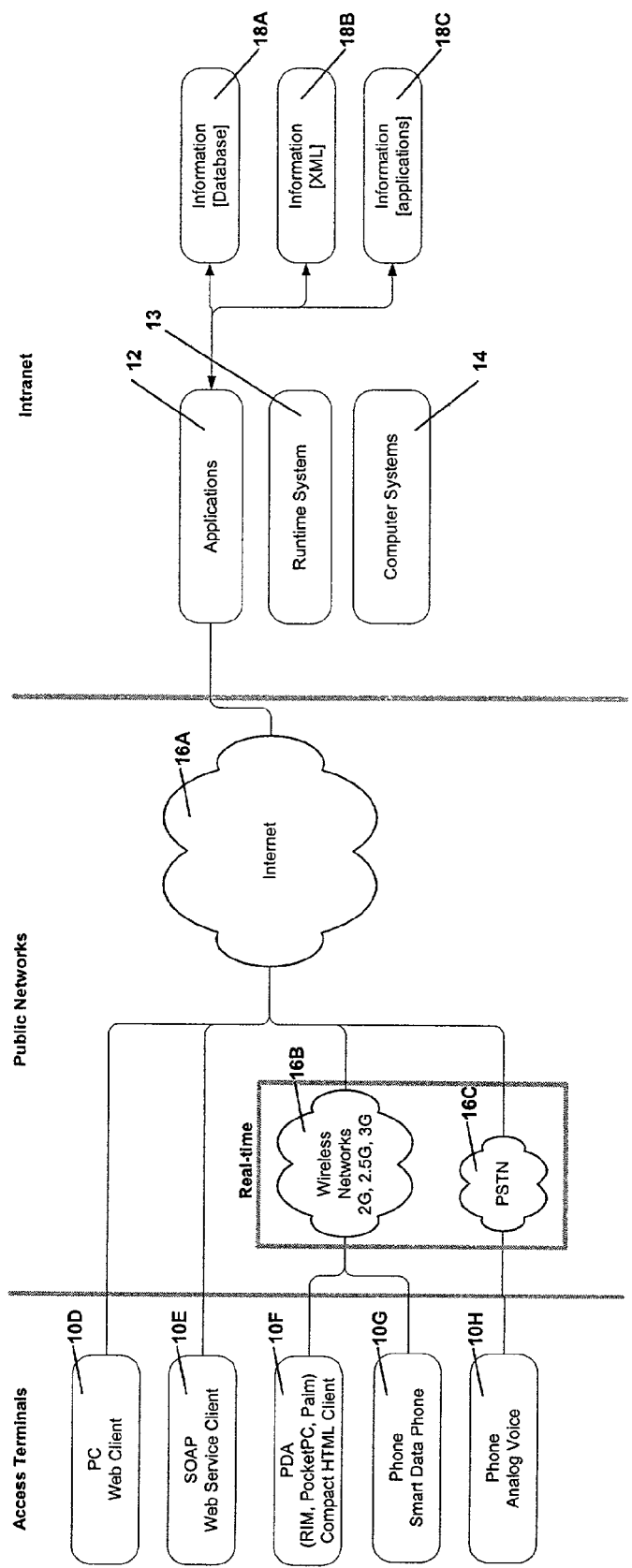
FIG. 3 is a flow diagram illustrating the use of multiple terminals to access the same application via multiple channels, all in real-time mode in accordance with the prior art.
Figures 4, 5:
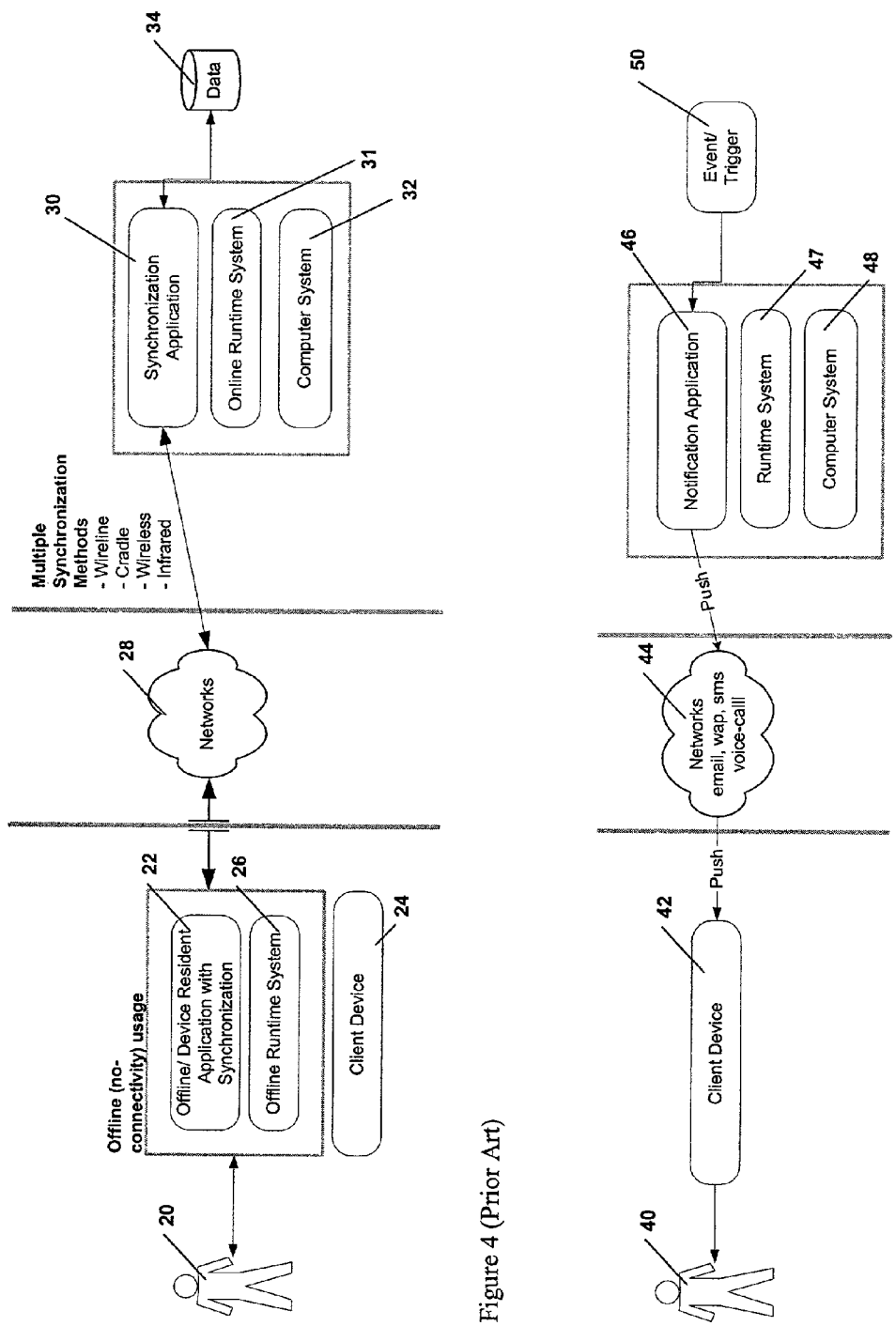
FIG. 4 is a flow diagram illustrating client-server interactions when users access an application in disconnected mode, using offline client devices in accordance with the prior art.
FIG. 5 is a flow diagram illustrating how alerts are pushed to users in asynchronous mode in accordance with the prior art.

The present invention provides a system and method for building applications. In the preferred embodiment, the system and method are implemented on a computer system and are designed to rapidly develop multi-channel and multi-modal applications that operate over a multitude of network standards, devices, languages and browsers. Particularly, the system and method may comprise software components that may be implemented by at least one computer system or network (e.g., a plurality of cooperatively linked computers). The present invention provides a software development environment that allows a developer to consolidate the design of various custom applications into a single application that can handle multiple modes, channels, and device capabilities. As such, the present invention eliminates the need to design separate custom applications for each variation in mode, channel, browser, and/or device.

The discussion below describes the present invention in the following manner: (i) Section I provides a glossary of terms that are used throughout the discussion; (ii) Section II describes the general architecture of a preferred embodiment of the present invention, as implemented on a computer system; (iii) Section III describes the Interactive Design Environment and Plug-ins provided by the present invention; (iv) Section IV describes the a preferred embodiment of the graphical user interface (GUI) provided by the present invention; (v) Section V describes the "Model-View-Controller" programming architecture in which applications may be designed using the present invention; (vi) Section VI describes a preferred method of creating applications by use of the present invention; (vii) Section VII describes how the present invention may be employed to build scalable (e.g., layered and componentized) applications; (viii) Section VIII describes how the present invention may be used to create internationalized applications; (ix) Section IX describes how applications created by the present invention may be deployed; and (x) Section X provides an example of how the present invention may be utilized to create a currency converter application; (ix) Section XI is a schema definition file (CML1.xsd) used within a preferred embodiment of the present invention; (xii) Section XII is a schema definition file (CML.xsd) used within a preferred embodiment of the present invention; (xiii) Section XIII is a document type definition file (TPL.dtd) used within a preferred embodiment of the present invention; and (xiv) Section XIV is a document type definition (VTL.dtd) used within a preferred embodiment of the present invention.

I. Glossary of Terms

Action: An action is a reusable logic element that may perform operations on data, i.e., it is a unit of processing that may be required in any application. The preferred embodiment affords several types of commonly used actions that the developer may use to build lists of actions to specify the processing associated with each state.

Applications: Software that performs a specific task or function and manifests itself for end-users to interact with. The present discussion will also generally refer to applications that deliver services over multiple channels and support multiple modes of operation. The invention offers a method of building such applications using a framework including controllers, views, data and resources.

Application developers: Application developers are persons who may interact with the IDE (see 'IDE') to create applications using the framework afforded by the present invention.

Channel: A channel refers to the medium, or the "pipe" over which user interaction takes place. The main channels of access are: "wire-line" access over the Internet; "wireless" data access over cellular and other over-the-air networks; and voice access over analog PSTN networks.

Class: A class is an encapsulated set of program statements and methods that specify the data and behavior of an object.

Controller: A controller is a deterministic, finite automaton, illustrating all possible states, transitions and user interaction paths allowed by an application. In the present invention, it takes form as a visual diagram that links end-user interactions and server side processing.

Data adapter: A data adapter is a pre-built class (see 'Class') that provides a mechanism for instantiation of user objects for each particular type of object such as Java Bean, or EJB, and encapsulates their details from their usage. In the preferred embodiment of the current invention, data adapters are implemented using Java Programming Language.

Data binding: A data binding is a parameterized method call on a variable/object. Every variable/object has methods that can be called. Some methods require parameters to be passed to those methods. Many of these methods may often be reused with the same parameters—it is convenient to have a mechanism to call such methods by the use of read-to-run parameterized methods. The use of data bindings provides this mechanism.

Data model. A data model is a formalized representation of facts, concepts, or instructions in a suitable for communication, interpretation, or processing by the invention. The data model preferably includes external data integration using data adapters (See 'data adapter'), and internal user-defined variable data that is persisted across requests during a transaction.

Data sources: Data sources is the general term used to group all information sources from which data can be retrieved. Some non-limiting examples of data sources include relational databases, flat files, and RMI (remote-method invocation) calls. In accordance with the present invention, data sources are preferably accessed using data adapters (see 'data adapter'): there are pre-built data adapters for various types of data sources.

DTD: A DTD (Document Type Definition) defines the legal building blocks of an XML document. It defines the document structure and relationships between various building blocks of the DTD with a list of legal elements.

End user: Users or end-users are the person(s) that interact with a developed application preferably using a client device.

IDE: Integrated Development Environment. Provides a developer with a visual environment to design applications.

IDE users: See 'application developers'.

Interaction flow: See 'controller'.

Internationalization: Internationalization (i18n) is the process of designing an application so that it can be adapted to various locales.

Locale: A locale is a combination of a language and a region.

Localization: Localization (l10n) is the process of adapting software for a specific locale by adding locale-specific components and translating media.

Mode: The way an end-user interacts with the application. For example, the present invention offers development of applications that can operate in three modes in which users can operate: real-time, disconnected, and asynchronous.

Model: See 'data model'.

Multi-channel application: An application that can be accessed via two or more channels.

Multi-modal application: An application that can be accessed via two or more modes, including but not limited to real-time, disconnected, and asynchronous access.

Object: An object is a passive entity containing or receiving information. Objects are instantiations of classes.

Plug-in: A software component that integrates with the IDE (see 'IDE') and provides additional functionality in the IDE.

Pre-action: A list of actions (see 'Action') that are executed before a view (see 'View') is displayed in a state. Pre-actions are a property of states (see 'State').

Presentation: See 'View'.

Post-action: A list of actions (see 'Action') that are executed when control is transferred out of the state via a transition (see 'Transition').

Rendering Rule: A Rendering rule determines the view type to be displayed based on the type of client device capabilities and the channel through which the client device is connected to the application.

View Type: The term view types generally refers to the various ways that view templates may be defined by the developer. View types may include but are not limited to an XHTML view, XSL View, and Native View—all of which are processed by the run-time system to generate presentation specific for a client device.

Scoping Rules: See 'Variable Scope'.

Session management: The process of persisting user and system information into a context such that subsequent requests from the same user are re-associated with the same context.

State-based Session management: Session management, with the additional information of application controller state, that is used to handle interrupted transactions across channels.

State: The condition of a controller at a given instance in time, including its configurations, attributes, and/or information content. Attributes of a state include a list of actions to perform (see 'Action') and views (see 'View') to display.

Sub-controller: A sub-controller encapsulates a controller and associates it with a name, such that it may be "called" from other controllers much like a sub-routine is called from a main program.

Sub-model: Same as 'sub-controller'.

Terminal: The device that is operated by an end-user. It generally consists of an input device, such as a keyboard, a processing unit such as a CPU, a computer program such as a browser and an output device, such as a display screen or printer.

Transition: A special case of an action (see 'Action'). A transition is an action that transfers control from one state to another state. In the present invention, a transition is also a container of additional actions (i.e., when a transition action is executed, any actions that have been assigned to the transition will also execute). A transition action cannot contain another transition actions.

Variable: A variable is a runtime/design time identifier to reference an object or instance of a class. See 'object'.

Variable lifetime: Refers to how long a variable's value is held in memory. See also 'Variable scope'.

Variable scope: Variable scope is a variable's visibility in relation to states, controllers, and actions. In the present invention, there may be four defined scopes including request scope, controller scope, application scope, and global scope. This is not only useful in partitioning and encapsulating user objects, but also enhances memory utilization, since objects are instantiated only in the contexts in which they are allocated.

Request Scope: See 'Variable scope'. "Request" scope applies to variables that exist only during the processing of the current request. Request variables are automatically created when users interact with a view and send data back to the controller. This data is in the form of name-value pairs. Once the execution ends with another view, the "request" variables will be released and will no longer be accessible.

Controller Scope: See 'Variable scope'. "Controller" scope applies to variables that have been declared for a controller. These variables are only visible while control is within the controller and will be deemed nonexistent when this Controller is exit.

Application Scope: See 'Variable scope'. "Application" scope applies to variables that have been declared for an application. These variables are visible by all controllers in the application. Application variables exist on a per-user basis. Once a user terminates her session with the application, the application variables will be released.

Global Scope: See 'Variable scope'. "Global" scope applies to variables that have been declared for multiple applications across multiple users. These variables are visible by all controllers in all applications by all users.

Users: Users or end-users are the person(s) that interact with a developed application.

View: A user interface that is presented to the end user. A view allows a user to interact with that user interface. A view might take the form of visual, audio, tactile feedback. Views are assigned as properties of a state. When control is transferred to a state that has a view associated with it, the view is presented to the user.

Wireline Connection: Connections requiring a physical wire to be attached to the client device that allows end-users to interact with the application.

Wireless Connection: Connections that do not require a physical wire (e.g., over-the-air via radio) to be attached to the client device that allows end-users to interact with the application.

Workflow: See 'controller'/'interaction' flow.

XML: Is extended Markup Language. A known method of representing data structures in a hierarchical format with concepts such as parent/child/sibling relationships.

II. General Architecture

Figure 6:
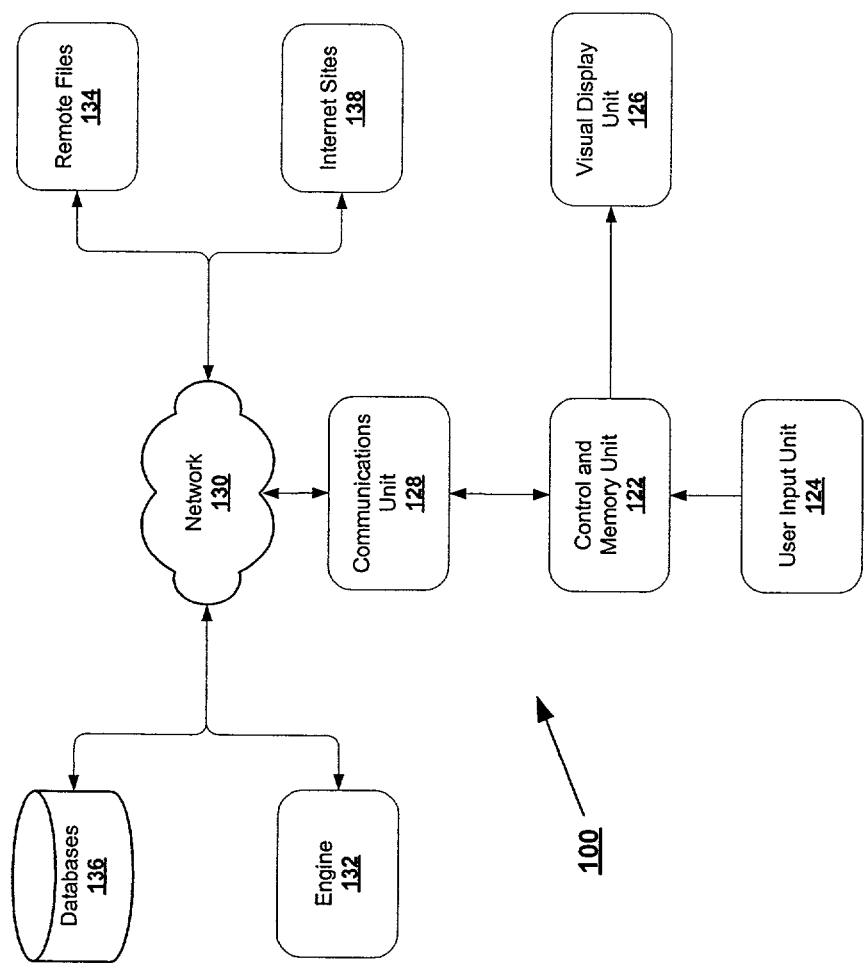
FIG. 6 is a block diagram illustrating a system for building and deploying applications implemented within a computer system in accordance with a preferred embodiment of the present invention.

FIG. 6 shows an application development system 100 which is implemented on a computer system in accordance with the present invention. System 100 may represent a conventional and commercially available computer system or an independent microprocessor-based system built specifically for use with the present invention. System 100 may comprise a control and memory unit 122, a user input unit 124, a visual display unit 126, and a communications unit 128.

Control and memory unit 122 may be a conventional and commercially available processor-based system or network server including a microprocessor, volatile and non-volatile memory, and one or more persistent storage devices. In the preferred embodiment, control and memory unit 122 may adapted to and may store at least a portion of the operating software that directs the operation of system 100. Particularly, control and memory unit 122 may store and operate an Integrated Development Environment (IDE) and other functional modules and portions of the present invention, which may be cooperatively used to design and develop multi-modal, multi-channel applications. Alternatively, the IDE may be partially or wholly stored on a remote or disparate system, device or network, and may be accessed and loaded into control and memory unit 122 by way of user input unit 124 and/or communications unit 128.

User input unit 124 may include one or more conventional and commercially available devices adapted to allow a user to provide data to, and access data from, control and memory unit 122, and may comprise without limitation a user input assembly such as a keyboard, mouse, or touch pad. User input unit 124 may further include other conventional peripheral devices such as disk drives, printers, scanners and the like. Display unit 126 may be a conventional and commercially available device for allowing system 100 to display visual data to a user, such as a computer monitor, a flat panel display or other conventional display device which is suitable to display output generated by computer system 100. It should be appreciated that user input unit 124 and display unit 126 cooperatively permit a system user or operator to enter and/or modify data within system 100, to visually develop application with system 100, to access data from system 100, and to perform system maintenance, management and modification.

Communications unit 128 may be a suitable and commercially available device or a combination of devices for transferring data over global communications network (e.g., the internet) or computer network 130. Unit 128 allows system 100 remotely deploy applications created by system 100 onto an application-running engine 132 (e.g., the engine described in Chong, et al., supra, which is incorporated herein by reference), and to access data from conventional remotely located files 134, databases 136 and internet sites 138 for use in the application building process.

III. Interactive Design Environment and Plug-Ins

Figure 7:
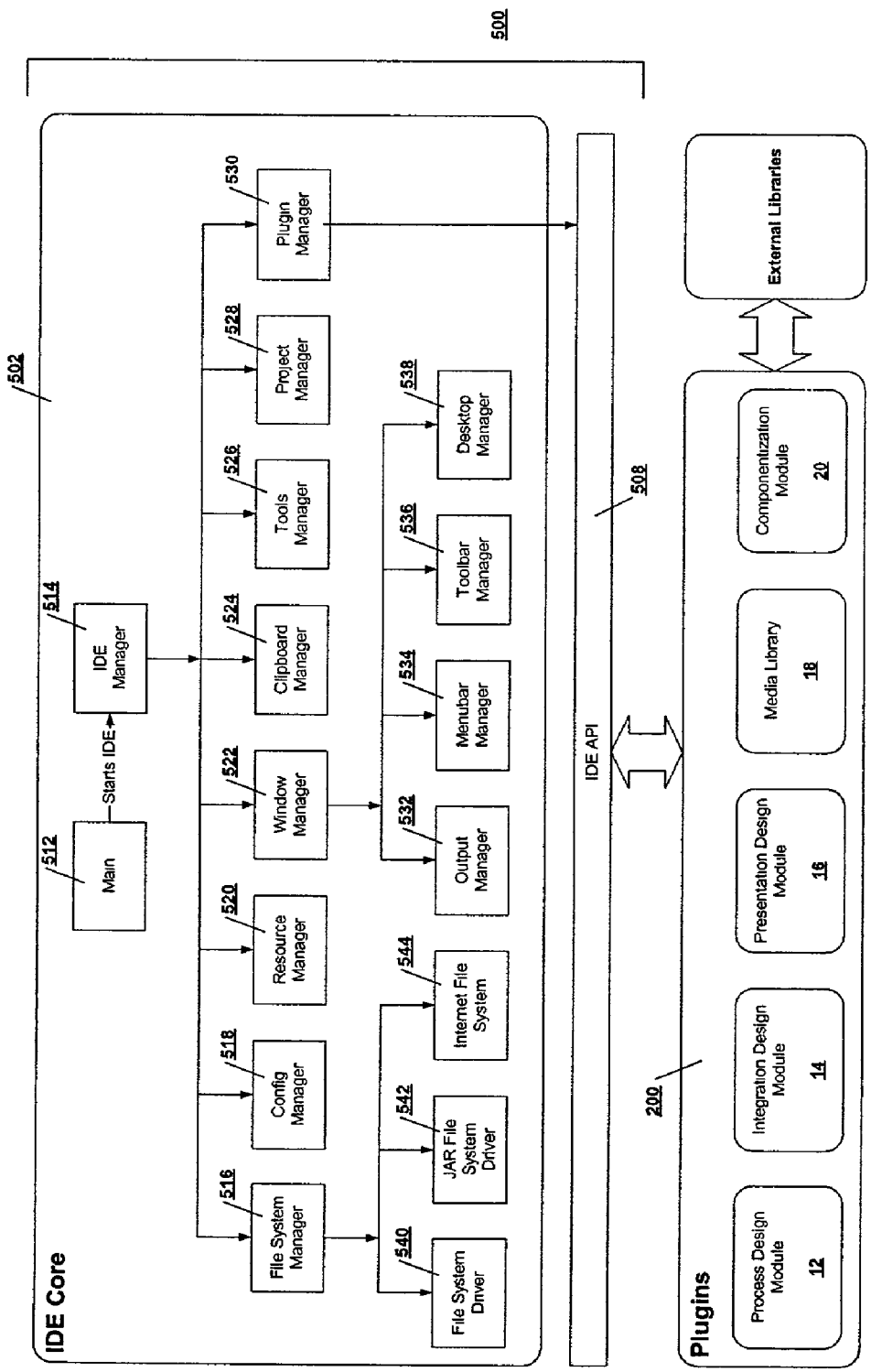
FIG. 7 is a block diagram illustrating the Interactive Design/Development Environment (IDE) and functional modules of the system shown in FIG. 6.

FIG. 7 illustrates the Interactive Design Environment (IDE) 500 and the various functional modules or plug-ins 200 of system 100. In the preferred embodiment, IDE 500 and plug-ins 200 may be stored within control and memory unit 122.

A. Plug-Ins

In the preferred embodiment, the application design system 100 includes the following functional modules or plug-ins 200: a process design module 12, an integration design module 14, a presentation design module 16, a media library module 18, and a componentization module 20. In the preferred embodiment, modules 12-20 may stored within and/or comprise conventional software and/or hardware components. The operation of each of these modules will be described in detail in the following discussion. It should be appreciated that the plug-ins 200 may further include other types of plug-ins, adapted to perform conventional functions.

Plug-ins 200 may also communicate with conventional external libraries, as shown in FIG. 7.

Figure 8:
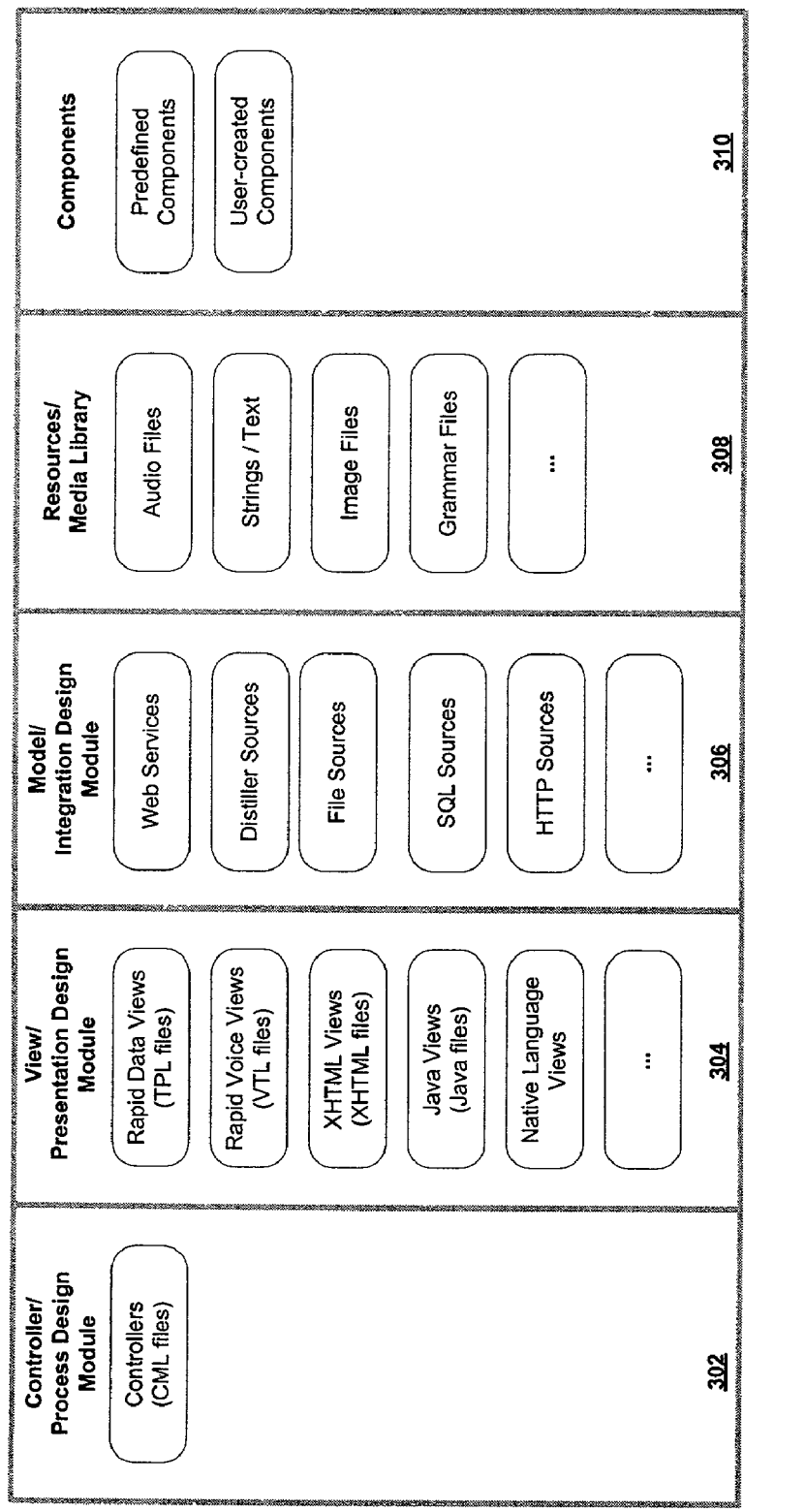
FIG. 8 is a block diagram illustrating possible outputs of the present invention for each application/module designed using the invention. The combination of these outputs is called an application descriptor or a project

The output of application design system 100 for each created application or component is an application descriptor or project 300, as shown in FIG. 8. The terms "application", "application descriptor" and "project" will be used interchangeably hereinafter. The output of system 100 includes the contents of a project. In the preferred embodiment a project will comprise: controllers 302, which may be produced by the process design module 12; various types of views 304, which may be produced by the presentation design module 16; data adapters and data bindings 306, which may be produced by the integration module 14; resources 308, which may be produced by the media library 18, and components 310 which may be produced by the componentization module 20.

In the preferred embodiment, the output generated by system 100 does not necessarily include the entire run-time environment that runs the application descriptor. Rather, as discussed more fully and completely in Section IX and shown in FIG. 9, the deployment and application run-time may be managed by a separate subsystem. This subsystem is a specialized run-time engine that implements all the features required by multi-modal, multi-channel applications, e.g., workflow/interaction-flow controllers(runners), context and session management containers, the ability to switch between modes and channels, understanding various application protocols, dynamically applying different presentation systems based on client capabilities, and the ability to integrate with legacy systems. This subsystem or run-time engine is described in detail in Chong, et al., which is incorporated herein by reference.

B. Integrated Development Environment

Referring back to FIG. 7, the integrated development environment (IDE) 500 interacts with plug-ins 200, and comprises an IDE core 502 and an IDE application program interface (API) 508. The IDE core 502 comprises of a series of managers and drivers that exposes operating system resources to plug-ins 200 through API 508. In the preferred embodiment, IDE core 502 includes the following:

Main Module 512, which activates or starts the IDE.

IDE Manager 514, which manages the other managers in the IDE.

File System Manager 516, which abstracts the file system API to plug-ins, and which controls conventional file system drivers, such as file system driver 540, java archive (JAR) file system driver 542, and internet file system driver 544. The "file system" is an abstraction of the concept of files in a file cabinet. It exposes functions to determine what files are available, to add or remove files, and to modify the files. This abstraction eventually translates to calls on associated physical file system drivers. For example, the file system driver allows the file system to modify files on a local storage device such as a disk drive.

Configuration Manager 518, which provides global APIs to store project configuration data.

Resource Manager 520, which provides APIs to retrieve GUI data such as images and strings.

Window Manager 522, which handles windowing and provides a consistent look-and-feel, and which may include other conventional managers such as an output manager 532, a menubar manager 534, a toolbar manager 536, and a desktop manager 538.

Clipboard Manager 524, which handles cut/copy/paste actions of IDE.

Tools Manager 526, which handles the launching of external tools such as compilers and emulators.

Project Manager 528, which handles issues dealing with projects, such as opening, saving, and closing projects.

Plug-in Manager 530, which handles the various plug-ins 510 that implement the functionality of system 100.

File System Driver 540, which implements the file system interface 516 to access files on a local disk.

JAR File System Driver 542, which implements the file system interface 516 to access files that have been archived in a JAR (Java Application aRchive) file.

Internet File System Driver 544, which implements the file system interface 516 to access files remotely via various internet protocols such as HTTP (hyper text transfer protocol), SMTP (simple mail transfer protocol), NNTP (network news transfer protocol) and the FTP (file transfer protocol) protocol, and other suitable protocols.

Output Manager 532, which manages a text window where status messages from various managers and plug-ins of the IDE 500 will appear.

Menubar Manager 534, which manages the menu bar that appears at the top of the IDE window.

Toolbar Manager 536, which manages the toolbars that is displayed underneath the menu bar and displays a series of buttons.

Desktop Manager 538, which manages the windows on a desktop and includes mechanisms to save/restore window sizes and positions.

The IDE core 502 abstracts the operating system resources for the plug-ins 200 so that the plug-ins 200 can later be ported to other IDE cores more easily. Essentially, as should be appreciated by one of ordinary skill in the art, the IDE core 502 is simply an abstraction of the operating system API. The plug-ins 200 may be implemented through the graphical user interface (GUI) provided by IDE 500, as described in Sections IV and VI. The managers and drivers may comprise conventional manager and driver software and hardware components. The operation of these managers and drives is discussed below.

C. Operation of the IDE Managers

Figure 10:
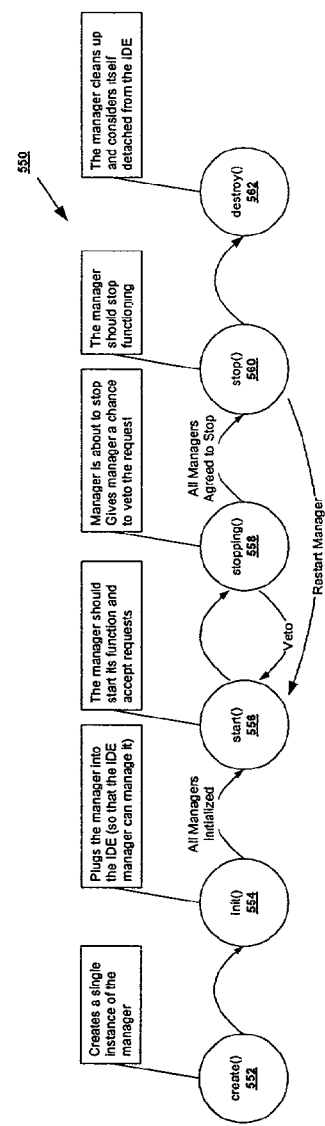
FIG. 10 is a flow diagram describing the lifecycle of the IDE managers involved in the current invention.

FIG. 10 describes the lifecycle 550 of the various managers of the IDE 502 and how they are initialized and started. Each manager in the EDE core 502 has a manager lifetime. When the IDE 500 first starts, it invokes the IDE manager 514, which manages the other IDE managers. The IDE manager 514 controls which managers will get initialized and in which order. First, the various managers are created in step 552. This involves loading the managers' code into memory. Then, the manager is initialized in step 554. During this step, the managers initialize any variables or other properties they need to function. At this point, the managers cannot assume anything about other managers. After all managers have been initialized, each manager is started in step 556. During this step, managers can assume that all other managers have been initialized. This allows managers that depend on other managers to do additional work. For example, the configuration manager 518 relies on the file system manager 516 to be initialized before it can load settings from a file. The IDE manager 514 will start all managers, after which the IDE will be running. When the IDE is to be shutdown (i.e. exit the IDE), the IDE manager 514 will again be called to shutdown each manager. During the shutdown process, the IDE manager 514 will signal to each manager that the managers are "stopping". The "stopping" step 558 allows any manager one chance to abort the shutdown sequence. For example, if a file was not saved in an open project, the project manager can veto the "stopping" event if the user chooses to abort the exit request. If a veto was returned to the IDE manager 514, then it will stop sending the "stopping" event to the other managers and will continue running. Otherwise, after all the managers agree to the "stopping" event (e.g., no veto was returned), then the IDE manager 514 will continue with the shutdown. The next step in the shutdown is to tell the managers to "stop" in step 560. Here, the managers should perform any cleanup code with the assumption that the other managers have not been unloaded from memory yet. So, for example, the configuration manager 518 can save a settings file during this step. After all managers have been stopped, the IDE manager 514 will send a "destroy" event, in step 562, to let the managers perform one final cleanup with the knowledge that all other managers have been stopped. The IDE manager 514 will then execute a system "exit" that will tell the operating system to stop the IDE 500 and release the memory it used.

Figure 11:
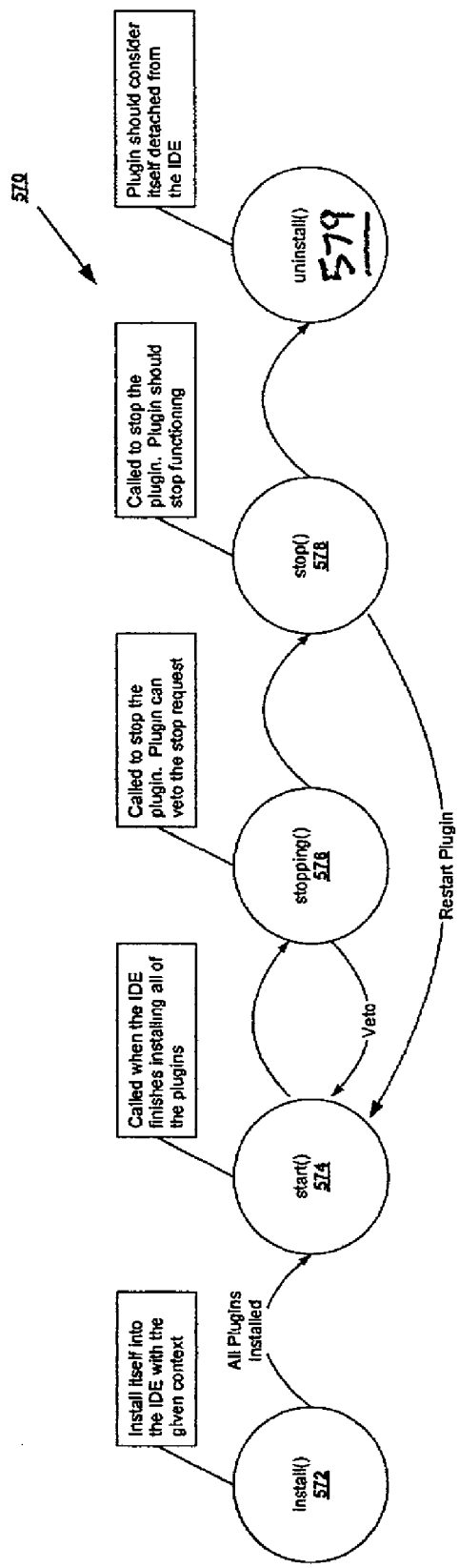
FIG. 11 is a flow diagram describing the lifecycles of IDE plug-ins involved in the current invention.

FIG. 11 describes the lifecycle 570 of a plug-in. Plug-ins include the various editors that appear in the IDE 500 (e.g., process design module 12, integration design module 14, presentation design module 16, media library 18, componentization module 20 ). Plug-ins are managed by the plug-in manager 530. The plug-in manager is controlled by the IDE manager 514. During the "start" stage of the IDE manager 514, the plug-in manager 530 will begin the initialization code for the plug-ins. Plug-ins follow a similar life-cycle pattern as managers within the IDE. First, the plug-in manager 530 will create each plug-in via the "install" event in step 572. The plug-ins will be loaded into memory at this point. Plug-ins can also perform any initialization code such as loading settings from files. After all plug-ins have been "installed", the plug-in manager 530 will send the "start" event in step 574. At this point, the plug-ins can assume that all of the other plug-ins that will be loaded into the IDE 500 have already been initialized. This is useful when certain plug-ins depend on the fimctionality of other plug-ins. When the user is about to shutdown the IDE 500 (e.g., by use of an exit command), the "stopping" event is fired by the plug-in manager 530 in step 576. Like their IDE manager counterparts, each plug-in should determine if it is ready to be stopped or not. If not (e.g. still compiling files), then a veto is returned to the plug-in manager 530. At this point, the plug-in manager 530 will abort the shutdown process by returning its own veto event to the IDE manager 514. Otherwise, the shutdown continues. After all plug-ins agree to be stopped, a "stop" event is fired in step 578, at which point all plug-ins should execute code to "cleanup after themselves." Note that unlike the managers in the IDE, plug-ins can be restarted if the plug-in manager 530 fires a "start" event again. After all plug-ins have been stopped and no "start" event is fired, then an "uninstall" event is fired in step 579. At this step, the plug-ins are given the opportunity to perform any other cleanup with the knowledge that all other plug-ins have been stopped.

Figure 12:
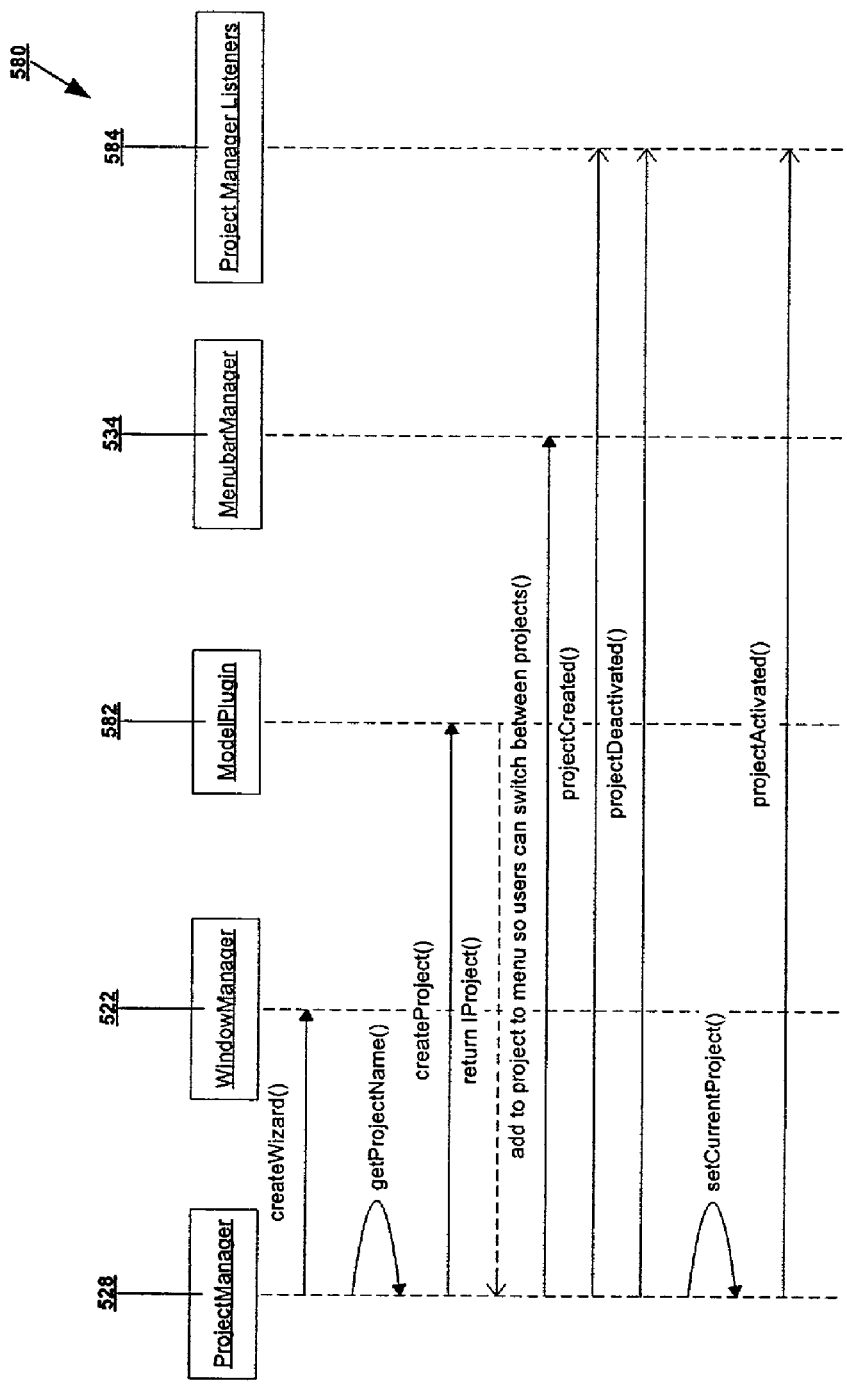
FIG. 12 is a sequence diagram detailing the process used by the current invention in creating a new project in the IDE.

FIG. 12 describes the interaction process 580 occurring between various IDE managers in order to create a new project. When the project manager 528 is installed in the IDE 500, it installs several commands to the menu and toolbar. One of these commands is the "New Project" command. When IDE-users select this command, the "Create" finction of the project manager 528 is executed. The first thing it will do is bring up a project creation wizard. This wizard will be installed by a plug-in during the plug-in manager 530 initialization code. The reason for this is to allow the IDE 500 to be able to handle more than one predetermined type of project. So, it will be up to the plug-ins to determine what type of project to create (which is more flexible since any user-defined plug-in can define their own project parameters). The IDE user interacts with the wizard to enter preliminary information about the project (see FIGS. 77, 78, 79, which are described later). One of the standard prompts is a location of where to store the project. The project manager 528 will then take this information and call the plug-in's implementation of the "createProject" call. Note that part of the process of a plug-in (e.g., ModelPlugin 582, shown in FIG. 12) installing a project creation wizard is also to register a "createProject" function so that the project manager 528 can call this function to create a project. The plug-in will handle all the details of creating a project, which will involve creating a directory to store project files and setting the project parameters (like project name, version number, comments). After the project is created, the project manager 528 will then fire off a "Project Created" event so that all interested "parties" or managers (e.g., "listeners" 584 ) interested in whether a project was created will be notified as such. After that, if a project was already being edited while a new project is created, a "Project Deactivated" event is fired to tell listeners 584 that the currently edited project will be put on the sidelines while the new project will become the "active" project. After the newly created project becomes the "active" project (the project to which users can make modifications), the "Project Activated" event is fired.

Figure 13:
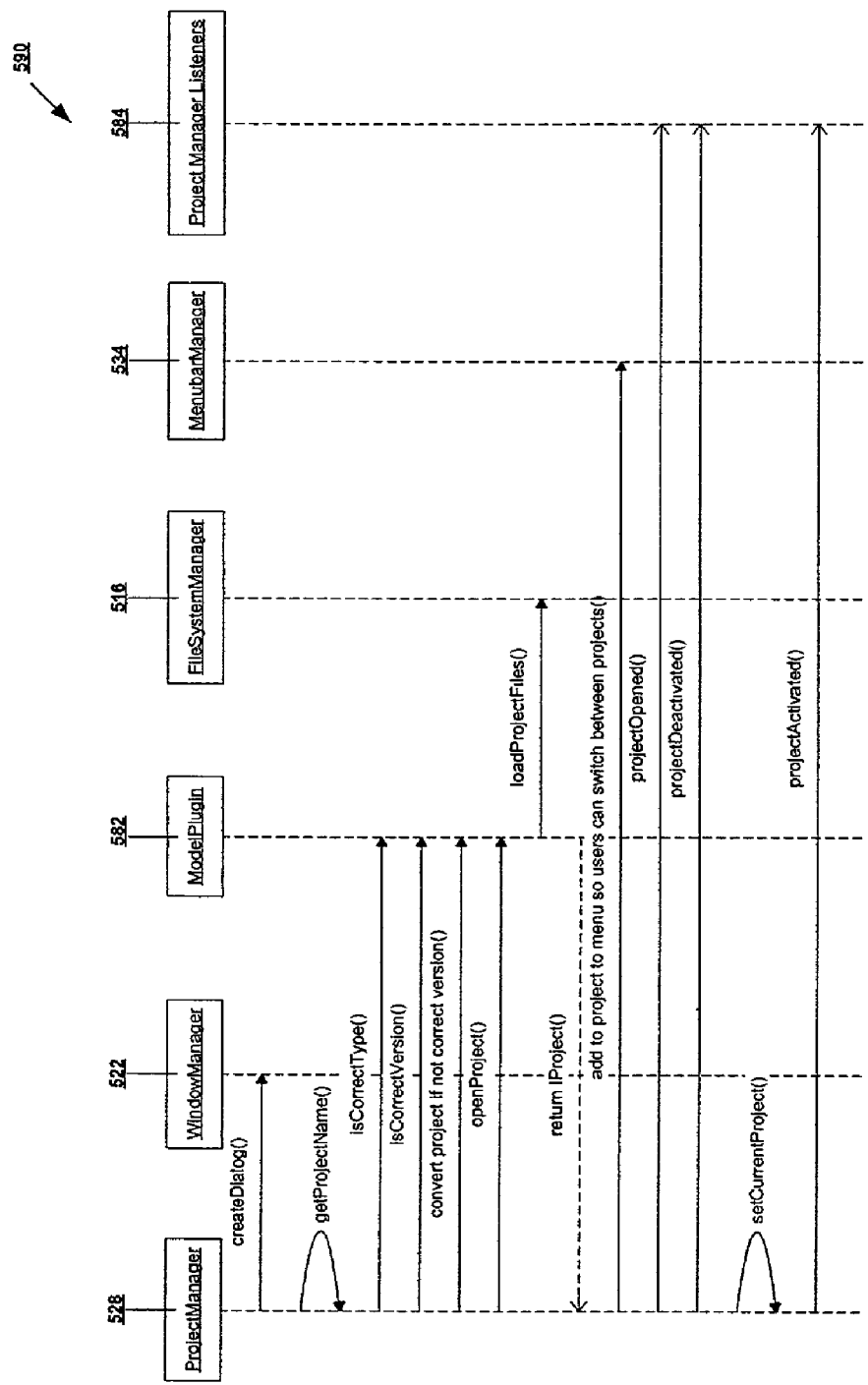
FIG. 13 is a sequence diagram illustrating the process used by the current invention to open an existing project in the IDE.
Figure 14:
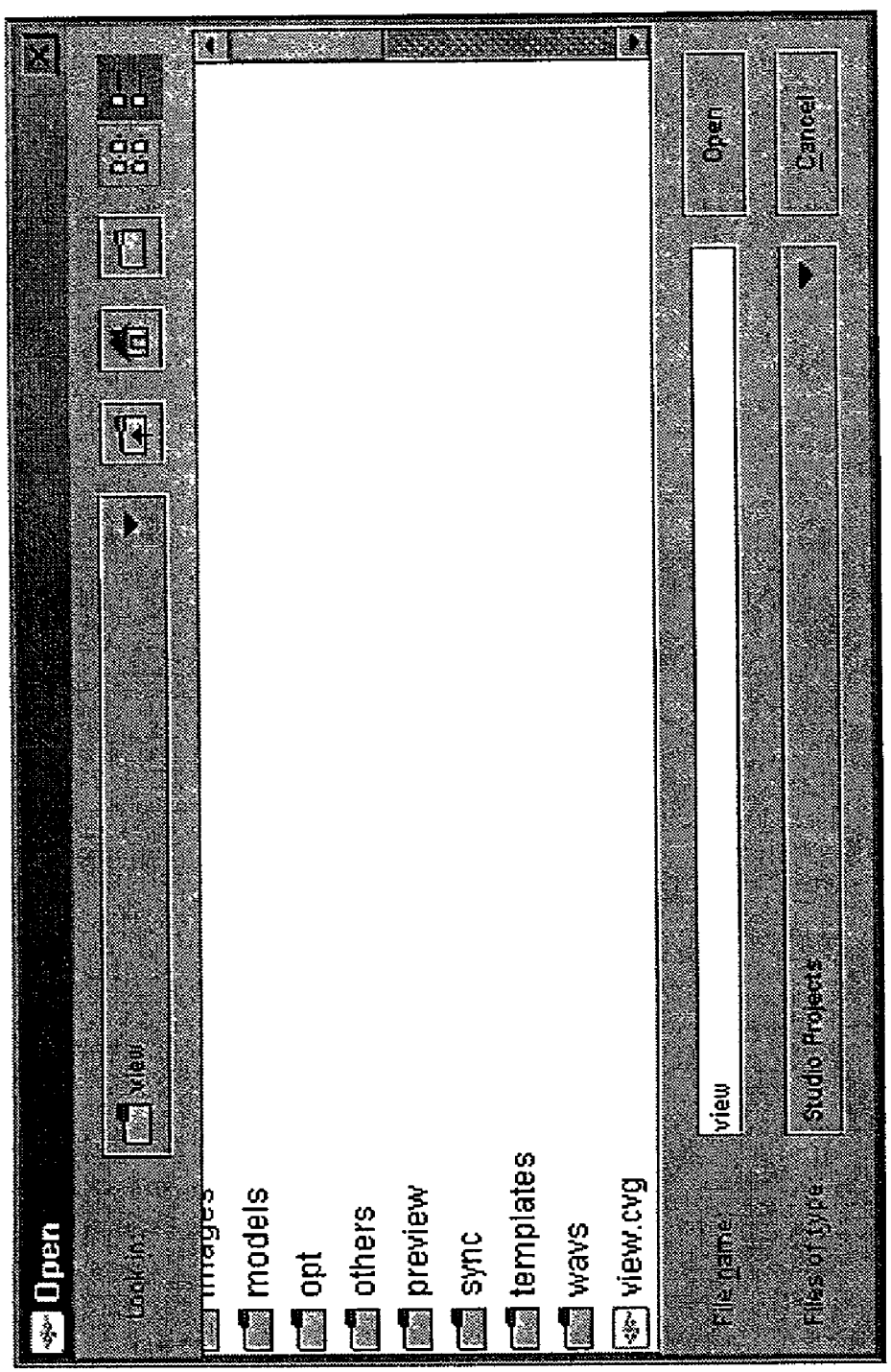
FIG. 14 is an embodiment of a dialog box used by the IDE to select a file for opening a project in the current invention.

FIG. 13 describes the process 590 when a project is "opened" or loaded for users to edit. The project manager 528 will first open up a dialog to allow users to select the project to load, as shown in FIG. 14. The project manager 528 will get the project name and then ask the plug-in whether it can correctly load the project. Again, plug-ins can install themselves into the IDE 500 and register themselves to be able to handle project calls. One of these calls is the "createProject" (as described above). If the plug-in determines that the project can be loaded, it tells the project manager 528 than it is ready to load the files. The project manager 528 will then call the "openProject" call for the plug-in to load all the files needed from disk. Once successfully loaded, the project manager 528 will fire the "projectOpened" event to all interested "parties" or managers. After that, if a project was already being edited while a new project is created, a "Project Deactivated" event is fired to tell listeners that the currently edited project will be "sidelined" while the new project will become the "active" project. After the opened project becomes the "active" project (the project where users can make modifications to), the "Project Activated" event is fired.

Figure 15:
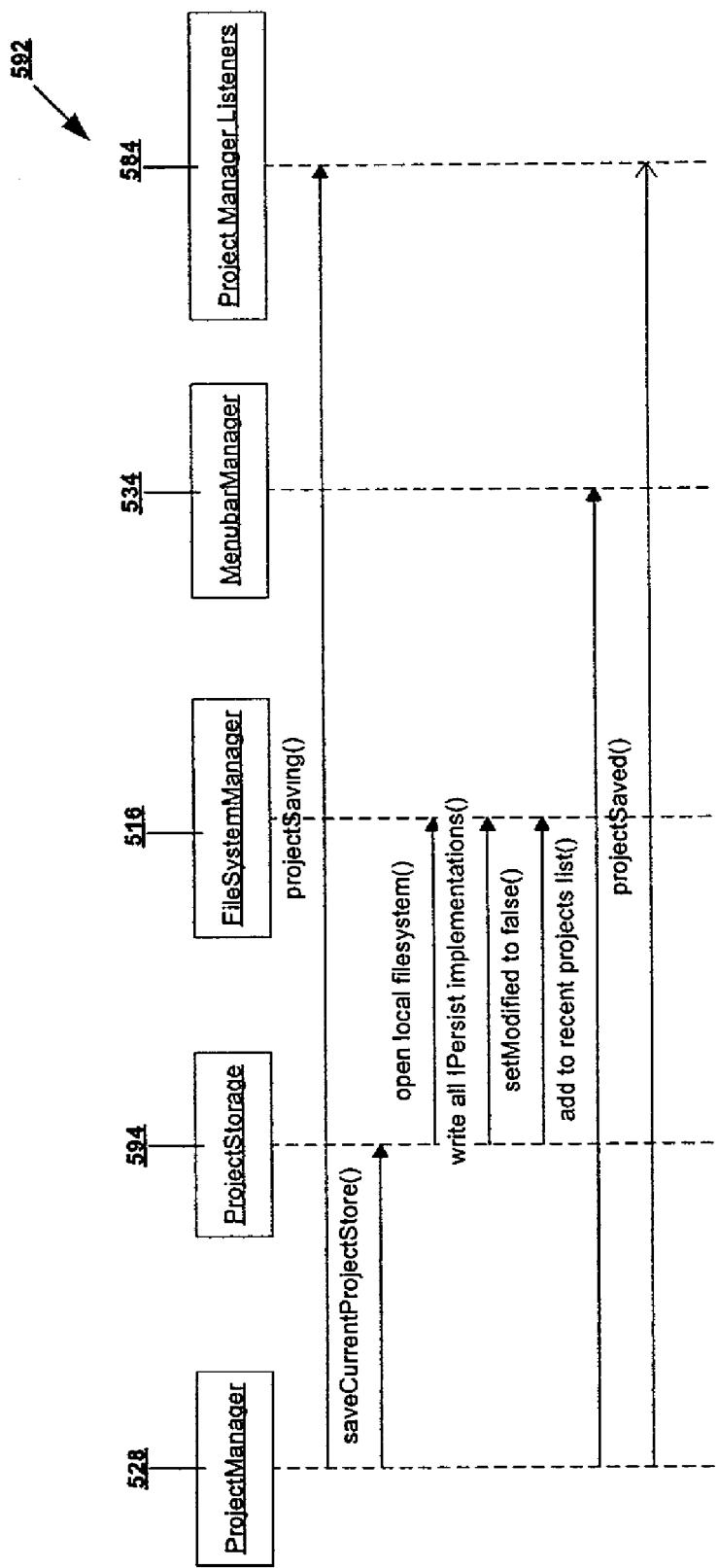
FIG. 15 is a sequence diagram illustrating the process used by the current invention to save a project in the IDE.

FIG. 15 describes the process 592 when a user chooses to save the project. First, the project manager 528 will fire a "projectSaving" event to tell interested "parties" or managers that it is about to save a project. This gives various other plug-ins a chance to setup additional files and commit changes to get saved. The "saveCurrentProjectStore" is then called, at which point the files will be saved within a conventional storage device or location 594. After files are saved, we also reset the "modified" flag to false. This flag is used to determine which files were modified and hence needs to be saved. So, files that have not been modified will not get re-written to disk. After the project has been saved, a "projectSaved" event gets fired to all interested parties.

Figure 16:
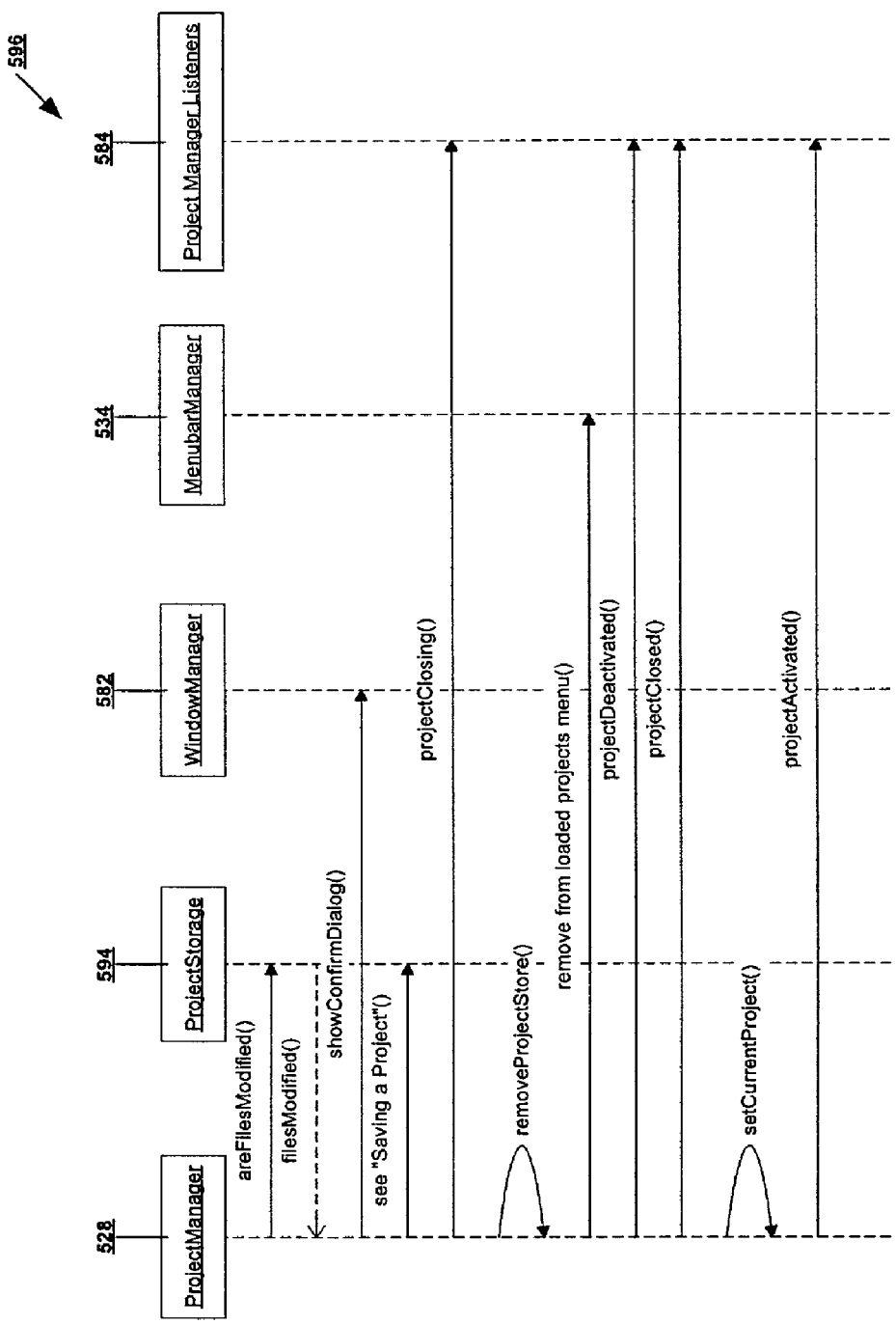
FIG. 16 is a sequence diagram illustrating the process used by the current invention to close a project in the IDE.

FIG. 16 describes the process 596 when a user chooses to "close" a project. Closing a project involves removing all editors from memory and stops the editing of the files in a project. Before a project is closed, the project manager 528 will ask whether the project files have been modified or not. If files have been modified, project manager 528 will ask whether the user wants to save the project first. If so, then the project saving process 592 described above will be executed. If files have been modified and the user chooses to cancel the "close" operation, then the project manager 528 will stop the close finction. Otherwise, if the project was successfully saved (if modified) or files have not been modified, then project manager 528 continues the close operation. A "projectClosing" event is fired to let interested parties know that the manager 528 is about to close the project. The project manager 528 will then release the memory that the editors used and close the various editor windows (by making a call to the window manager 522). When the project is "closed", a "projectDeactivated" event is fired to tell interested parties that the project is no longer active. Then a "projectClosed" event is fired to say that the project has been closed. Finally, if another project was being edited and was deactivated (because the closed project was previously being edited), that project will become activated. After the project is activated so that the user can edit the project, a "projectActivated" event is fired to let registered listeners 584 that this project is now the active project to be edited. It will be apparent to those skilled in the are that the rest of the mangers may function using events with the IDE core 502 to accomplish or participate in many functions of the IDE.

IV. Graphical User Interface

Figure 17:
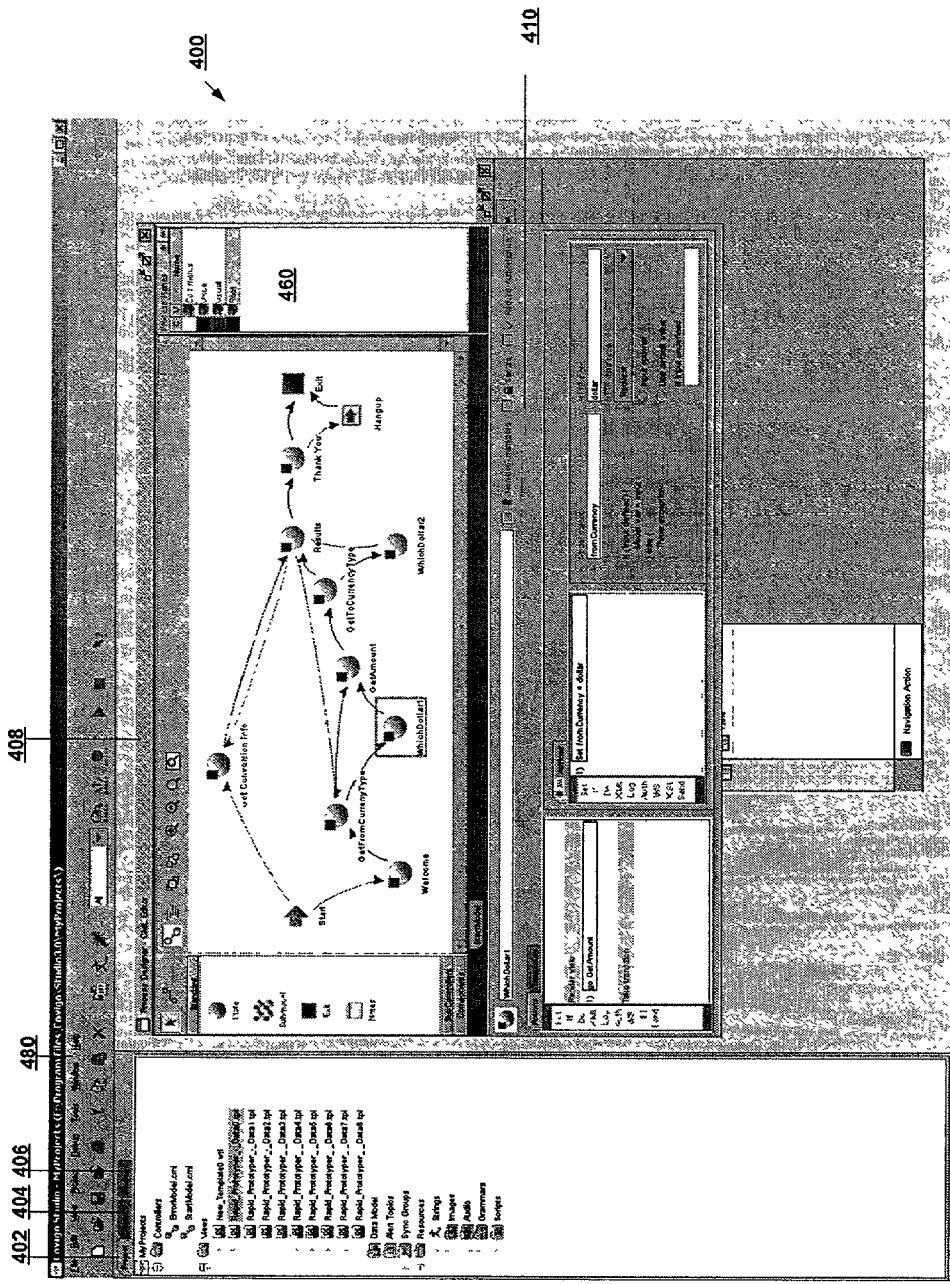
FIG. 17 illustrates an embodiment of a graphical interface for the IDE of the present invention.
Figure 18:
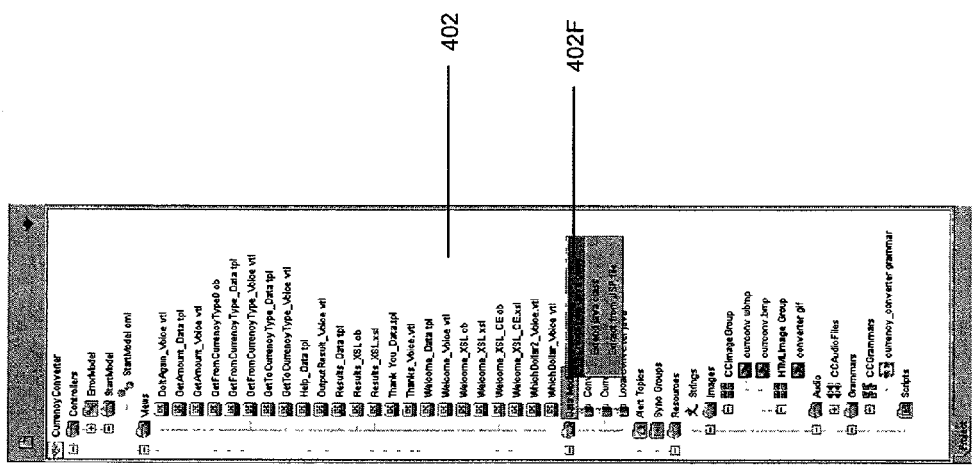
FIG. 18 illustrates an embodiment of a graphical interface for a project tree of the IDE associated with the current invention.

IDE 500 provides a graphical user interface (GUI) that allows a developer to operate the various functional modules or plug-ins 200 of system 100. The graphical user interface of the preferred embodiment is designed to encourage the development of multi-modal, multi-channel applications using the MVC architecture below in Section V. FIG. 17 illustrates one non-limiting embodiment of a graphical user interface (GUI) 400 for system 100. The graphical interface 400 provides a facility to create and manage the files and objects in an application or project created by system 100. The project tree 402 lists all the files associated with the current project. As seen in FIG. 18, there are several types of files that may be displayed in the project tree 402. These file types will be described as the invention is further explained below. The objects tree 404 contains all the data sources and model variables instantiated in the current, selected "controller". The bindings list 406 contains the all methods of the objects in tree 404 that have been used in the current controller. Objects, bindings, and controllers are more fully and completely explained below.

Figure 19:
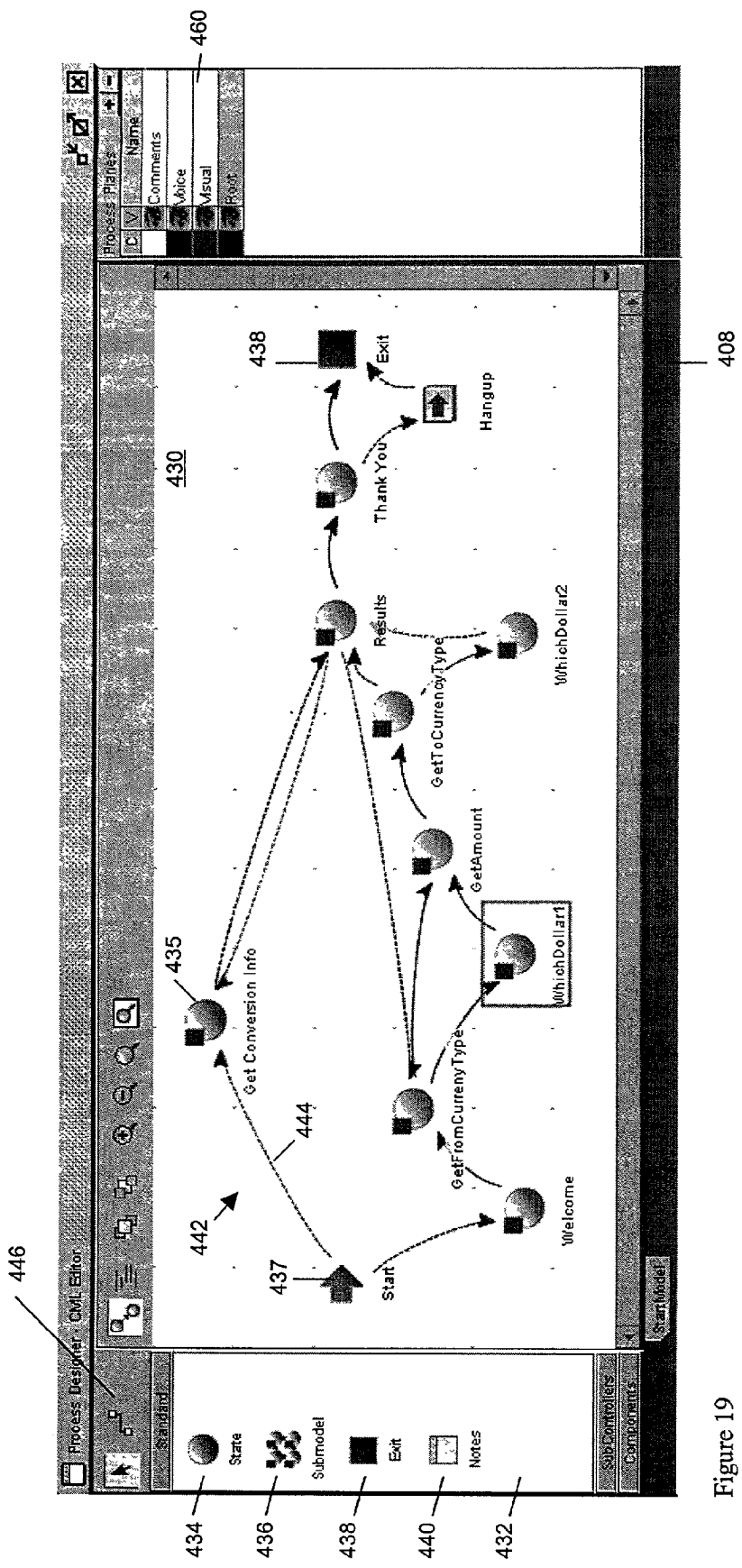
FIG. 19 illustrates an embodiment of a graphical interface for the interaction flow editor of the IDE associated with the present invention.
Figure 20:
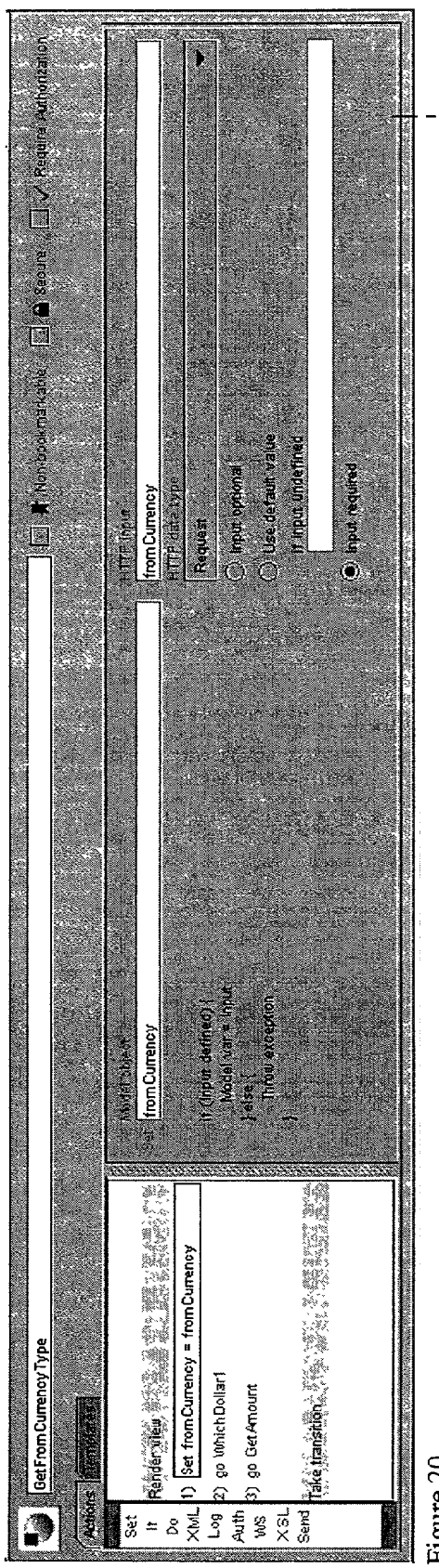
FIG. 20 illustrates an embodiment of a graphical interface for the actions editor, which is linked to the interaction flow editor shown in FIG. 17, associated with the present invention.

Interface 400 further includes editors 408 and 410, illustrated in FIGS. 19 and 20. Editors 408 and 410 provide interfaces for configuring the interaction flow and application logic. The user interfaces of the application may be developed in the appropriate editors 412, 414, 416, 418 and 420, which are illustrated in FIGS. 21, 22, 23, 24, and 25, respectively. Each of these editors will be explained more fully below in Section VI.

V. MVC Design Architecture

Figure 26:
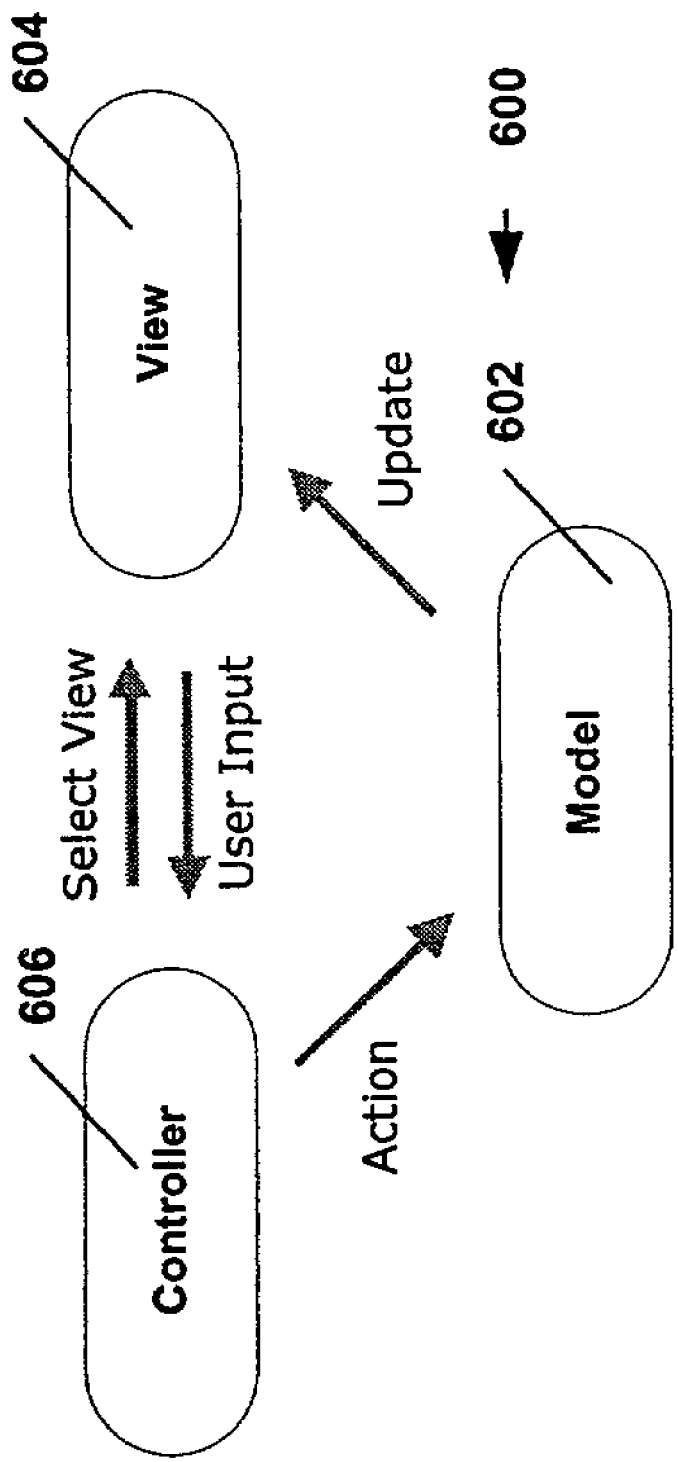
FIG. 26 is a flow diagram illustrating the run-time interactions between the Model, View, and Controller modules in the MVC (Model-View-Controller) programming paradigm of the prior art.

The preferred embodiment of system 100 enforces applications development using a "Model-View-Controller" (MVC) design architecture. MVC is a known, object-oriented design pattern. MVC was designed to reduce coding effort required to build large multi-user systems where different simultaneous views of the same data are required. The Model-View-Controller design approach separates the application data from the user interface and application behavior. This separation increases reusability and flexibility of the overall solution. It also provides a powerful way to organize systems that support multiple presentations of the same information. As shown in FIG. 26, the MVC architecture 600 is composed of three design component types: the model 602, the view 604, and the controller 606.

The model 602 represents the data in the application. It manages all transformations of data. The model 602 does not need to know about specifics of the view 604 and controller

606. The model 602 can be queried by all the views 604 associated with it through the controller 606. The model 602 sends notifications to all the views 604 through the controller 606 when there are relevant changes to the data.

The view 604 represents the output of the application. The view 604 maintains the look of the application and presents the data to the user. The view 604 does not act on the data or change it. The view 604 forwards user input to the controller 606. The view 604 further updates the output display when it receives notifications from the controller that the data has changed.

The controller 606 represents a mapping between the user interaction from the view 604 and application actions and business logic. The controller 606 is typically specialized and is designed to work with interactions from a particular view 604. The controller 606 translates the user input into operations on the model data. The controller 606 also selects which view to display based on user input and actions on the model 602.

VI. Method for Developing Applications

As will become apparent in the following discussion, there is one-to-one correlation between MVC and the programming model for multi-modal, multi-channel applications implemented by the present invention. Thus, applications developed using the present invention are designed to leverage the benefits afforded by the MVC design architecture.

In the present invention, the controller designer preferably takes form as an interaction flow editor. The interaction flow editor or "workflow editor" is represented by a visual diagram (e.g., a workflow diagram) that maps the paths that an end user can take through an application. The path an end user takes is generally determined by what the user inputs at specified points in the user interface. The interaction flow design also contains the logic that ties the application together. It is composed of basic units called states, which are linked together by transitions. These states will be explained in more detail later.

In the present invention, a view designer may be used to create a specific user interface that displays data to and possibly accepts input from an end user. A view is associated with a state in the interaction flow. One state may be associated with many or no views. Each channel on which an application may operate generally requires its own view. Thus, in many multi-channel applications, each state may contain multiple views.

The model designer in the MVC architecture design of the present invention is referred to as data integration. Data integration entails retrieving the data for an application from various sources. In the preferred embodiment, the present invention converts all data sources into Java objects to provide a common interface for placing data in views. The java objects can in turn be instantiated into variables or model-variables and used as references in control and view design.

Figure 27:
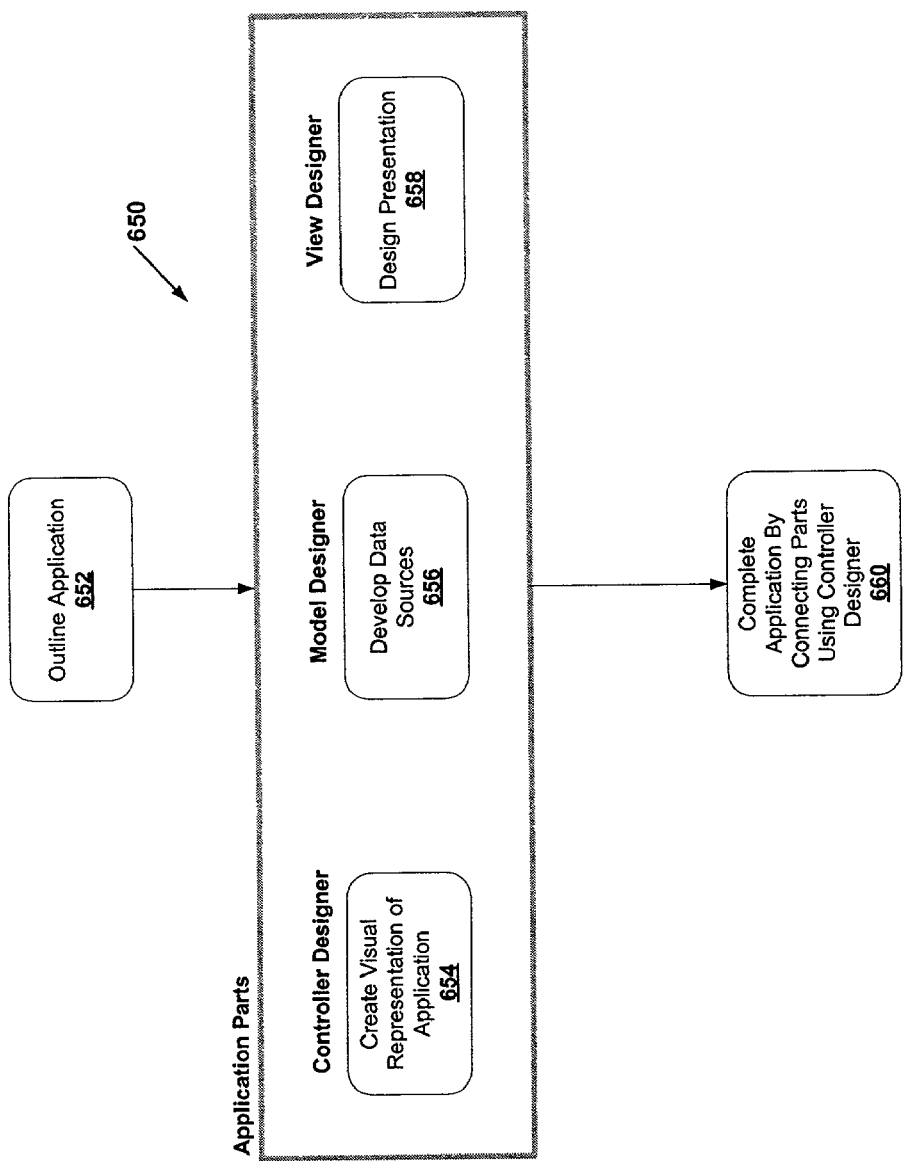
FIG. 27 is a flow diagram illustrating a preferred design time method using Model View Controller (MVC) architecture for developing applications using the present invention.

FIG. 27 illustrates the method 650 of designing and deploying a multi-channel according to a preferred embodiment of the present invention and using the MVC paradigm. Briefly, a developer will use system 100 to perform the method 650 by completing the following steps: (i) design an outline of the application, as shown in functional block or step 652; (ii) design a visual representation of the application interaction (e.g., by use of the process design module 12), as shown in functional block or step 654; (iii) design or integrate data sources within the application (e.g., by use of the integration design module 14), as shown in functional block or step 656; (iv) design the presentation of the application (e.g., by use of the presentation design module 16), as shown in functional block or step 658; and (v) complete the application by updating the controller design with views and data elements if required (e.g., connecting the various application parts). The IDE 500 may then output a persistent representation of the above designs developed in steps 654, 656 and 658 and including various resources (such strings, images, class libraries) used by the designs to a manifest called project. (Note that steps 654, 656, and 658 and 660 may occur in any order, or even simultaneously, and represent the creation of the controller, model, and view of the MVC design paradigm, respectively.) The foregoing steps will be described more fully and completely below.

A. Outlining the Application

Before creating the various parts of an application, a developer will outline the functionality of the application, as indicated in step 652 of FIG. 27. The outline may generally be created by performing the following tasks and considering the following factors:

a) The developer will divide the application into logical, sequential steps. Each step will represent one state, transition or sub-controller.

b) The developer will expand the outline as necessary to account for "worst case scenarios" (this may be especially important for multi-channel applications).

c) The developer will consider which steps or series of steps should be broken out into sub-controllers. This object-oriented approach encourages reuse and maintenance.

An example of how the foregoing process of outlining an application is performed is provided in Section X below with reference to a currency converter application.

B. Controller: Interaction Flow Design

Once an outline has been developed, the developer may visually design the interaction flow of the application, as indicated in step 654 of FIG. 27. The interaction flow defines the application concepts and logical flow of the application in the form of a state diagram. These concepts and ideas include all interactions between the application and the end user, as well as all the back-end resources and processes. The user designs the interaction flow by creating a visual representation using a few simple building blocks: states, sub-controllers or sub-models, transitions, and actions. States, sub-controllers and actions are defined as follows:

State: The condition of the controller at a given instance in time, including its configurations, attributes, and/or information content.

Sub-controller or Sub-model: A controller which can be called by another controller.

Transition: The change from one state to another.

Action: A process that takes place when called. Each action may be categorized as a pre-action, action, or post-action. States have pre-actions, actions, and post-actions. Transitions only have actions. Actions may be used to execute a transition, or to store and retrieve data.

Pre-action: An action executed as soon as the state is entered (via a transition) from a different state. When views are associated with the state, the pre-action is always executed before a view is rendered to the end user.

Action: When views are associated with the state, the action is executed after a view has been rendered. Otherwise, the action is executed after any and all pre-actions have been executed. Note that calling a transition (from a state) is an action. If there are transitions from the current state to other states, each transition will have its own action.

Post-action: A post-action is executed only if a transition is taken from a state to a different state. If no transition is taken, the post-action will not be executed. The post-action is executed after any actions on the transition are executed and before the pre-actions of the next state are executed.

Figure 28:
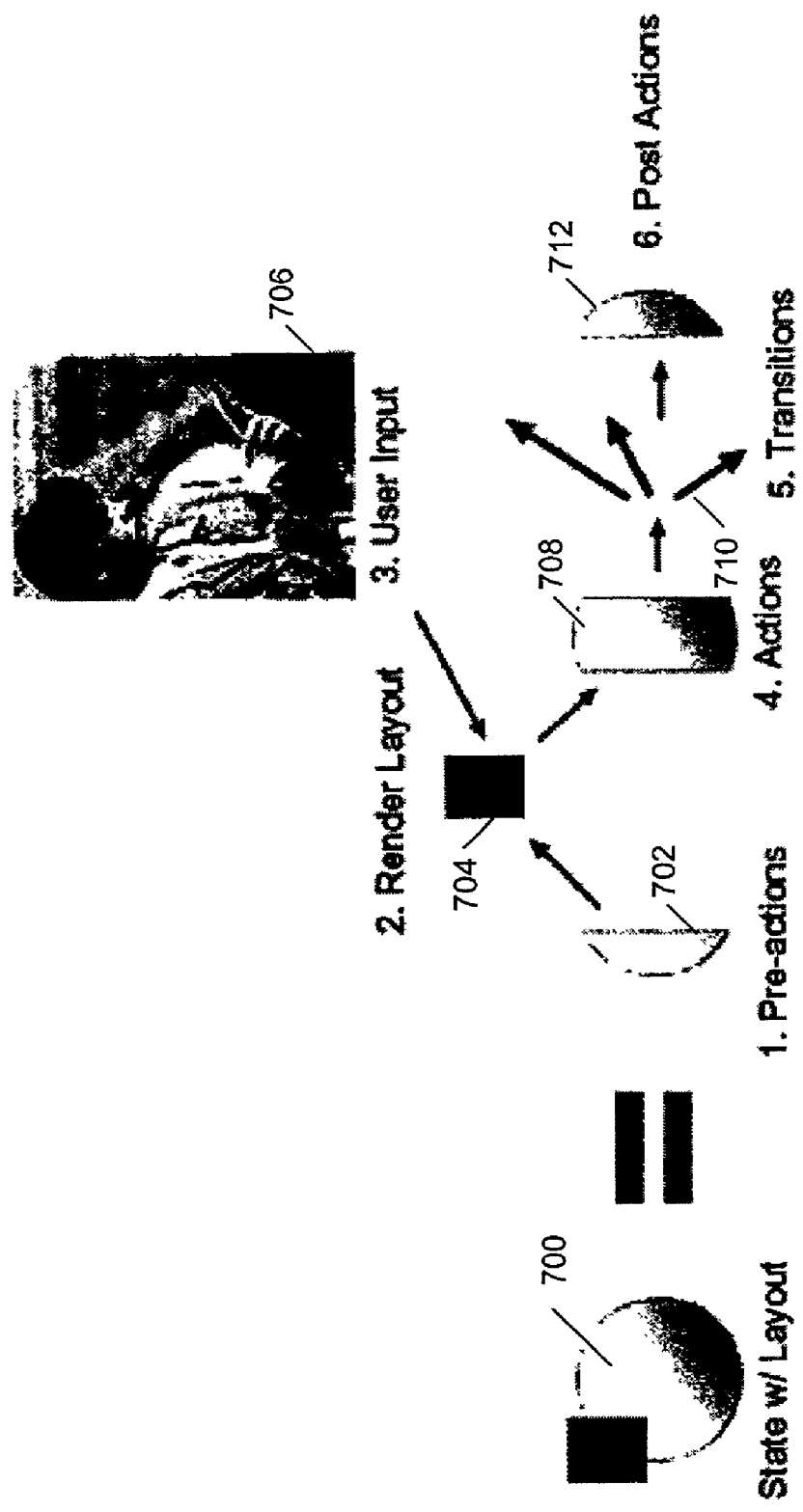
FIG. 28 is a flow diagram illustrating the order in which the components (actions, transitions, views) of a state are executed during run-time.

FIG. 28 illustrates an order in which the foregoing application elements are preferably executed by a run-time system implementing a state controller. As shown in FIG. 28, a run-time implementation of a state 700 may perform certain pre-actions 702, which generate an interactive graphical layout 704 that appears on a client device. A user may then provide input 706 through the layout 704. The state 700 will then perform certain actions 708 that may trigger one or more transitions 710 (e.g., to one or more different states). After the transition 710, the state will perform certain post actions 712.

States, transitions, actions and controllers can be combined together to form a complete and functional application. In the preferred embodiment of the invention, a developer will adhere to the following rules and conventions when forming an application:

1. An application is composed of one or more controllers.
2. The first controller in an application is referred to as the "StartModel."
3. A controller is composed of a set of states and sub-controllers, tied together by transitions.
4. The first state in a controller is called a "start" state. Each controller requires a start state. A start state will not have any views.
5. Transitions cannot transfer to start states.
6. The last state(s) in a controller is called an "exit" state. Exit states are optional within controllers. Transitions cannot leave "exit" states. If a sub-controller contains an "exit" state and the application reaches this state, several things can happen:
    (i) The application can return from the sub-controller to the controller that called it.
    (ii) If there is no controller that called the sub-controller, the run-time engine implementing the controller may decide among the following actions:
        a. In real-time mode, the application will be restarted for the user;
        b. In offline mode, the application will return back to the operating system that invoked the application.
7. Each controller will only have one "start" state, but can have any number of "exit" states. Multiple "exit" states can be used to reduce visual clutter among transition lines. However, all "exit" states have the same functionality.
8. Each state contains a set of pre-actions, a set of actions, and a set of post-actions.
9. Each transition contains a set of actions.
10. Each sub-controller call contains a set of actions.
11. Sub-controller calls behave like states in the current controller. However, once the start state of the sub-controller has been called, the application does not come out of the sub-controller until some exit state of the sub-controller is reached.
12. Actions in each set are executed sequentially (from first to last), and may appear in any order.
13. A transition is called from one of the actions in the originating state.
14. If a state has multiple transitions, each transition can have a condition associated with it, so that the transition is only taken when the condition is satisfied.
15. The first transition whose condition (if any) is satisfied will be taken, and the actions following the transition in that state will not be executed.
16. When an action (including pre-actions and post-actions) in an action list fails to be executed, the remaining actions in that list will be skipped and if a view exists then that view will be displayed. In the case of pre-actions, if an action fails, the rest of the actions in the pre-actions list are skipped and the controller will display the view (if one is present). For post-actions, if an action fails, the rest of the actions in the post-actions list are skipped and the controller will transfer control to another state (since post-actions only occur when a transition is to be taken).

(1) Creating a Workflow Diagram

Following the above-delineated rules and conventions, a developer creates a workflow diagram that visually represents the interaction flow, in functional block or step 654 of FIG. 27. The developer creates the workflow diagram by use of process design module or plug-in 12 of system 100 (see FIG. 7). The GUI 400 provided by IDE 500 includes a workflow editor 408 (see FIGS. 17, 19), which serves a graphical interface for the process design module 12 with "drag-and-drop" functionality and a set of toolbars that allow application developers to rapidly model a complete multi-channel application. By providing a separate workflow editor 408, the GUI 400 allows a developer to separate interaction flow modeling from presentation design, which is performed by use of module 16, and data source integration, which is performed by use of module 14. The workflow editor 408 (i.e., the graphical interface for the process design module 12) allows application developers to globally view the application and to visually diagram the interaction flow of the application (controller by controller). Each state of the application flow can then be connected with supporting application process logic. Particularly, the workflow editor 408 allows a developer to define the individual states of an application, and control logic for directing transition flow between states. The editor 408 also allows developers to specify procedures and rules to fully define complex business processes. Developers can then componentize and store an entire state flow or parts of a state flow describing a business process for future reuse (e.g., by use of componentization module 20).

The GUI 400 includes a visual design interface or editor 408 that relates iconographic symbols to functional states, components and transitions of the application that is being developed. FIGS. 17 and 19 illustrate a non-limiting embodiment of a graphical interface for editor 408, which represents the process design module 12. As shown best in FIG. 19, the design editor 408 includes an editor window 430, and a menu or palette 432 of standard drag-and-drop visual components 434-440 with which a user may create a visual representation or interaction workflow diagram 442 for each controller of an application. The interaction workflow diagram 442 defines the user interaction flow for the application between the client device and the server or the client device and the device local server (application) generated out of GUI 400.

As shown in FIG. 19, an interaction workflow diagram 442 may include components 432-440 (which represent states) and transitions 444 that cooperatively and visually describe the logical process flow of an application or controller. Each state represents a complete transaction that begins with the user requesting some piece of information; proceeds with the server delivering a client-specific presentation on the target device; and ends with the receipt of the end-user's response. The start state 437 and end state 438 of the process flow each have their own special representations.

The palette 432 includes visual icons or components 434-440 that are used to represent various types of states. The workflow diagram 442 shown in FIG. 19 begins with a start state component 437, which indicates the beginning of the process flow, and terminates with an exit state component 438, which indicates the completion of the process flow. The remaining states of the process flow are depicted using either state components 434 or sub-model components 436.

A state component 434 is used to define a set of actions, pre-actions and post-actions where no user interaction is required for that state. A state component 434 represents a logical decision point within the workflow diagram 442 that does not render data to the end user. A state with layout component 435 is the same as the state component 434 with the additional capability of interfacing with the end user. A sub-model component 436 represents a sub-controller and is a collection of the other states, transitions and components. Particularly, a sub-model component 436 is a high level depiction of the process flow for a sub-controller. Only actions and a parameters list are defined for a sub-model component 436. The parameters list describes inputs to the sub-model component 436.

A developer uses the process design module interface 408 to create a workflow diagram 442. A developer may construct a workflow diagram 442 by identifying the states that the application or controller requires (e.g., according the outline and the above-delineated rules and conventions), and dragging the representative components 434-440 into editor portion 430 from the standard component palette 432 in a conventional manner (e.g., by use of a mouse or touch pad). The developer may then link the components 434-440 together by use of the transition tool 446. Particularly, a developer may create a transition 444 between two states (e.g., between states 437 and 435) by selecting the transition tool 446, selecting the state that will be "transitioned from" (e.g., state 437), then moving the cursor to the state that will be "transitioned to" (e.g., state 435). The foregoing steps are effective to create a visual depiction of the transition and to functionally link the states within the interaction workflow diagram 442. System 100, by use of IDE 500, may store the visually created interaction flow for each controller in the XML/CML format as described below.

Figure 29:
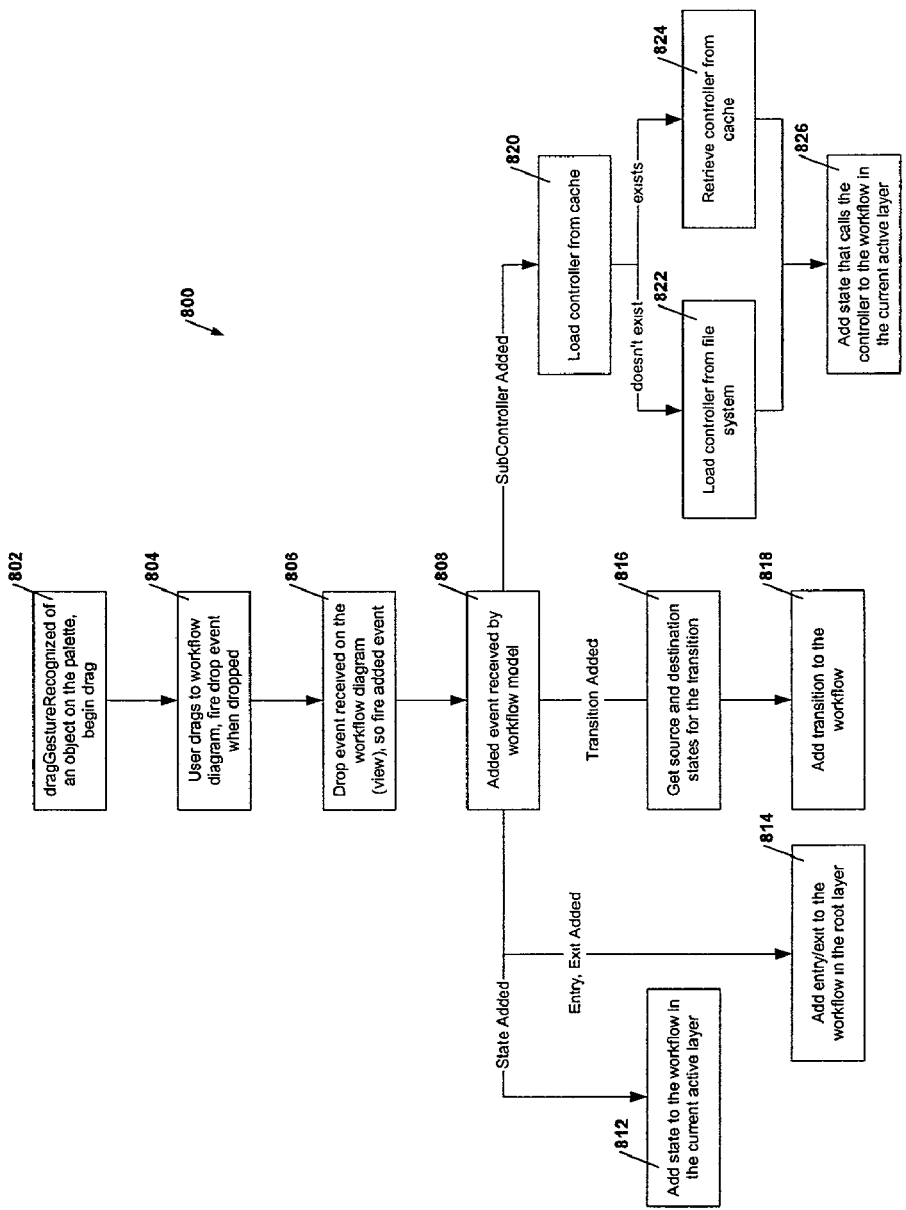
FIG. 29 is a flow diagram illustrating how objects are added to the interaction flow editor associated with the IDE of the current invention.

FIG. 29 is a flow diagram 800 illustrating how the IDE 500 internally adds objects to a controller's workflow by use of editor 408. The mechanism to edit an application's workflow contents may involve the workflow editor 408 and property inspection plug-ins. Property inspection plug-ins expose a user interface that allows users to edit the properties of an object. Each object has its own set of properties that it exposes. The property inspector reads these properties and displays the values in a two-column table. Each property has a name and a value associated with that name. Thus, the property name will be the first column in a table and the value will be displayed on the second column. Only the second column (values) can be edited by the user. In some instances, an object might reveal its own property inspector. In such cases, the IDE 500 will display the object's editor rather than provide an editor through the generic property inspector plug-in. As previously discussed, objects or components (such as states and sub-controllers) exist on the object palette 432. When a user drags components from this palette in step 802 in FIG. 29 (e.g., using a mouse pointer), information about the component being dragged is stored in a temporary storage medium. In step 804, the user drags the component into the workflow diagram 442. When the user drops the component (e.g., releasing the mouse pointer button), an event is triggered on the workflow editor 408 under the object drop location. (Software process for performing "drag and drop," "clicking," and "double-clicking" functions, such as in the Windows Operating System™ are well known in the art.) The component is then added to the workflow diagram as shown in steps 806, 808. The workflow editor 408 then determine what type of object was dropped and determines the appropriate action.

If a state is added, the IDE 500 adds the state to the workflow model (i.e., the workflow editor data structure) in the current active layer (layers are explained below in Section VII), as shown in step 810. If an entry or exit state is added, the IDE 500 adds the state to the generated workflow model in a root layer, as shown in step 812. If a transition is added, the IDE 500 retrieves source and destination states for the transition in step 816, and then adds the transition to the workflow in step 818. If a sub-controller is added, the IDE 500 loads the sub-controller from the memory cache in step 820. If the sub-controller does not exist in the cache, it is loaded from the file system. By default, the file system manager will use the local disk drive to read and modify files. If the sub-controller does exist, it is received from the cache in step 824. Finally, in step 826, the IDE 500 adds a state that calls the sub-controller to the workflow model in the current active layer.

Figure 30:
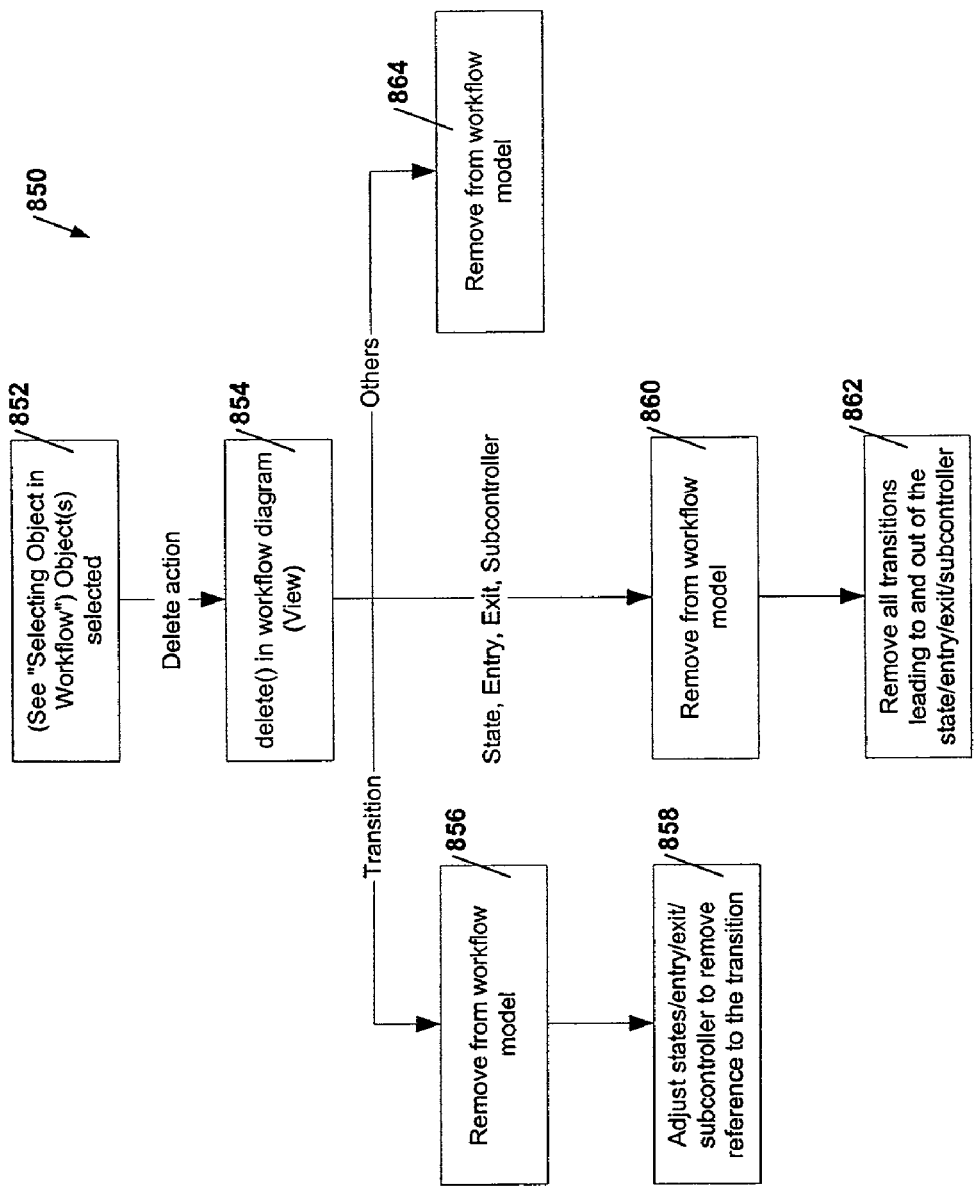
FIG. 30 is a flow diagram illustrating how objects are removed from the interaction flow editor associated with the IDE of the current invention.

FIG. 30 is a diagram 850 illustrating how an object or component is removed from the workflow editor 408. The appropriate object(s) are first selected using the mouse pointer, as shown in step 852. The user then executes a delete action. The delete action could come from a variety of different sources, including pressing a 'delete' key on the keyboard or pressing the delete button in the toolbar. In step 854, removal of the object is shown in the workflow diagram 442. If the removed component is a transition, the IDE 500 further removes the transition from the created workflow model (i.e., the workflow editor internal data structure) in step 856, which will update the views appropriately. In step 858, the IDE 500 adjusts all states, entries, exits, and sub-controllers to remove reference to the transition. If the removed component is a state, entry, exit or sub-controller, the IDE 500 removes the component from the workflow model in step 860. IDE 500 then proceeds to step 862, and removes all transitions leading to and out of the removed component (i.e., the state, entry, exit or sub-controller). For any other type of removed component, IDE 500 removes the component from the workflow model in step 864.

By creating the visual workflow diagram(s) 442, the developer has laid the application foundation. Next, the separate pieces of the application need to be created: the views and the data sources. (See the View and Model sections below for a full and complete explanation.) After creating or importing the views and data sources, the developer then connects them together in the application flow. This is done using actions.

(2) Creating Actions

System 100 allows a developer to create various actions by use of the actions editor 410 (see FIGS. 17 and 20). In the preferred embodiment, system 100 allows a developer to create the following predefined actions: Set, If, Do, XML, Log, Auth, WS, XSL, Send, and Code. Furthermore, developers can also create custom actions and add them to the palette. The predefined actions are defined as follows:

1. The Set action sets the value of a controller variable to the value of an input returned from the end user (in a "request" variable). This is the primary interface to retrieve values entered by a user. The "Set" action can operate in three different modes:
   a. Input required—requires the specified "request" variable to exist. If it does not, then the controller fails the action and proceeds as defined in the rules above.
   b. Input optional—the specified "request" variable does not have to exist. If it does not, then the controller continues to the next action.

c. Input option with default value—the specified "request" variable does not have to exist. If it does not exist, then the controller variable is set to the specified default value.

2. The If action contains a condition entered by the developer. If the condition is satisfied, the following action will be executed. If it is not satisfied, the following action is skipped. The user can enter any expression to be evaluated. Inequality operators include "=" (equals), "!=" (not equal), "<" (less than), ">" (greater than), "<=" (less than or equal), and ">=" (greater than or equal). It will be apparent to those skilled in the art of programming that the any Boolean condition can be used inside the If action.

3. The Do action calls a method on a controller object. The user enters the method name on the object on which to act in the form <object name>.<method name>. A table with the return value and parameters is shown for that particular method in which the user may pass controller variables. It will be apparent to those skilled in the art of object oriented programming on how objects and methods are used. Methods and objects are also further explained below in the data integration part of this section.

4. The XML action maps the value of tree nodes in an XML data source to the values of model variables.

5. The Log action writes a line in the engine log. The engine log is a file that resides in an application repository. While the application runs, any errors or other messages can be written to this file. This file can then be used to debug errors, to determine logging, or for any other suitable function. The Log action may print a string and/or the value of any model variables. Running of the application is discussed within Chong, et al.

6. The Auth action is used for user authentication. The Auth action allows the developer to set when the user has been authorized or unauthorized.

7. The WS action allows the developer to call a web service. Web services are a new breed of Web applications. They are self-contained, self-describing, modular applications that can be published, located, and invoked across the Web. Web services perform functions, which can be anything from simple requests to complicated business processes. Once a Web service is deployed, other applications (and other Web services) can discover and invoke the deployed service.

8. The XSL action applies a XSL stylesheet to a XML data source and stores the output in a given model variable. It will be apparent to those skilled in the art of internet standards to appreciate XML and XSL actions and their use cases.

9. The Send action is used to send alerts to subscribed users.

10. The Code action is used to write language-specific code that gets executed as an action. This allows developers to write custom code when the above actions (1-9) are not sufficient. Developers are provided with a text editor into which they can add any arbitrary code. During deployment (see Section IX, infra), this code is compiled by a code compiler to generate code that will run on platform supporting the language-specific code. In the preferred embodiment, the IDE 500 provides provisions for writing Java Language code. Alternative embodiments may be based on differing technologies without departing from the scope of the present invention.

Figure 31:
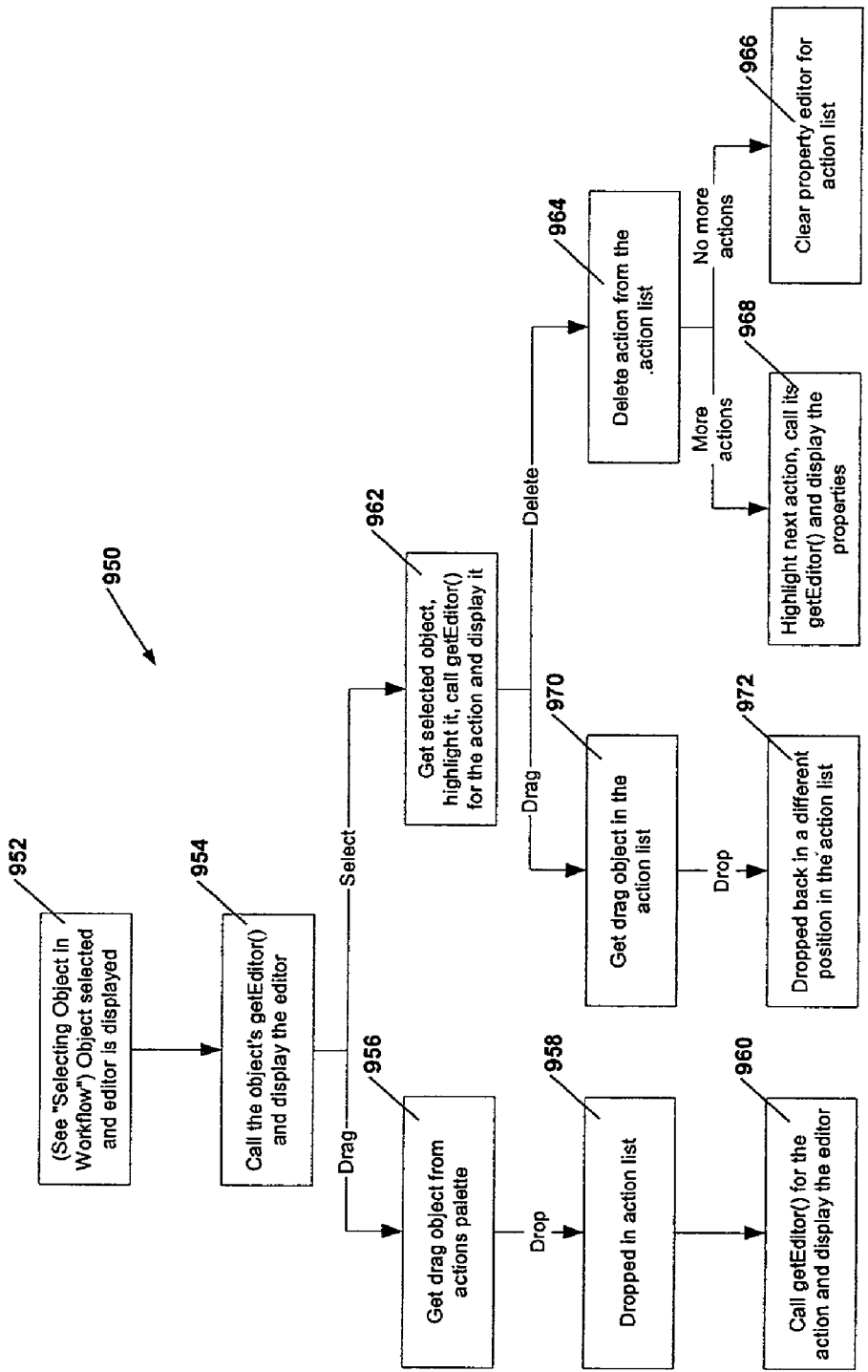
FIG. 31 is a flow diagram illustrating how selecting an object in the interaction flow editor of the IDE brings up property editors inside the IDE associated with the current invention.

FIG. 31 is a flow diagram 950 demonstrating the various operations available through the actions editor 410, shown in FIGS. 17 and 20. The actions editor 410 is embodied within the property editor plug-in. When an object is selected in the workflow editor (see FIG. 32 discussed below), an editor that is associated with the selected object will be displayed, as shown in steps 952, 954. Users interact with this editor. The actions editor 410 is one of the types of editors that the property editor plug-in will display. The actions editor is a hierarchical editor. One action editor 410 may actually bring up another action editor. For example, a transition can contain a list of more actions. A transition is an editor (determines the target state) and is also an editor for other actions. There are four primary actions that can be performed in the action editor. A drag event from the actions palette to the actions list (steps 956, 958) adds an action to a list of actions for a selected object, and calls and displays the editor for that action, as shown in step 960. A select event on an action in the actions list will bring up an editor for that action, as shown in step 962. A delete event on a selected action in the actions list will delete the action, as shown in step 964. If no more actions exist, the IDE 500 will clear the property editor in step 966. If more actions do exist, the IDE 500 will highlight the next action and call its editor in step 968. A drag event on an action in the actions list will reorder the action, as shown in steps 970 and 972.

Figure 32:
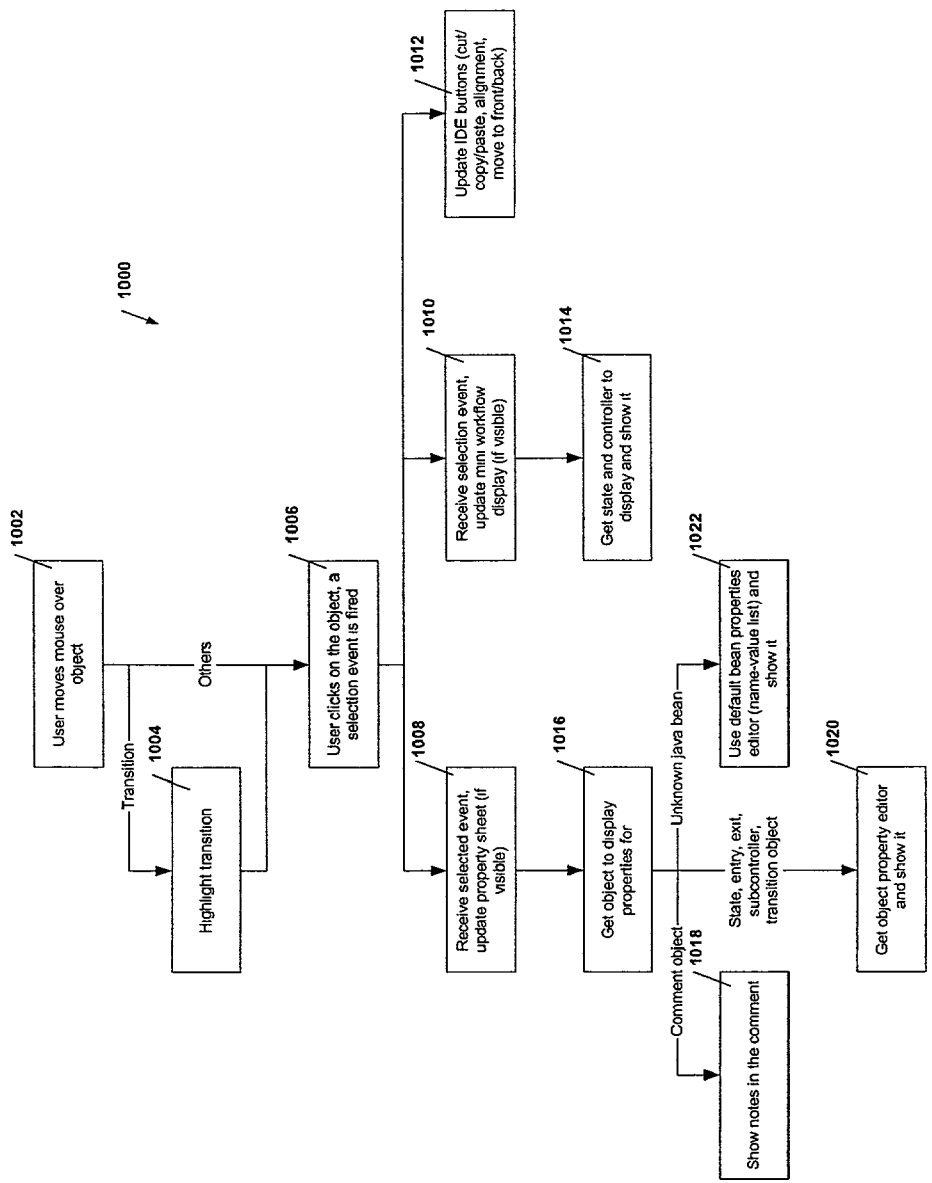
FIG. 32 is a flow diagram illustrating how an object is selected in the interaction flow editor associated with the IDE of the current invention.

FIG. 32 is a diagram 1000, illustrating the operation of the IDE 500 in response to a user selecting a component on the workflow editor 408. In order to select a transition, a developer moves the cursor over the transition, as shown in step 1002. Once the cursor is over the transition, the transition is highlighted to provide visual feedback to the developer that the transition is ready to be "clicked" on to be selected, as shown in step 1004. Developers can then click on the transition, as shown in step 1006 to select that transition object. For other types of components (such as states), the developer moves the cursor over the component, as shown in step 1002 and clicks on the component, as shown in step 1006. After the object (e.g. transition, state) is selected, the IDE 500 will determine what type of component or object was first selected. The IDE 500 will receive the selection event, and will update the property sheet to show the settings for the selected object in step 1008, update the mini workflow diagram to show the selected object in a controller viewer that displays the entire diagram in steps 1010 and 1014, and update the displayed IDE buttons such as the "cut" and "copy" buttons to allow developers to delete or make copies of the selected object in step 1012.

Figure 33:
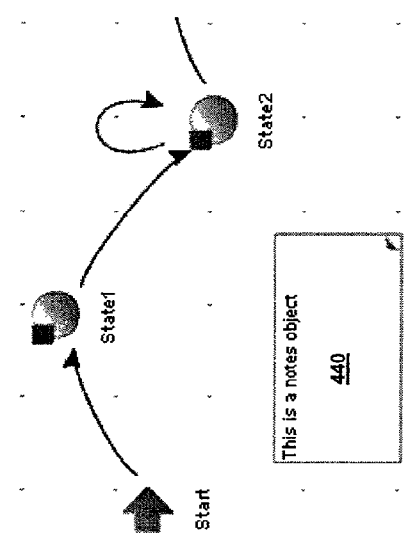
FIG. 33 is an embodiment of a notes object in the controller editor of the IDE described by the current invention.
Figure 34:
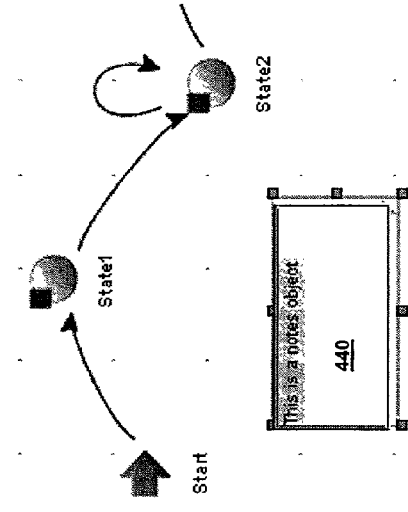
FIG. 34 is an embodiment of a graphical interface for editing the content of the notes object inside the IDE described by the current invention.

In step 1016, the IDE 500 retrieves the component to display properties. If the component has a special editor, the IDE 500 will display that editor, as shown in step 1018. For example, the 'state' component or object has an action editor. The selection code will determine this and display the state's editor. Otherwise, if the selected component or object implements a standard property inspector (e.g. JavaBean), then the IDE 500 may use an inspector mechanism to display a generic editor that would edit that object's property, as shown in step 1022. One example of this editor is a table of name-value pairs in which the name describes the property and the value column is where users could enter its value. If the component or object is a "notes object," IDE 500 will display any associated text in the notes, as shown in step 1018. A notes object is an object that serves no function in the running application. This object is to serve as documentation for the application. This object exposes a text area where users can enter any text to describe the various aspects of the application. The notes object 440 appears as a yellow "sticky" note icon in the component palette, as seen in FIG. 19. When dragged into the workflow editor, it appears as a yellow box with text in it, as seen in FIG. 33. Users can click on the box to put it in "edit" mode where users can enter text in the notes object, as seen in FIG. 34.

(3) Storing Workflow

In the preferred embodiment, system 10 stores the created interaction flow is stored in an XML format (although it need not be), which will be referred to as CML (Controller Markup Language). In alternate embodiments, the interaction flow may be stored in any other suitable manner such as programming language constructs. As the interaction flow defines the logical progression of the application, CML is the language that joins the views and data together. CML is designed according to the following abstract rules:

1. Everything is an object.
2. Any object can be a simple object or a container object.
3. A simple object can be represented as a String.
4. A container object contains other objects, which are one of the three following types: property, collection member, or map.
5. A property describes the current object. It can be represented in CML in one of two ways:
    a) If the property is a container object, the property is represented as a child tag of the current tag.
    b) If the property is a simple object, the property is represented as an attribute inside the current tag.
6. A collection member is represented as a tag, whose name is the class name (of the collection member) itself.
7. A map is a key-value pair, where the key is a String and the value is an object. It is represented as a tag, whose name is the class name of the map itself.
8. If an object is contained within another object, that child object is represented by a child tag of the parent object's tag.

The following table contains a list of each major CML tag used within the preferred embodiment of the present invention, along with a description of each tag's function.

| CML Tag | Description |
| --- | --- |
| <Model> | Represents a controller. Everything contained or used by the model (views, variables, etc.) is a child tag of the model. |
| <ModelInterface> | A list of declared objects - data sources as well as model variables. It defines how the current controller interfaces with external services or parent controllers. |
| <ModelVarDef> | Represents a model variable. Includes information about the name of the object, the object's type, and whether or not the object can be accessed by parent controllers or external services. |
| <DataBindingInterface> | Contains a list of data bindings used in the model. Data bindings associate a name with a method call where all the parameters of the method have been specified by the binding. |
| <DataBinding> | Represents a data binding. Contains several properties as children, including a reference to the affected object, and the parameters passed in. |
| <PROPERTY> | Represents a property of the parent tag. The type of property being expressed depends on the attributes. |
| <ListView> | A list of views associated with a particular state. The state name is contained in the cml:name attribute. |
| <DeviceBasedView> | Represents one view (of type rapid voice, rapid data, XHTML, etc.). Child properties include the criteria with which the view will be selected for rendering at run time, (e.g., view file name) |
| <DefaultController> | Represents a state. Contains as child properties pre-actions, actions, and post-actions. |
| <SetVariableAction> | Represents Set action. |
| <CustomAction> | Represents If action. |
| <BindingAction> | Represents Do action. |
| <TransformAction> | Represents XML action. |
| <LogAction> | Represents Log action. |
| <AuthAction> | Represents Auth action. |
| <XSLAction> | Represents XSL action. |
| <OperationAction> | Represents WS action. |
| <AlertAction> | Represents Send Alert action. |
| <TransitionAction> | Signals that a transition will be taken. |
| <SubmodelController> | A reference to a sub-controller. The sub-controller will be defined in another CML file. |

The structure/rules of CML are embodied in a schema definition files CML1.XSD, which is included in Section XI of this application and CML.XSD, which is included in Section XII of this application, as may be appreciated by one of ordinary skill in the art.

Figure 35:
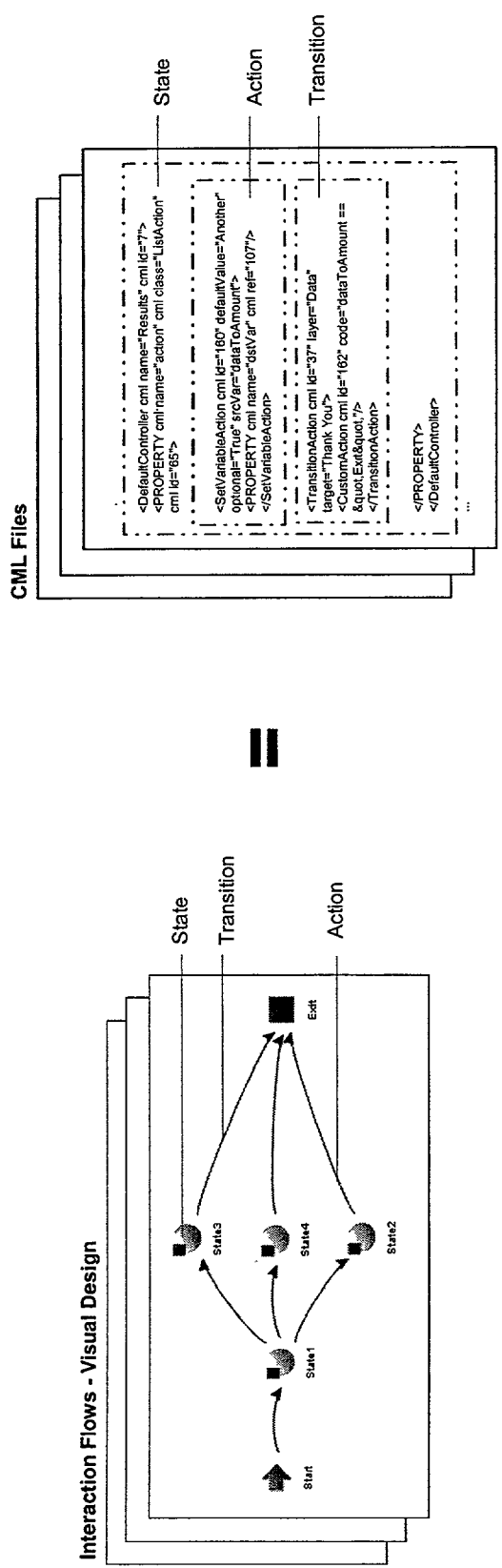
FIG. 35 illustrates the relationship between a visually developed interaction flow inside the IDE associated with current invention and Controller Markup Language (CML) files that are output by the same IDE.

FIG. 35 shows one example of the relationship between a visually developed interaction flow and the associated CML files that are generated by system 100. The creation and use of CML in connection with the interaction flow of an application is described in further detail in Section X, infra.

C. View/Presentation Design

Referring back to FIG. 27, after creating the visual representation of the application (e.g., the interaction flow), the user may proceed by designing the presentation of the application, as indicated in functional block or step 656. Presentation design is the creation of views with which the end user will interact. A view is an interface that may take different forms on different modes, channels, or devices. A developer designs the application views by use of the presentation design module 16. The presentation design module 16 provides design elements and editors that define how end users interact with the multi-channel applications. Module 16 allows applications to be delivered to a multitude of multi-channel devices, such as a personal digital assistant (PDA), a cell phone or a pager, without having to create multiple visual templates for each channel and device. Module 16 allows developers to create a single set of visual templates for a specific application that may be accessed using though multiple channels using multiple devices. Module 16 also allows developers the ability to define individual visual templates in various formats and languages that can be used for defining information as data input/output, voice input/output or any combination. Through the presentation design module 16, the presentation layer is completely separated from the process layer.

Different channels often require different views; for example, one may rely on visual cues, such as text, and the other on different sensory cues, such as audio files. There can also be several visual views; the application developer can create a special view for a specific device or browser. (For example, a developer may want to take advantage of the larger screen size on a more capable device by displaying more information or images. This may warrant creating a separate template for the more capable device from that of the generic visual view.) The developer will add all necessary templates to the state. The workflow engine 132 will select the appropriate view at run-time.

In the preferred embodiment, there are five different methods with which the developer can create views:
1. Rapid visual
2. Rapid voice
3. XHTML
4. Java
5. Native language Each of these methods and view types will be more filly and completely described in the following discussion.

An application can consist of any combination of view types. Even for the same channel, view types can be mixed and matched between states. Each view type may be stored in a separate file. However, references to the view are preferably stored in the controller file (e.g., in CML).

Figure 36:
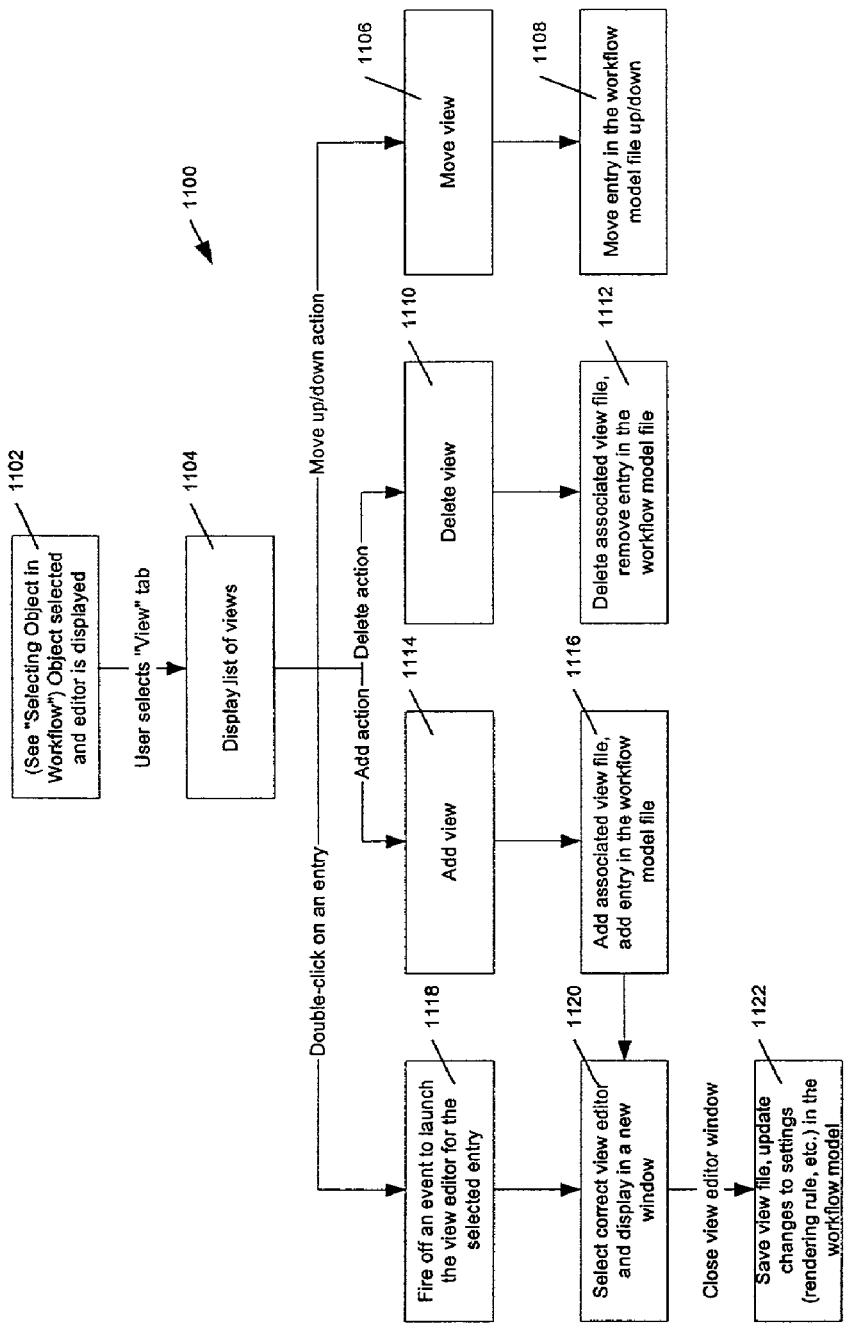
FIG. 36 is a flow diagram illustrating the underlying processes of the view property editors associated with the IDE of the current invention.

Editing (e.g., adding/deleting) of the views first occurs in the workflow editor 408 (see FIG. 19). FIG. 36 illustrates a method 1100 for editing views according to a preferred embodiment of the invention. The user may first select a state object (states may contain views), in step 1102. The property editor will display an editor for referring to the view type to display only if a state was selected. At that point, the user will be presented with a list of views associated with the state, including some basic information about the each of the views, in step 1104. This may be represented as a table with three columns. The first column displays the rendering rule (rendering rules determine which view type to display based on the type of device that is requesting that view) from which the server will use to determine if the view type is appropriate for a connecting device. The second column displays the type of view it is (e.g., rapid visual, rapid voice, XHTML, java, native). The third column displays the view name (filename). The runtime-server described in Chong, et al. evaluates the rendering rules from top to bottom, so order is imported. Hence, users can move view entries up or down the list, as shown in steps 1106 and 1108. In addition, users can add new views (steps 1110, 1112) or remove existing view references in the list (steps 1114, 1116). To edit the views, users can either double-click on the appropriate list entry or double-click on the view entry in the project tree (step 1118). Depending on the view type, an appropriate editor will appear (step 1120), allowing users to edit that view. After the developer completes the editing process, the developer will close the view editor window, and system 100 will save the view file and update any changes in the workflow model, as shown in step 1122. The process of creating and editing views for each view type (e.g., rapid visual, rapid voice, XHTML, java, native) is described in more detail in the following discussion.

(1) Presentation Design—Rapid Visual/Rapid Voice

The rapid data and voice editors enable fast, simple development of data and voice views, respectively. They allow the developer to create a "bare bones," fuinctional application quickly. Rapid data and voice editors are best suited for "prototyping" an application. (In the process of prototyping, a functioning application is generated without delving too deeply into the details of how precisely the templates are displayed. Once the application is working, users can go back and add the final presentation elements to make the application templates more polished.)

Rapid data view primitives are designed with one for all data media devices. Which means that once the view is created with rapid data primitives, the runtime engine (described in Chong, et al.) will automatically translate these views to the appropriate data markup/presentation languages formats suitable for the connected device using the application. Similarly the Rapid voice primitives are designed for one for all voice media devices.

Content Primitives are used for the construction of both visual and voice user interfaces. Content primitives are the basic user interface widgets that can be added to a template. In the preferred embodiment, the following six basic primitive types for rapid visual development are provided:
1. Paragraph: The Paragraph primitive is used to display text, images and hyperlinks.
2. Input: The Input primitive provides a text input field.
3. Horizontal Rule: The Horizontal Rule primitive breaks the flow of the page to signal a conceptual shift in content.
4. Option List: The Option List primitive provides for a selection from a list but that does not call for an instant transition to another state. An HTML analogy would be a drop-down list that allows for a choice to be made but that does not function as instant navigation. Thus, multiple option lists can be inserted into one interface.
5. Transition List: A transition list is used for navigation through a menu with instant transition to another state. Typically only one will be used per user interface of a state.
6. Table: The table primitive provides a structure with columns and rows in which text, images or links can be placed.

Similar to rapid visual primitives, the six rapid voice primitives are provided in the preferred embodiment of the invention as follows:
1. Play: The Play primitive provides a sound clip, which does not accept input (similar to the rapid visual Paragraph primitive).
2. Input: The Input primitive asks the user a question and interprets the answer (similar to the rapid visual Input primitive).
3. Menu: The Menu primitive presents a list of choices and interprets the answer (similar to rapid visual Option List and Transition List primitives).

4. Import: The Import primitive loads a speech object (e.g., a Java object for building speech applications).
5. Pause: The Pause primitive plays no sound (e.g., inserts a pause). This primitive is analogous to rapid visual Horizontal Rule primitive.
6. Confirm: The Confirm primitive confirms that the information entered earlier in the state was correctly recognized, and corrects any misrecognitions if necessary. A misrecognition can occur if the voice engine "heard" something other than what the speaker intended. The confirm primitive repeats what the voice engine though the user said for the user to confirm whether it was indeed the correct word or phrase.

In the preferred embodiment, the rapid visual primitives are stored in an XML format, which will be referred to as TPL. In alternate embodiments, the rapid visual primitives may be stored in any other suitable format. The following table outlines some non-limiting examples of tags in TPL, with a description of the tags' functions and their legal "child tags." XML is a convenient way to represent a hierarchy of "nodes" where a "node" is a tag, the tag's attributes, and the tag's data. Essentially, XML will describe a tree of nodes. In this tree, there will be nodes (tags) that will have parent-child relationships. So, a child tag will be contained within a parent tag. (Note: (None) means the tag has no valid children; a tag name followed by '+' means there must be one or more instances of this child tag; a tag name followed by '*' means there must be zero or more instances of this child tag; and a tag name followed by '?' means there can be zero or one instances of this child tag. In addition, two or more tags separated by '|' means that either tag may appear as a child.)

| Tag | Description | Children |
| --- | --- | --- |
| View | Top-level element for TPL; Everything contained in the view is a child of this element | Timer?, Para*, Input*, List*, Table*, Action*, NavigationActionList, MetaDataList, ResponseHeaderList |
| NavigationActionList | Used for GUI - when Studio needs to show actions | Action+ |
| MetaDataList | Like HTML <meta>, contains commands for the gateway or device for cache expiration (how long until), specifying tags for gateway, etc. Can be used to send proprietary information To device | MetaData+ |
| MetaData | One particular instance of <meta> information | (None) |
| ResponseHeaderList | When sending a name-value pair back to server, the developer may want to send the version number, character set, locale information, etc. Any HTTP response header can be sent using <ResponseHeaderList> <!To server--> | ResponseHeader+ |
| ResponseHeader | Collection member in <ResponseHeaderList> | (None) |
| Timer | Translates to the <timer> tag in WML | (None) |
| Para | Container for all text, image, anchors, breaks, etc. Defines text & styles for text, defines links, creates lists Used by the Paragraph primitive | (Text | Anchor | Image | Break)+ |
| Input | User interface component that accepts textual input from end user Used by the Input primitive | Text*, Image*, Break* |
| List | Wrapper for both option & navigation lists Like HTML <select> Used by the Option List and Navigation List primitives | ListItem+ |
| ListItem | -List item, like HTML <li> | (None) |
| Table | Table which can contain images or text Like HTML <table> Used by the Table primitive | TableRow+ |
| TableRow | Specifies contents of a table cell Like HTML <td>, except using attributes to specify row & col numbers | (Text | Image | Break | Anchor)+ |
| Action | Element to say which action needs to happen when the end user presses a button or a page expires | PostData* |
| Text | Text with style formatting | #PCDATA |
| Anchor | List HTML <a> | (#PCDATA | PostData)* |
| Image | Displays image to the end user; Like HTML <img> | ImageData+ |
| ImageData | Contains information about an image | (None) |
| Break | List HTML <hr> Used by the Horizontal Rule primitive | (None) |
| PostData | Specifies which name-value pairs gathered in the current view to post back to the server | (None) |

The structure/rules of TPL are embodied in the document type definition (DTD) file called TPL.DTD included in Section XIII of this application, as may be appreciated by one of ordinary skill in the art.

In the preferred embodiment, the rapid voice primitives are stored in an XML format, which will be referred to as VTL. In alternate embodiments, the rapid voice primitives can be stored in any other suitable format. The following table outlines some non-limiting tags in VTL, with a description of the tags' functions and their legal child tags.

| Tag | Description | Children |
| --- | --- | --- |
| VoiceDoc | Top level element | VoiceDoeGlobals?<br>VoiceTemplate+ |
| VoiceDocGlobals | -Project level settings, to be used for providing generic error handling or help throughout the application | |
| VoiceTemplate | Top level element for current view | (Input \| Play \| Confirmation \| Object \| Menu \| Pause)* |
| Input | Input primitive | Prompt?, Prompt?, Error*, Event* |
| Play | Play primitive | Prompt?, Error*, Event* |
| Confirmation | Confirmation primitive | Prompt?, Prompt?, Prompt?, ConfirmingItem+, Error*, Event* |
| ConfirmingItem | -Used for Confirmation primitive Specifies which items (preceding primitives) a user wants to confirm | Prompt? |
| Menu | Menu primitive | Prompt?, MenuItem*, Error*, Event* |
| MenuItem | Menu item used in Menu primitive | Prompt? |
| Object | Importing Speech Objects Import primitive | Param*, Error*, Event* |
| Param | Used by Import primitive Parameter for a speech object Can be any object | Param* |
| Prompt | In Play, Input, Menu - wherever a prompt is played | (Audio? \| TTS? \| Break?)* |
| Audio | Audio file | (None) |
| Break | Creates a pause in a prompt | (None) |
| Pause | Pause primitive | (None) |
| Error | Prompt to play in the event of an error | (Prompt)? |
| Event | Plays a prompt for any event, but generally used for Help | (Prompt?) |
| DefaultAttributes | For setting top-level attribute values for prompts | (None) |

The structure/rules of VTL are embodied in the document type definition (DTD) VTL.DTD included in Section XIV of this application, as may be appreciated by one of ordinary skill in the art.

Figure 21:
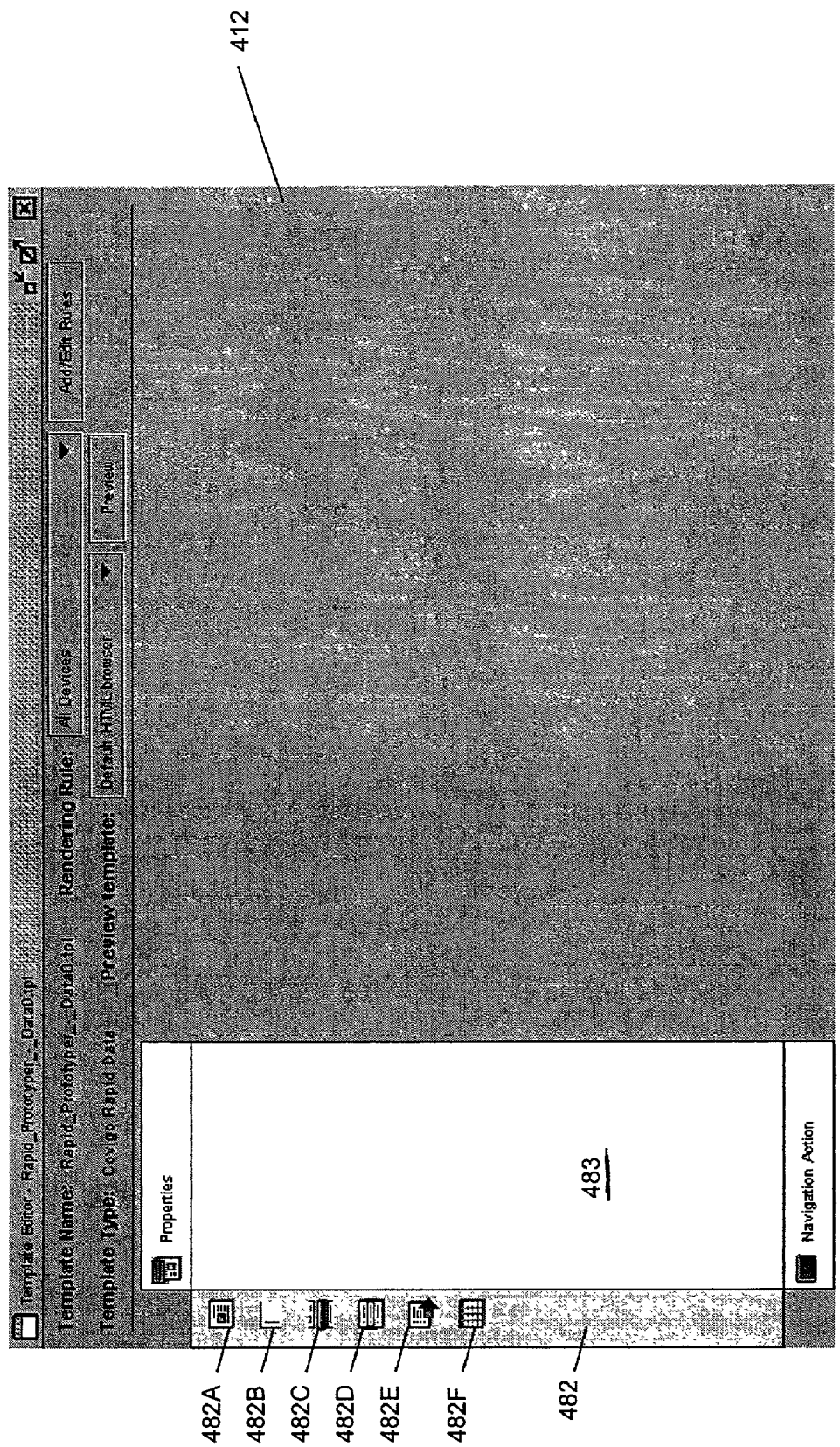
FIG. 21 illustrates an embodiment of a graphical interface for an editor to create and modify rapid visual user interfaces inside the IDE associated with the current invention.
Figure 22:
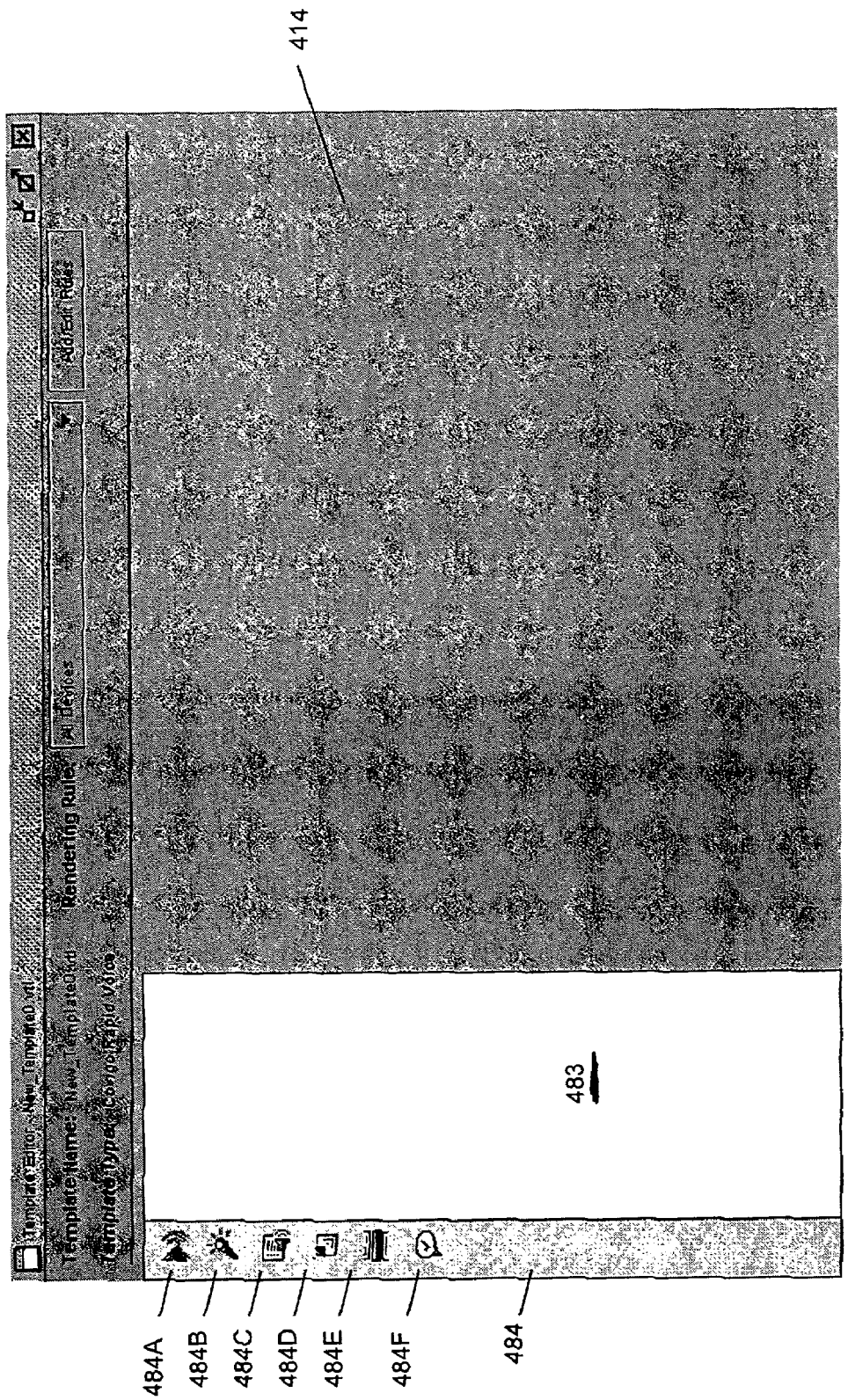
FIG. 22 illustrates an embodiment of a graphical interface for an editor to create and modify rapid voice user interfaces inside the IDE associated with the current invention.

A developer can use the presentation design module 16 to create a presentation design through the rapid visual editor 412 (FIG. 21), and the rapid voice editor 414 (FIG. 22). As shown in FIG. 21, the rapid visual editor 412 has a palette of rapid visual primitive icons 482, including icons 482A, 482B, 482C, 482D, 482E, and 482F, which represent Paragraph, Input, Horizontal Data, Option List, Transition List and Table primitives, respectively. As shown in FIG. 22, the rapid voice editor 414 has a palette of rapid voice primitive icons 484, including icons 484A, 484B, 484C, 484D, 484E, and 484F, which represent Play, Input, Menu, Inport, Pause, and Confirm primitives, respectively.

Figure 37:
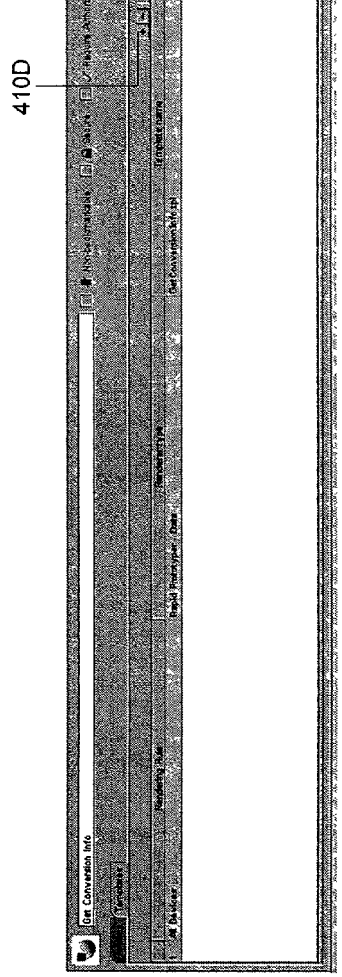
FIG. 37 illustrates a palette for creating a data view template associated with the IDE described by the current invention.

A developer may use editors 412, 414 to create and edit rapid visual and voice presentations through the following steps:

1. The developer creates a template. This can be done in several ways. One is to right-click in the project tree 402, shown in FIG. 18, on the "Views" node. A popup menu will appear with a "Create New View" option. Another way is to select a state. That action will display a properties inspector as shown in FIG. 37. When the "Templates" tab is selected, it shows a list of templates assigned to the state. Users can then press button 410 D to create a new view. Part of creating a new view will display a dialog box, shown in FIG. 38, where users can select the type of view and assign a name to that template.

2. The developer calls up the template in the presentation design module 16. This can be done in several ways. First is to select a state. That state will display a properties inspector, as shown in FIG. 37. Users can then double-click on the items in the list to launch the editor. Alternatively, users can select a template in the project tree 402 (FIG. 17). Expand the "Views" node to display a list of templates. Users can then double-click on a template name to launch an associated editor. Alternatively, users can right-click to activate a popup menu where users can select the "Edit" option to edit the template.

3. The developer drags and drops any desired primitives 482A-482F or 484A-484F into the respective adjacent layout table 483.

4. The developer configures each primitive. This may be performed as follows:

a. The presentation primitives are configured using a combination of static, dynamic data sources or media elements. Developers will add presentation primitives (e.g., primitives 482A, 482B, 482C) to the presentation. Then, as the developer selects the added primitive by clicking on the added primitive, a property panel for that primitive will appear (e.g. FIG. 39—Panel 1150). Within the various fields of that property panel, developers can then drag variables or methods in or enter text into those fields. In addition, developers can drag various media types (see FIG. 18).

b. Static data source elements are those that the user enters data at design time, for example simple text strings, copying and pasting images, and other elements. This primarily applies to the paragraph element where developers can enter text. Developers can also drag and drop images from tree 402 (FIG. 18) into the property panel to add images or image groups (see Section VIII. D, infra, on image groups). This represents static data as the content will not change while the application runs.

c. Dynamic data sources are those whose value is determined by the run-time engine (described in Chong, et al.) at application usage time. These resources are referenced using a model variables, objects and bindings using the integration design module see e.g., Section VI.D(7), infra). These model variables are incorporated into primitives by reference. To incorporate dynamic data source, a user may simply drag and drop the model variables from objects 404 and bindings 406 sections of the project tree 402 (FIG. 17) into the primitives and by configuring the corresponding property editors associated with bindings.

d. Primitives can also be configured using media elements such as images, audio files, grammars. They are also incorporated by reference by dragging dropping them from resource section of project tree 402 onto the primitives section. The developer can bring in media (images, sound clips, grammars) as necessary. This can be done by using the import mechanism under the "Resources" node in the project tree 402. The developer expands the "Resources" node to reveal other nodes like "Strings", "Images", "Audio", "Grammars", and "Scripts" (see Section VIII.D, infra), and right-clicks on one of these nodes to display a popup menu that will allow developers to bring in (import) the media files.

e. The developer creates data sources as necessary (see e.g., Section VI.D.(7), infra).

The process for building an application using rapid voice primitives is virtually same as for rapid visual primitives. In visual applications, however, presentation design entails creating a layout for the screen; in voice applications, presentation design is less visual. The voice presentation design involves bringing together a series of prompts that interact with the user. Because the interaction paradigm is different across channels, developers often create completely separate views for different channels. However, developers can use the same data sources for all channels, despite the use of different views. For example, input from the end user may be assigned to the same objects, or data presented to the user may come from the same data sources.

Figure 39:
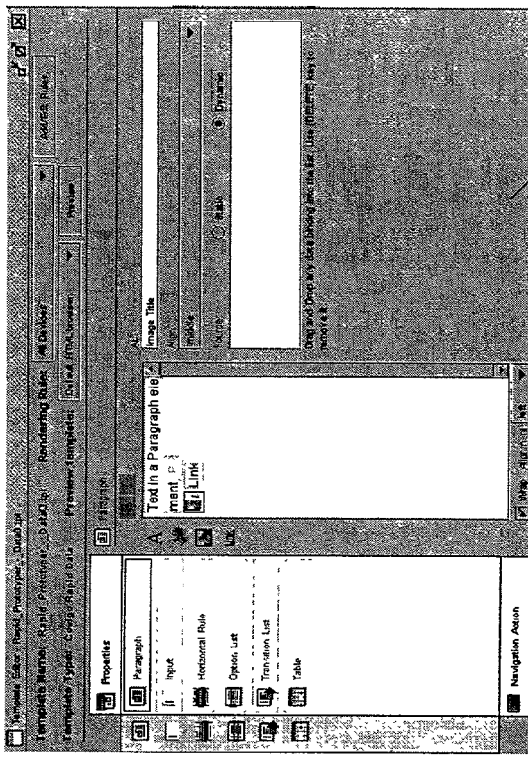
FIG. 39 illustrates how user interfaces built using the rapid visual view editor inside the IDE associated with the current invention, shown in FIG. 21, correspond to Template Markup Language (TPL) files that are output by the same IDE.

The presentations or views that are designed in rapid visual and rapid voice technologies are stored in XML formats, TPL and VTL, respectively. FIG. 39 illustrates how one non-limiting example of a rapid visual presentation or view shown in screen 1150 may be represented in TPL 1152.

(2) Presentation Design—XHTML

Extensivle Hypertext Markup Language (XHTML) is the known modularized, XML-compliant, next generation of HTML 4.0. The system 100 extends XHTML by adding an additional module to the ones it currently supports. Developers use XHTML (and optionally, the XHTML extension) in order to obtain more control over the presentation of a view than rapid editors can offer, or in order to allow a view to be available across multiple modes, markup languages, devices, and browsers.

The XHTML extension provided by system 100 adds the ability to generate different views for different devices, channels, browsers, and capabilities using one document. The XHTML extension allows the developer to reorder or reposition content, dictate specific rendering behaviors for a given tag, transform tables with different subsets of content or into different orientations, and transform lists into other types of lists.

The following tables describes the additional (new) tags in the XHTML extension:

| Tag | Description | Child tag of | Parent tag of |
|---|---|---|---|
| Layout | For a given terminal type, renders what is enclosed in <div> tags with the matching id attribute values. <div> blocks whose ids are not listed will not be rendered. Anything not enclosed in <div> will not be rendered either. If the id attribute of section lists an id that is not found, it will be ignored. | Head | section |
| Section | The id attribute of section should match the id attribute of a div tag in the body of the document. When it does, the contents of the div block will be rendered. | Layout | (None) |
| overrideset | Contains terminal-specific information about rendering preferences. Overrides any default rendering behavior that already exists. | Whichever tags can be rendered in multiple ways: abbr, acronym, div, ol, ul, select | override |
| Override | Used to specify rendering behavior for a given tag or widget. Each terminal rule requires its own instance of override (if needed); in other words, there can only be one terminal per override, and there can be multiple override instances per tag or widget. | overrideset | row, col, delimiter |
| Col | Appears only when nested inside a table (i.e. <table><terminal><swap><col>. . .). Used to specify a column in the table to be used for rendering. Multiple columns can be used at a time, but columns and rows cannot be mixed. | override | (None) |

-continued

| Tag | Description | Child tag of | Parent tag of |
|---|---|---|---|
| Row | Appears only when nested inside a table (i.e. <table><terminal><swap><row>. . .). Used to specify a row in the table to be used for rendering. Multiple rows can be used at a time, but columns and rows cannot be mixed. | override | (None) |
| delimiter | Used to separate two table columns or rows that are being combined into one. Used only when a table is being transformed into a list. | override | (None) |
| Timer | Specifies the length of time to remain on a view. There can only be one timer element per document. The unit of time specified in the value attribute is 1/10 of a second. | Head | (None) |

The additional tags comprise only a portion of the extension module. The following tag attributes were added as well:

| Tag | Attribute | Description | Values (* is default) |
|---|---|---|---|
| div | type | Used to specify when the div grouping is used for defining a section in a layout, defining a "smart list," or for style. When type = "section" the id attribute needs to be defined, for the id attribute of <section> to match. When type = "list", the contents need to match one the predefined list formats. These formats are: brlist: text/image, followed by <br/> plist: <p>text</p> bulletlist: an unordered (<ul>) list numberedlist: an ordered (<ol>) list selectlist: a selection list (<select>) any of the above, wrapped in <span listitem = "true"> When type = "normal", the div works as it does in regular XHTML. | section, list, normal* |
| div | name | Used to specify the name of a list that this list will be transformed into | Name used for list |
| div | multiple | If this list is transformed into a selection list, specifies whether the use can select only a single item or can select multiple items | true, false* |
| span | listitem | Wraps a list item in a "smart list." Can be combined with any other span attribute (e.g., value, href). | true, false* |
| span | value | Used to define the value that is to be returned if the current list item is selected. For example, this would be the value attribute in a selection list. Only needed if the list is being transformed into a selection list, and it is not a selection list in its current form. | Value to be used if selected in form-type element |
| span | href | Used to define the URI the application will move to if the current list item is selected. Only needed if the list is being transformed into a form that requires hyperlinks, and the list items currently do not have links. | URI |
| noscript | type | The value of this type should match the value of the type attribute in the script element it follows. Used to identify which no script blocks should be rendered for a particular device. | Media types defined by W3, WMLScript |
| input | format | Specifies format mask for WML view | Format mask for WML |
| input | emptyok | Indicates whether leaving the text entry field is acceptable. Browser will not let user move on if emptyok = "false" and the input is empty. | true*, false |

Figure 23:
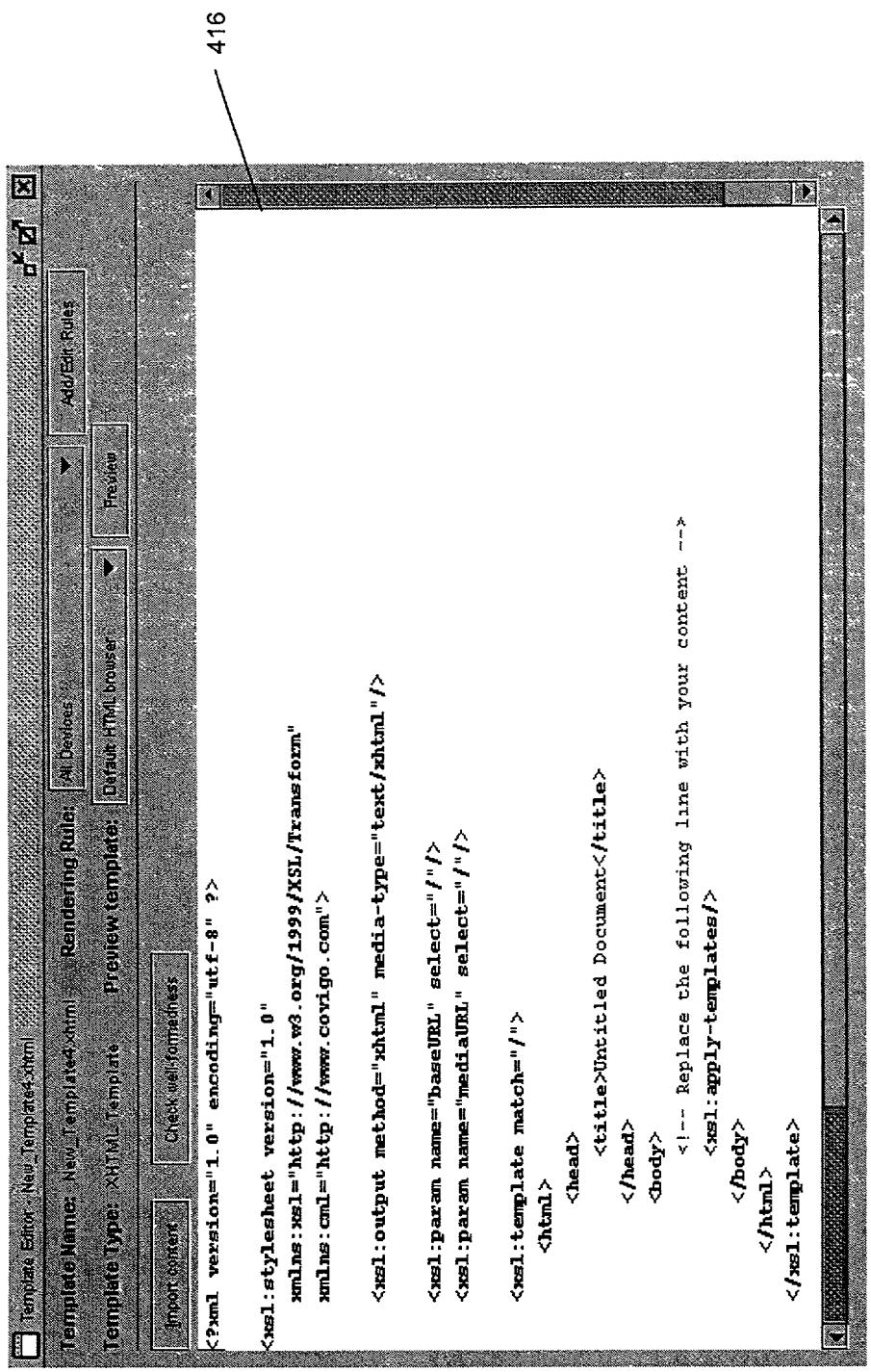
FIG. 23 illustrates an embodiment of a graphical interface for an editor to create and edit XHTML user interfaces inside the IDE associated with the current invention.

The presentation module 16 provides an XHTML editor 416, shown in FIG. 23, for creating and editing XHTML views. To use the extension effectively, the developer should first create a XHTML page for the richest device targeted in the XHTML editor 416. The design should be modularized, using <div> or <table> tags to group key pieces of content.

This modularizationn will allow the developer to specify which groupings to keep or drop per view. After developing the XHTML template, the developer simply saves the page, and the view will be added to the state and the project tree 402 will be accordingly updated.

(3) Presentation Design JAVA

Java views are pieces of GUI code implemented in the native language of a device's Virtual Machine, i.e. Java. Java views enable developers to (i) use more active user interface components, when those offered in HTML are not enough; (ii) present a GUI on Mobile Information Device Profile (MIDP) and PersonalJava devices, even when there is no browser present on the device; and (iii) reuse existing, legacy code rather than porting the code to HTML. For example, HTML may not be sufficient if a browser does not support newer technologies (e.g., Flash) that allow more interactive elements, such as mouse-over animations.

Figure 24:
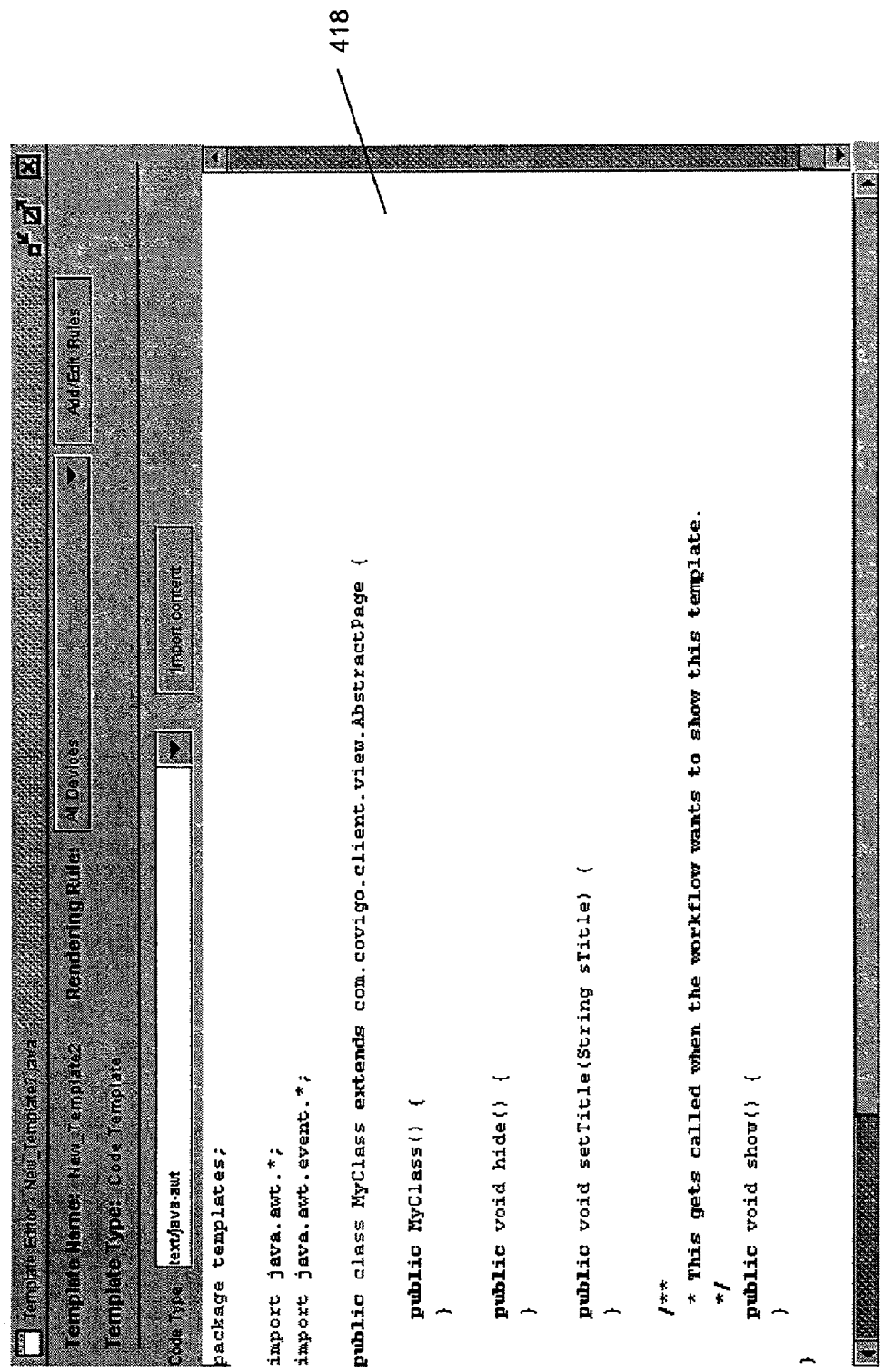
FIG. 24 illustrates an embodiment of a graphical interface for an editor to create and edit Java language user interfaces inside the IDE associated with the current invention.

The presentation module 16 provides a Java view editor 418, shown in FIG. 24, for creating and editing Java views. There are many types of Java views (e.g., Abstract Windowing Toolkit (AWT) and MIDP) that developers may create in the Java view editor 418. AWT is part of the standard Java (J2SE) API. AWT is a known type view that allows developers to create GUIs for Java programs by entering code that will render the view directly. MIDP is a known set of APIs (not a subset of AWT) targeted at more limited mobile information devices, such as mobile phones and entry level PDAs. Other APIs may also be created in the future to address different devices. These APIs can manifest themselves as "Profiles" as described by Sun Microsystems of Palo Alto, Calif. As such, in the preferred embodiment, presentation module 16 does not provide a fixed set of Java view types that can be used. Rather, editor 418 is essentially be a blank editor onto which users can enter custom code to render the views for applications that run on devices supporting the natively rendered view. When the application is packaged, the application runs the code through a compiler associated with the language in which the view is created. This compiled code is then a part of the application. This is different from the other rendering types in which the view is specified in an XML language. In those cases, a separate viewer or browser will read the XML language and render the appropriate output. It will be apparent to those skilled in the art of java programming on how to create java language user interfaces. Alternative embodiments may be based on differing languages other than Java without departing from scope of the present invention.

(4) Presentation Design—Native Language

Figure 25:
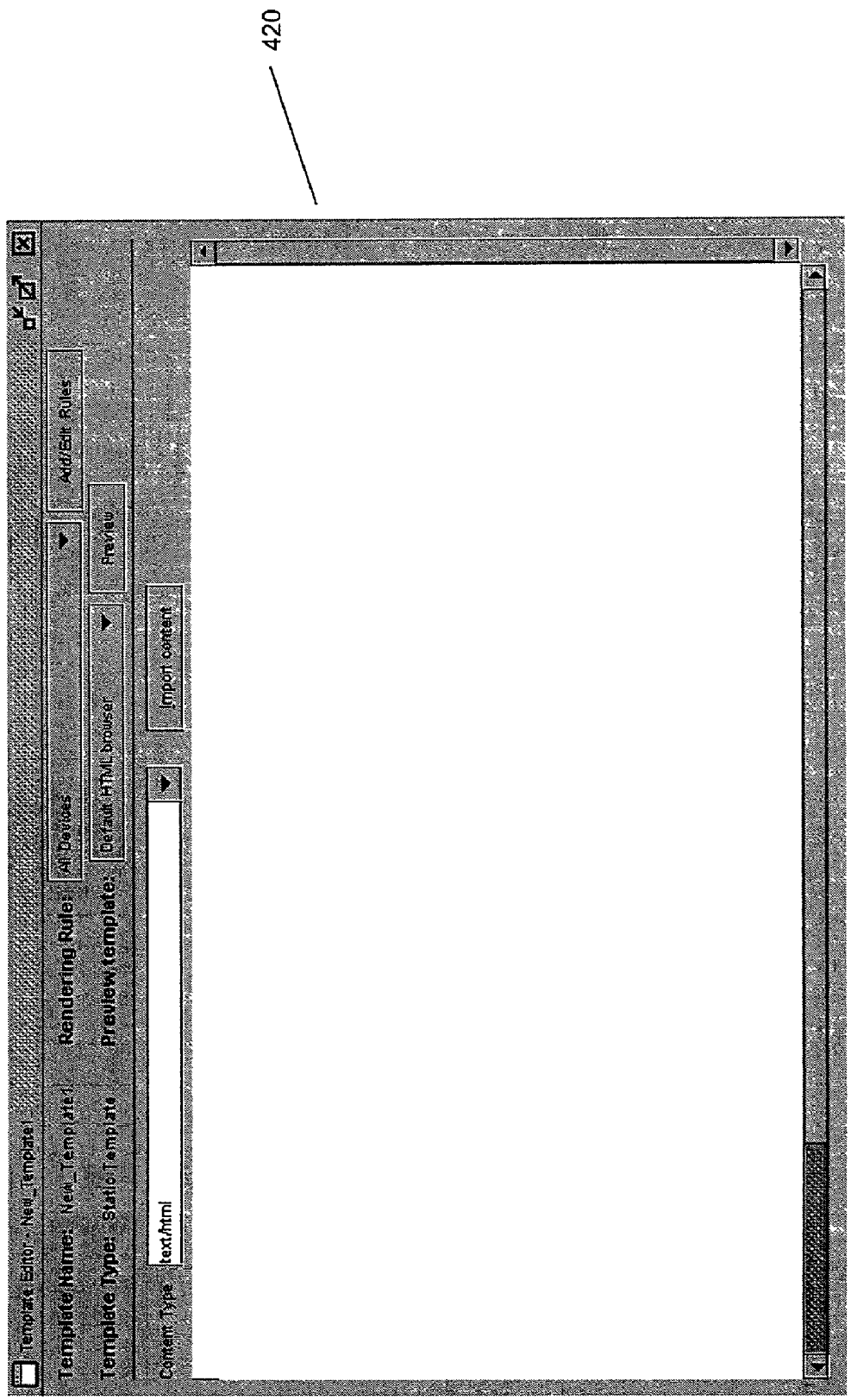
FIG. 25 illustrates an embodiment of a graphical interface for an editor to create and edit native user interfaces inside the IDE associated with the current invention. Native user interfaces are developed in the native markup language of the device or browser that is connecting to use the application being designed in the IDE.

Native language views are those who have been developed in a specific language for a particular device, browser, screen size, capability, or channel. Native language views may be created and implemented when a developer wants complete control over the presentation of the view or when the view has already been developed beforehand. To develop a view in a native language, the developer simply creates code in the target markup language, or in the preferred embodiment Java. The native language editor 420 is shown in FIG. 25. Alternative language embodiments may be based different languages other than java without departing from the scope of the present invention.

D. Data Modeling/Integration Design (1) Data Integration

Referring back to FIG. 27, after creating the presentation or views of the application, the developer may proceed by developing the data sources (i.e., data integration), as indicated in functional block or step 658. The data integration design module 14 (FIG. 7) is used to define methods that can be used by controllers and views to access data. Within the MVC (model-view-controller) paradigm, the data integration module represents the "model". Views interact with the controller and controllers interact with models. Views interact with models only through the controller, which, as will be seen later, is called a data binding.

Figure 40:
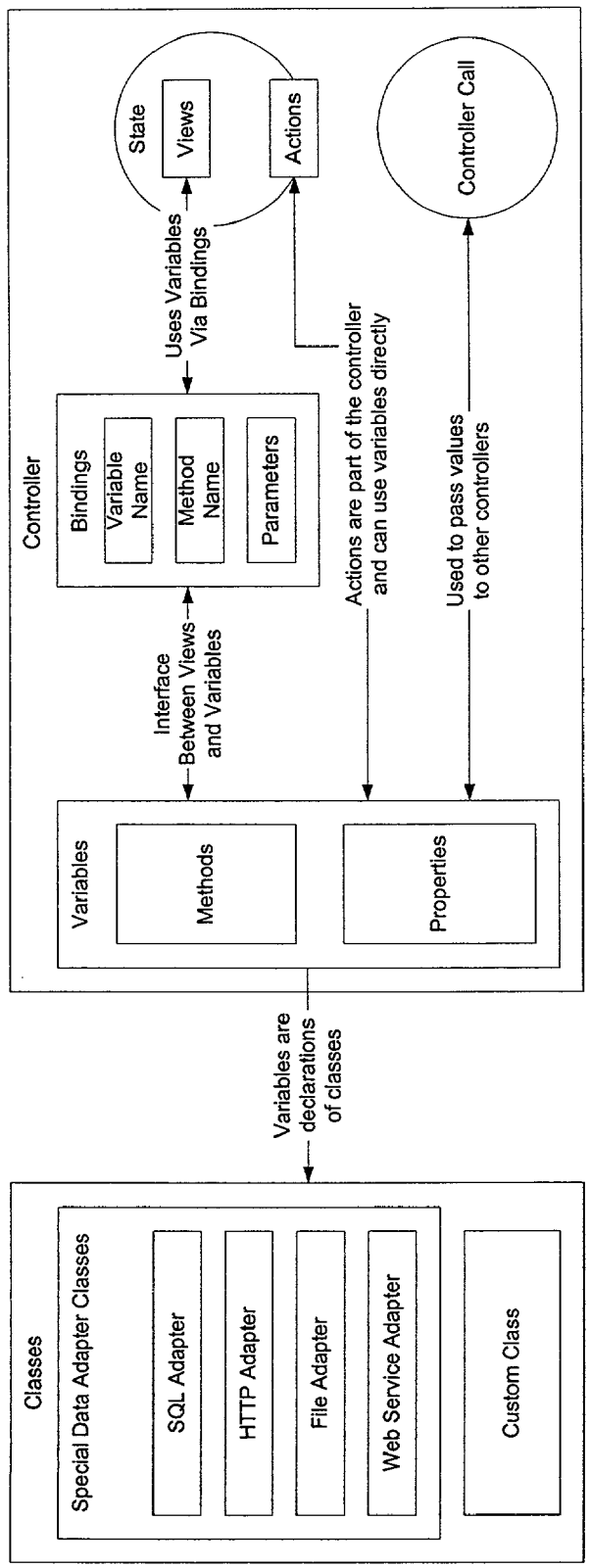
FIG. 40 is a flow diagram documenting the role of variables associated with data-integration in the present invention.

Data integration involves the creation of variables, whose type corresponds with a data adapter type. Variables are design-time definitions of run-time objects that are to be instantiated (become active participants in the controller). In other words, these objects are "active" elements in an application that participate in the control of the application. Variables are defined and associated with a type. This type is called a "class" in object-oriented terminology. A class is a definition of the properties (data) and methods that an instantiated object can have. Properties are attributes or states that a class is defined to have. Methods are function calls that can manipulate the properties and return values to the caller. Special versions of these "classes" exist and form what will be called the data adapters. Hence, data adapters are pre-built classes. FIG. 40 illustrates the relationship between these various elements.

Data adapters are essentially "classes" that can interface with various internal and external data sources. Internal data sources are those that reside on the same computer as system 100. External data sources are the data elements that do not reside on the computer system 100, but instead are accessible through network connection. Data sources are entities that contain data to be used or manipulated by the controller. Data sources and their associated data adapters are the "model" of the MVC paradigm. In the IDE 500, there are several data integration interfaces by which an application developer can use to design and configure data adapters. For variables of other types (e.g., classes), the IDE 500 will provide a generic property inspector that displays the name-value pairs of the various defined class properties.

(2) Variables Used by the Controller

As previously mentioned, variables are design-time definitions of the run-time objects that are to be instantiated. Variables are also called model variables in this document. Variables can be used by the controller. Controllers will use variables by assigning/retrieving variable values or by making method calls that the variable contains. This is done by using actions. For example, if a variable property is to be manipulated, application designers can use the "set" action. If a method is to be invoked, application designers can use the "method" action.

Figure 41:
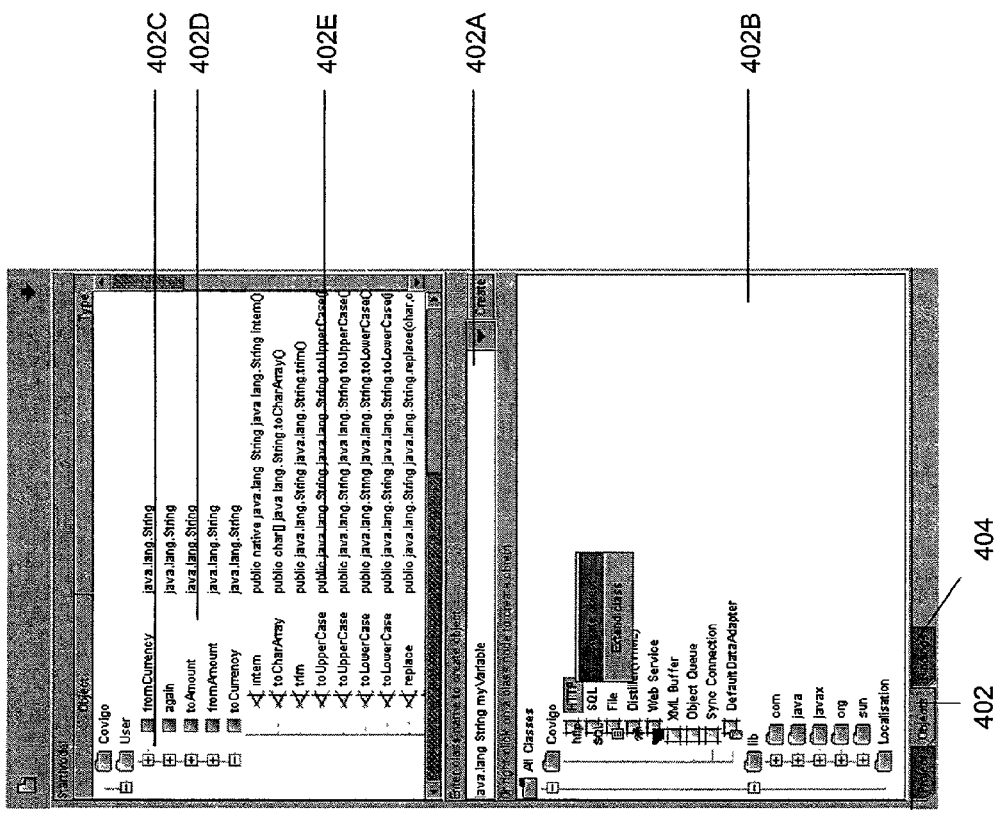
FIG. 41 illustrates the addition of a data source in the objects tree associated with the IDE described by the current invention.

Variables are declared and are associated with a particular controller In the IDE 500, when the controller editor has focus, a list of variables that are associated with that controller will be displayed in a tree (see e.g., objects tree 404 in FIG. 41). Application developers can add variable declarations by using the class tree (steps detailed below). To add more class definitions, developers can import additional classes.

It should be appreciated that views do not have direct access to the variables. However, for a view to be useful, they must access some data to present to the end user. In keeping with the MVC paradigm, views access model data through controllers. This may be done by use of two methods. First, if a view needs to access a particular variable value, this access may be accomplished with a call to the controller. The controller will expose a special interface by which model data can be accessed. The second is if a view needs to access data returned from a method call. This can actually be accomplished by performing a method call in an action, assigning the return value to a variable, and then using that variable in the view. However, the controller may further expose another construct called a data binding.

(3) Data Bindings

A data binding associates a name to a method call on a variable. This way, views can make method calls indirectly by using data bindings. Using data bindings in views are no different than using variables. For variables, the application designer identifies the variable name by special markers (markers are dependent on the rendering technology used for each view). In the case of bindings, instead of using variable names, binding names are used. In XSL, both cases may appear like <xsl:value-of select="/root/myVariableOrBinding"/>. However, it is up to the implementation to decide how to determine when to replace the text with the data.

Bindings have four properties that need to be configured. The first property is the name of the binding. This is the name by which views will reference the bindings. The second property is the variable name on which the binding will reference. The third property is the method name to invoke on the variable. The final property is a list of parameters to set for the method call (if a method call requires parameters to be passed to it).

(4) Variables as Controller Interfaces

Variables are also used as interfaces between controllers. To promote re-use, controllers can make calls to other controllers. That way, controllers can be reused in different places without redefining a controller. However, for controllers to be even more flexible, there should be a mechanism by which application designers can pass inputs to and receive outputs from. This mechanism may reuse the variables mechanism.

There are two additional properties that can be set when the user declares a variable. They are the "accepts value" and "returns value" flags. In the IDE 500, when the "accepts value" flag is checked, the associated variable will be exposed as one of the properties of the controller to which other controllers can pass values. When the "returns value" flag is checked, the associated variable will be exposed as one of the properties of the controller from which other controllers can receive values. Variable values passed between controllers are passed by reference. That is, instead of making a copy of the variable value to pass to the controller, a reference to the variable value is passed instead. So, if the variable was a complex data type that contained several properties, those properties could be modified when passed into a controller. However, the reference to the variable itself cannot be modified. In other words, the variable cannot be assigned to a different object in the controller that was called and have that new value be reflected in the calling controller.

(5) Variable Scopes and Lifetimes

A variable scope defines a variable's visibility in relation to states, controllers, and actions. In the preferred embodiment, there are four scopes defined, including "request", "controller", "application", and "global". A variable lifetime defines how long an instantiated variable (i.e. object) is "active".

(a) Request Scope

The "request" scope applies to variables that are visible only during the time that the controller is processing a request. A request occurs when an end-user (i.e., an application user not the IDE developer) submits (e.g., posts back to the server) some data in the presentation. When the end-user data reaches the controller, the request scope will begin. Request variables are automatically created when end-users interact with a view and send data back to the controller. This data is in the form of name-value pairs. Actions in the controller, such as the "set" action, can use these "request" variables. Request processing is finished when another view is presented to the user. At that point, the request variable is no longer accessible. That is, the request variable's lifetime comes to an end and its scope will be closed (no longer a visible variable).

(b) Controller Scope

The "controller" scope applies to variables that have been declared for a controller. These variables are only visible within the controller in which the variable was defined. So, for example, if a controller contains a controller call where control is transferred to a different controller, then the calling controller's variables are not visible to the controller being called.

When controllers contain calls to other controllers, the call will create a new stack frame for the variables of the controller being called. That way, when control is returned back to the calling controller, the calling controller's variable values will still exist. The stack is a data structure that allows values to be added and then removed in first-in, last-out order. Hence, when control is transferred to a controller, the controller's variables are saved on the stack. When control leaves the controller, the controller's variables are removed from the stack and the stack will point to the previous controller's variables, hence preserving the state of a controller's variables. Therefore, a "controller" variable lifetime exists between the start and the end (e.g., the "exit" state) of the controller.

Because the scope of "controller" variables only exist within the controller defining those variables, there exists a mechanism by which to pass variables to controllers that are being called. This mechanism is performed through variable mapping where variables are used to transfer data between controllers. (See Section VI.D.(4), supra). This is actually variable passing and is not considered as a break in scope rules.

(c) Application Scope

The "application" scope applies to variables that have been declared for an application. These variables are visible by all controllers in the application. At run time, application variables are visible and exist on a per-user basis. Once an end-user terminates her session with the application, the application variables will be released. Variables defined as having "application" scope can be accessed by all controllers within an application, but only by a particular end-user. That is, the values of the "application" scoped variables will be different between end-users. One end-user cannot retrieve the values of "application" scoped variables of another end-user.

(d) Global Scope

The "global" scope applies to variables that have been declared for multiple applications across multiple end-users. During application run-time these variables are visible by all controllers in all applications by all end-users.

(6) Designing with Variables in the IDE

The integration design module provides a rich framework for tying the front-end interaction to a variety of data sources. The integration module 14 can integrate with a wide range of data sources including XML, HTTP, EJB, JDBC, FTP, and flat files. In addition, developers can build custom adapters to other data sources or applications. By binding dynamic data sources to the presentation, the integration design module enables dynamic rendering of content to a specific requesting multi-channel device "on the fly" rather than simply presenting static pages. Thus, developers can choose to either configure direct backend integration with a data source, or dynamically harvest the information from an existing website. Both data abstraction methods enable real-time, transactional functionality for business-critical applications and services. The integration design module 14 allows developers to construct data bindings with supporting methods and variable definitions to manipulate data sources.

A list of all variables used in the project will be displayed in the project tree 402 (FIG. 18). The project tree 402 provides a portion of the graphical interface for the integration design module 14, which allows developers to manipulate the variable entries.

Figure 42:
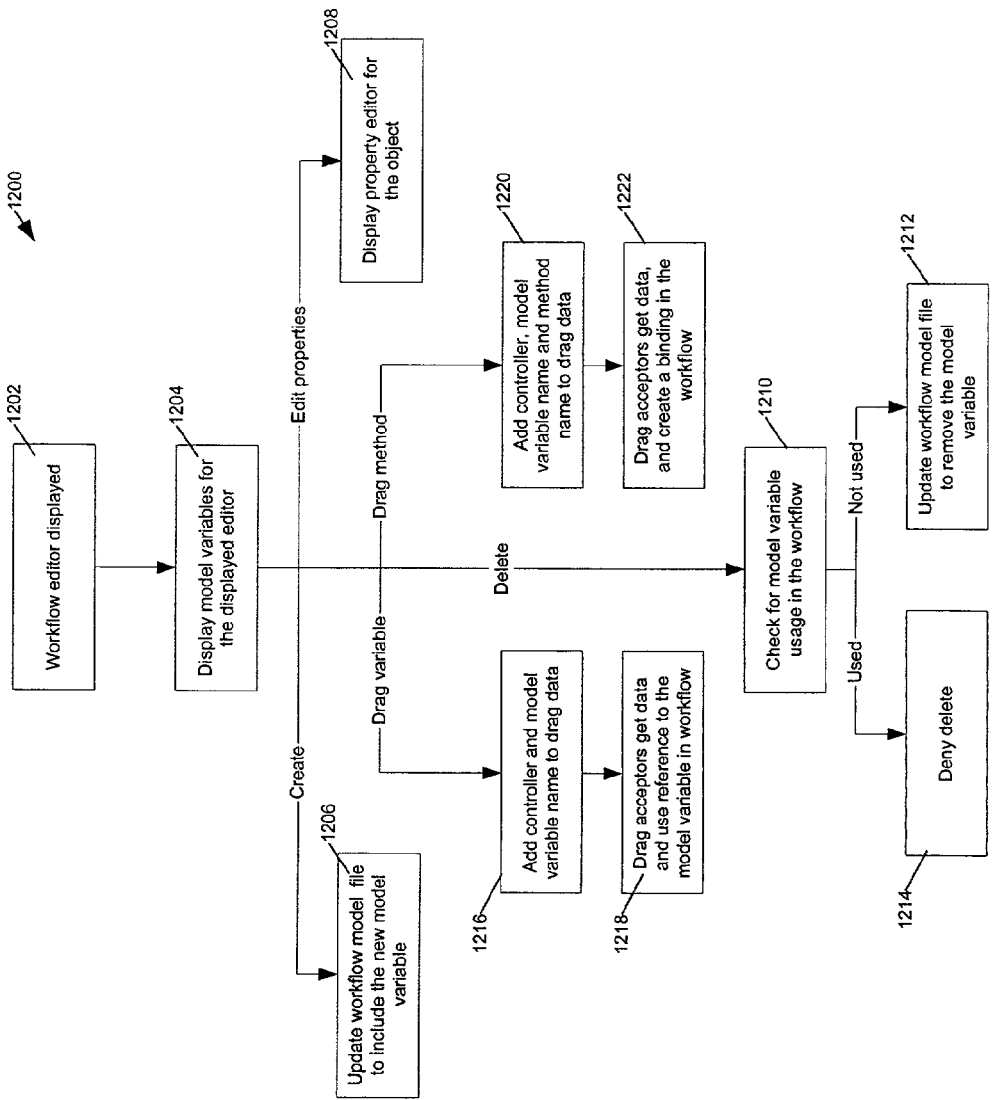
FIG. 42 is a flow diagram illustrating the underlying processes behind manipulating model variables associated with data-integration in the present invention.

FIG. 42 is a flow chart, illustrating a method 1200 of performing various manipulations of variable entries. The method begins with steps 1202 and 1204, where a developer displays the workflow editor (e.g., editor 408, FIG. 19) and model variables within the editor (e.g., the variables within the model tree shown in FIG. 41). Users can create new variables, which will be displayed in the project tree 402. To create variables, users will be presented with a list of possible variable types (i.e., classes) from which users can create variables, as shown in the bottom half of FIG. 41. There are two ways of creating variables. The first is to browse through the list in the tree and select an object type. Once selected, users can right-click to bring up a context-sensitive popup menu. When users select the "Create object" option, the new variable will be created and added to the list of variables for the workflow. Alternatively, users can create objects by typing in the variable type and a name to assign the variable in the input field labeled by "Enter class name to create object" (field 402 A in FIG. 41). In the preferred embodiment, the format is <variable type>[<name>[,<name>]*]. This resembles the method by which users would declare variables in the "Java" or "C" programming language. If a name is not specified (e.g., variable created by specifying variable type only or by right-clicking to create a variable), then a unique name will be assigned to the variable and added to the list of variables for the workflow. When a new variable is created, the system 100 will update the workflow model to include the new variable, as shown in step 1206 of FIG. 42.

There are additional actions that can be performed on a variable. Developers can edit the properties of a variable, such as by modifying the variable name. This is accomplished through a property editor, as shown in step 1208. If the variable is an object that contains properties, then the properties are displayed for the user to edit. Users can also delete the variable by a delete action (e.g., by right-clicking on the variable to delete and selecting the "delete" option, or by pressing a "delete" key). When a variable is deleted, system 100 checks for any usage of the model variable in the workflow, as shown in step 1210. If the variable is not used within the workflow, system 100 updates the workflow model file to remove the model variable, as shown in step 1212. If the variable is used within the workflow, system 100 does not delete the variable and issues a corresponding message to the developer, in step 1214.

There are also drag and drop mechanisms for the variable and any methods that the variables might contain. Variables are essentially objects that may or may not contain methods. These methods enable users to modify the behavior of the object. For example, a TextField object (variable) might have a method called "setText" that, when called, will set the text of that object. Dragging these methods into various editors that accept these methods will essentially make a call to that method. Variables can be dragged into any editor that accepts a variable (e.g., the action editor or the view editor).

Figure 43:
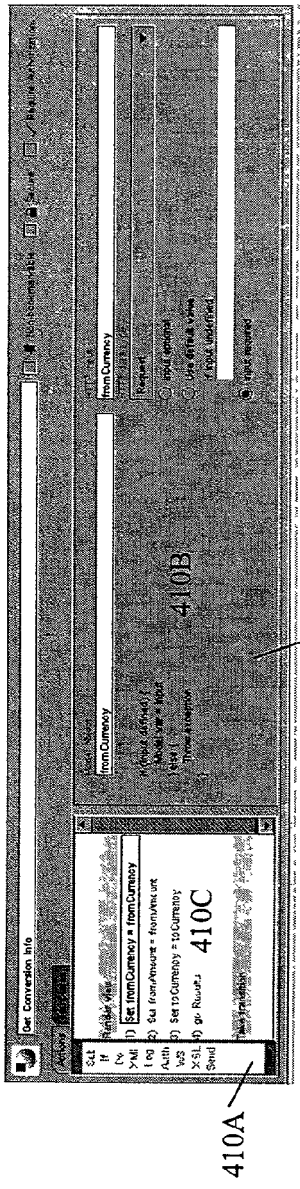
FIG. 43 is an embodiment of the actions palette with a set action inside the IDE described in the present invention.
Figure 44:
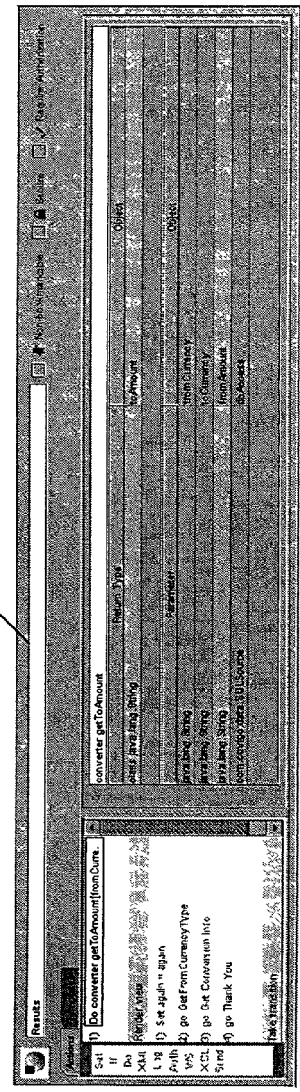
FIG. 44 is an embodiment of the actions palette with a do action inside the IDE described in the present invention.

As mentioned above, one method by which variables are used in the editors is through dragging either the variable or a variable's method to an editor that accepts the variable or variable method. In the IDE 500, there are "drag sources" and "drop targets." Drag sources are user interface widgets (such as a tree node) that can be dragged by a user (e.g., by using a mouse, pointing to the widget, pressing and holding the mouse button, and moving the mouse). Drop targets are user interface widgets (such as text fields) that have been specified to accept drag sources of specific type(s). There are two elements that can be dragged from a variable. The first is the variable 402D itself. The variable itself is usually dragged into an editor that uses the variable (e.g., either by assigning a value to the variable or retrieving the variable's value). Examples of this include dragging the variable into a template editor 416 (FIG. 23) or dragging into a "set" action editor 410B (FIG. 43). The second is to drag a variable's method 402E. If the variable has methods, the variable node in the variable tree 402C (FIG. 41) will be expandable to expose a list of methods that can be called. The method nodes 402E can be dragged into the "do" action as seen in FIG. 44. When dragged into the "do" action editor, the variable's return as well as parameter list is shown. The list is formatted into a name-value pair table where users can edit the value by typing in a value or by dragging a variable into the value field.

(7) Integration Design in the IDE

Integration design involves the following aspects of application development: (i) gathering information from various resources such as databases, web sites, files, to name a few; (ii) storing or submitting data in any of the above sources; (iii) resolving model variables; and (iv) using the information to do any necessary transactions or calculations.

A developer may use the integration design module 14 to perform all of the foregoing data integration functions. The general steps taken by a developer to integrate back-end data with an application in system 100 is as follows:

1. Determine where the data originates such as:
   SQL: data stored in any relational database
   HTTP: data retrieved from a URL
   File: data stored in a flat file
   Data gleaned from an existing web site accessible from a browser.
2. Add a new data source in the integration design module
3. Configure the data source
4. Creating variables of certain data-source types These steps are more fully described below:

Step 1—Determine Data Sources

Depending on where the data resides, the application developer selects the appropriate data source. Various predetermined data sources exist, as seen in region 402B of FIG. 41. These include:

HTTP—data in a document retrieved using the HTTP protocol at the location specified by a URL;
SQL—data stored in a relational database;
File—data stored in a flat file;
Web repurposer—data gleaned from an existing web site accessible from a browser;
Web Service—data received as a result of a web service invocation (e.g., a remote procedure call); and
Custom—user writes their own code to retrieve data that is not one of the preconfigured data sources.

After determining where the data will come from, the designer may create instances of the data sources in the integration design module.

Step 2—Adding Data Sources

The nodes in the tree table widget 402C as shown in FIG. 41 are visual representations of declared objects. The nodes are displayed in a two-column tree table with the first column displaying the name of the variable and the second column displaying its type. Developers can further expand these nodes to reveal the methods that can be called on these objects. These methods appear as nodes that appear underneath the variable node. Again, there will be two-columns for these method nodes. The first column displays the name of the method. The second column displays the method signature (i.e. the parameters that can be passed to the method). These are the objects that are declared to be created when the controller runs. The objects shown are associated only with the corresponding controller. Thus, declared controller objects have associated scopes. In this case, the controller objects shown on the tree will have "controller" scope. In other words, the declared object, when used, will only reside within the associated controller. Once the control leaves the controller to a different sub-controller, then the object will be destroyed. Other scopes include the "request" scope in which the object is only "visible" in one state, an "application" scope in which the object is visible throughout the application, and a "global" scope in which the object is visible across all users of the application.

To declare a controller object, developers can view another tree called a class tree in region 402B (FIG. 41). This tree contains a hierarchical view of the classes and packages of the libraries in the project. This tree may be preceded with the system libraries. In the case of Java, the system libraries include "com.sun.*", "java.*", "javax.*", and "org.omg.*". When developers add additional libraries through the configuration panel (e.g., by adding a classpath), this tree will be refreshed to reflect the additional libraries. The example embodiment of FIG. 41 shows Java class libraries. Adding Classes Additionally, developers can add classes to the project. Classes are definitions that objects can take. For example, a "TextField" class will create objects of the type "TextField". Classes can be added by simply copying a class file into the project directory. Alternatively, developers can create classes within the IDE 500 by selecting the "Create new Java class" option from a context-sensitive menu, accessed by right-clicking on the "Data Model" node 402F in the project tree 402 of FIG. 18. This will launch a text editor wherein users can enter code to define the class. Once completed, the class source file is compiled into a class file and placed into the project directory. The classes can be any custom user class. The classes will typically be used to provide data to the controller. These classes appear in the same class tree as the other libraries, shown in region 402B of FIG. 41, allowing users to create declarations of these classes as well. When declared, these classes have the same behavior as the system libraries.

Step 3—Configuring Data Sources

A set of special classes also exists to help users integrate with data (see step 1). Users have the option of using these special classes or extending the special classes with their own extensions. The special classes have special icons in the class tree so as to distinguish them from standard libraries or user classes. (See region 402B in FIG. 41, there is "HTTP", "SQL", "File", "Web repurposer", "Web Service", "XML Buffer", "Object Queue", "Sync Connection", and "DefaultDataAdapter" special classes). These special classes have their own set of methods that operate on the data as described below. When declared, the special classes have the same behavior as the system libraries. System libraries are standard classes that are bundled with the run-time environment. For example, the Java libraries include packages to manipulate strings and perform other conventional tasks. The main difference is that there are special configuration dialogs that are geared specifically to configure these data integration classes.

Extending Data Adapters

Sometimes, the pre-built data adapters are not enough to extract the data from a data source. However, it might be the case that an application developer might want to re-use the basic functionality provided by the data source object but also to extend it with his or her own functionality. So, as part of configuring the data adapter, developers can add code to extend the data source functionality. Data (model) integration can be accomplished through use of code (either user-defined, user-extended, or system-defined). In object-oriented programming, this is done through class extension or class inheritance. In one non-limiting implementation, the code used by system 100 is Java code. System 100 uses the code to perform data collection, filtration (selecting only desired pieces of data), and collation (gathering data from different data sources). This provides flexibility. For commonly used integration sources, a set of predefined adapters is available. These predefined adapters can be used "as-is", or with class extension.

Data Adapter Details

Figure 45:
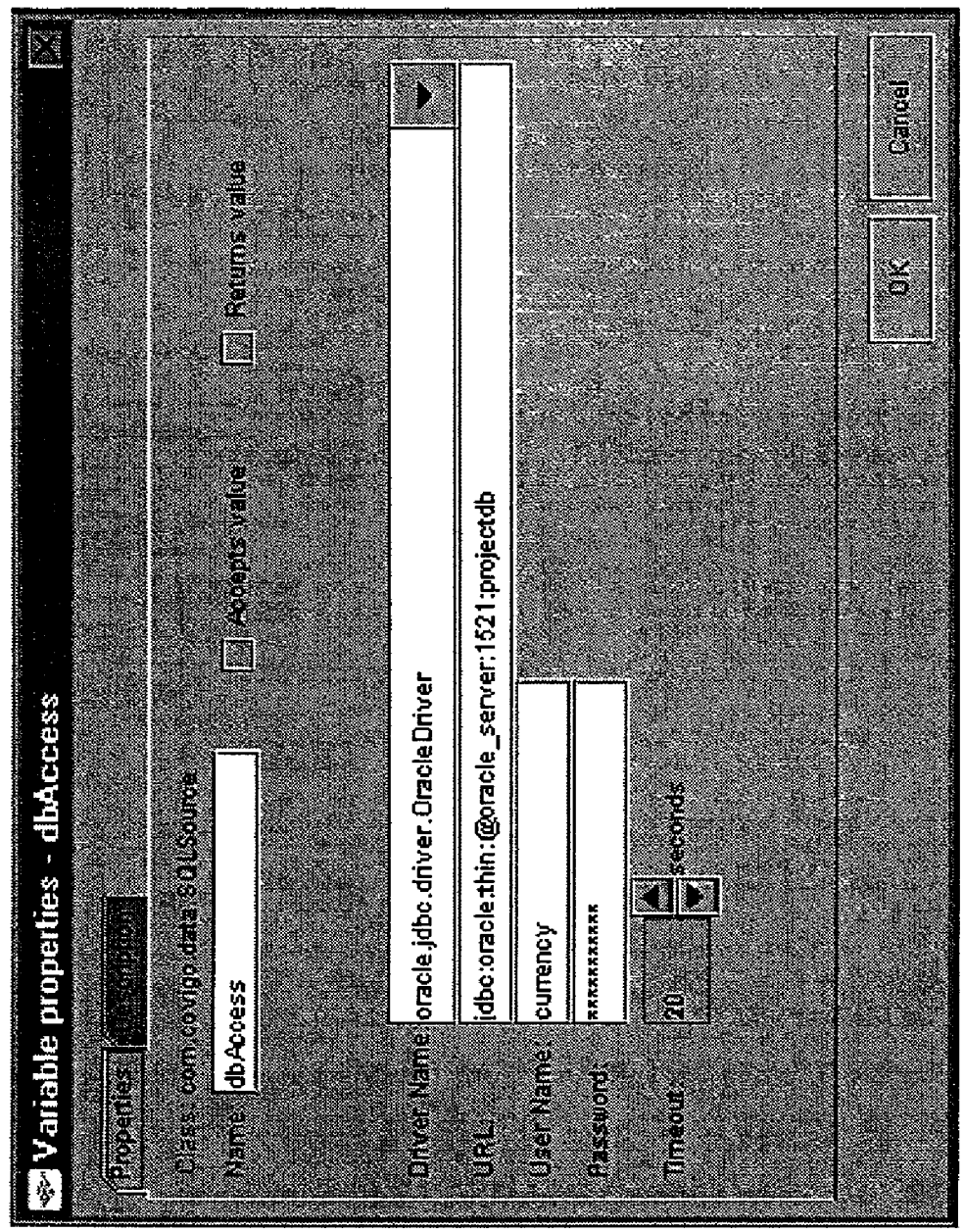
FIG. 45 illustrates an embodiment of a graphical interface for configuring a data source inside the IDE described in the present invention.
Figure 46:
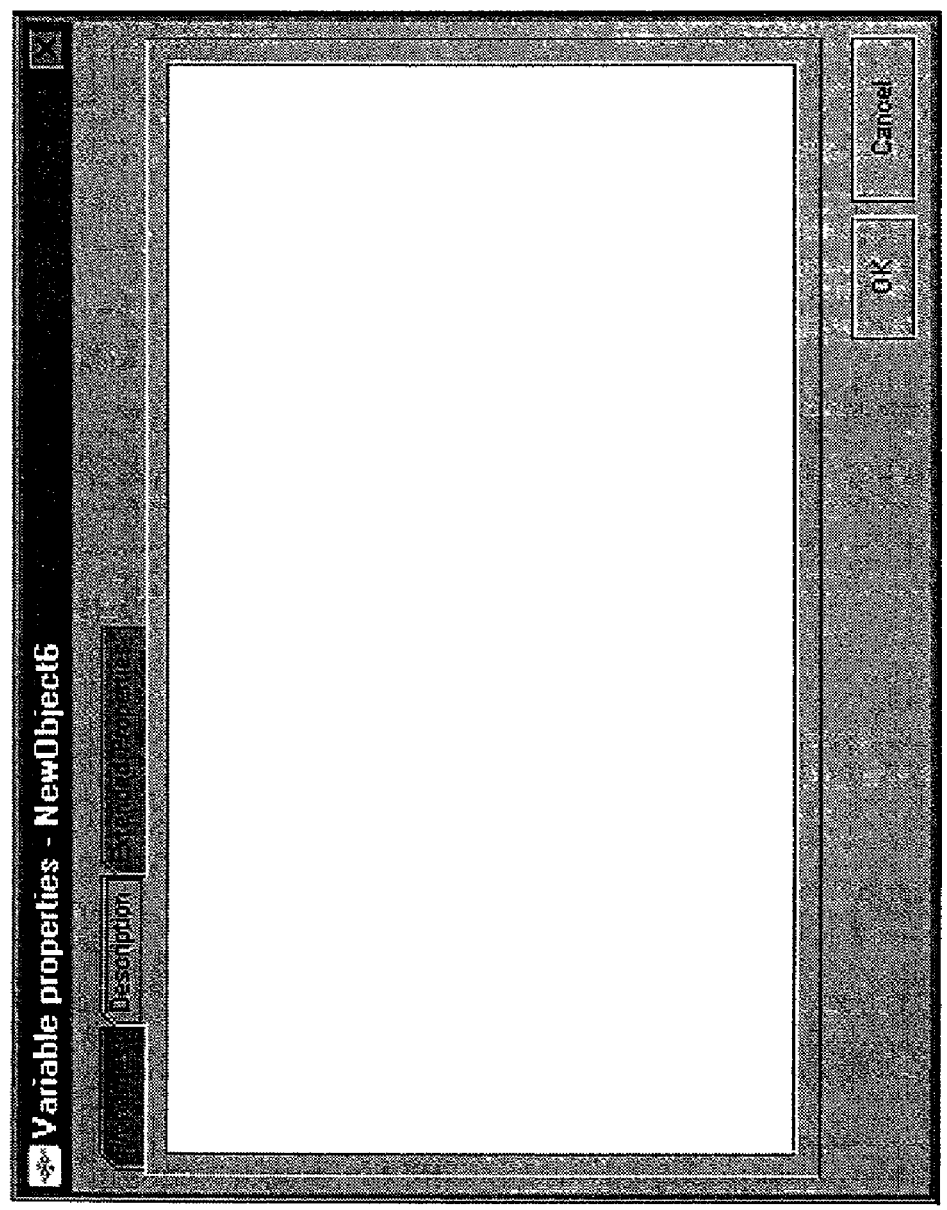
FIG. 46 illustrates a non-limiting embodiment of a graphical interface for providing a description of an object inside the IDE described in the present invention.

Each data source adapter has an associated interface or panel including a text field where developers can enter the name of the declared controller variable. An embodiment of such as panel is shown in FIG. 45. The "Accepts value" and "Returns value" checkboxes are related to data passing for sub-controllers. If the checkbox is checked, then the controller variable can be used to accept a value (have a value passed in) or to return a value (have a value be passed out of the sub-controller). So, the name and the accepts/returns checkboxes will be common for all model variables. In addition, each panel has a "Description" tab, as shown in FIG. 46. This allows developers to enter some text that describes the controller variable.

HTTP Data Source

Figure 47:
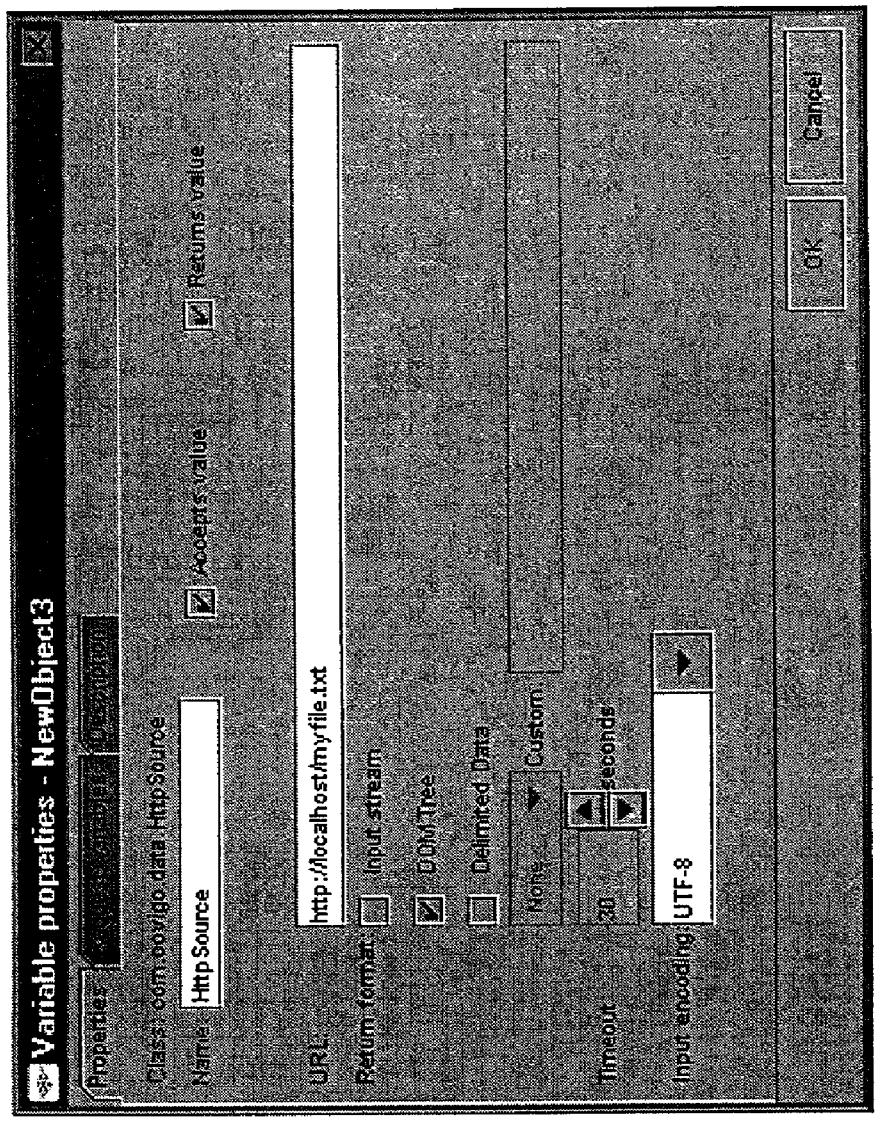
FIGS. 47-48 illustrate non-limiting embodiments of graphical interfaces for configuring a data source object of the HTTP type inside the IDE described in the present invention.

FIG. 47 illustrates a graphical interface for configuring a data source object of the HTTP type. The HTTP source shown in FIG. 47 is used to retrieve data using the HTTP protocol. It is similar to the File source that is described below. The difference is that instead of reading from the local file system, a URL to the file is specified. The "Timeout" field is used to specify how long to wait for data to be returned until the connection is deemed invalid. The "Input encoding" field specifies the encoding format of the data being returned.

There are three return types for the data, as shown in FIG. 47. The first is an "InputStream". This means that the data will not be interpreted. The stream of data retrieved will be passed back to the developer. Users can access the stream using the "getInputStream( )" method call. The second return type is a "DOM Tree". The structure and function of a "DOM Tree" will be apparent to those ordinarily skilled in the art of internet standards (e.g., a DOM representation is tree-like hierarchical representation of data.) The third return type is "Delimited Data". For this option, the File source will retrieve the data and then parse it using a conventional parser. Depending on what the user selected, the token separators will be the character chosen. In the drop-down, a list of token separators might include comma (,), tab (\t), space ( ). There is a "Custom" item in the drop-down that allows the user to enter the character that the user wishes to use to separate the fields. When the data is ready to be used, users can use the "getRowByindex( )", "getColumnByIndex( )", "getRows( )", "getcolumns( )" methods, which will return Collection objects.

Figure 48:
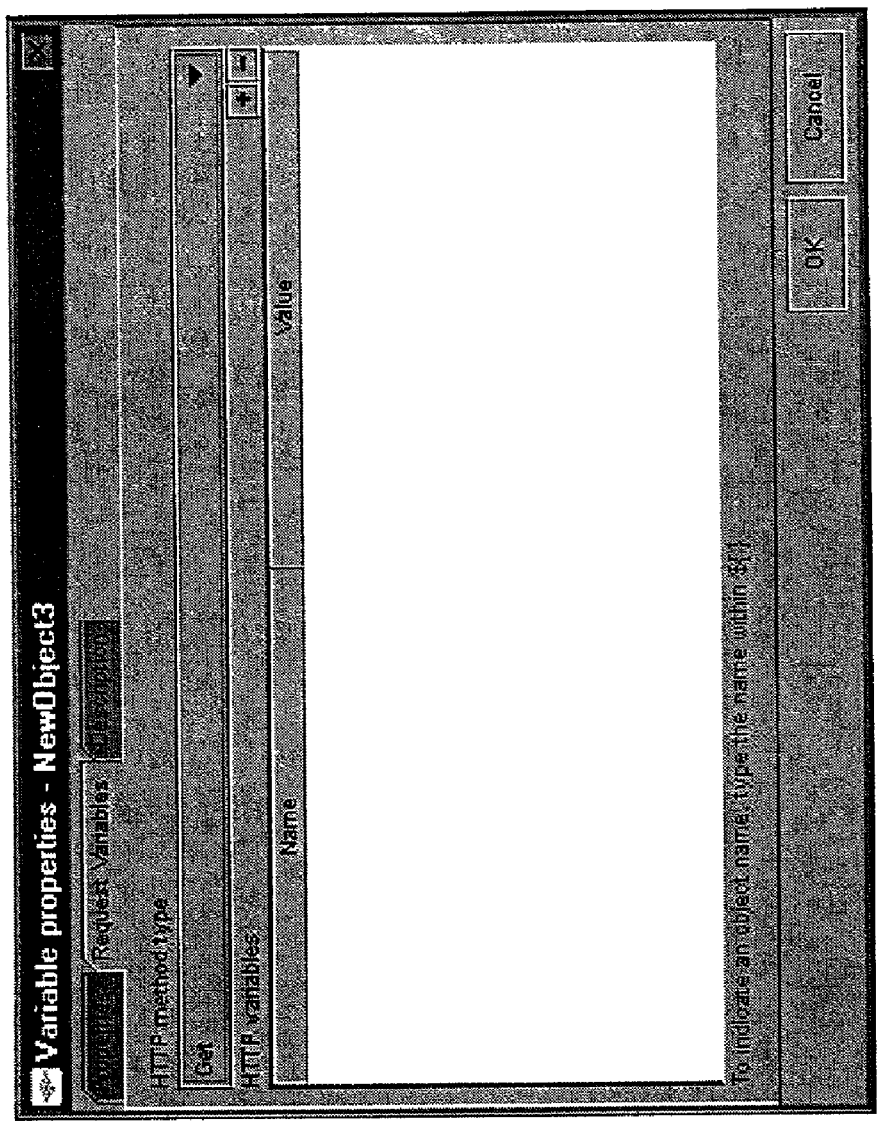

The panel or interface of FIG. 48 allows a developer to enter any additional HTTP variables to pass in the request to retrieve the data. These variables can be static text or the name-value pairs can come from a controller variable. Developers can specify either "GET" or "POST" for the HTTP request type. The significance of these parameters will be apparent to those of ordinary skill in the art of internet standards, such as HTTP.

SQL Data Source

Figure 49:
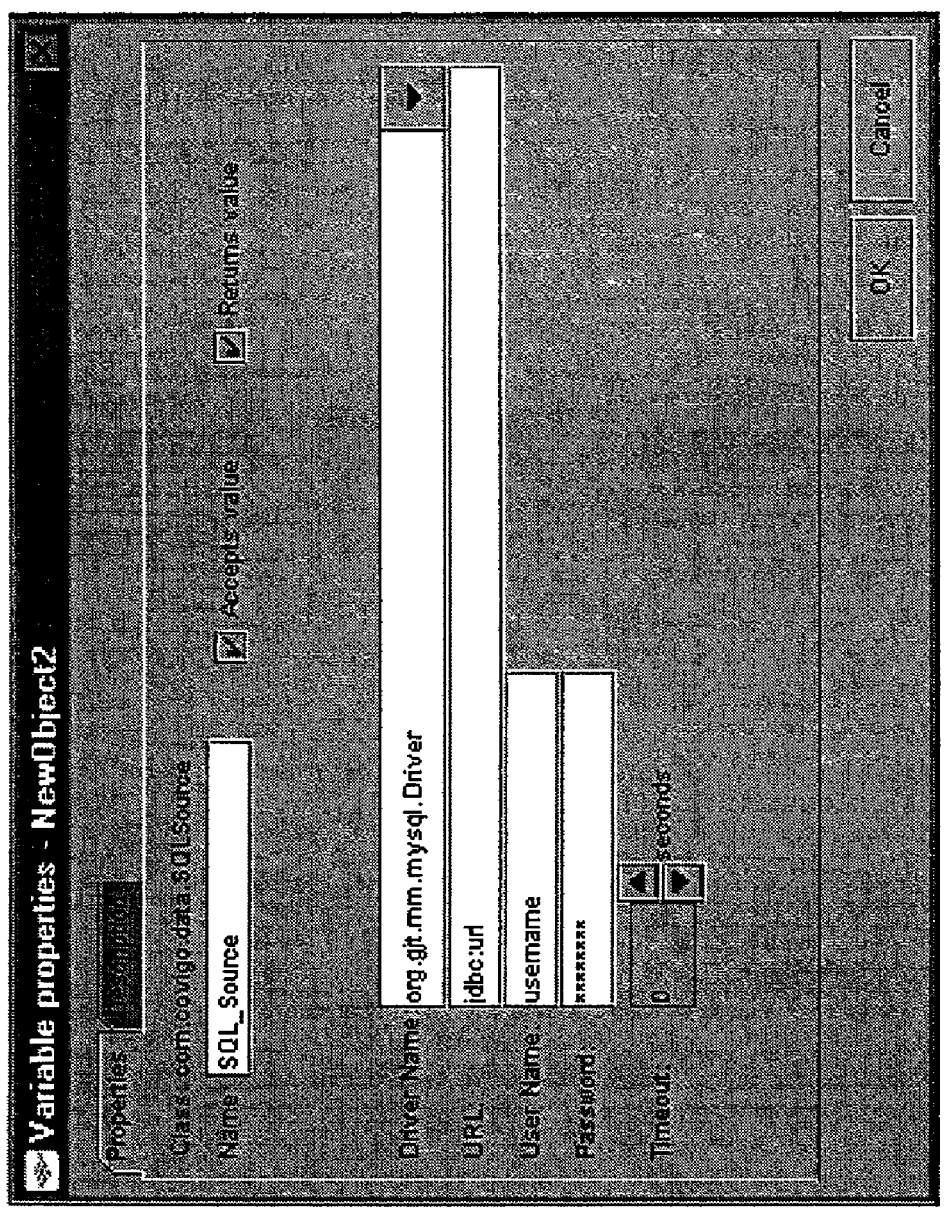
FIG. 49 illustrates an embodiment of a graphical interface for configuring a data source object of the SQL type inside the IDE described in the present invention.

FIG. 49 displays a configuration panel or interface for an SQL source. The interface of FIG. 49 contains several text fields to configure a connection to a database via the known JDBC (Java Database Connectivity) API. In the preferred embodiment, the specific implementation is for a Java platform, which has JDBC for database connectivity. However, in other alternate embodiments, the implementation could be easily extended to use other APIs such as the known ODBC (Open Database Connectivity) API.

The "Driver Name" is the fully-qualified class name that implements the JDBC driver interface. In this example, it is "org.gjt.mm.mysql", which is a publicly available database. The GUI implements an editable combo-box widget that displays a set of widely used driver names (such as Oracle™ and Sybase™). If a new database driver becomes available and it is not in the drop-down list, then the developer can enter the driver name in the field. The "URL" is a driver-specific text string that gets passed. JDBC database drivers have their own URL formats that include the machine name, port numbers, and others. Developers may consult conventional database documentation for details on what to specify. The "User Name" and "Password" fields specifies the login information to connect to the database (if security is enabled on the database). The "Timeout" field specifies the number for a session to hold on to the database connection. It should be appreciated that when the timeout expires, the database connection is not closed. On the server, there is a pool of database connections that maintains a constant connection to the database. The "Timeout" field only specifies when to return the session's database connection back to the database connection pool. The SQL data adapter includes methods such as "executeQuery( )", "executeUpdate( )", "getRowByIndex( )", "getColumnByIndex( )", "getRows( )", and "getcolumns( )" that can be used to retrieve the data.

File Data Source

Figure 50:
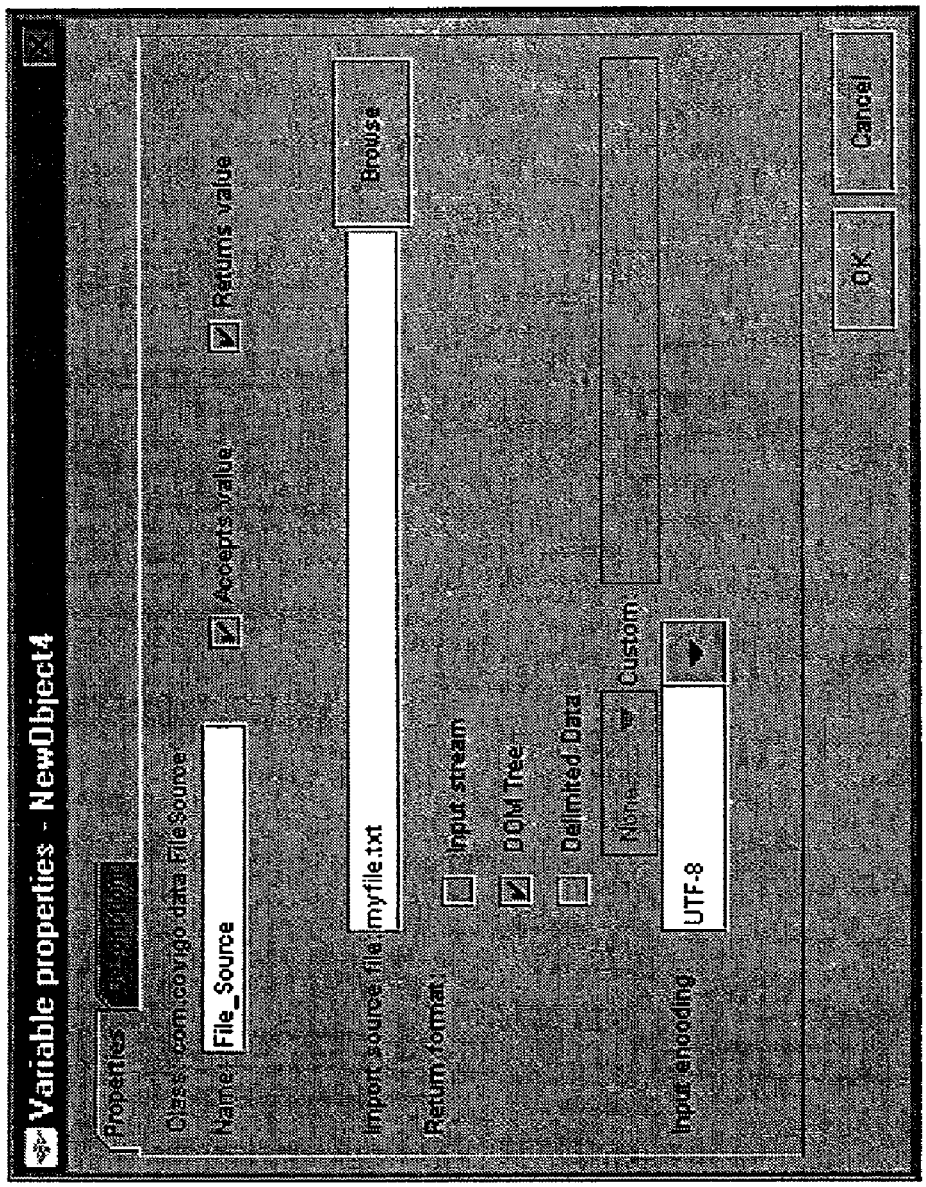
FIG. 50 illustrates an embodiment of a graphical interface for configuring a data source object of the File type inside the IDE described in the present invention.

FIG. 50 shows an example of the configuration panel or interface for a File source adapter. In addition to the standard name and accepts/returns checkboxes, there are additional fields to configure the adapter. This configuration panel looks very similar to the HTTP source adapter. The main difference lies in the mechanism used to retrieve the data. The "Import source file" field specifies a file to read. Developers can press the "Browse" button to browse on the local file system for a file to import. A valid file entered in this field will be copied into the project (reference by copy). Otherwise, when the application is deployed to different systems, the same file and directory structure in the servers are most likely different. As a consequence, the file is copied locally into the same directory of the application to ensure that the file will exist.

Like the HTTP source, the file source adapter has three return types for the data. The first is an "InputStream". This means that the data will not be interpreted. The stream of data retrieve will be passed back to the user. Developers can access the stream using the "getInputStream( )" method call. The second return type is a "DOM Tree" The third return type is "Delimited Data". For this option, the File source will retrieve the data and then parse it using a simple parser. Depending on what the user selected, the token separators will be the character chosen. In the drop-down, a list of token separators might include comma (,), tab (\t), space ( ). There is a "Custom" in the drop-down that allows the user to enter the character that they wish to use to separate the fields. When the data is ready to be used, users can use the "getRowByIndex( )", "getColumnByIndex( )", "getRows( )", "getcolumns( )" methods, which will return Collection objects. The "Input encoding" field specifies how the file was encoded so that the system 100 can retrieve the data correctly from the file.

Web Page Scraping Data Source

Figure 51:
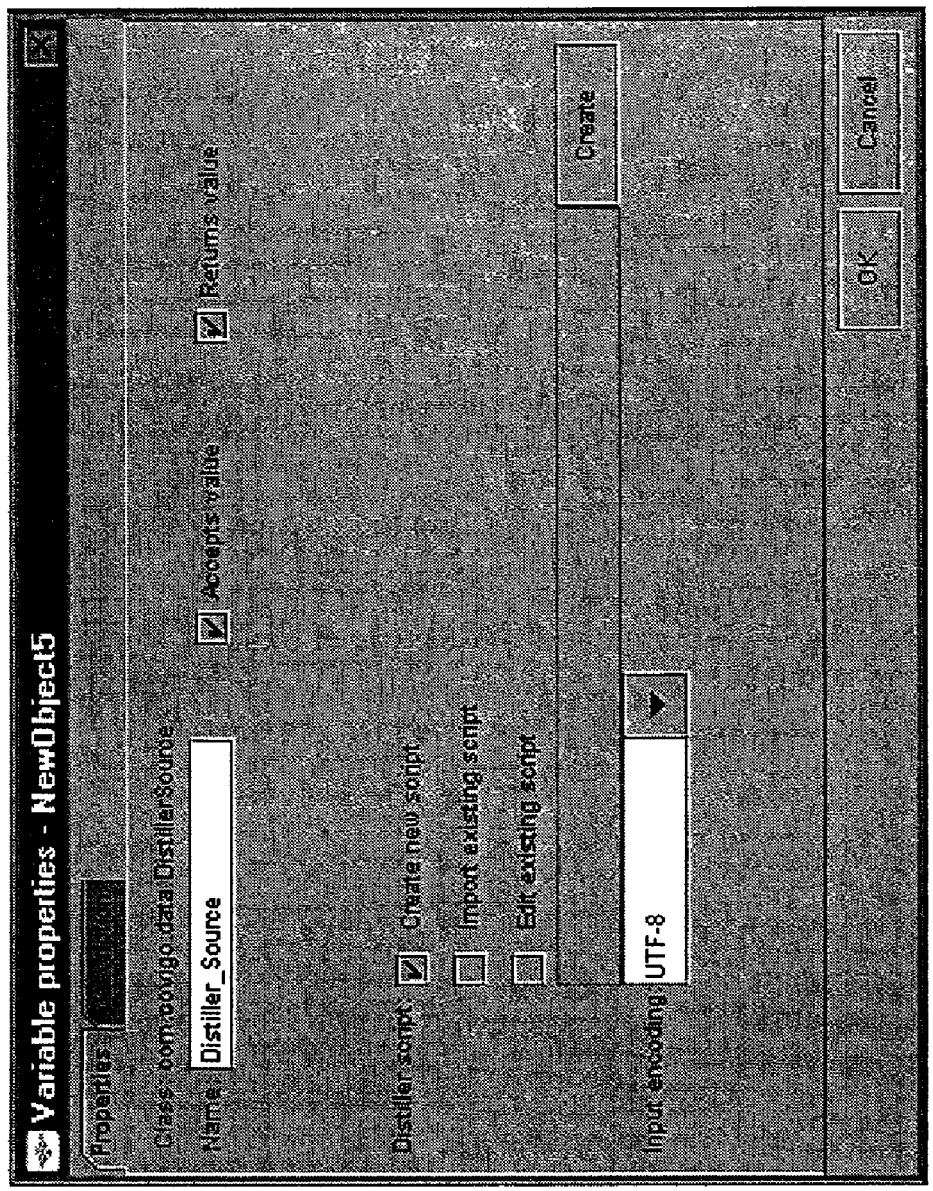
FIG. 51 illustrates an embodiment of a graphical interface for configuring a data source object of the web repurposer type inside the IDE described in the present invention.

FIG. 51 shows the configuration panel for a Web Page source adapter. This adapter allows application developers to gather data from web pages. Additional fields to configure are the script and the input encoding. The "Script" field specifies the script to use to retrieve data. Users can opt to create a new script, import an existing script, or edit an existing script.

Web Services

Figure 52:
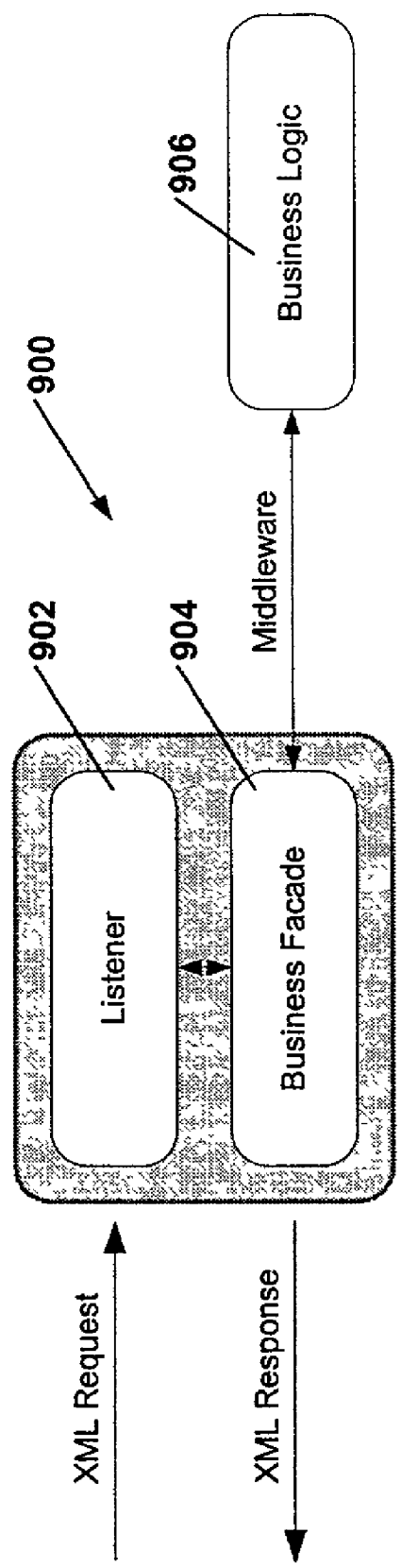
FIG. 52 illustrates the general architecture of a web service.
Figure 53:
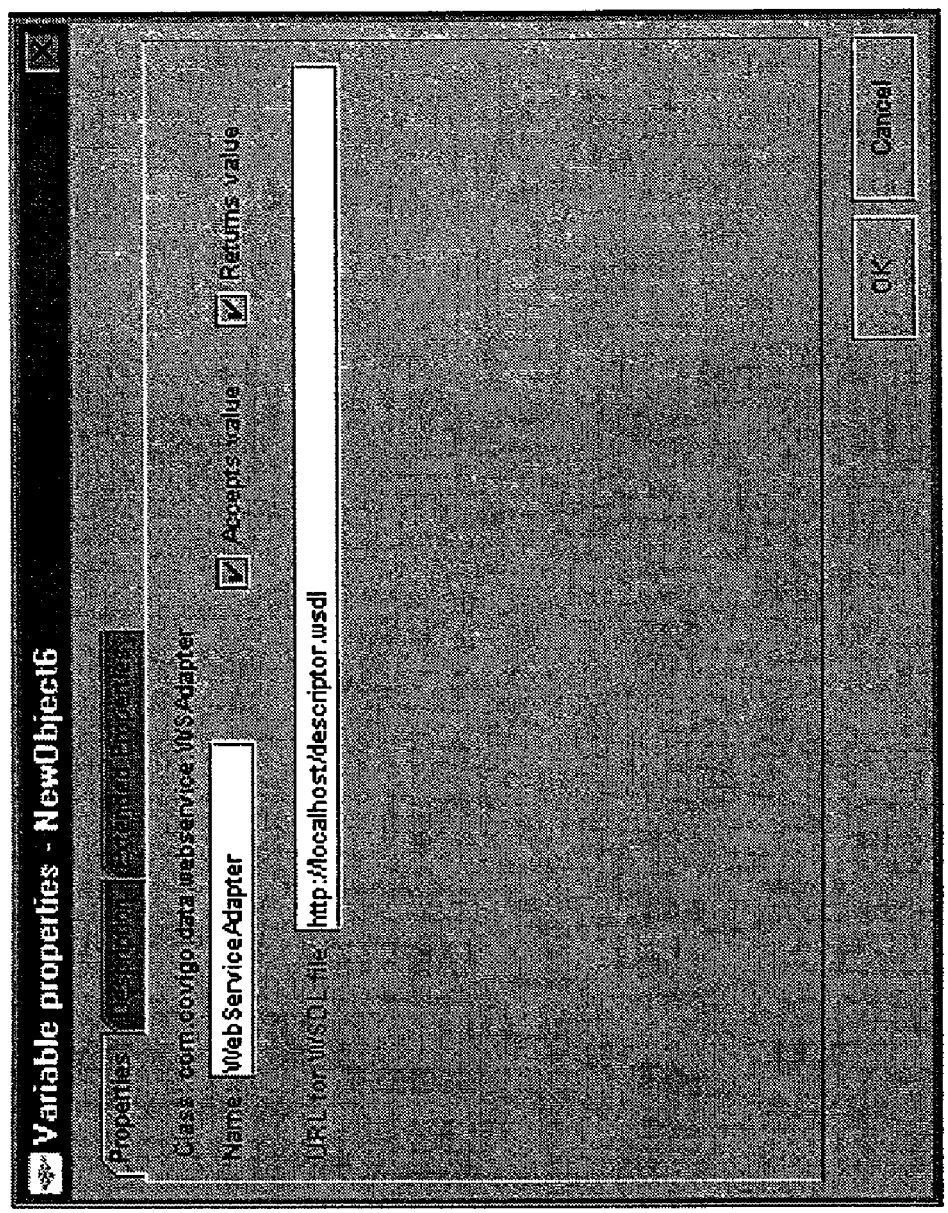
FIGS. 53-54 illustrate non-limiting embodiments of graphical interfaces for configuring an adapter object for web services inside the IDE described in the present invention.
Figure 54:
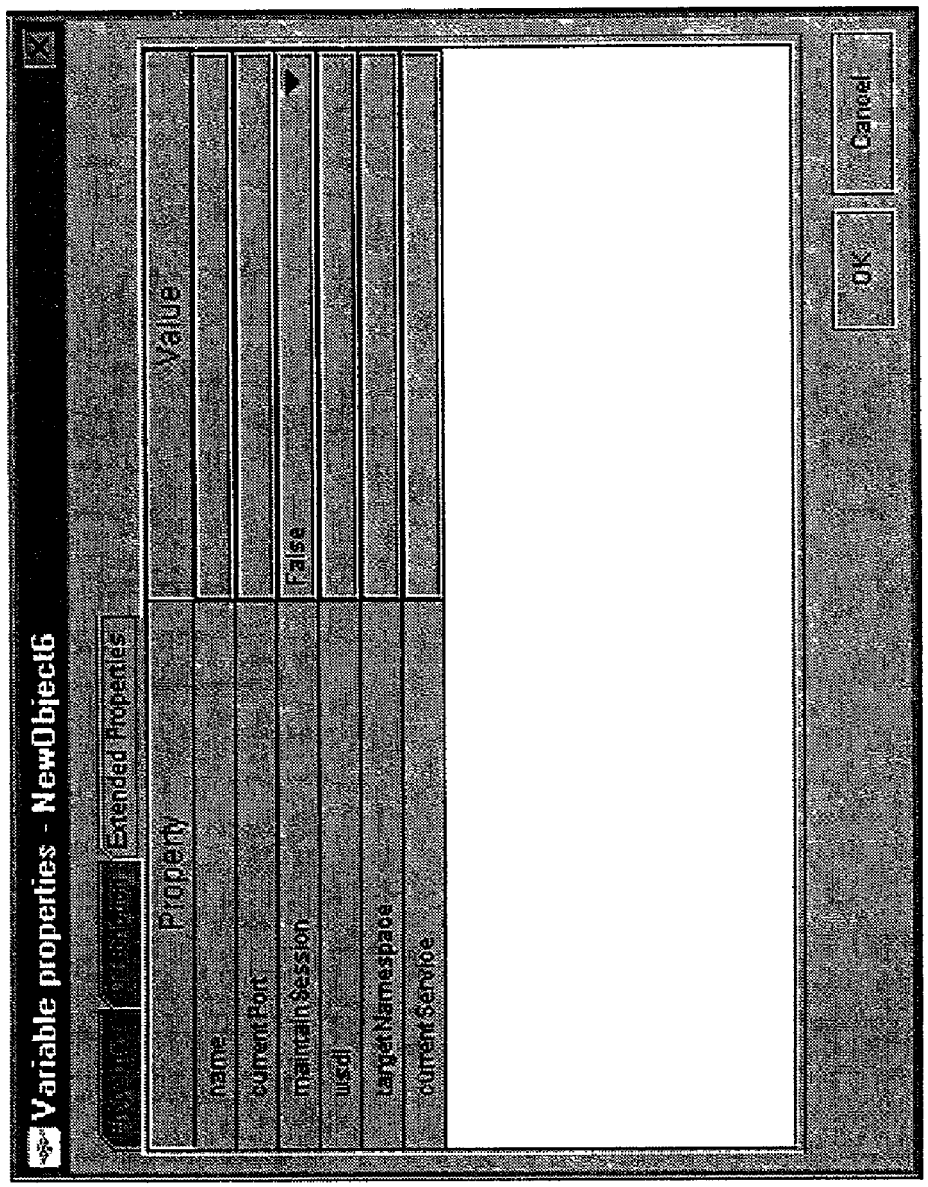

FIG. 52 describes a web service 900. Viewed from an n-tier application architecture perspective, the web service is a veneer for programmatic access to a service which is then implemented by other kinds of middleware. Access consists of service-agnostic request handling (a listener) 902 in FIG. 52 and a facade 904 that exposes the operations supported by the business logic 906. The logic itself is implemented by a traditional middleware platform and will be apparent to those skilled in internet standards such as Web Service Description Language (WSDL). A client can read a WSDL description of a service published by a server and will automatically know how to invoke a service (e.g., parameters, invocation type) and what kind of a response to expect. Essentially Web service is a remote procedure call. A request is sent a server and response is received. In the case of web-service adapter, FIG. 53 shows the configuration panel for entering the name of the web service adapter and where to obtain the service description (URL for WSDL file). The IDE 500 will automatically fetches the service description file from the given URL and parses and show the user the available services from the service as shown in sample embodiment in FIG. 54. This panel shows the parameters that the service will accept. These parameters can be configured manually or through the use of variables form Project tree 402.

Step 4—Creating Variables

Developers can then navigate through class tree 402B (FIG. 41) tree to select the class type of the object to declare. At that point, developers can then press the "Create" button (FIG. 41) to create the object. Alternatively, the interface may include a context-sensitive menu option with a "Create object" option 402B that users can access via a secondary input button to create the object. Once created, the object will appear in the declared objects tree 402C.

In a preferred embodiment, system 100 also provides a feature to help more advanced users to create object declarations more quickly. If a developer does not want to navigate the declared objects tree, system 100 provides a text field 402A (FIG. 41) where developers can specify the name of the object and its type to create in the form of <object type> [<object name>[,<object name>]*]. If the object name is not specified at all, then a unique name will automatically be assigned to the object. Developers can later go back to edit the declared object name.

VII. Techniques for Building Scalable Applications

A. Layers

The IDE 500 allows for the creation of applications and controllers in multiple layers. These layers allow the developer to organize a program into separate functional portions. The layers are represented visually on the interaction workflow diagram 442 of FIG. 19 using different colors. That is, each layer is mapped to a different color. To aid in the visualization of the program, the developer can filter out one or more layers to examine a program's component(s), using the layer palette 460, shown in FIGS. 19 and 55. Layers are finctional as well—if a layer is hidden during deployment, its states is not deployed to the engine 132 and are unable to be used by end users.

Layers facilitate the development of multi-channel applications by providing a method to isolate channel-specific application behavior. When multiple channels behave in the same manner, their views may all be associated with the same state. If one channel requires different or additional interactions with the user, the developer may separate its states onto a different layer. This provides several advantages, including:

a. making it easy to isolate one channel for development, debugging, and maintenance;

b. making it easy to deploy or hold back specific channels; and c. providing visualization of where and how applications differ.

Figure 55:
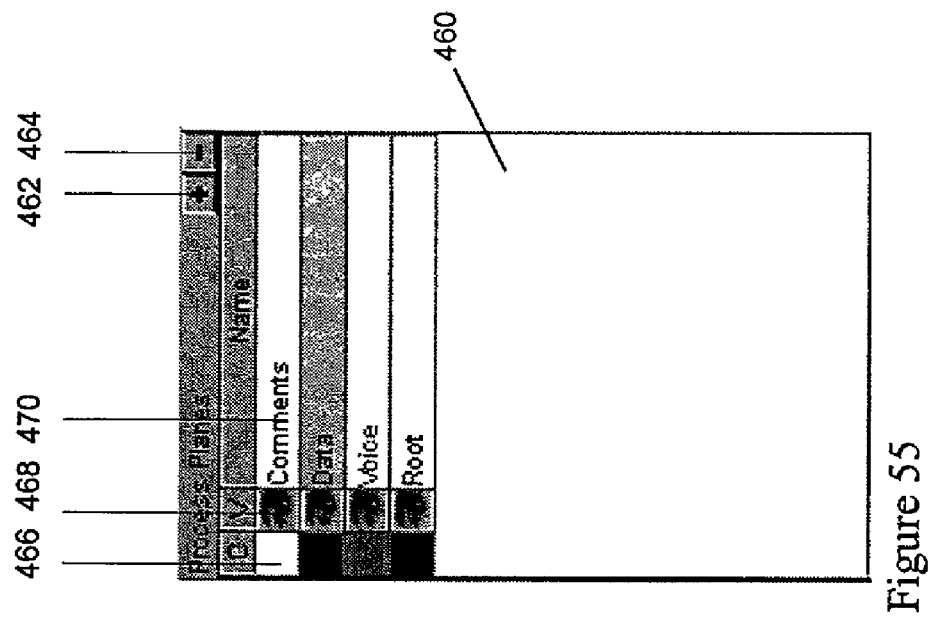
FIG. 55 illustrates an embodiment of a graphical interface for creating, using, and managing layers in the interaction flow inside the IDE described in the present invention.

Referring now to FIG. 55, buttons 462 and 464 allow the developer to add and delete layers, respectively. Column 466 indicates the color associated with each layer. Column 468 indicates whether the layer is visible or not in the interaction flow diagram 442—the developer can toggle the visibility on or off by clicking on the corresponding icon. Column 470 allows the developer to describe the function of the layer (e.g., comments, data, voice, root).

The color affects the workflow diagram visually by altering the color of transitions and states on the associated layer. For all states in a particular layer, the text color that describes the state will be the color specified in the layers panel. For transitions that occur between states that are in the same layer, the color of the transition will be the color of that layer. However, if a transition occurs between two states in different layers, the transition will take the color of the target layer.

The visibility layer visually toggles a layer on or off. When toggled off, all states in that layer are hidden from view. Transitions follow a slightly different rule. For transitions that occur between states on the same layer, if the layer is toggled off, then that transition will also be hidden. For transitions that occur between states on different layers, if either of the two layers are disabled, then the transition will also be hidden.

When the user highlights a particular layer using the layers palette 460, then that layer becomes "active". That is, an "active" layer is the layer on which dropped states will be added to that layer. There are two special layers called "Root" and "Comments". The "Root" layer can never be disabled. The default layer of the application is the 'Root' layer. The "Start" and "Exit" states of an application or controller are always added to the "Root" layer. If the user highlights the "Root" layer, then all states become visible. However, if a user highlights a different layer (other than "Root"), then only that layer will be visible (other layers become semi-transparent). At this point, when developers add states and other objects to the controller, that object will be added to the selected layer. Users can never highlight the "Comments" layer. That is, users can never add states to the "Comments" layer. If a user adds a comment object to the workflow diagram, then that comment object is added to the "Comments" layer automatically. In the preferred embodiment, the editor 408 is further adapted to independently display one or more voice and visual layers, representing voice and visual channels, respectively. In this manner, a developer can interact with and design voice and visual channels of an application separately.

The "active" layer affects where components are placed in the workflow. The workflow editor will determine which layer is active. Then, as objects are dropped onto the editor, that object will be added to the active layer. An example of how foregoing layering process is implemented is provided in Section X below.

B. Componentization

Developers can use the componentization module 20 to define certain sub-controllers that are created into components that can be re-used. Developers should componentize a created sub-controller when it contains code that is used repeatedly across many different applications or when it needs to be integrated as a part of a larger application.

Each component created by system 100 is comprised of the following: (i) an interaction process model defined by process design module 12, which sets forth the user interaction flow between the client device and the server; (ii) back-end data adapters and bindings in terms of model variables defined using the integration design module 14; (iii) the presentation layer defined by the presentation design module 16; (iv) all media imported into the component including strings, images, audio files, and speech recognition grammars; (v) a visual icon representing the component; (vi) a description that defines the behavior of the component; (vii) a functional "black-box" interface that allows variables to be passed in and out of the component; and (viii) instructions on how to assemble the resources in the component into the application using that component. Items (i)-(viii) may be stored in any archive file format. The archive file format used in preferred embodiment of the invention is a Java JAR file.

Figure 56:
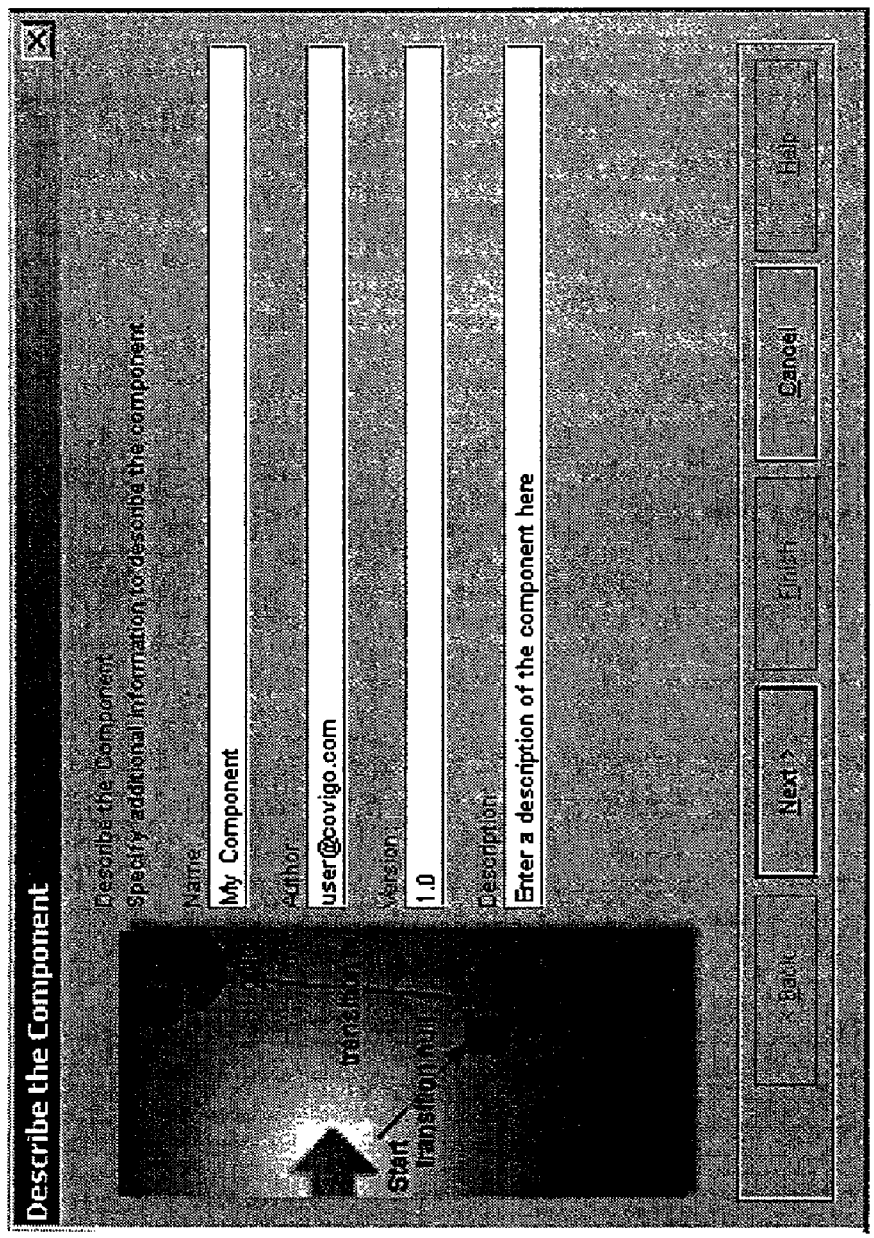
FIGS. 56-57 illustrate non-limiting embodiments of graphical interfaces for a wizard to componentize the current interaction flow inside the IDE described in the present invention.
Figure 57:
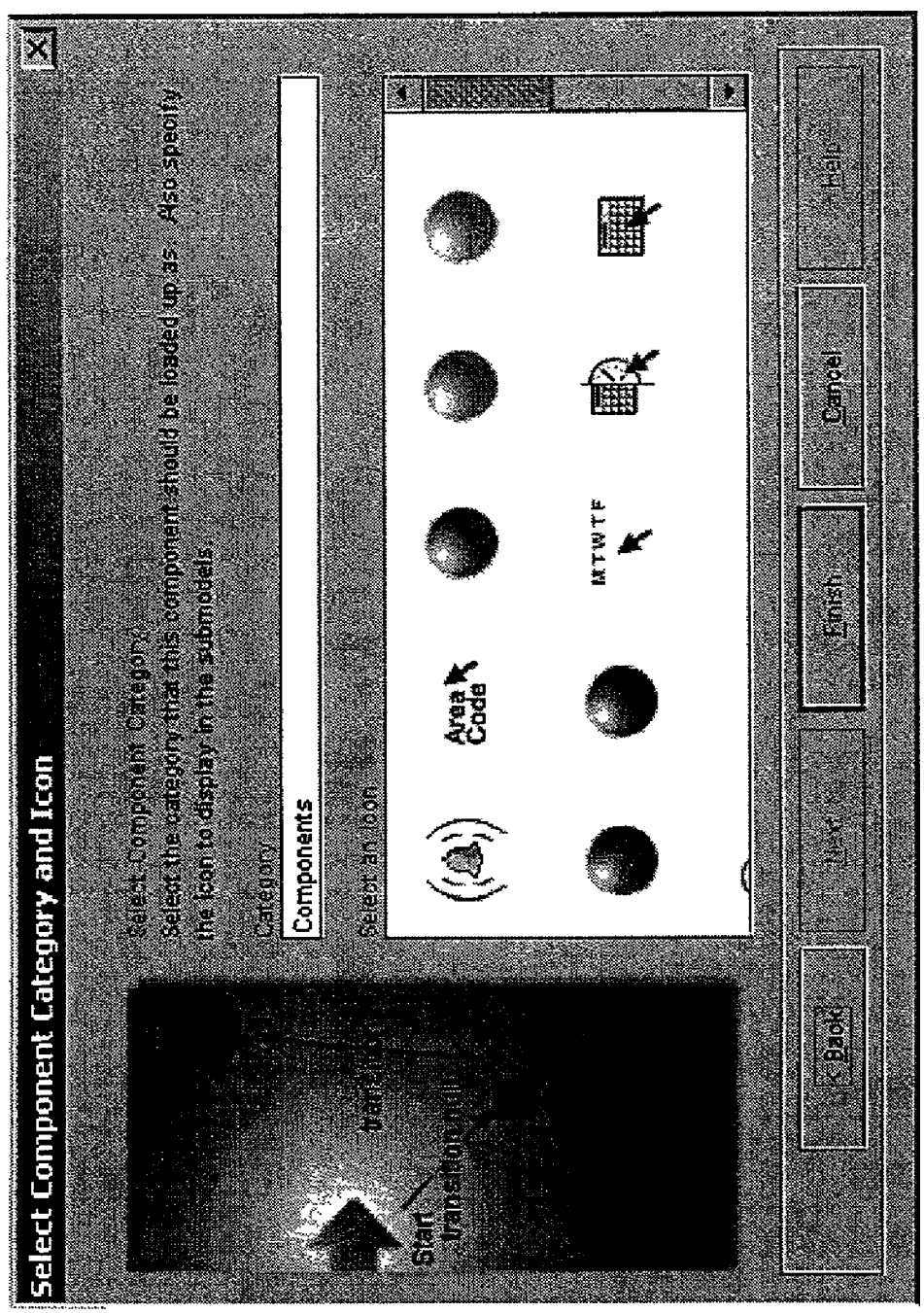

To create a component, the user selects the Componentize tool, which may be located within the Tools menu 480 of interface 400 (see FIG. 17), and which activates the componentization module 20. The componentization module 20 generates a wizard that guides the developer through configuring the component, as shown in FIGS. 56-57. The wizard allows a developer to enter a name for the component as well as various other meta-level properties to be embedded with the component, as shown in FIG. 56. These properties can then be used by the IDE 500 to display more information about the component (e.g., the component description in a "tooltip" 450A could appear when the mouse pointer hovers above a component). The properties selected in FIG. 57 specify what the component will look like on the workflow diagram. Additional icons can be added to the IDE 500 by copying icon files into a directory defined by the user (e.g., default can be in "components/img"). Components can also be categorized into different palettes. This allows users to organize components into meaningful categories, definable by the user. These categories appear as different palette panels that the user can switch between in palette 450, shown in FIG. 58.

Figure 58:
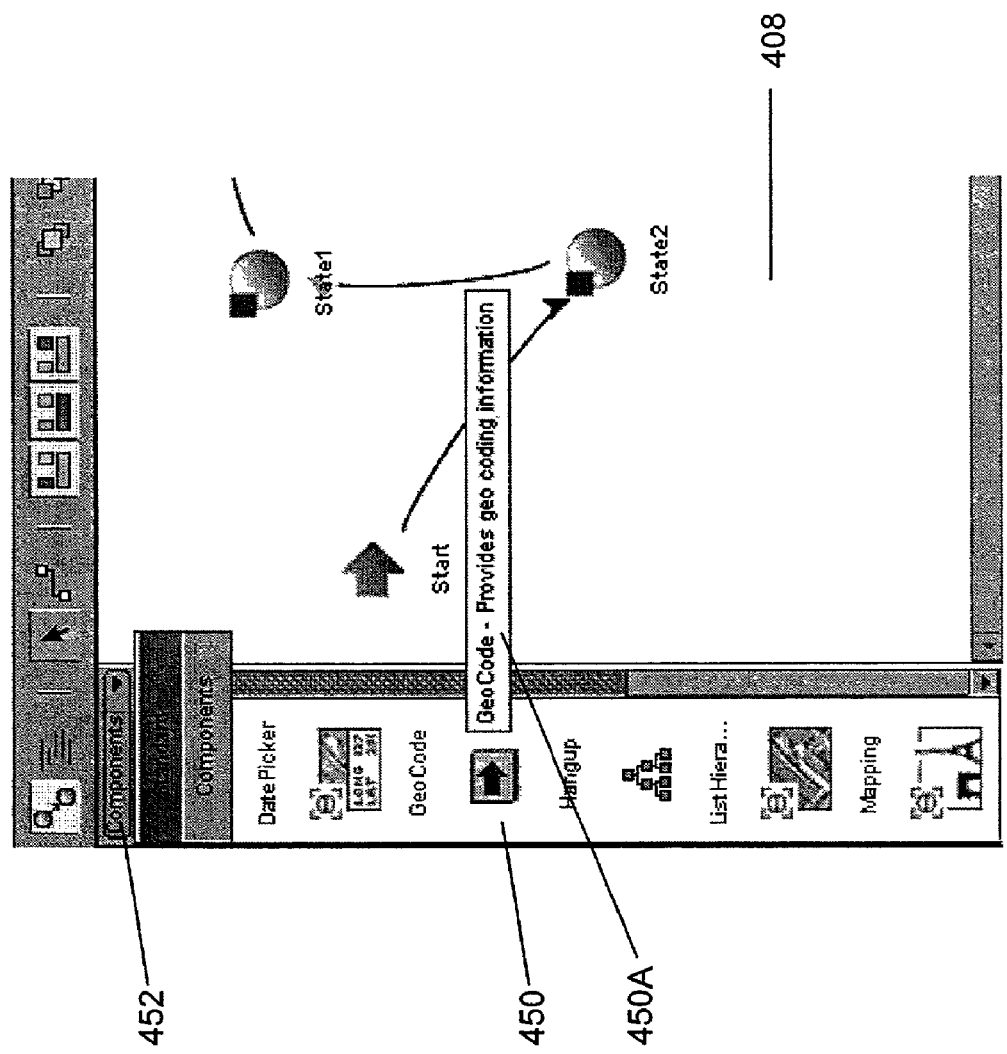
FIG. 58 illustrates a non-limiting embodiment of multiple palettes available to the developer inside the IDE described in the present invention to use in building an interaction flow, in the editor shown in FIG. 19.

Once created, the component appears in the components palette 450, shown in FIG. 58. Components may be incorporated into any application built using the present invention simply by dragging the visual icon (v) into the editor window 430 of the editor 408, as previously described in reference to FIG. 19. When the components are used in an application in the system 100, all the items that are part of the component (i.e., items (i)-(viii)) become referenceable by the application. Users are able to view the contents of the component (i.e. items (i)-(viii)) if the component has been marked as "viewable". However, users cannot edit the component contents. If a component has been marked as "viewable", users can edit the component contents through a merging mechanism. This mechanism involves copying all of the component resources into the application using that component. So, the component becomes part of the application and can be safely edited at that point. Editing component resources at this point will not change the component itself because users will now be editing a copy of the component's resources.

Properties of a component are exposed the outside world by way of "controller variables." Variables passed between sub-controllers can be passed by value or passed by reference, by manipulating the IN/OUT fields during componentization, using the componentization module 20. These variables follow the previously described scoping rules. Note that the call to components and sub-controllers are the same. For a given application, there exists various scopes in which a variable will be valid. Scopes define the "lifetime" of a variable. That is, scopes define how long a variable will be accessible in the application. The "request" scope defines variables that exist only between when data on a form in a template is submitted to the next template that is displayed. The "controller" scope allows variables to exist only between when control is passed to the controller (e.g. "Start" state) and when control returns to the calling controller (e.g. "Exit" state). The "application" scope defines variables that will be visible and will exist throughout the application for a particular user (e.g., the variable is not destroyed between sub-controllers). The "global" scope defines variables that are visible across all users of the application (e.g., multiple users in the same application can access the same variable).

To share a component with another developer, the developer simply copies the archive containing the component contents (e.g., the JAR file) created by the componentization process from his components directory into the other developer's components directory. This components directory is a fixed location in the IDE installation directory where the IDE 500 is assured of being able to find the components.

Figure 59:
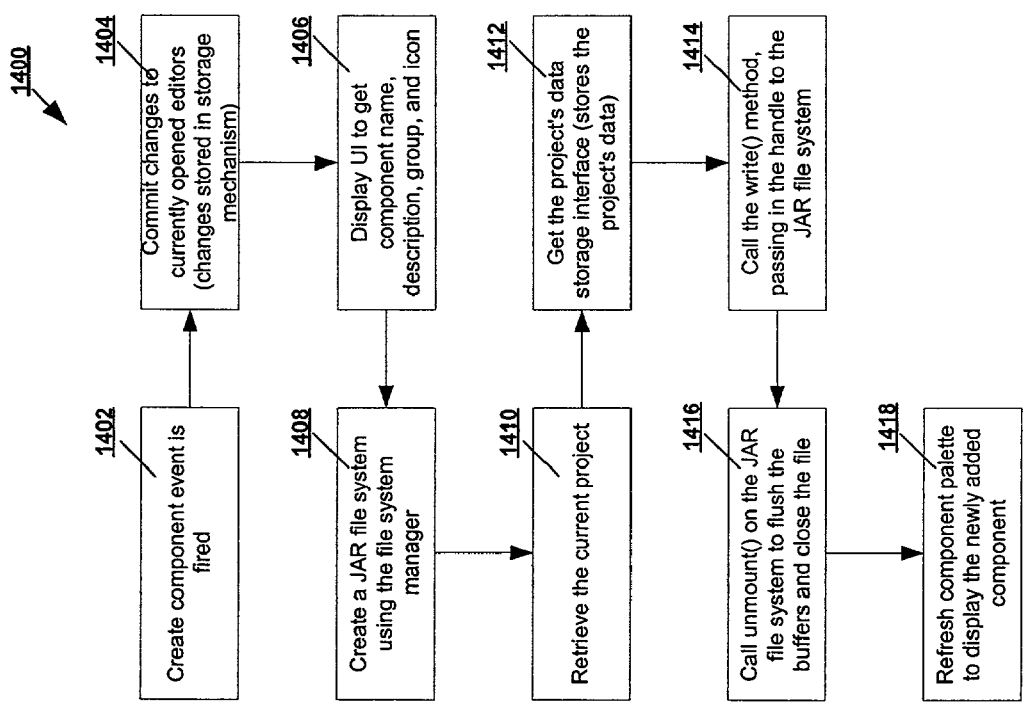
FIG. 59 is a flow diagram documenting the processes called by one of the plug-ins associated the IDE described in the current invention during the componentization of a controller.

The componentization module 20 takes a developer through the componentization process. FIG. 59 is a flow diagram 1400 representing the componentization process. The componentization module 20 allows a developer to encapsulate an entire process model into a single component. After a create component event is selected or "fired" (step 1402), module 20 commits any changes made in the opened editors to the project storage mechanism (step 1404). This project storage mechanism is a data structure that holds all of the project's data in a convenient data structure. The storage mechanism is like a virtual file system that exists in memory. It is implemented as a file cache that stores the parsed versions of the files for convenient access. For example, an XML text file exists as bytes on disk. However, when read by the plug-ins, it will be parsed into some data structure and stored in the project storage.

Componentization is actually an extension of the system's save command. Instead of saving to a series of files in the file system, the system 100 saves into a single archive file (e.g. JAR file). The writes are done through the file system manager, which abstracts the details of the file system from the plug-in. In componentization, the mechanism will use the JAR file system. Thus, the write mechanism is the same, but the destination will be to a JAR file. This JAR file becomes the component that is placed in a location where the IDE can read the file and display in the component palette for users to use.

The componentization process, as shown in step 1406 FIG. 59, includes prompting a user for various properties of the component (such as name, category, description, version, and a visual icon that will be displayed when the component is dragged into a workflow editor). After the prompt, the componentization module 20 will call the "File System Manager" to create a JAR file in step 1408. A JAR file is a single file on disk. This JAR file format is defined by Sun Microsystems™ of Palo Alto, Calif. and will be used to store additional files in this one file (i.e. JAR file is a collection of multiple files that have been concatenated and indexed so that the files can be later extracted into individual files). Once the JAR file is opened for writing, module retrieves the current project in step 1410, and calls the "Project Manager's" save function to save all the files in step 1412. This is the same as having the user select the "Save Project" command from the menu. The only difference is the target "file system". In this case, the target file system is a JAR file where file data gets written one by one into a single file. This is in contrast to a local file system where files get written to disk. In step 1414, the module 20 calls the write method, passing in the handle to the JAR file system. Note that the calls to write the file data remains the same. The only difference is in the destination of the files. This component JAR file is stored in a specific directory within the IDE installation directory so that the IDE can determine where to load up a list of components to display in the component palette. Once the storing is complete, in step 1416 Componentization process will ask the "File System Manager" to un-mount the Jar File. Un-mounting the Jar file commits the changes so that the component can be read. Once unmounted, the componentization module 20 will signal the components palette, shown in FIG. 58, to refresh its list by re-reading all components from the components repository again (step 1418).

In addition to the standard components and user-defined components, the system 100 includes a plurality of predefined component objects that may be viewed and accessed through the IDE graphical interface 400, and more particularly, through the component palette 450, shown in FIG. 58. The component palette consists of two parts, a component category selector 452 and a component list 450. Developers can specify the category in which a component should be created to better organize sets of related components. Once categorized, developers can use selector 452 to select the set of components to display. There is one "internal" category that developers cannot add components to called "Standard". The "Standard" component category displays the list of basic controller primitives from which components are built. The components in the other categories are developer-defined components. To use the components, developers drag an object from portion 450 and drops into the controller editor 408.

The components are sub-controllers that are self-contained, reusable units. A component repository with a number of predefined components is shown in palette portion 450 of FIG. 58. By selecting region 452 of palette portion 450, a developer may select to view various predefined components, as illustrated in FIG. 58. The predefined components may be stored within the media library 18, which contains an extensive selection of ready-to-use components that are reusable and easily configurable to enable device-, language-, and network-independent multi-channel applications. The media library 18 contains business logic, interface standards, service functionality, and network intelligence components that eliminate the need to build multi-channel applications "from scratch" each time. Specific components include but are not limited to common visual controls, data control adapters, transaction blocks, Protocol Independent Multicast (PIM) applications (e.g., e-mail and instant messaging, address books, calendaring, to-do lists), and commerce applications such as (login, shopping carts, product catalogs, and search).

Components may be customized after they are incorporated into the application. If a developer chooses to modify and customize the component, the component is merged into the current project as a sub-controller, and all its internals are merged with the current project. The merging process involves performing a copy of the component's resources into the application. (Note that modifying the component resources at this point does not modify the component itself. Rather, users will be modifying a copy of the component of which the application will be using.)

At run-time, components used in a project are instantiated as required by the engine 132. The engine 132 reads the storage manifest of the component and determines how to instantiate the component. The run-time behavior of the component is defined by the sum of all it is comprised of, and obeys the following principles: (a) the component provides a black-box interface to the outside world that may be used to configure the component at instantiation; and (b) a component has a single entry point, and may have any number of exit points.

VIII. Internationalization

Internationalization is the process of designing an application so that it can be adapted to various locales. A locale is a combination of a language and a region. For instance, US English is different (albeit subtly) from UK English. Part of the internationalization process involves localization. Localization is the process of adapting software for a specific locale by adding locale-specific components and translating media (e.g., strings, images, voice-files, grammar definitions). When performing application internationalization, it is desirable that localizing to a different locale should not require additional engineering/recompilation efforts.

The IDE 500 allows application developers to create internationalized applications from the onset. In order for this to occur, the application must have internationalization constructs built-in. This includes separating the media from the presentation. That is, text, images, audio files, and other media must not be "hard-coded" into the application. In fact, the IDE 500 will create separate resource reference files for each locale added to the system. When the application runs, the run-time environment that implements the interfaces outputted by the IDE 500 determines which media to return to the end-user based on their user profile (e.g., what locale the end-users connect from).

In addition to separating the media from the presentation, the IDE 500 automatically tracks the resources that are used in the application. This is done by trapping media insertion events and updating an internal store of media as described below.

Figure 60:
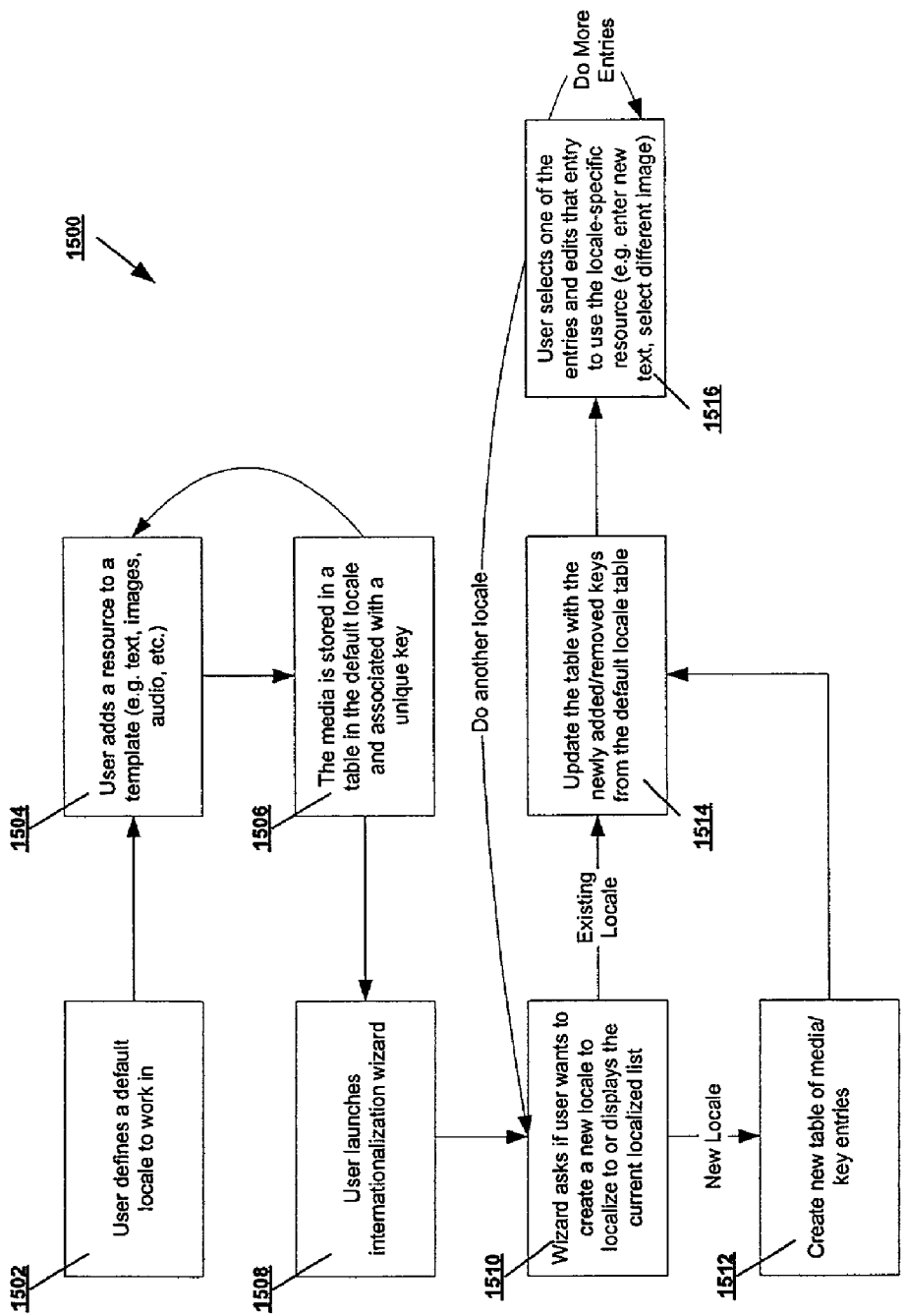
FIG. 60 is a flow diagram illustrating the process of internationalization called by one of the plug-ins associated with the IDE described in the current invention during the internationalization of an application or component designed using the current invention.

IDE 500 may be developed in such a way that the plug-in manager 530 and API 508 mandate that the plug-ins follow strict rules of internationalization. For example, if the one of the plug-in modules such as presentation designer 16 has constraints such as paragraphs and images, the associated save command is mandated to detect the resources used by the primitives and catalogue them into appropriate resource bundles. When a user first creates an application, system 100 creates a data store called a resource bundle. Resource bundles store the media that is added to the presentation. FIG. 60 illustrates a preferred embodiment of the internationalization process 1500. The first resource bundle created by a user will be of the "default locale" (step 1502). The default locale is the application designer-defined locale that the designer will work with while developing the application. So, as developers create content (step 1504), the various media will be added to the default locale's resource bundle (step 1506). After the application is finished, a translator can come in and use the IDE 500 to translate (i.e., localize) the media. This translator will be able to do this without modifying the application (using the internationalization wizard of system 100 as described below).

Figure 61:
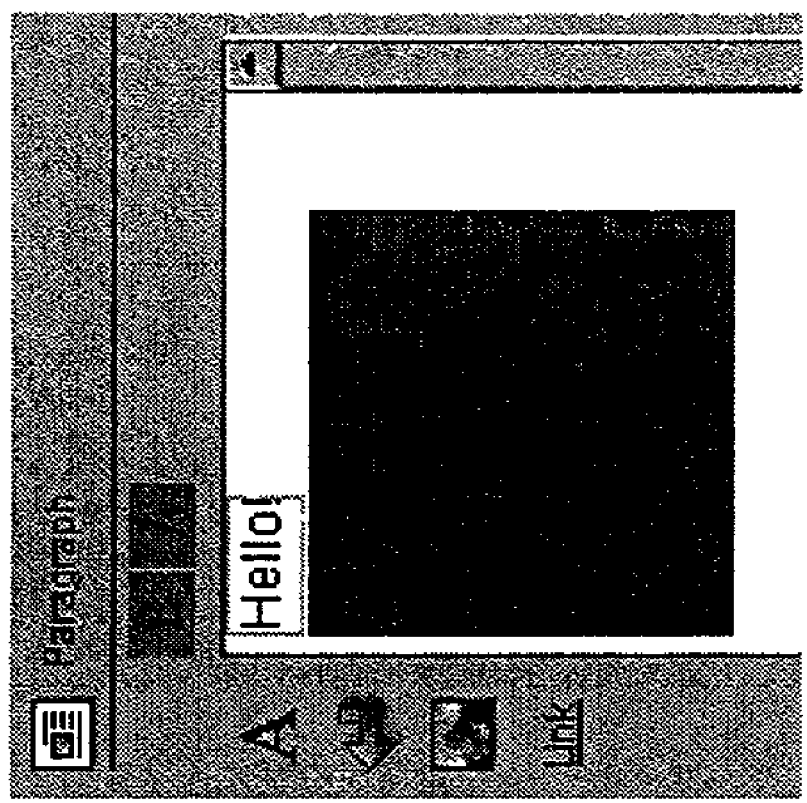
FIG. 61 shows a non-limiting embodiment of a view that contains internationalizable resources: a string of text and an image inside the IDE described in the current invention.

As illustrated in step 1506, the IDE 500 will automatically add resources (such as text and images) to a table to ease the task of internationalization. When the application is first created, a set of tables will be created and associated with a default locale. Developers can optionally modify this default locale. The default locale specifies the tables into which all resources that are added to the project will go to. So, for example, while developers enter text in the template editor, an entry in the text table will be created. FIG. 61 shows an example of two media types added to a template, a block of text ("Hello") and an image. When the developer added the text, the text is automatically associated with a key and placed into the text table. For the image, an image was imported and as a result is automatically assigned a key and put into an images table.

The format of the tables depends on the type of data that is stored. For text data, the table will consist of a key and the text. The key is a unique identifier that uniquely identifies the block of text for the particular locale. When developers switch locales, the keys in the different tables will remain the same while the text will change to the appropriate locale. For other media types, the storage is similar. There will be a unique key that will identify the resources in a particular locale.

For example, the developer starts a project and enters some text and adds an image into a presentation template (FIG. 61). The entered text will be stored in the default locale table for text and will have a unique identifier associated with that block of text. Similarly, the image will have a key associated with the image and will be stored in an image table.

A. Internationalization Wizard

Figure 62:
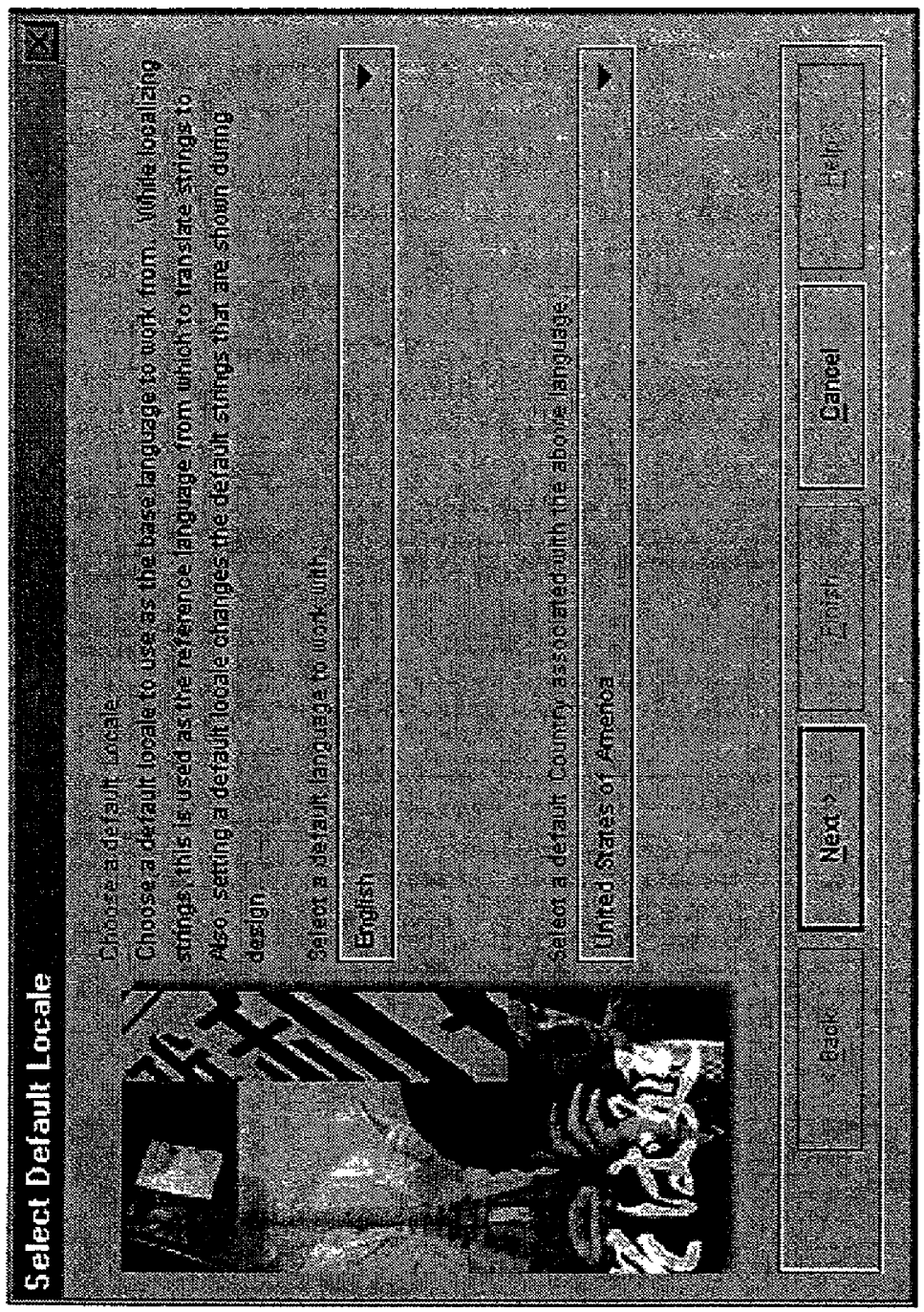
FIGS. 62-64 are non-limiting embodiments of graphical interfaces used in a wizard inside the IDE described in the current invention to guide IDE-users through application internationalization process.
Figure 63:
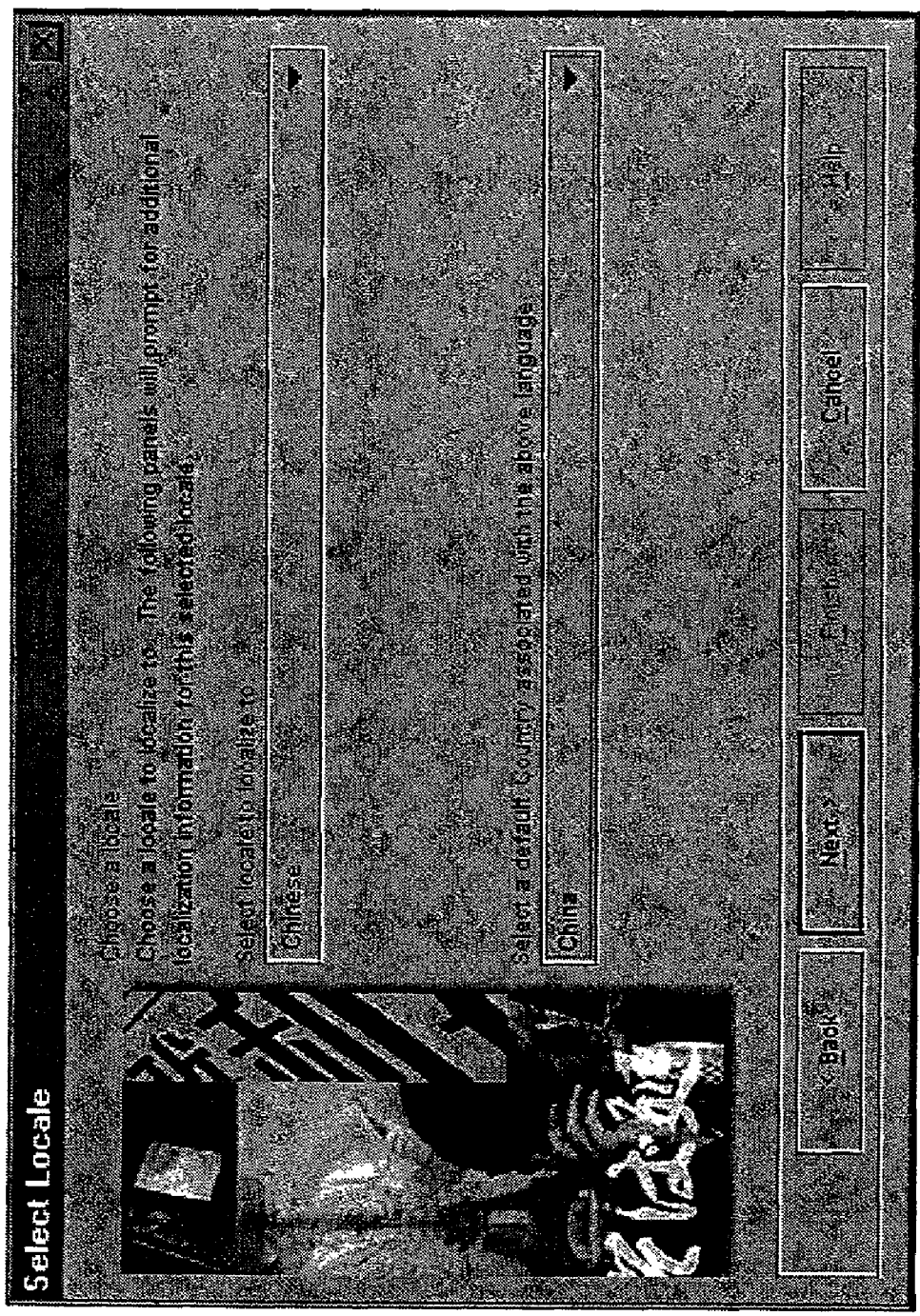
Figure 64:
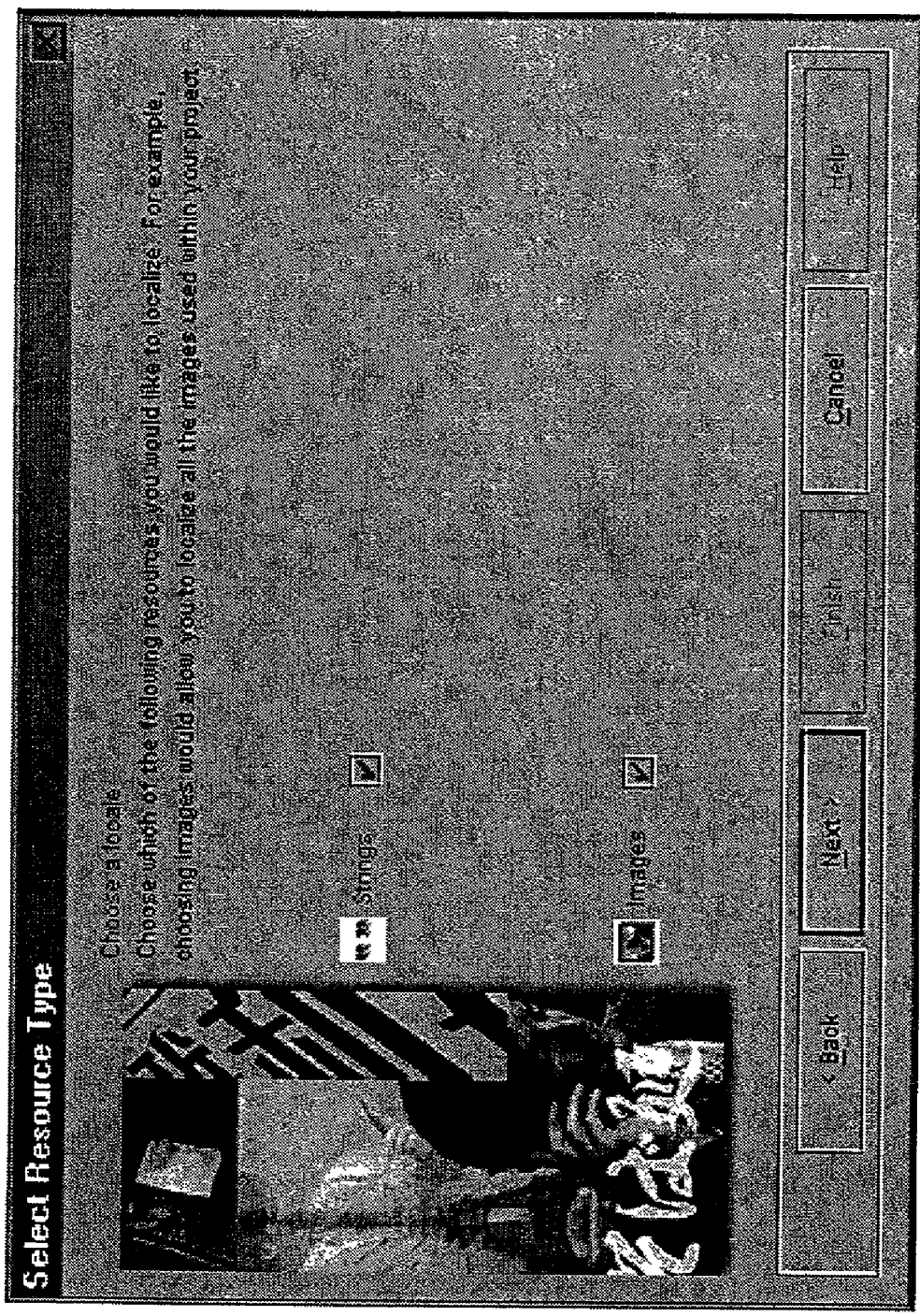

Referring back to FIG. 60, when the application developer is ready to localize the application to a different language, the developer will launch the internationalization wizard, as indicated in step 1508. FIG. 62 illustrates an example of an internationalization wizard interface or screen generated by system 100. Developers specify the view of the locale from which they wish to translate. At the next step, the developer has the option of either creating a new locale (proceeding to step 1512 of FIG. 60) or editing an existing one proceeding to step 1514 of FIG. 60). Since there is only one locale, the developer can create a new one (Chinese-China in the interface example of FIG. 63). In step 1512 of FIG. 60, the wizard creates a new table of media and key entries. In step 1514, the wizard updates the table form the default locale table. In this step, the wizard may also display the media types that are localizable in the project, as shown in the interface example of FIG. 64. Since a text block and an image was placed in the template, the list contains the "Strings" and "mnages" entry. Both of the entries in the list were "checked", which means that the text and the images will be presented to be localized.

Figure 65:
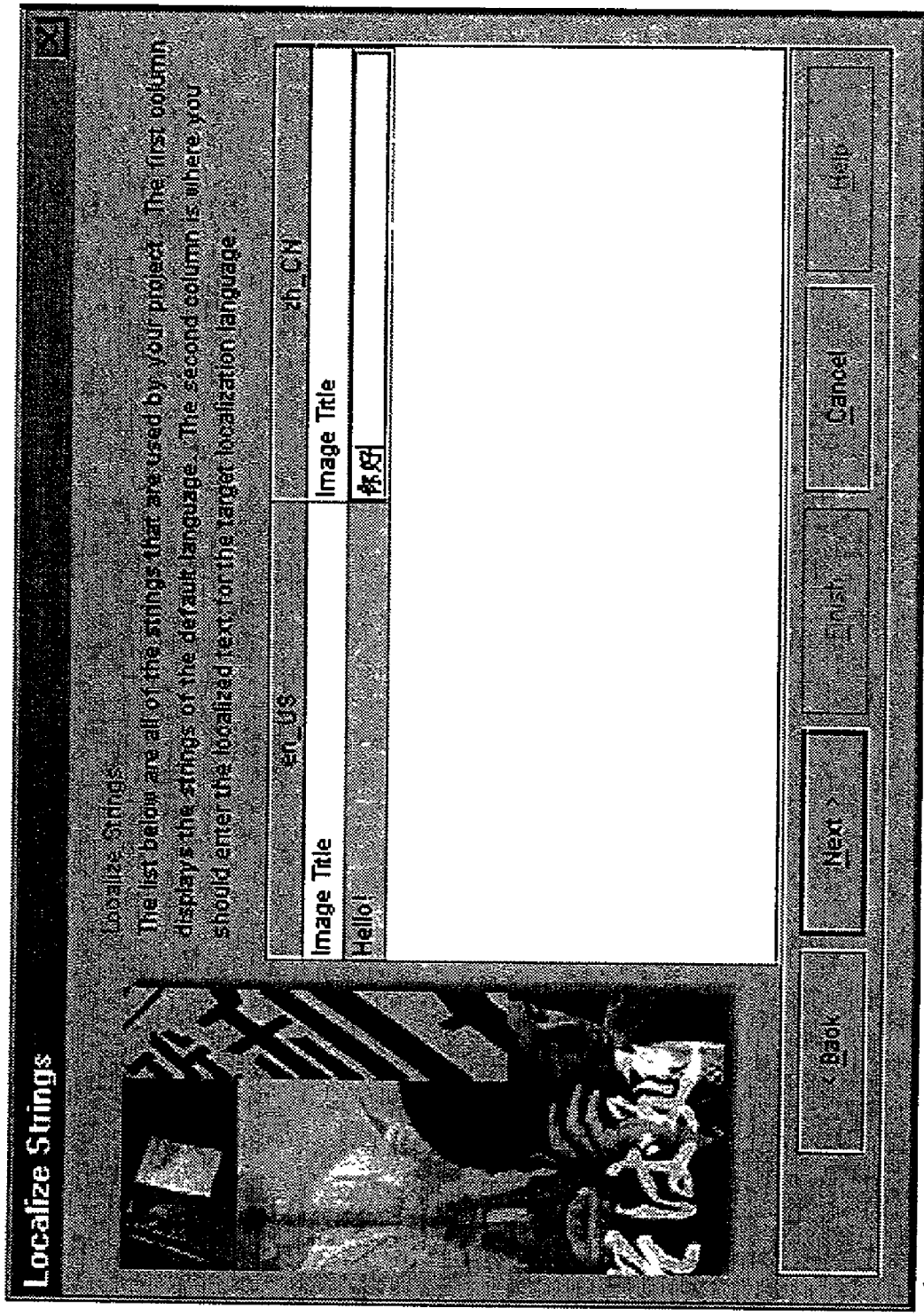
FIG. 65 is an embodiment of a graphical interface used to enter localized text during intermationalization process inside the IDE described in the current invention.

FIG. 65 shows a subsequent interface that may be generated by the wizard, displaying a list of all the text blocks entered by the developer. In the preferred embodiment, this information may be presented in a table of two columns. The first column shows the text in the default locale (e.g., US-English). The second column shows the text in the locale to be translated to (e.g., China-Chinese). Developers can then edit that text.

Figure 66:
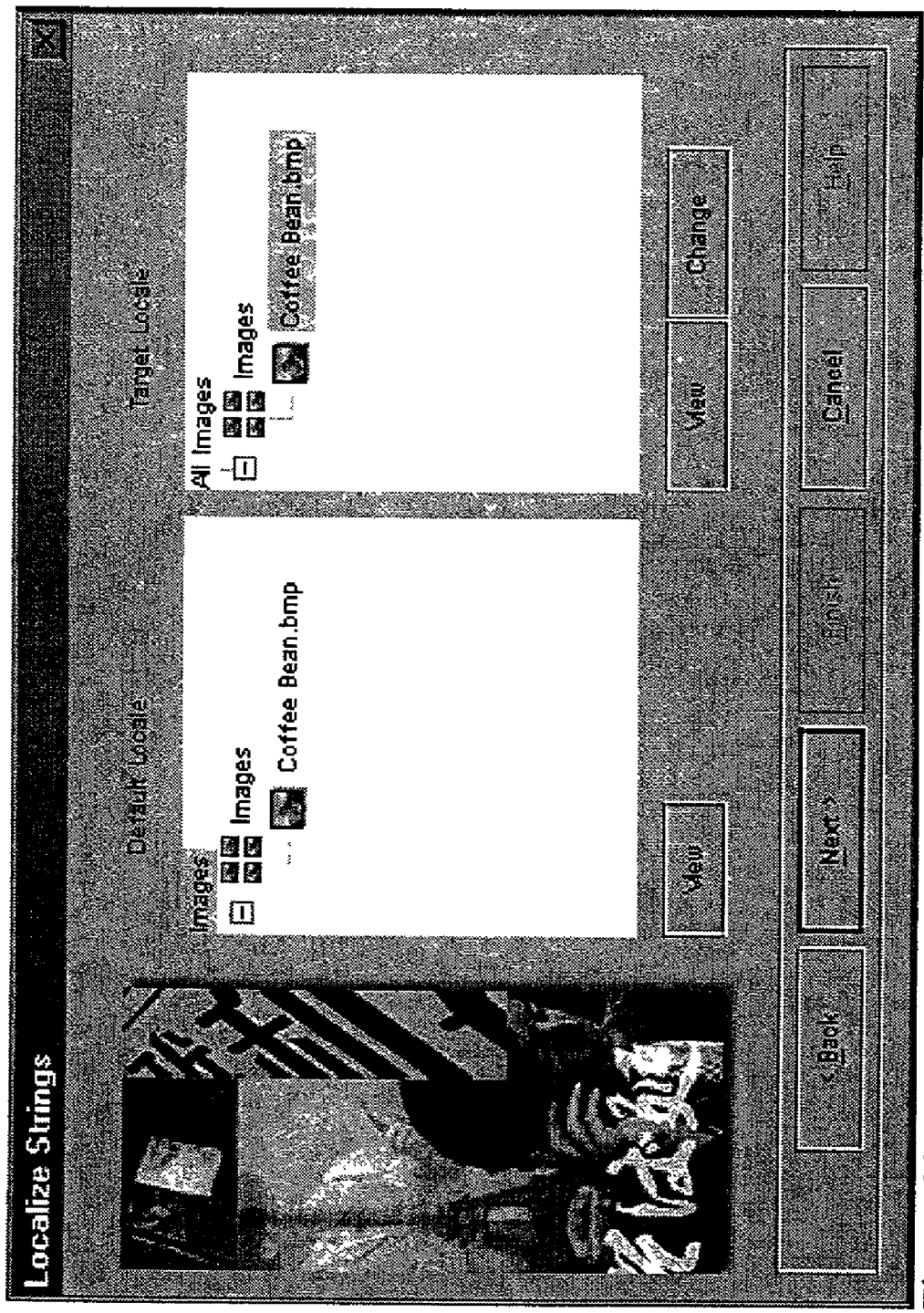
FIG. 66 is an embodiment of a graphical interface used to select localized images during internationalization process inside the IDE described in the current invention.
Figure 67:
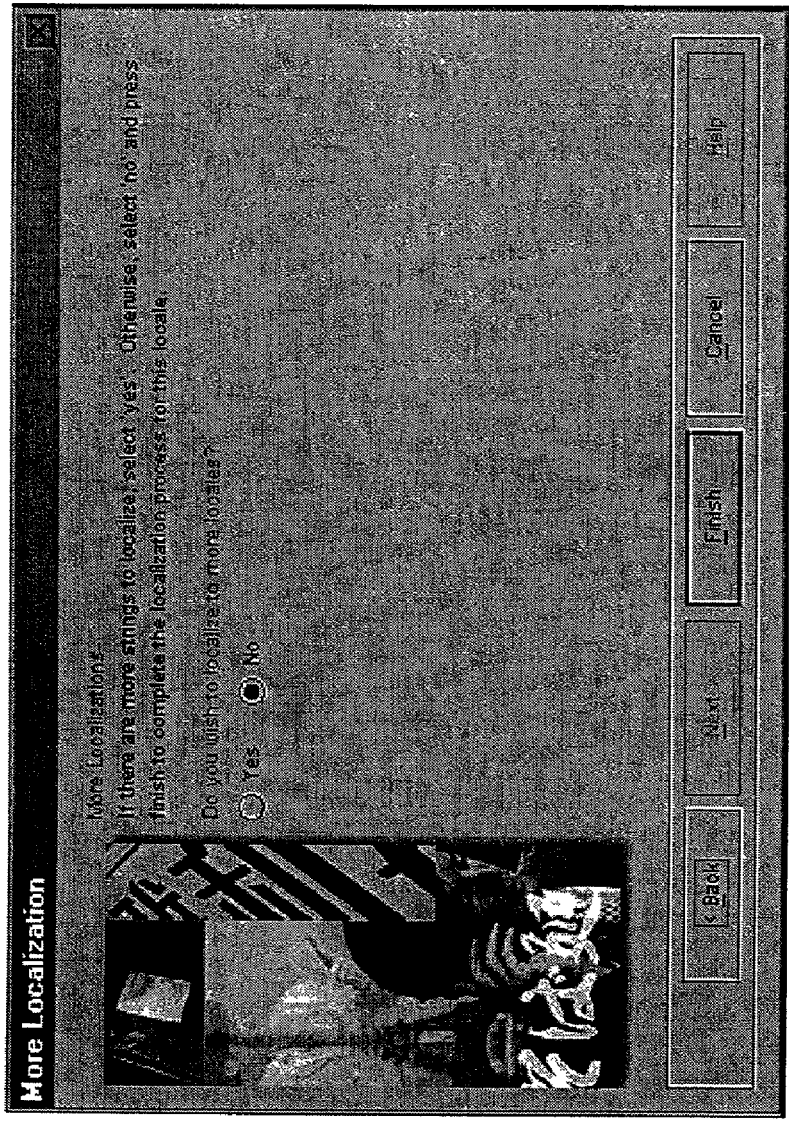
FIG. 67 is an embodiment of a graphical interface used in a wizard that allows users to localize to multiple locales during the internationalization process inside the IDE described in the current invention.

FIG. 66 shows a subsequent interface of the wizard, which displays a list of all the images used by the application. The interface includes a list for the default and the "target" locale. The default locale list includes the images in the default locale (e.g., US-English). The "target" locale allows developers to specify localized images for that locale (e.g., China-Chinese). As indicated in step 1516 of FIG. 60, developers are able to modify the target locale's images by selecting the image to change and pressing the "Change" button. (Note that the entries in the default and target locale lists correspond with each other line-by-line.) Once finished with the locale, the wizard may prompt the developer to either start over and perform translation on another locale or finish the internationalization session (see FIG. 67).

Note that as the developer edits media in the templates, the media might be added or deleted. The IDE 500 handles both cases by updating the tables consistently across all the different locales (e.g., the keys will be updated consistently across the locale tables).

B. Implementation

To ensure that the application can be used by different locales, in the preferred embodiment, all files are stored in the known UTF-8 format, since it is a convenient and space-efficient encoding scheme to persist localized data in files on a disk. In alternate embodiments, other encoding schemes can be used. Internally, all text is stored in a format that can represent the character set of different languages (for Java, this will be in the known UNICODE format).

Locales are described as a pair of letters indicating the language (e.g., pursuant to the known ISO-639 standard) and an optional pair of letters describing the country (e.g., pursuant to the known ISO-3166 standard). The format is <language>[<country>]. One non-limiting embodiment of the implementation may store the media in separate files with their filenames identifying their locale. Here are some examples:

1. text.properties—a file containing the text strings for the default locale
2. text_en.properties—a file containing the text strings for English
3. text_en_US.properties—a file containing the text strings for US-English
4. images.properties—a file containing the image filenames for the default locale
5. images_en.properties—a file containing the image filenames for English
6. images_en_US.properties—a file containing the image filenames for US-English At run-time, the selected locale may be matched against the correct locale file containing the media. Implementations of the run-time should attempt to load the most specific locale first before resorting to the default one. So, if a media file can be located by identifying the locale by language and country, then that should be used first (e.g., 3.). If not, then if a media file can be located by identifying the language, then that file will be used (e.g., 2.). If the locale cannot be determined, the default locale will be used (e.g., 1.).

The files themselves may contain some method of associating a key with the text. In one example, this could be as follows: <key>=<text string>. For keys associated with files (e.g., images.properties), an example of how the data could be stored might be as follows: <key>=<filename>. This could apply to localized image files, audio files, and grammar files.

C. Keeping Track of Text

The presentation design module 16 may be adapted to accept text in manner that simplifies localization. In the preferred embodiment, the presentation module 16 manages the entry of text in the following manner:

a) As a developer enters text in the presentation editor, the text is automatically broken into blocks of text that are placed into a lookup table for purposes of localization.
b) Individual text entries created in the lookup table have unique identifiers associated them. The unique identifiers can be generated by any method as long as the identifiers are unique and are alphanumeric.
c) If a non-text component is inserted between the text (e.g., an image), the text block will automatically be broken into two parts, the text appearing before the non-text element, and the text appearing after the element. (Note that if the text has already been localized to another locale, automatic splitting may not occur with the localized text block.)
d) Text styles (e.g. bold, italics) are performed on an entire block of text.

D. Keeping Track of Imported Media

Other media types that can be used include grammars, images, audio, and script files. These media types are represented as files that are used by the application. For example, grammars are specifications in grammar files that describe acceptable spoken text for a voice engine. Image files contain data about a visual picture to display. Audio files contain data to reproduce some sound.

This media is imported into the IDE 500 by using the project tree 402 in FIG. 18. There are several sub-nodes under the "Resources" node that shows the types of resources that can be imported. Developers will right-click on the appropriate node to reveal a menu that shows an import option.

For the "Strings" node, developers can "right-click" on the node to reveal a menu with an "Edit" option. Since text is not imported into the IDE 500 (e.g., the IDE 500 keeps track of text as described in section C, supra), developers will only be editing the text. Selecting the option will display a text strings editor (See FIG. 65—described in section A, supra). Strings are important in localization since the content must change for different locales.

For the "Images" node, developers can right-click on the node to reveal a menu with a "Create new image group" option. Images are organized into groups where a group represents a reference to a set of related images. Developers should use image groups to organize images by size and type. For example, a developer could create an image group called "Ball". Within this "Ball" group, developers should add images of a ball that is represented in different image formats (e.g., BMP, WBMP, GIF, JPG, PNG), different sizes (e.g., 32×32, 64×64, 128×128), different color depths (e.g., 1-bit black & white, 8-bit 256 color), or any other characteristics. So, when used, developers can reference the image group rather than the image itself. That way, as the application runs, a presentation engine has the option of selecting an image in the image group that would render the best based on the connecting device. Once an image group is added, a node appears. Developers can right-click on this image group node to reveal another menu with an "Import image file" option. If selected, the IDE will prompt the developer for an image file to import. This import will copy the specified source file into the project to be used. Images are potentially important in localization since different locales could have different cultural symbols. For example, in one locale, a "thumbs up" image could be used to indicate that something was "OK", where in a different locale, this would not make sense. So, in that other locale, a "green light" image could be used instead. So, developers would localize this by providing different image files for the different locales.

The "Audio" node has a similar function as the "Images" node. Developers create audio groups by right-clicking on the "Audio" node and selecting the "Create new audio group" option. Developers can then add different types of audio files (e.g., AU, WAV, SND, MP3) with the same content. This is obviously important during localization if the content contained a spoken language. Developers would localize this by providing different audio files for the different locales.

The "Grammars" node has a similar function as the "Images" node. Developers create grammar groups by right-clicking on the "Grammars" node and selecting the "Create new grammar group" option. Developers can then add different types of grammar files into the group. Grammars must be localized for different locales since grammars contain information about the spoken language that will be specific to each locale. Developers would localize this by providing different grammar files for the different locales.

The "Scripts" node allows developers to import other resource files. This is intended for the user to be able to import external script files that can be used by various views. For example, an HTML document could be created in a view that references an external script file. That external script file would be added to this node. Scripts could be important for localization if the scripts contained locale-specific content. For example, if a script had some text embedded into it that would be eventually displayed, that text may be localized by creating a different script and changing the text in that script. Then, developers would import the different script for the different locale.

IX. Deployment of the Application

Figure 9:
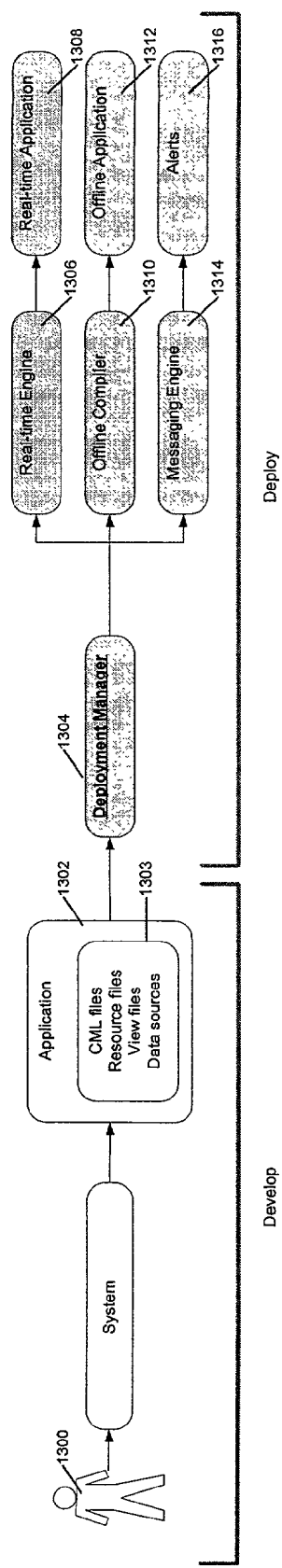
FIG. 9 is a flow diagram illustrating the development and deployment of applications using the present invention. The current invention can be part of a over-all system of developing, deploying and running multi-channel, multi-modal applications.
Figure 68:
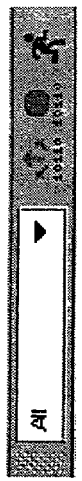
FIG. 68 is an embodiment of a set of toolbar buttons associated with the IDE described in the current invention for application deployment.
Figure 69:
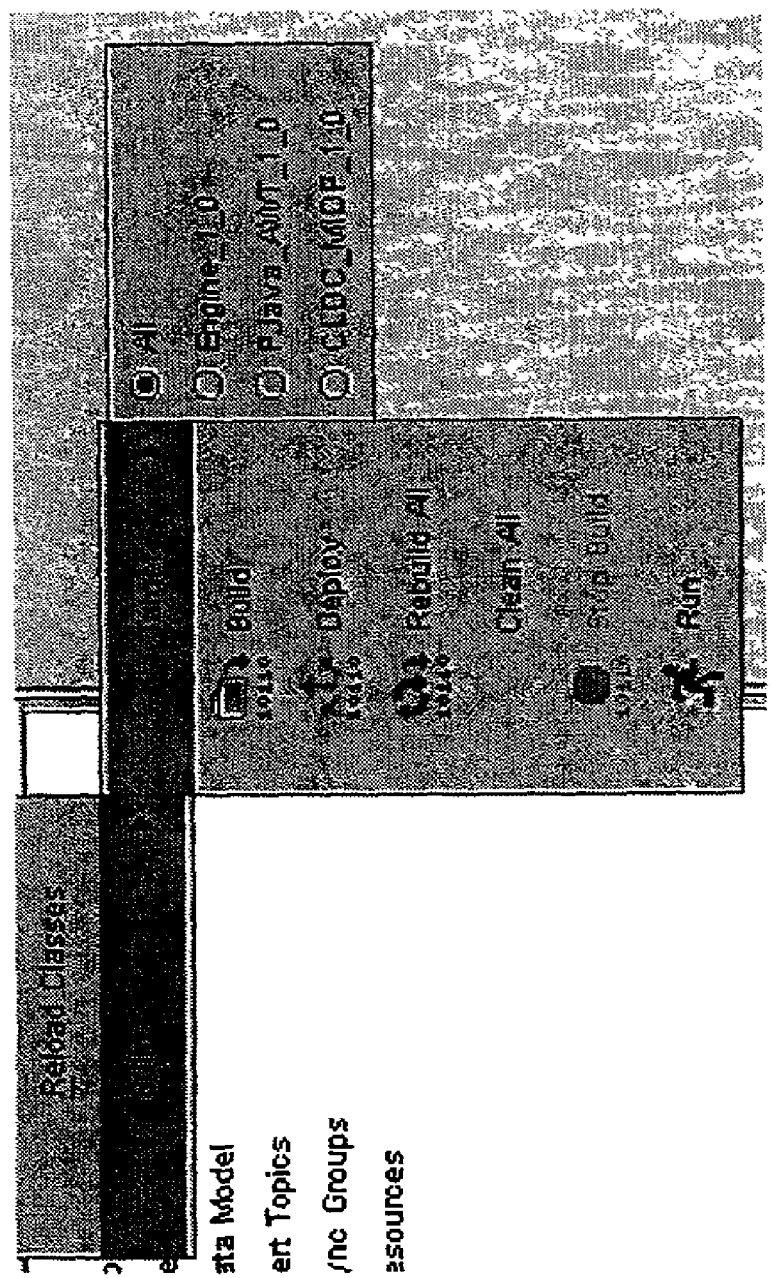
FIG. 69 is an embodiment of a set of menu commands associated with the IDE described in the current invention for application deployment.

FIG. 9 illustrates the process of deploying an application. In order to deploy an application (e.g., an application descriptor) created by system 100, all files associated with the application may be collected into a package to be sent over to a server containing the deployment manager 1304 in FIG. 9. The process of packaging the application can be handled in many ways. The method used within the preferred embodiment is to delegate file-level tasks to an external tool. The system 100 uses external build tools to process the files and place them into a package. Within the IDE 500, the user will be presented with a GUI to configure how the tools work. (See FIGS. 72 through 75, described below). The IDE 500 will take all this information and generate an external file (a build script) that can be understood by the build tool. When the user is ready to deploy the project, the user will execute a "deploy" command that manifests itself as a toolbar button or in the menu. (See e.g., FIGS. 68 and 69). This command call will then be delegated to the build tool, which then executes the created build script.

Figure 70:
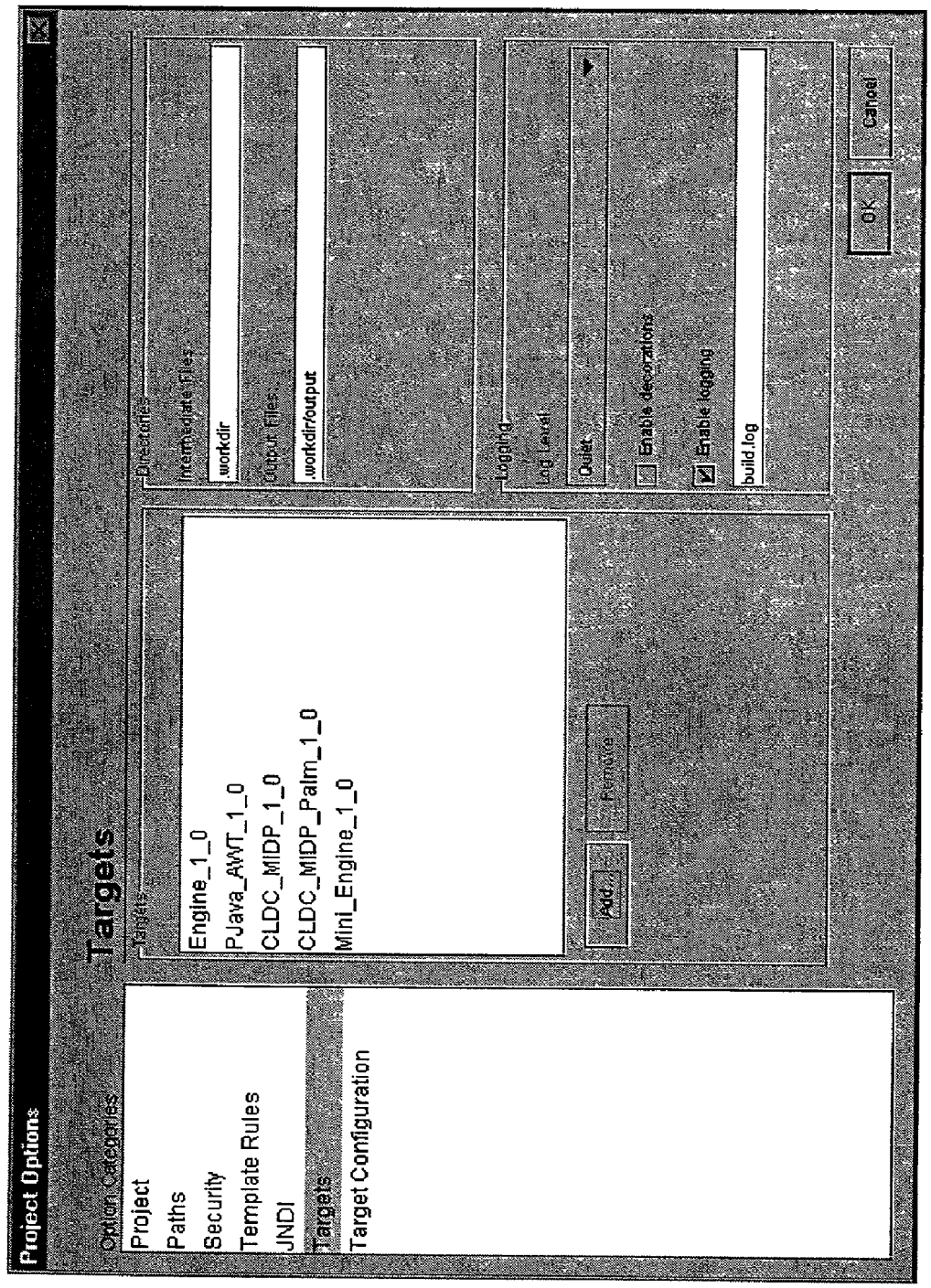
FIG. 70 illustrates an embodiment of a graphical interface associated with the IDE described in the current invention for adding, managing, and configuring deployment targets.

FIG. 70 shows a graphical interface for adding, managing and configuring deployment targets. In this case, the developer defines the targets for a build script. The deployment is handled by running a build script that packages the files. The build script can be implemented by any conventional build system, such as make, nmake, imake, ant, or any other suitable build system. The build scripts contain "targets" that define the process of steps to perform for a particular "target". By default, there should always be one "target" in the project that should deploy to the server. There are various other fields for configuring the build script, including specifying directories of intermediate files and specifying log levels. Other options can also exist, depending on the level of sophistication that is to be exposed to the user. The exact commands that are to be executed behind each target are described in the generated build script.

Figure 71:
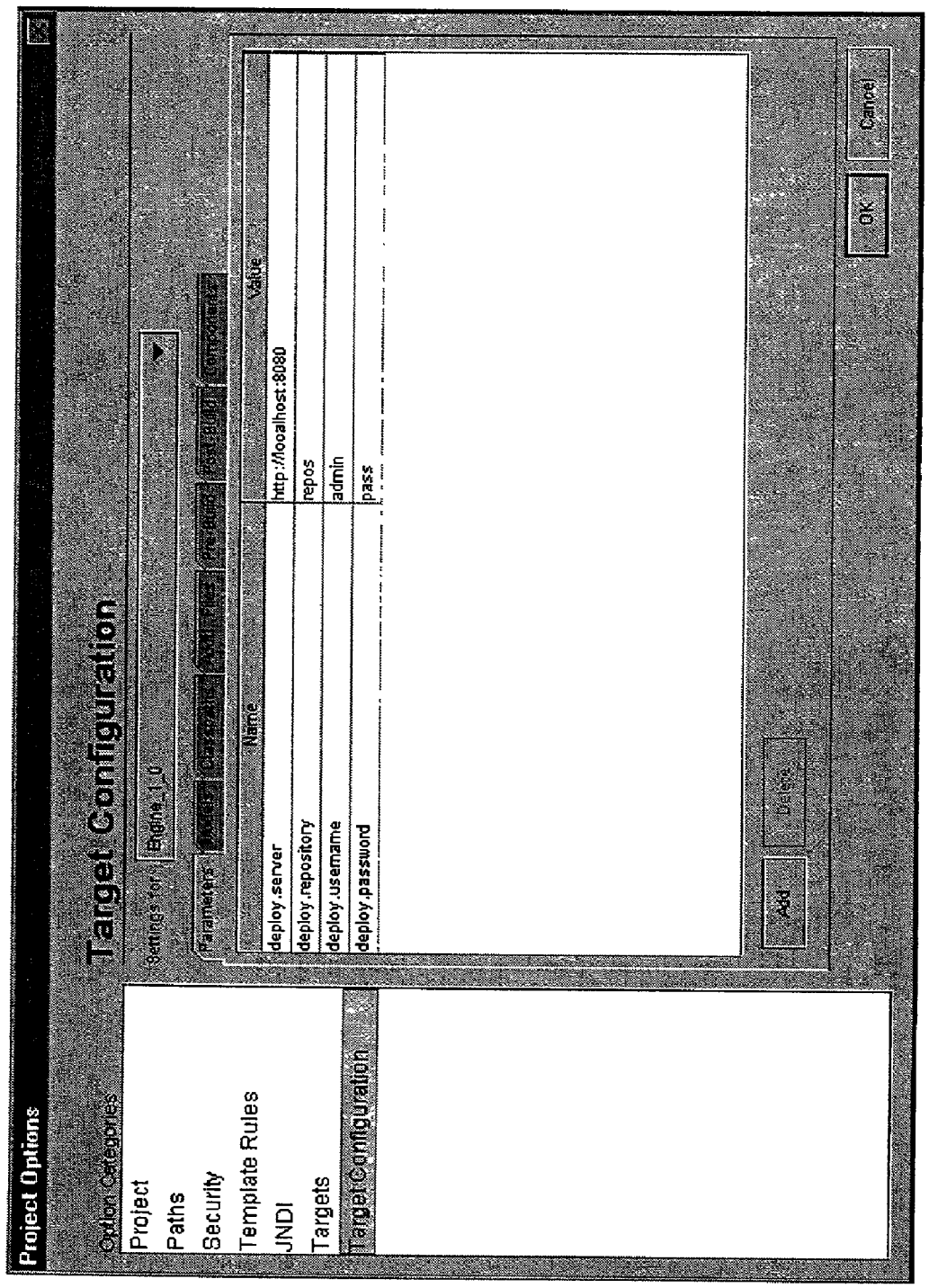
FIG. 71 illustrates an embodiment of a graphical interface associated with the IDE described in the current invention for configuring deployment targets.

FIG. 71 shows the options to configure a particular target. For deployment to the server, there are four parameters that need to be set:
 1. deploy.server—the URL on which the project will be deployed to;
 2. deploy.repository—the name of the repository on which the project will be deployed to;
 3. deploy.username—username for authentication of permission to deploy to the server; and
 4. deploy.password—associated password for authentication of permission to deploy to the server.

As shown above, the parameter names follow a naming convention of {system name}.{parameter} rather than just a {parameter}. This is to allow for a heterogeneous set of parameters (not just deployment settings) to be entered without having parameter names clash.

Figure 72:
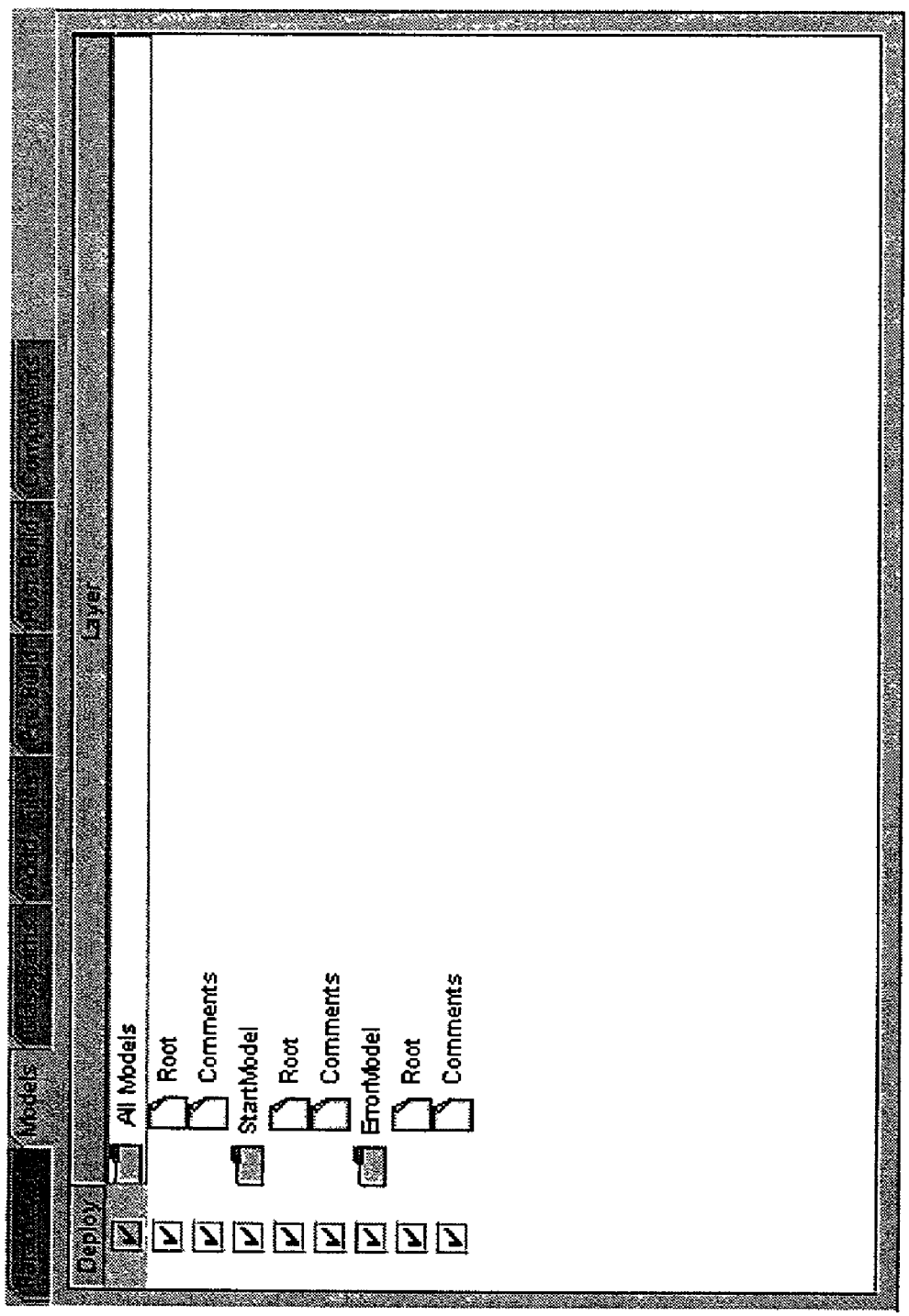
FIG. 72 illustrates an embodiment of a graphical interface associated with the IDE described in the current invention for configuring an application's controllers and their associated layers.

FIG. 72 shows a non-limiting embodiment of a graphical interface for configuring the application's controllers and their associated layers. By use of this interface, developers can enable or disable certain layers within the controller or enable/disable an entire controller from being deployed to the server. The layers panel 460, shown in FIG. 55, is a UI-only panel. That is, enabling/disabling the layers on panel 460 does not affect what gets deployed to the server. It is through the Configuration/Deployment interfaces (see e.g., FIGS. 70-75 respectively) that deployment is determined. This is primarily to separate the design aspects of the IDE 500 from the deployment aspects.

This particular implementation for the panel of FIG. 72 involves three types of checkboxes that have been placed into a tree. The nodes of the tree are expandable/collapsible to show/hide detail about the layers. Checking a checkbox on a layer under a named controller will enable the layer in that controller to be deployed. Similarly, "unchecking" the same checkbox will disable it from being deployed. If a checkbox is checked next to a controller name, then the controller will determine which layers to deploy based on the checks next to its layers. However, in the checkbox is unchecked next to a controller name, then the entire controller will not be deployed. Finally, there is a node called "All Models". The checkboxes under this node control the deployment of layers of all the controllers. So, if a checkbox is checked for a layer under "All Models", then all of the controllers that have that particular layer will be deployed. Similarly, if the user "unchecks" the checkbox, then all of the controllers that have that layer will not be deployed. Note that this change only happens on a toggle between check/uncheck states. That is, when the layer under "All Models" is unchecked, it means that there might still be layers in some controllers that have been marked for deployment. If it is checked, then definitely the layer in all controllers are checked. Only on the change from checked to unchecked will the layer in all the targets become unchecked.

Figure 73:
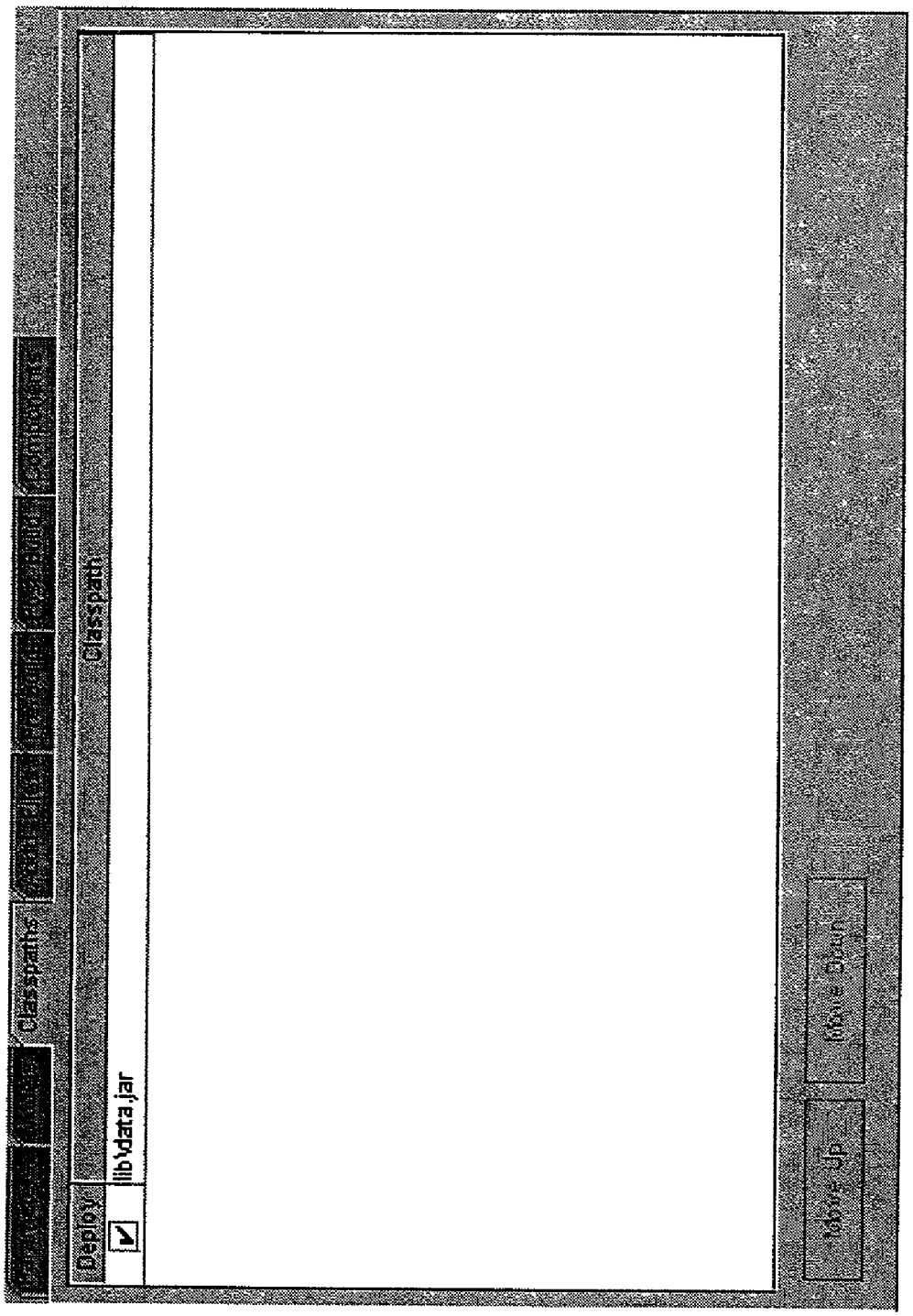
FIG. 73 illustrates an embodiment of an graphical interface associated with the IDE described in the current invention for configuring the classpaths to deploy with the application.

FIG. 73 shows a non-limiting embodiment of an interface for configuring the classpaths to deploy with the application. A classpath is a method to specify the locations of where to find object definitions (classes). A developer may specify the libraries (classpaths) that are used in the project. During deployment, these libraries might already exist on the server. In such cases, the user would "uncheck" the checkbox next to the library name to deploy. Otherwise, a check means that the library will be deployed along with the application to the server.

FIG. 74 shows a non-limiting example of a panel for configuring the files that are to be deployed to the server. The entries in this panel can be thought of as a copy command that copies the specified file to the specified directory. Note that this implementation allows regular expressions to be defined for the "File" column. That is, any file in the project directory that matches the expression will be deployed to the server under a directory named in the "Destination" column.

The system 100 may also include interfaces for allowing developers to add their own pre-build and post-build commands into the build process. This allows developers to more easily add simple commands without having to modify a potentially complex build script. The commands can execute shell commands in the system. In the pre-build dialog, users can add commands that are executed before the main build begins. The main build is essentially all the commands required to generate an application. For example, in the pre-build dialog, users can add a command to log the date and time that the build started. Similarly, the post-build dialog allows users to add commands to be executed after the main build has completed. For example, users can add commands to copy the built files to a different directory.

Figure 75:
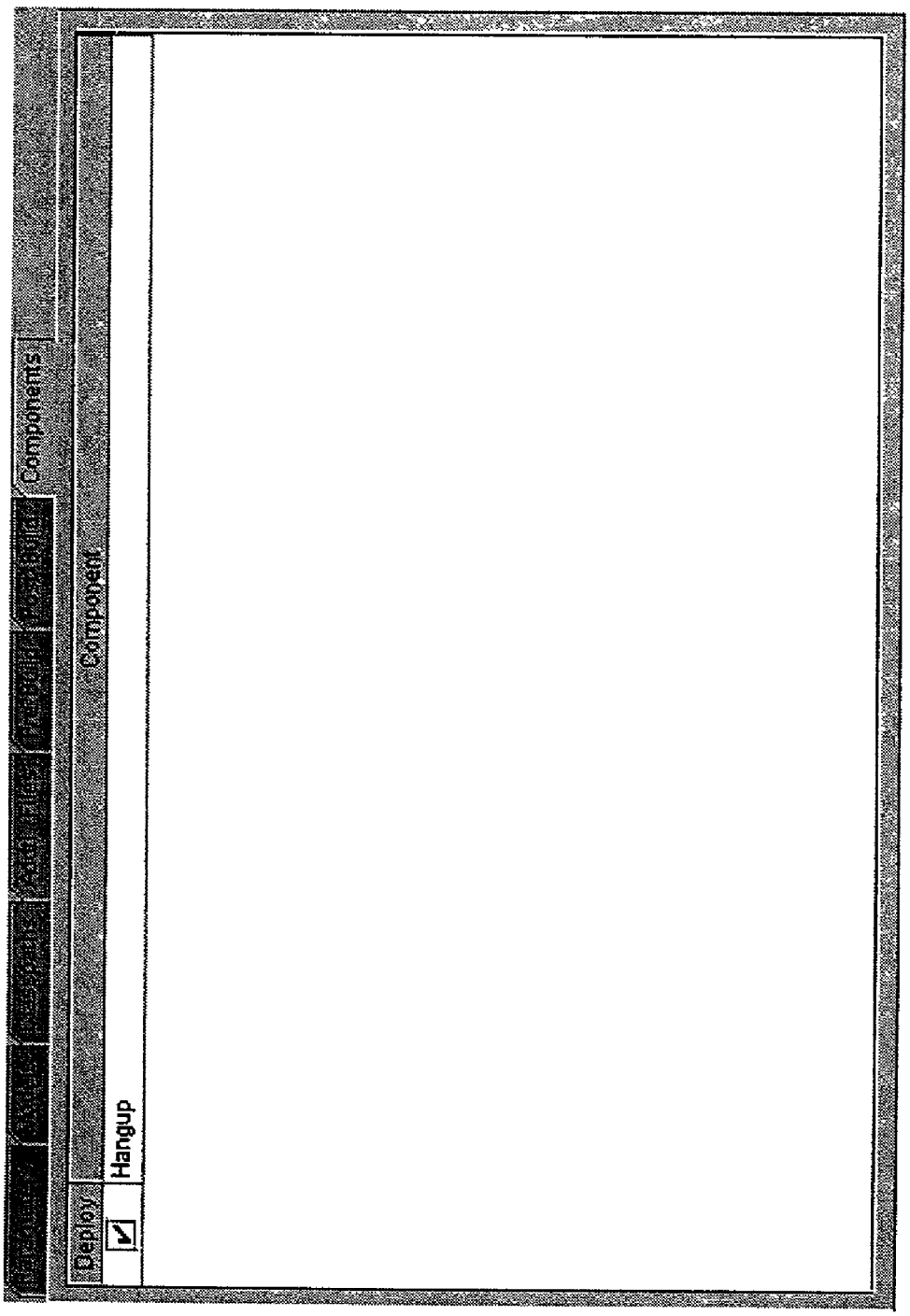
FIG. 75 illustrates an embodiment of a configuration panel or interface associated with the IDE described in the current invention that displays the components that are used in the project.

FIG. 75 shows one non-limiting embodiment of a configuration panel or interface that displays the components that are used in the project. The checkbox next to the component indicates whether the component should be bundled with the deployment or not. In cases when the component already exists on the server, users can opt not to deploy the component along with the project. Otherwise, the component will be bundled with the application to be sent to the server.

Figure 76:
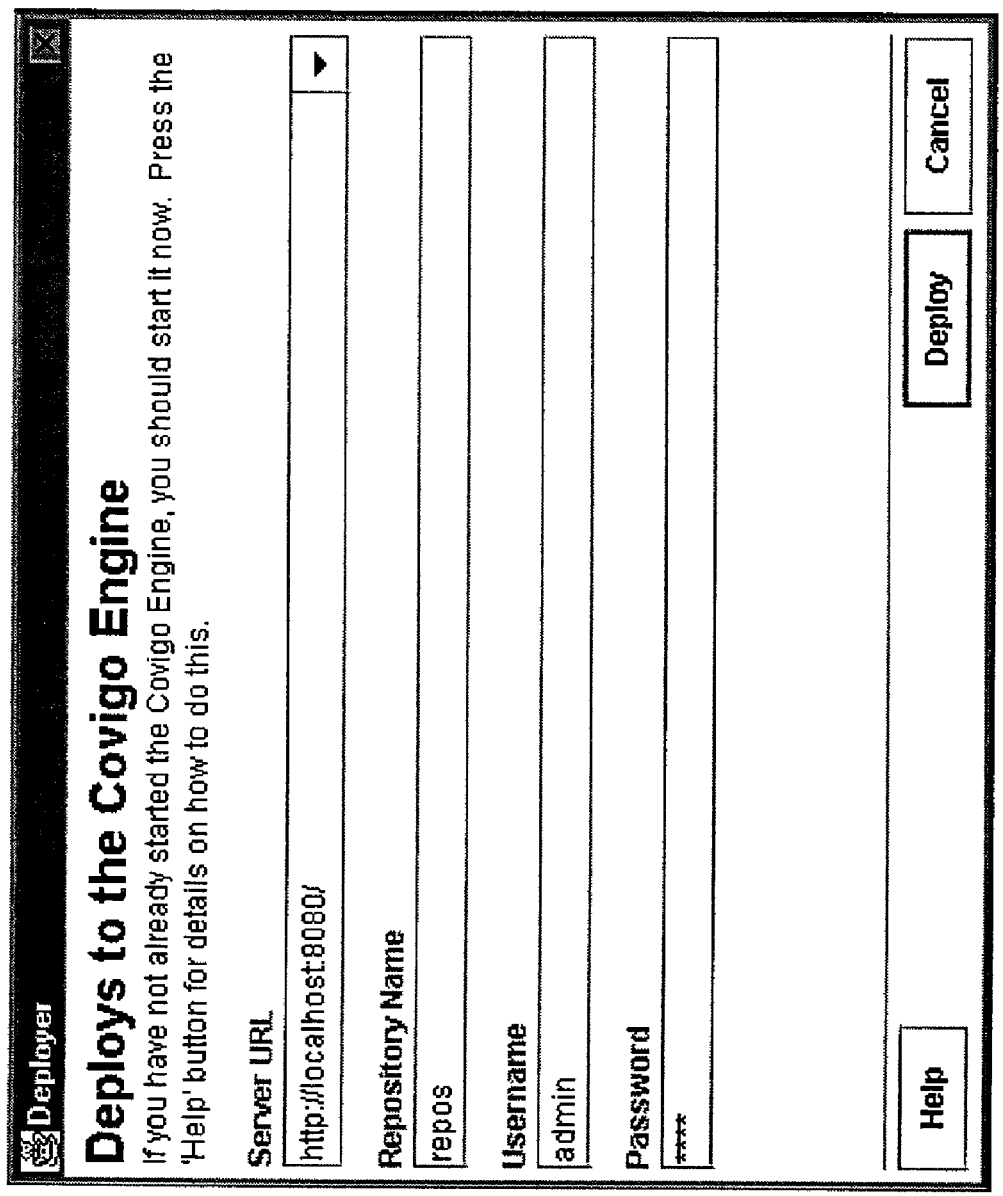
FIG. 76 illustrates an embodiment of a graphical interface associated with the IDE described in the current invention for initiating deployment of an application designed inside the IDE.

The dialog shown in FIG. 76 represents a non-limiting example of a user interface for initiating deployment. System 100 may include both an interactive and a non-interactive mode for deployment. During non-interactive mode, all of the settings as defined in the interfaces above (and as subsequently stored in the build script) will be used. However, during interactive mode, when appropriate, prompts will appear where it is appropriate for the user to enter information (e.g., to ask for deployment parameters).

Referring back to FIG. 9, the application 1302 is stored in a series of files 1303 (e.g., a set of CML files stores the interaction flow, the actions and the integration between all pieces of the application; a set of view files details the user interfaces; a set of resource files contains the resources needed in the application, such as strings, images, audio files, grammars, and any other applicable resources; and a set of data sources contains all the user-defined classes for the application). After a developer 1300 completes the application 1302 on system 100, the system 100 deploys the application by sending the files created during development to a deployment manager 1304. The deployment manager 1304 selects the appropriate rendering engine, depending on the desired modality. For example, for real-time mode, application 1302 would be sent to a real-time engine 1306 to output a real-time application 1308. Similarly, disconnected applications would be processed by an offline compiler 1310 to produce a disconnected/offline application 1312, and an asynchronous application would be sent through a messaging engine 1314 to send alerts 1316.

The applications developed based on the specified method and apparatus described above may be deployed not only to a run-time system executing in a computer server system, but also on a run-time system that is executing on a mobile computer such as a handheld PC, or cellular phone with a capable operating system, in the same way. This deployment on an offline embodiment of the run-time system enables the application to be accessed locally without the need for any remote access using a browser or other client applications. Such use of applications is referred to as the offline mode of operation, where the overall user interaction is limited to the mobile computer, without any external network access.

One skilled in the art may appreciate that "offline" applications may not need to support multiple channels of presentation since it is also possible for the application to be built specifically for the mobile computer. Additionally, for example, if the application thus deployed needs to communicate with a back end remote server system, some external method and system of synchronization may be desirable, so that the application is aware of changes on a centralized server system. Suitable external methods and systems are known to those of ordinary skill in the art. Furthermore, offline and realtime embodiments of a preferred runtime system are described more fully and completely in Chong et al.

Thus the present invention allows for developing applications that may be used in multiple modes such as offline on a mobile computer and online on a backend server system.

X. An Example of the Operation of System 100

In operation, system 100, as shown in FIGS. 6 and 7, may be used to rapidly develop and deploy applications that may operate in a multi-modal environment. The following example, a currency converter, demonstrates the process of creating a multi-channel and multi-modal application using system 100. It should be appreciated that the following non-limiting example in no way limits the scope of system 100 and that system 100 may be used to develop virtually any other type of application.

In the currency conversion example, the application converts a certain amount of currency to its equivalent in another currency. The user inputs the amount and currency to be converted along with the currency type to which the amount will be converted. The application outputs, to the user, the equivalent amount in the requested currency. The converter application supports users through multiple channels, including wireless web and voice through PSTN. The application also operates through multiple modes, including real-time and asynchronous, offline access.

The process of developing an application is outlined in FIG. 27. As previously discussed, because of the separation between Model, View, and Controller elements, the three corresponding steps 656, 658 and 654 can take place in any order or even simultaneously.

A. Controller: Building the Interaction Flow

Referring back to FIG. 27, in order to properly design the interaction flow model or diagram, a developer must first outline the basic functionality of the application, as indicated in step 652. This is an opportunity for the developer to clarify and visualize ideas and functional requirements. The next step is to visually transform the outline into a state or workflow diagram, by use of the process design module 12, shown in FIG. 7.

One non-limiting example of an outline for a currency converter application is as follows:

1. Prompt the user for conversion information as follows:
    a. Currency to convert from ('input currency')
    b. Amount of currency to convert ('input amount')
    c. Currency to convert to ('output currency')
2. Convert 'input amount' from 'input currency' to 'output currency' to get the 'output amount'
3. Output result and ask user if she would like to do another conversion or quit application.
4. If the user wants to do another conversion, then start over.
5. If the user wants to quit, then thank the user and exit.

It should be noted that steps 1a, b, and c could be combined into one state or divided into three different states. In a data application, there is no reason why each piece of data needs to be sent back to the server before proceeding to the next step. The "round trip" would be costly in terms of time. Thus, it would be most efficient to combine steps 1a, b, and c into one state in a data application. However, in a voice application, such a combination might not be desirable. There are an unlimited number of things that a user could say. Suppose the application asks from which currency the user would like to convert. If the user answers "dollars," an ambiguity arises. Particularly, it is uncertain to what type of dollar is the user referring (e.g., U.S. dollars, Euro-dollars, Hong Kong dollars, Canadian dollars, Australian dollars). Since the meaning of 'dollars' is unclear, this response is considered ambiguous and requires further processing.

A developer should always consider such ambiguities that may arise, especially when developing multi-modal applications, and revise the outline accordingly. In addition, because voice applications emulate phone conversations, it is standard convention to greet the user, while a greeting may be unnecessary for visual applications. A revised outline that addresses the foregoing ambiguities is shown below.

Figure 77:
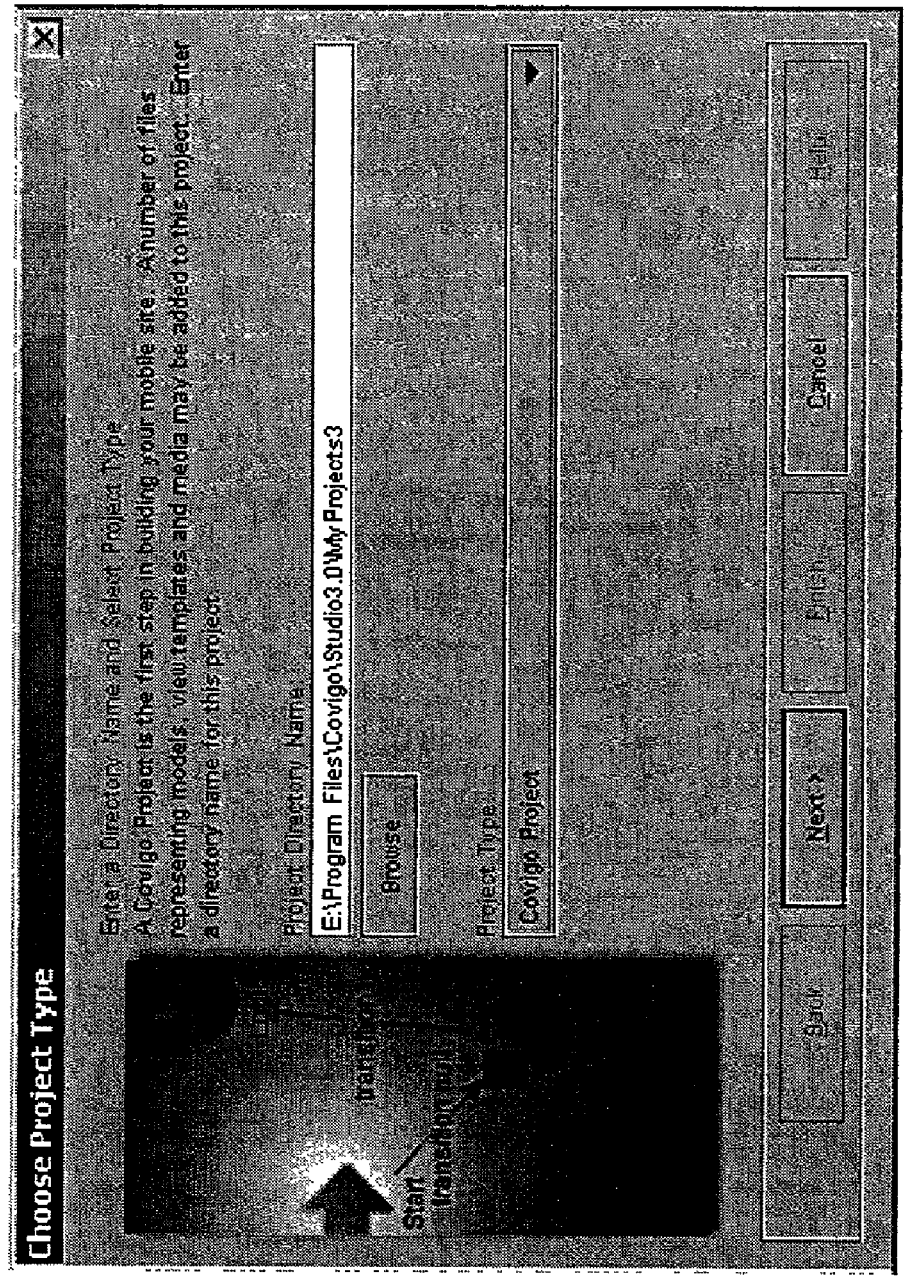
Figure 78:
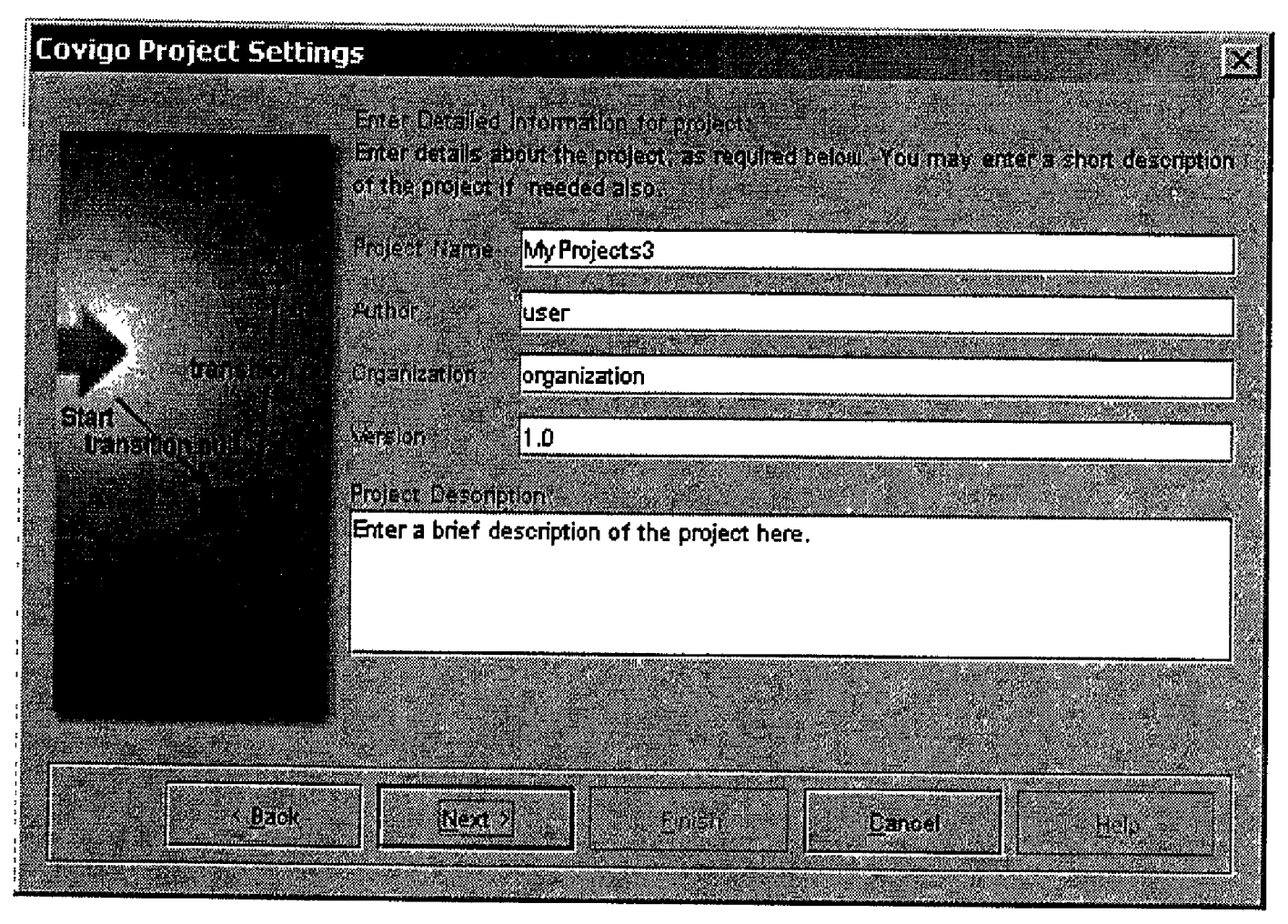
Figure 79:
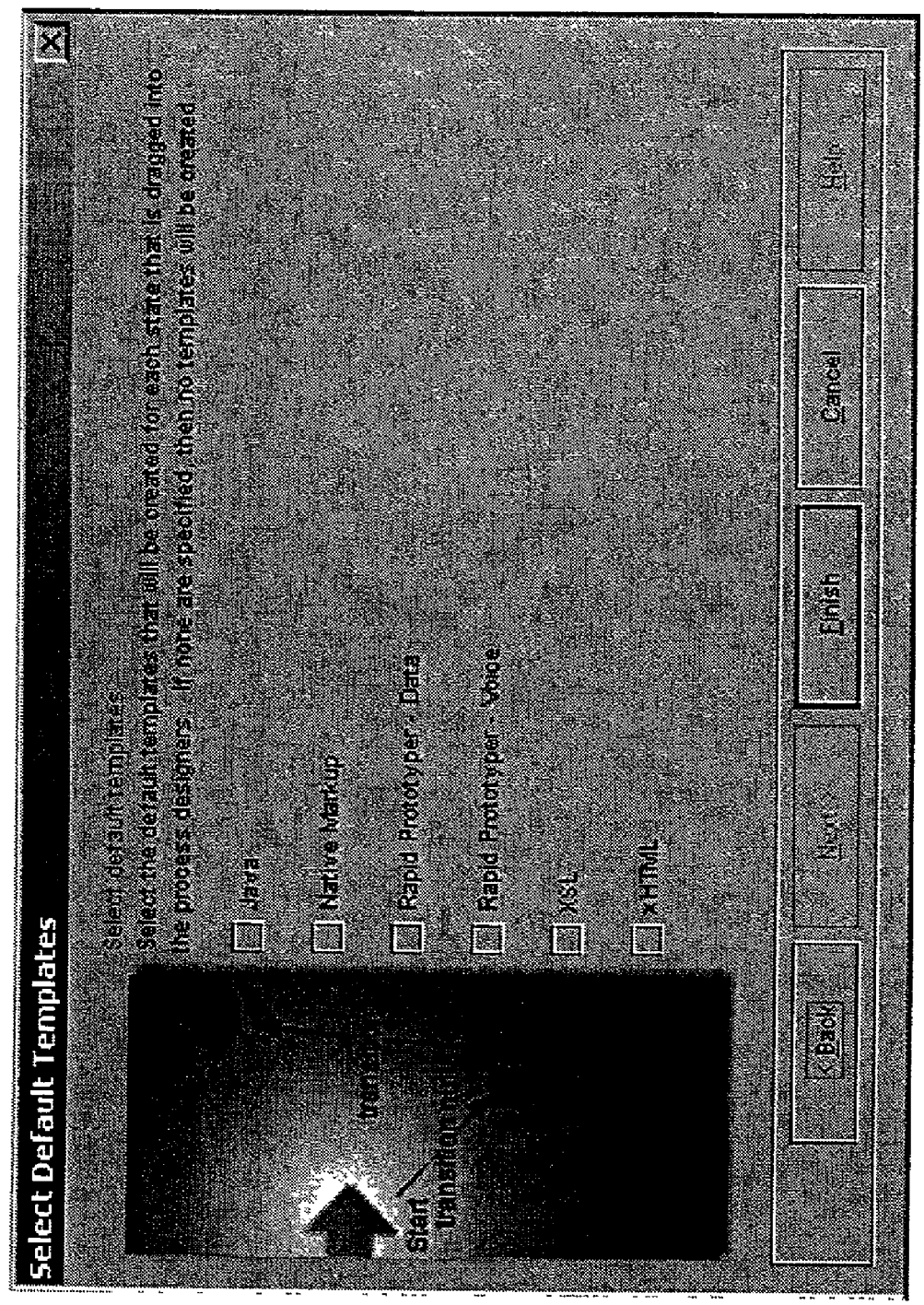
Figure 80:
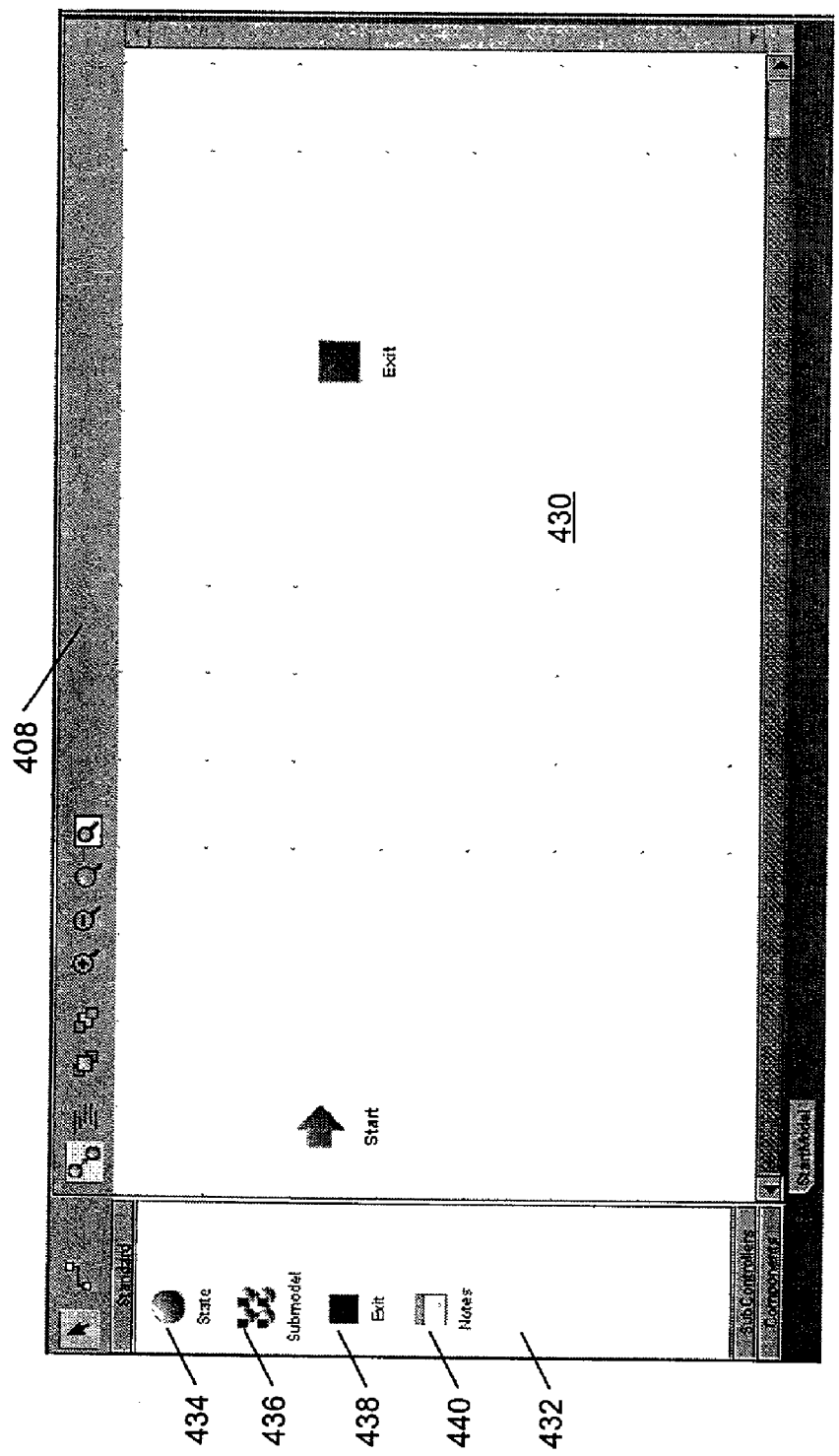
FIGS. 80-97 illustrate the interaction flow diagram created in the editor window associated with the IDE described in the current invention during various stages of the application building process for the currency converter example.

1. The voice application welcomes the user.
2. The user will be prompted for conversion information as follows:
   a. Currency to convert from ('input currency')
      a) Address/remove ambiguity if necessary
   b. Amount of currency to convert ('input amount')
   c. Currency to convert to ('output currency')
      a) Address/remove ambiguity if necessary
3. Convert 'input amount' from 'input currency' to 'output currency' to get the 'output amount'
4. Output result and ask user if she would like to do another conversion or quit application.
5. If the user wants to do another conversion, then start over.
   a. Address/remove ambiguity if necessary
6. If the user wants to quit, then thank user and exit.
   a. Address/remove ambiguity if necessary Once the developer has completed the outline, system 100 may be used to create a visual representation of the interaction process model. FIGS. 77 through 79 show some examples of preliminary screens that may be generated when a developer creates a new project. The developer assigns the project a name and description as shown in FIGS. 77 and 78. The developer then selects the default templates that will be created for each state of the application in the screen of FIG. 79. The new project provides (by default) an empty controller, called StartModel, to begin building the application. (The StartModel controller is illustrated in the editor 408, shown in FIG. 80.) Every controller has one start state and at least one end state as represented in FIG. 80. The internal notation for a start state is represented using Control Markup Language (CML) as below:

Model", which holds special significance. The "StartModel" is the first controller that the run-time system will use while running the application. In other words, the controller is the beginning of the application. Note, however, that this can be overridden within the system settings to use any other named controller to be the beginning of the application. Also shown in the above code, is the creation of an XML namespace called "cml". This is used to distinguish the attributes of the elements between other commonly named attribute names such as "name" and "id". Note that each of the objects in the CML file has a "cml:id" attribute associated with the element. This is a unique identifier for the element within the CML file, used when there are references to objects. This is analogous to the "pointer" in the "C" language. (This will be described in more detail in relation to the use of model variables.) The <DefaultController> element represents one state in the application. When a new controller is created, a "Start" state may automatically added to the application, as controllers will typically need a single entry-point. Like all states, the start state contains pre-actions, actions, and post-actions, which are all represented by the <PROPERTY> element. These actions will be described more fully below. Note that there is no "Exit" state in the CML file. The "Exit" state is a pseudo-state that only manifests itself in the user interface. In the CML file, transitions to any "Exit" state will essentially add an action to that state.

Figure 81:
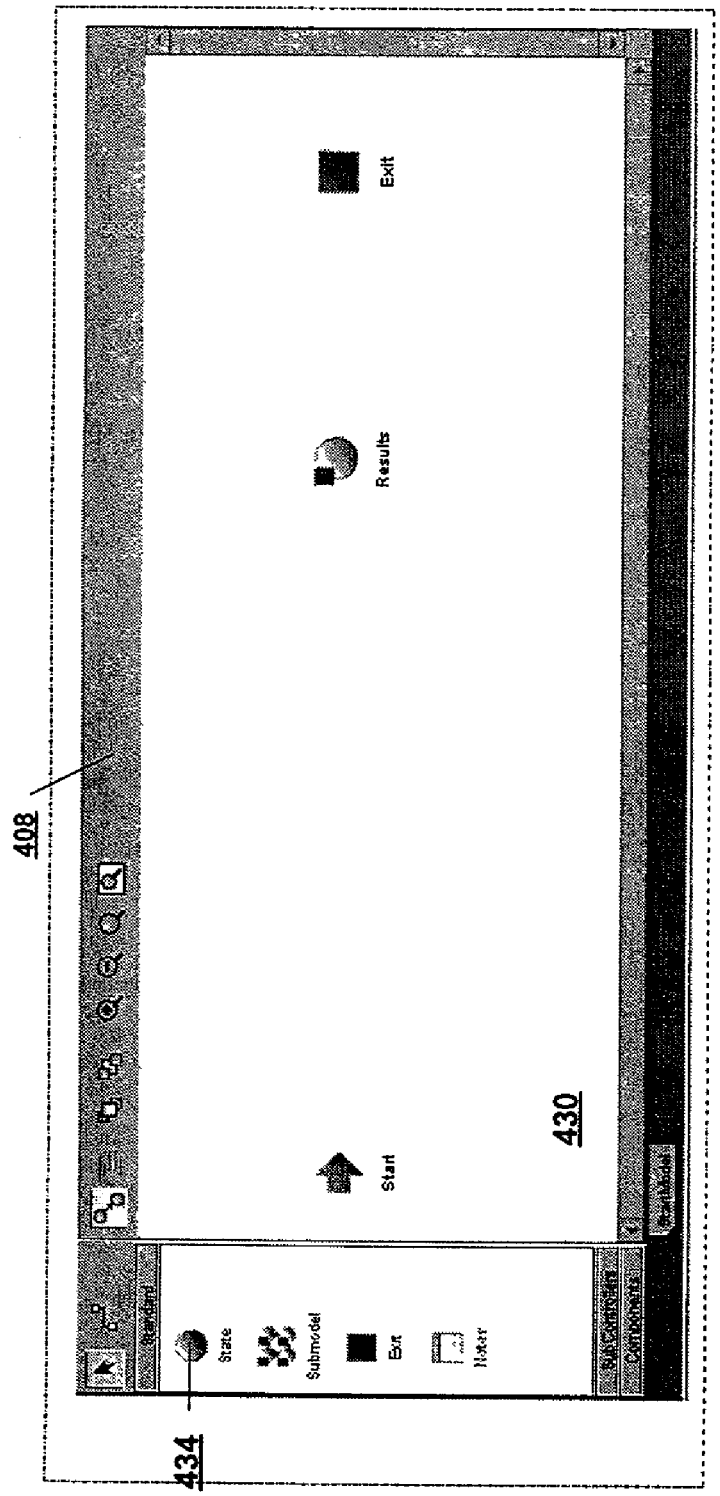

The first state common to both voice and data mediums in the converter example is the "Results" state. To add a state, the developer drags one state component 434 into the editor window 430 of editor 408. (See FIG. 81). This state is configured into a "Results" state within editor window 430, as shown in

```
<?xml version="1.0"?>
<?covigoml version="1.0">
    <Model xmlns:cml="http://www.covigo.com"name="StartModel" type="Default">
        <DefaultController cml:name="Start" cml:id="1">
            <PROPERTY cml:name="preAction" cml:class="ListAction"cml:id="64"/>
            <PROPERTY cml:name="action" cml:class="ListAction"cml:id="65"/>
            <PROPERTY cml:name="postAction"cml:class="ListAction"cml:id="66"/>
        </DefaultController>
    </Model><DefaultController cml:name="Start"cml:id="1"/>
<Model>
```

The <Model></Model> element denotes that a controller has been created. The code is at the root of the XML document. As indicated by the "name" attribute, this controller is the "Start- FIG. 81. Dragging a state 434 out into editor window 430 generates more XML code in the CML file as follows (changes are italicized):

```
<?xml version="1.0"?>
<?covigoml version="1.0"?>
    <Model xmlns:cml="http://www.covigo.com"name="StartModel"type="Default">
        <DefaultController cml:name="Start"cml:id="1">
            <PROPERTY cml:name="preAction"cml:class="ListAction"cml:id="64"/>
            <PROPERTY cml:name="action"cml:class="ListAction"cml:id="65"/>
            <PROPERTY cml:name="postAction"cml:class="ListAction"cml:id="66"/>
        </DefaultController>
        <DefaultController cml:name="Results"cml:id="4">
            <PROPERTY cml:name="preAction"cml:class="ListAction"cml:id="41"/>
            <PROPERTY cml:name="action"cml:class="ListAction"cml:id="42"/>
            <PROPERTY cml:name="postAction"cml:class="ListAction"cml:id="43"/>
        </DefaultController>
    </Model>
```

Figure 82:
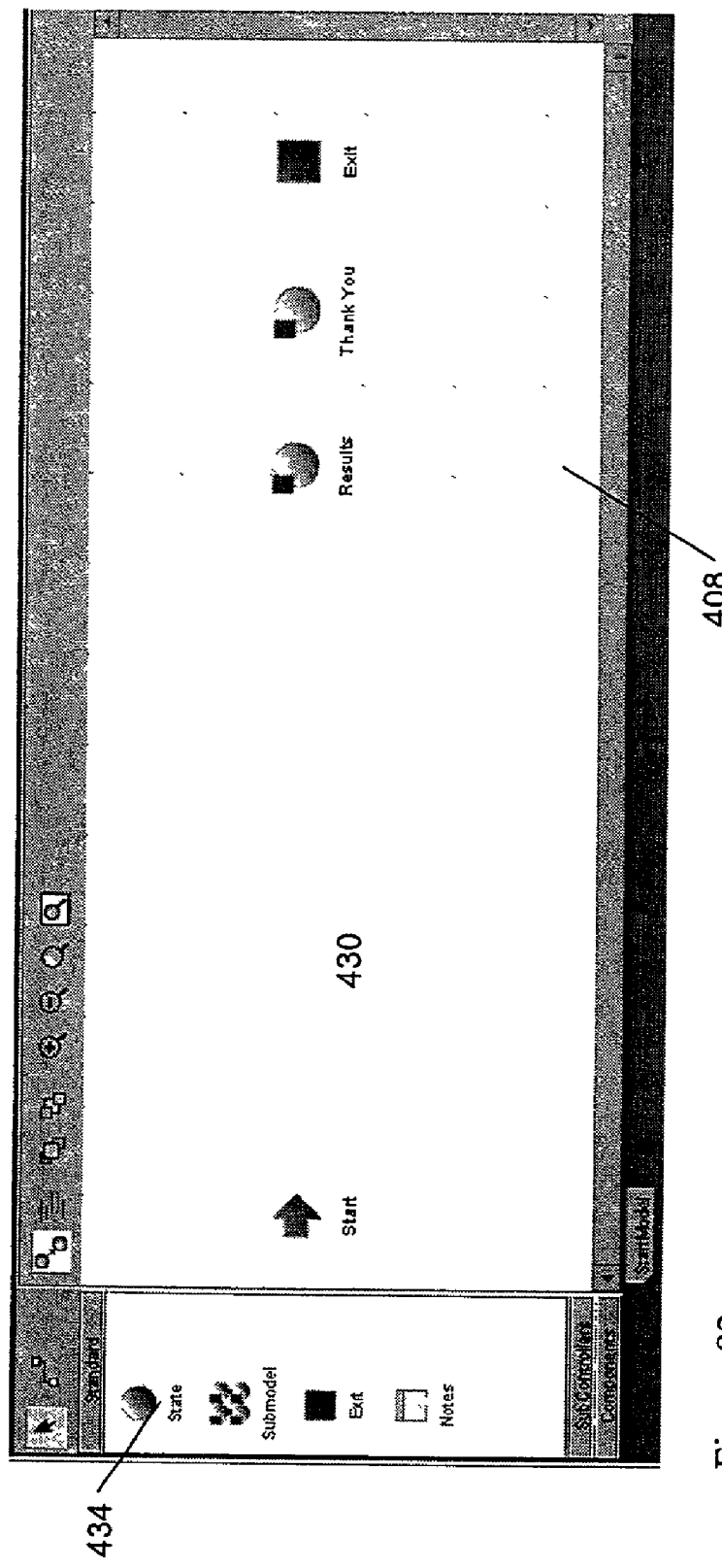

Like the "Start" state, the "Results" state is represented by the <DefaultController> element. As additional states are added, the entries in the CML file will generate similar outputs. The next common state in any medium for the application is the "Thank You" state, which thanks the user before exiting the application. Dragging another state component 434 into editor window 430, as shown in FIG. 82, generates the following output in the above CML file:

```
<DefaultController cml:name="ThankYou"cml:id="5">
    <PROPERTY cml:name="preAction"cml:class="ListAction"cml:id="37"/>
    <PROPERTY cml:name="action"cml:class="ListAction"cml:id="38"/>
    <PROPERTY cml:name="postAction"cml:class="ListAction"cml:id="39"/>
</DefaultController>
```

B. Creating Transitions

Figure 83:
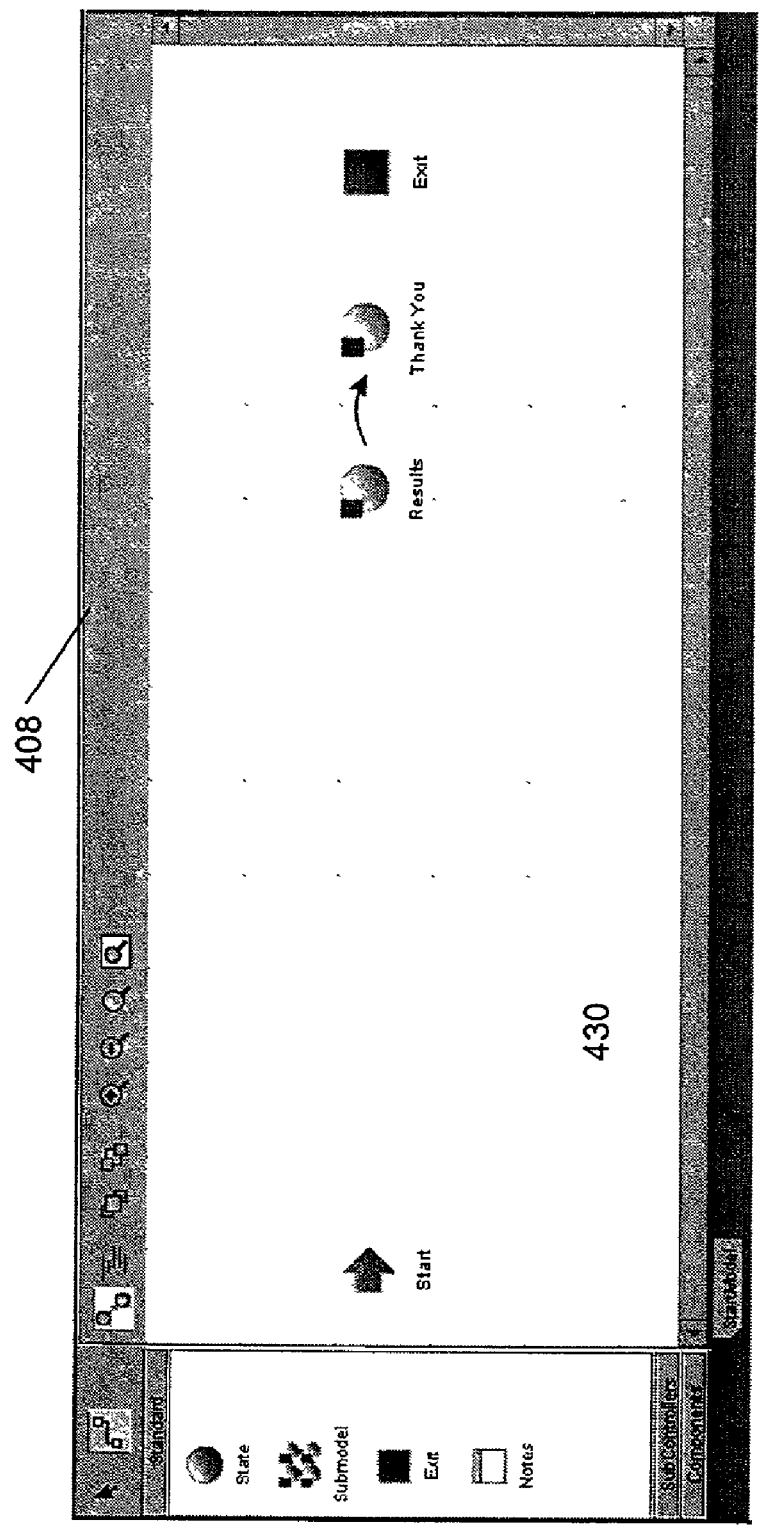

The next step is to connect the states with a transition. The user changes the current tool from the selection tool to the transition tool 446 (FIG. 83). To draw the transition, the user clicks on the starting (Results) state, holds down the mouse button, and releases it over the target (Thank You) state, as shown in FIG. 83.

This CML generated thus far appears as follows (with changes in italics):

```
<?covigoml version="1.0"?>
    <Model xmlns:cml="http://www.covigo.com"name="StartModel"type="Default">
        <DefaultController cml:name="Start"cml:id="1">
            <PROPERTY cml:name="preAction"cml:class="ListAction"cml:id="64"/>
            <PROPERTY cml:name="action"cml:class="ListAction"cml:id="65"/>
            <PROPERTY cml:name="postAction"cml:class="ListAction"cml:id="66"/>
        </DefaultController>
<DefaultController cml:name="Results"cml:id="4">
        <PROPERTY cml:name="preAction"cml:class="ListAction"cml:id="41"/>
        <PROPERTY cml:name="action"cml:class="ListAction"cml:id="42">
            <TransitionAction cml:id="14"target ="Thank You"/>
        </PROPERTY>
        <PROPERTY cml:name="postAction"cml:class="ListAction"cml:id="43"/>
    </DefaultController>
<DefaultController cml:name="ThankYou"cml:id="5">
        <PROPERTY cml:name="preAction"cml:class="ListAction"cml:id="37"/>
        <PROPERTY cml:name="action"cml:class="ListAction"cml:id="38"/>
        <PROPERTY cml:name="postAction"cml:class="ListAction"cml:id="39"/>
    </DefaultController>
</Model>
```

When the transition was added, it added a property called "action" to the <DefaultController> element. The implementation of the "action" containers are "ListAction" types. Each action section has its own property containers. Transitions are only added to the "action" section of the state. There are two other sections in a state, the "preAction" and the "postAction". The execution order of these actions is demonstrated in FIG. 28. When a transition transfers control to this state from a different state, the "preAction" is performed. After that, the view is shown to the user. The user interacts with the view and then comes back to the workflow. At this point, the "action" section is executed. If a transition is taken to a different state, then the "postAction" section is executed after the transition finishes (but before the "preAction" of the next state is executed).

The developer continues to drag and drop states into the controller editor as necessary, and connects them with transitions. Note the remaining states in the application are visual (web, wireless-data and other data centric channels)- or voice-channel specific. For modularization purposes, channel-specific states are isolated on different layers in the application.

C. Creating Layers

The layering function of the process design module 12 will be utilized for the currency converter application. This entails building a workflow diagram that is common for all channels, and that is referred to as the "root" layer. This "root" layer exists for all controllers. The "root" layer cannot be disabled. The "Start" state is placed in the "root" layer. The other voice and data layers will be built on top of the root layer. To finish the root layer, the developer adds all states that are shared by both the voice and visual layer of the application, as described above. These common states are shown in FIG. 82 and include: a start state, an end state, a state that returns the conversion results, and a state that thanks the user.

The developer creates a new layer, the Visual layer, by selecting button 462 in layer palette 460, shown in FIG. 55. When the developer selects the visual layer, editor 408 will display only the states that are unique to that layer. The states and transitions in the other layers become semi-transparent to aid in the graphical layout of the diagram. Once in the visual layer, the developer may add a state to gather the three needed pieces of information from the user. The layer must be selected in order for a state to be added to that layer.

Figure 84:
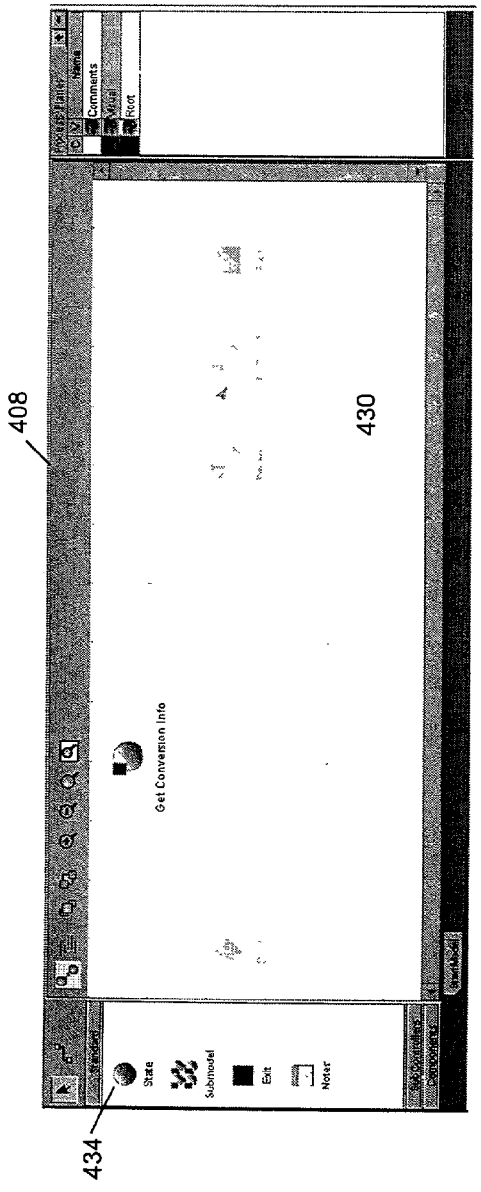

The "Get Conversion Info" state is created, like the root states, by dragging a state component 434 into editor window 430. The resulting controller, shown in FIG. 84, generates the following code:

```
<DefaultController cml:name="Get Conversion Info"cml:id="3">
    <PROPERTY cml:name="preAction"cml:class="ListAction"cml:id="49"/>
    <PROPERTY cml:name="action"cml:class="ListAction"cml:id="50"/>
    <PROPERTY cml:name="postAction"cml:class="ListAction"cml:id="51"/>
</DefaultController>
```

Figure 85:
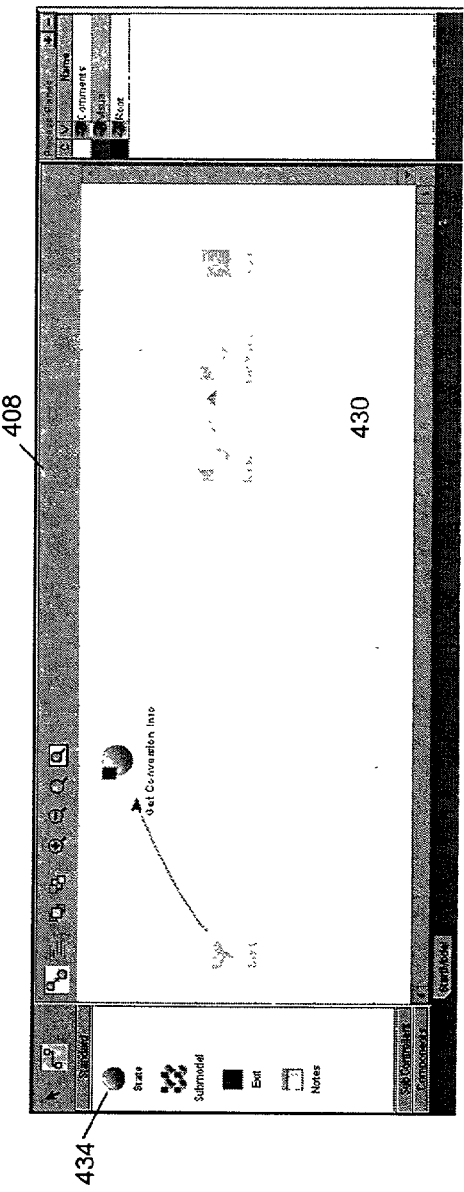
Figure 86:
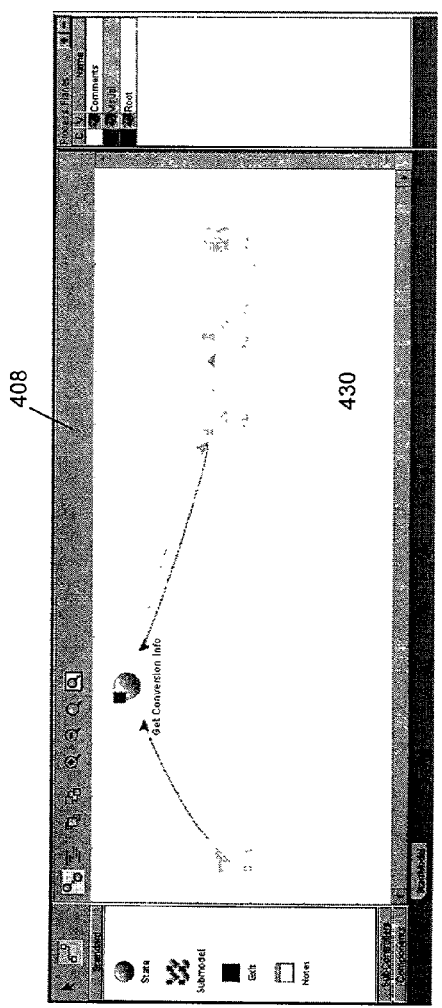

The format is identical to that of a state in the root layer. Since "Get Conversion Info" is the first state with which the end user interacts, the developer draws a transition from the 'Start' state to it. Transitions may be drawn between states on different layers, as shown in FIG. 85. The transition appears in the Start state code as follows (with new code in italics):

```
<DefaultController cml:name="Start" cml:id="1">
    <PROPERTY cml:name="preAction" cml:class="ListAction" cml:id="64"/>
    <PROPERTY cml:name="action" cml:class="ListAction" cml:id="65">
        <TransitionAction cml:id="12" layer="Visual" target="Get Conversion Info"/>
    </PROPERTY>
    <PROPERTY cml:name="postAction" cml:class="ListAction" cml:id="66"/>
</DefaultController>
``` functionality, the developer draws another transition from the "Get Conversion Info" state to the "Results" state created in the root layer. After viewing the conversion result in the "Results" state, the user may choose to repeat the exercise. Thus, the developer draws a transition from the "Results" state back to "Get Conversion Info". The result is shown in FIG. 86, and corresponds to the following CML (with new code in italics):

```
<?covigoml version="1.0"?>
    <Model xmlns:cml="http://www.covigo.com" name="StartModel" type="Default">
        <DefaultController cml:name="Start" cml:id="1">
            <PROPERTY cml:name="preAction" cml:class="ListAction" cml:id="64"/>
            <PROPERTY cml:name="action" cml:class="ListAction" cml:id="65">
                <TransitionAction cml:id="12" layer="Visual" target="Get Conversion Info"/>
            </PROPERTY>
            <PROPERTY cml:name="postAction" cml:class="ListAction" cml:id="66"/>
        </DefaultController>
        <DefaultController cml:name="Results" cml:id="4">
            <PROPERTY cml:name="preAction" cml:class="ListAction" cml:id="41"/>
            <PROPERTY cml:name="action" cml:class="ListAction" cml:id="42">
                <TransitionAction cml:id="88" layer="Visual" target="Get Conversion Info"/>
                <TransitionAction cml:id="14" target="Thank You"/>
            </PROPERTY>
            <PROPERTY cml:name="postAction" cml:class="ListAction" cml:id="43"/>
        </DefaultController>
        <DefaultController cml:name="Thank You" cml:id="5">
            <PROPERTY cml:name="preAction" cml:class="ListAction" cml:id="37"/>
            <PROPERTY cml:name="action" cml:class="ListAction" cml:id="38"/>
            <PROPERTY cml:name="postAction" cml:class="ListAction" cml:id="39"/>
        </DefaultController>
        <DefaultController cml:name="Get Conversion Info" cml:id="3">
            <PROPERTY cml:name="preAction" cml:class="ListAction" cml:id="49"/>
            <PROPERTY cml:name="action" cml:class="ListAction" cml:id="50">
                <TransitionAction cml:id="13" target="Results"/>
            </PROPERTY>
            <PROPERTY cml:name="postAction" cml:class="ListAction" cml:id="51"/>
        </DefaultController>
    </Model>
```

The "layer" attribute in a <TransitionAction> element is set to the layer of the target's state. In the current example, the "Start" state is in the "root" layer, and the "Get Conversion Info" state is in the "Visual" layer. Since the target layer for transition in FIG. 85 is the "Visual" layer, the "layer" attribute is the Start state's transition is set to "Visual."

After receiving the end user's input, the application will display the results of the conversion. In order to achieve this In the "Get Conversion Info" state's transition to the "Results" state, the "layer" attribute was omitted because the target layer is the root layer ("root" is the default value that is assigned when the "layer" attribute is omitted).

Figure 87:
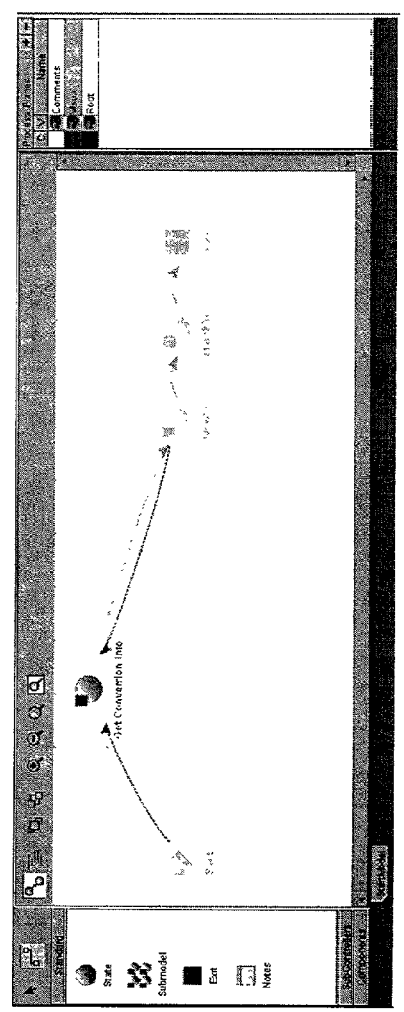

To complete the flow of the visual application, the developer draws a transition from the "Thank You" state to the "Exit" state, as shown in FIG. 87. This generates the following (with new code in italics):

```
<DefaultController cml:name="Thank You" cml:id="5">
    <PROPERTY cml:name="preAction" cml:class="ListAction" cml:id
    ="37"/>
    <PROPERTY cml:name="action" cml:class="ListAction" cml:
``` application begins by welcoming the end user. It then asks for the first piece of required information, the currency type from which the user would like to convert. The developer creates these two states and connects them using transitions, using the methods described above, as shown in FIG. 88. As a result, the following code is added to the CML file (with new code in italics):

```
<?covigoml version="1.0"?>
    <Model xmlns:cml="http://www.covigo.com" name="StartModel" type="Default">
        <DefaultController cml:name="Start" cml:id="1">
            <PROPERTY cml:name="preAction" cml:class="ListAction" cml:id="64"/>
            <PROPERTY cml:name="action" cml:class="ListAction" cml:id="65">
                <TransitionAction cml:id="12" layer="Visual" target="Get Conversion Info"/>
                <TransitionAction cml:id="120" layer="Voice" target="Welcome"/>
            </PROPERTY>
            <PROPERTY cml:name="postAction" cml:class="ListAction" cml:id="66"/>
        </DefaultController>
        <DefaultController cml:name="Results" cml:id="4">
            <PROPERTY cml:name="preAction" cml:class="ListAction" cml:id="41"/>
            <PROPERTY cml:name="action" cml:class="ListAction" cml:id="42">
                <TransitionAction cml:id="88" layer="Visual" target="Get Conversion Info"/>
                    <TransitionAction cml:id="14" target="Thank You"/>
<PROPERTY>
            <PROPERTY cml:name="postAction" cml:class="ListAction" cml:id="43"/>
        </DefaultController>
        <DefaultController cml:name="Thank You" cml:id="5">
            <PROPERTY cml:name="preAction" cml:class="ListAction" cml:id="37"/>
            <PROPERTY cml:name="action" cml:class="ListAction" cml:id="38"/>
            <PROPERTY cml:name="postAction" cml:class="ListAction" cml:id="39"/>
        </DefaultController>
        <DefaultController cml:name="Get Conversion Info" cml:id="3">
            <PROPERTY cml:name="preAction" cml:class="ListAction" cml:id="49"/>
            <PROPERTY cml:name="action" cml:class="ListAction" cml:id="50">
                <TransitionAction cml:id="13" target="Results"/>
            </PROPERTY>
            <PROPERTY cml:name="postAction" cml:class="ListAction" cml:id="51"/>
        </DefaultController>
        <Default Controller cml:name="Welcome" cml:id="119">
            <PROPERTY cml:name="preAction" cml:class="ListAction" cml:id="125"/>
            <PROPERTY cml:name="action" cml:class="ListAction" cml:id="126">
                <TransitionAction cml:id="121" layer="Voice" target="GetFromCurrencyType"/>
            </PROPERTY>
            <PROPERTY cml:name="postAction" cml:class="ListAction" cml:id="127"/>
        </Default Controller>
        <Default Controller cml:name="GetFromCurrencyType" cml:id="6">
            <PROPERTY cml:name="preAction" cml:class="ListAction" cml:id="33"/>
            <PROPERTY cml:name="action" cml:class="ListAction" cml:id="34"/>
            <PROPERTY cml:name="postAction" cml:class="ListAction" cml:id="35"/>
        </DefaultController>
    </Model>
```

-continued

```
id="38">
    <TransitionAction cml:id="15" target="ExitFromModel"/>
</PROPERTY>
<PROPERTY cml:name="postAction" cml:class="ListAction" cml:
jid="39"/>
</DefaultController>
```

Figure 88:
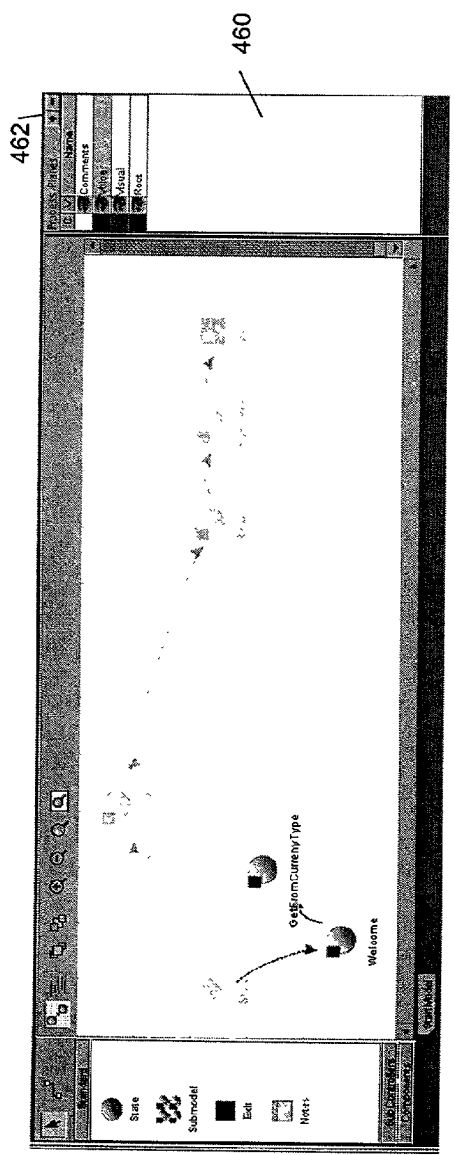
Figure 89:
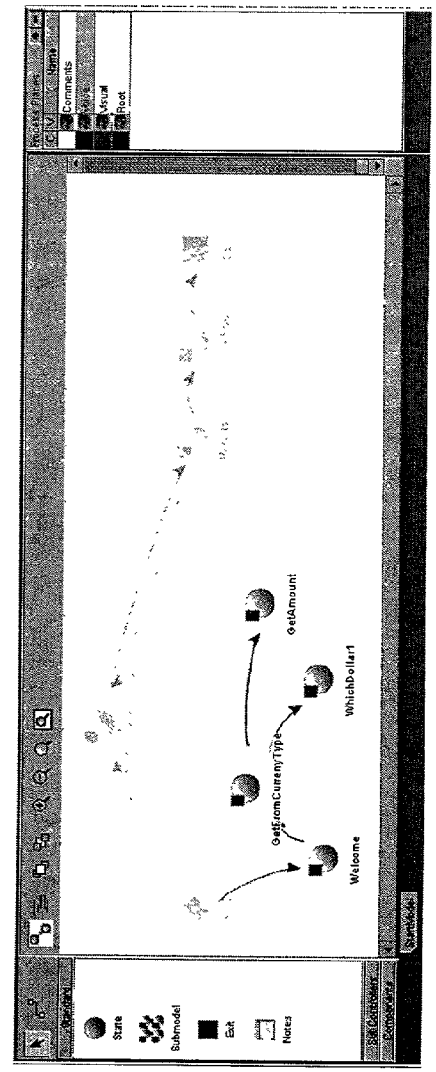

Now that the visual application has been completed, the developer may create a voice layer for voice channel-specific states, by pressing button 462 in layer palette 460 in FIG. 88. Returning to the application flow outlined above, the voice As detailed in the outline, the user's response to the "GetFromCurrencyType" state should be carefully considered. If the user answers "dollars," it is uncertain to what type of dollar is the user referring (see above). Thus, an extra state is necessary to clarify the user's intent behind the ambiguous response. Thus, the "GetFromCurrencyType" state has two transitions: one to the "GetAmount" state if the response is clear, and one to the "WhichDollar1" state if the response is ambiguous. FIG. 89 illustrates the additions to the workflow diagram. The generated CML code appears as follows (with additions in italics):

```
<DefaultController cml:name="GetFromCurrencyType" cml:id="6">
    <PROPERTY cml:name="preAction" cml:class="ListAction" cml:id="33"/>
    <PROPERTY cml:name="action" cml:class="ListAction" cml:id="34">
        <TransitionAction cml:id="19" layer="Voice" target="WhichDollar1"/>
        <TransitionAction cml:id="16" layer="Voice" target="GetAmount"/>
    </PROPERTY>
    <PROPERTY cml:name="postAction" cml:class="ListAction" cml:id="35"/>
</DefaultController>
```

Figure 90:
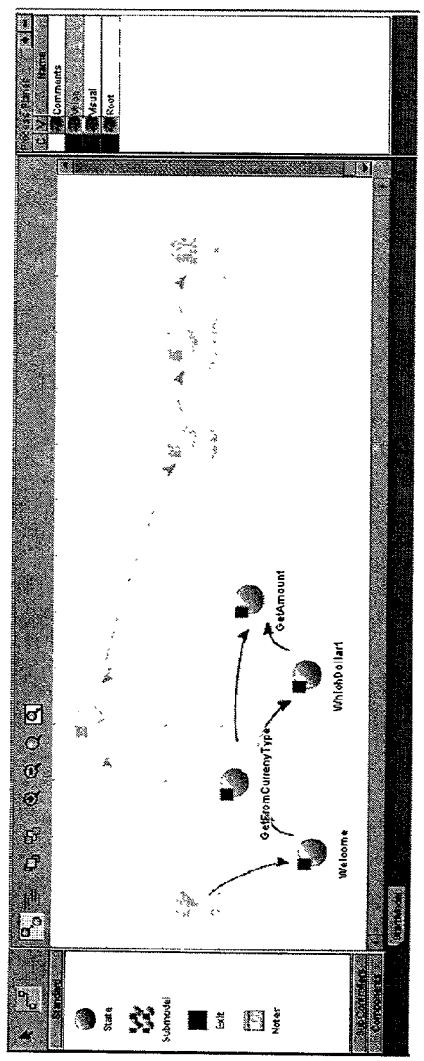

Once the application enters the "WhichDollar1" state and disambiguates the user's response, it will move back to the original path of the application flow. The developer draws a transition from "WhichDollar1" to "GetAmount." FIG. 90 illustrates the addition. The CML code generated appears as follows (with additions in italics):

```
<DefaultController cml:name="WhichDollar1" cml:id="9">
    <PROPERTY cml:name="preAction" cml:class="ListAction" cml:id="61"/>
    <PROPERTY cml:name="action" cml:class="ListAction" cml:id="62">
        <TransitionAction cml:id="20" layer="Voice" target="GetAmount"/>
```

-continued

```
    </PROPERTY>
    <PROPERTY cml:name="postAction" cml:class="ListAction" cml:id="63"/>
</DefaultController>
```

Figure 91:
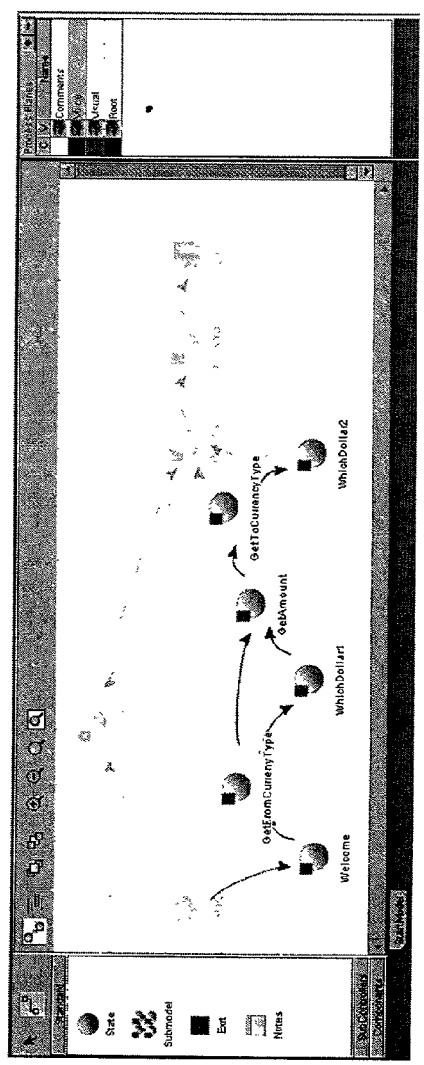

The next step in the voice application is to ask the user to which currency to convert. This state, "GetToCurrencyType," is similar to the "GetFromCurrencyType" state. It will also need a state, "WhichDollar2," to handle possible ambiguous responses. Once the currency is known, the application will converge back to the "Results" state in the root layer. The developer connects the states as shown in FIG. 91. The affected states in the CML file appear as follows:

```
<DefaultController cml:name="GetAmount" cml:id="7">
    <PROPERTY cml:name="preAction" cml:class="ListAction" cml:id="45"/>
    <PROPERTY cml:name="action" cml:class="ListAction" cml:id="46">
        <TransitionAction cml:id="17" layer="Voice" target="GetToCurrencyType"/>
    </PROPERTY>
    <PROPERTY cml:name="postAction" cml:class="ListAction" cml:id="47"/>
</DefaultController>
<DefaultController cml:name="GetToCurrencyType" cml:id="8">
    <PROPERTY cml:name="preAction" cml:class="ListAction" cml:id="57"/>
    <PROPERTY cml:name="action" cml:class="ListAction" cml:id="58">
        <TransitionAction cml:id="21" layer="Voice" target="WhichDollar2"/>
        <TransitionAction cml:id="18" target="Results"/>
    </PROPERTY>
    <PROPERTY cml:name="postAction" cml:class="ListAction" cml:id="59"/>
</DefaultController>
<DefaultController cml:name="WhichDollar2" cml:id="10">
    <PROPERTY cml:name="preAction" cml:class="ListAction" cml:id="53"/>
    <PROPERTY cml:name="action" cml:class="ListAction" cml:id="54">
        <TransitionAction cml:id="22" target="Results"/>
    </PROPERTY>
    <PROPERTY cml:name="postAction" cml:class="ListAction" cml:id="55"/>
</DefaultController>
```

Figure 92:
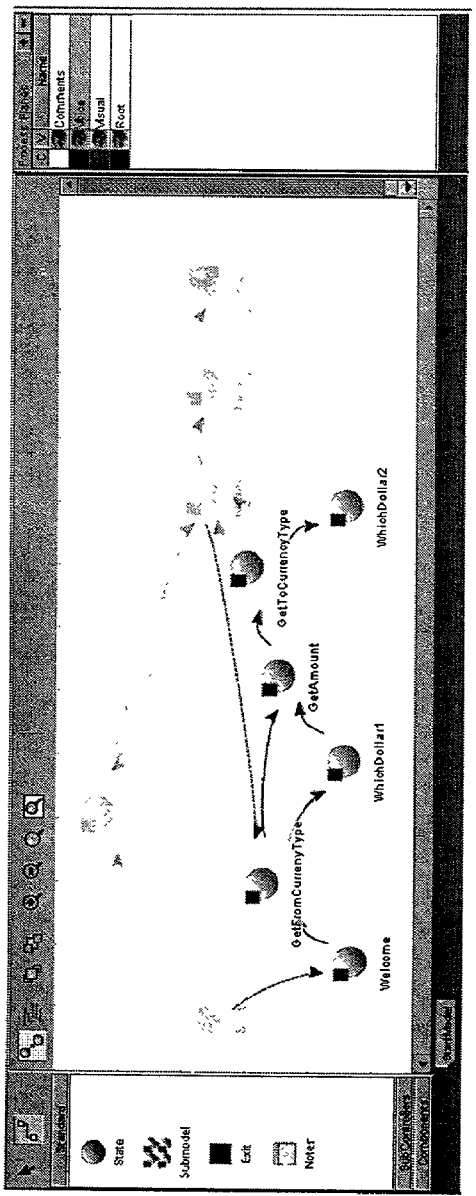

At the "Results" state, the user has the option to start over and begin another transaction. The developer draws a transition back to the "GetFromCurrencyType" state, as shown in FIG. 92. The affected states in the CML file appear as follows:

```
<DefaultController cml:name="Results" cml:id="4">
    <PROPERTY cml:name="preAction" cml:class="ListAction" cml:id="4"/>
    <PROPERTY cml:name="action" cml:class="ListAction" cml:id="42">
        <TransitionAction cml:id="87" layer="Voice" target="GetFromCurrencyType"/>
        <TransitionAction cml:id="88" layer="Visual" target="Get Conversion Info"/>
        <TransitionAction cml:id="14" target="ThankYou"/>
    </PROPERTY>
    <PROPERTY cml:name="postAction" cml:class="ListAction" cml:id="43"/>
<DefaultController>
```

Figure 93:
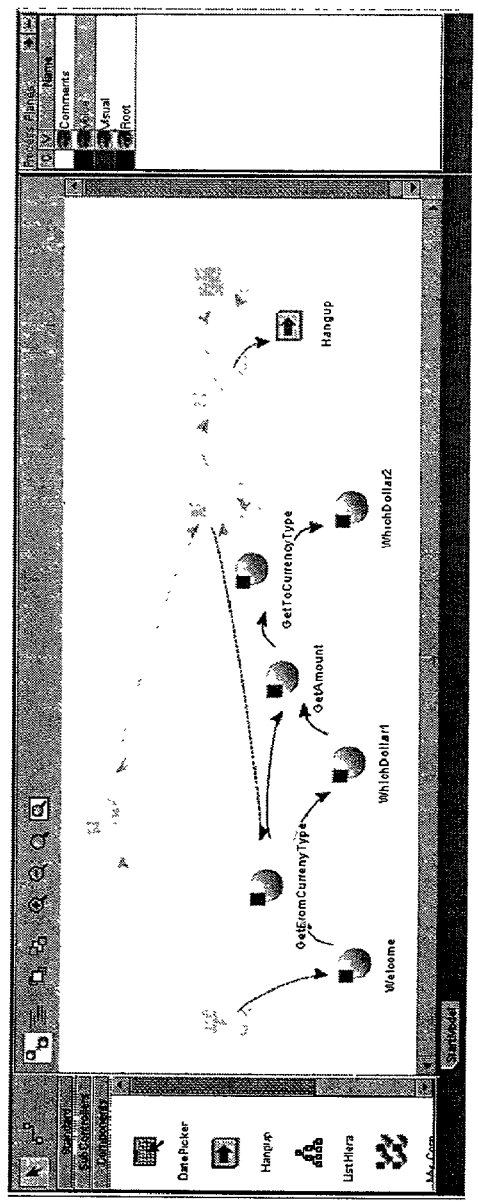

Lastly, to finish the voice application, the developer adds a preconfigured "Hangup" component. The "Hangup" component is needed to exit the application; reaching the "Exit" state merely starts the application over from the beginning. FIG. 93 illustrates how the developer would add the component into the interaction flow. The CML generated appears as follows:

```
<SubmodelController cml:name="Hangup" cml:id="23" modelName="Hangup_StartModel">
    <PROPERTY cml:name="preAction" cml:class="ListAction" cml:id="29"/>
    <PROPERTY cml:name="action" cml:class="ListAction" cml:id="30">
        <TransitionAction cml:id="25" target="ExitFromModel"/>
    </PROPERTY>
    <PROPERTY cml:name="postAction" cml:class="ListAction" cml:id="31"/>
</SubmodelController>
```

The palette of components shown in FIG. 93 is essentially filled with pre-built, preconfigured controllers that have been componentized for generic reuse.

Now that the controller is complete, the developer creates the views displayed to the end user and the data model necessary to run the application. These processes will be described fully in the View and Data Model sections below, respectively.

Figure 94:
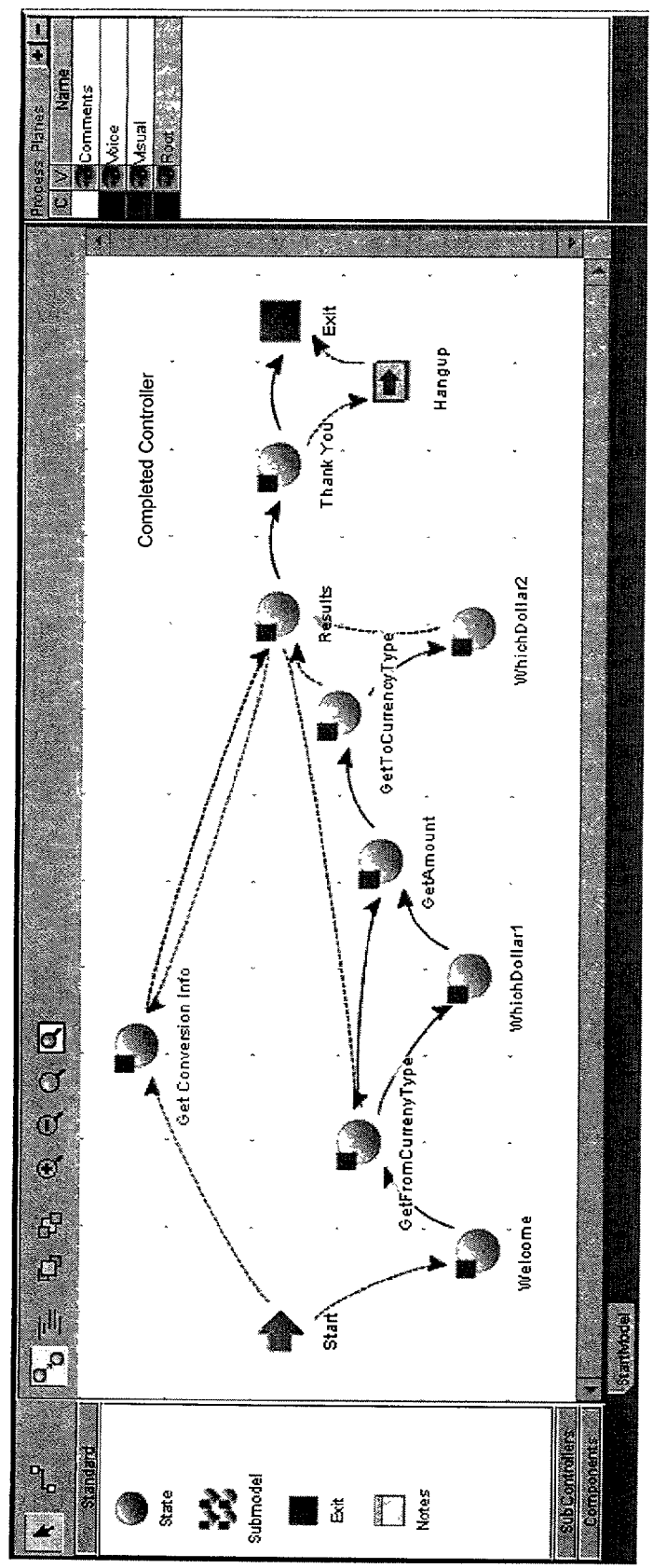
Figure 95:
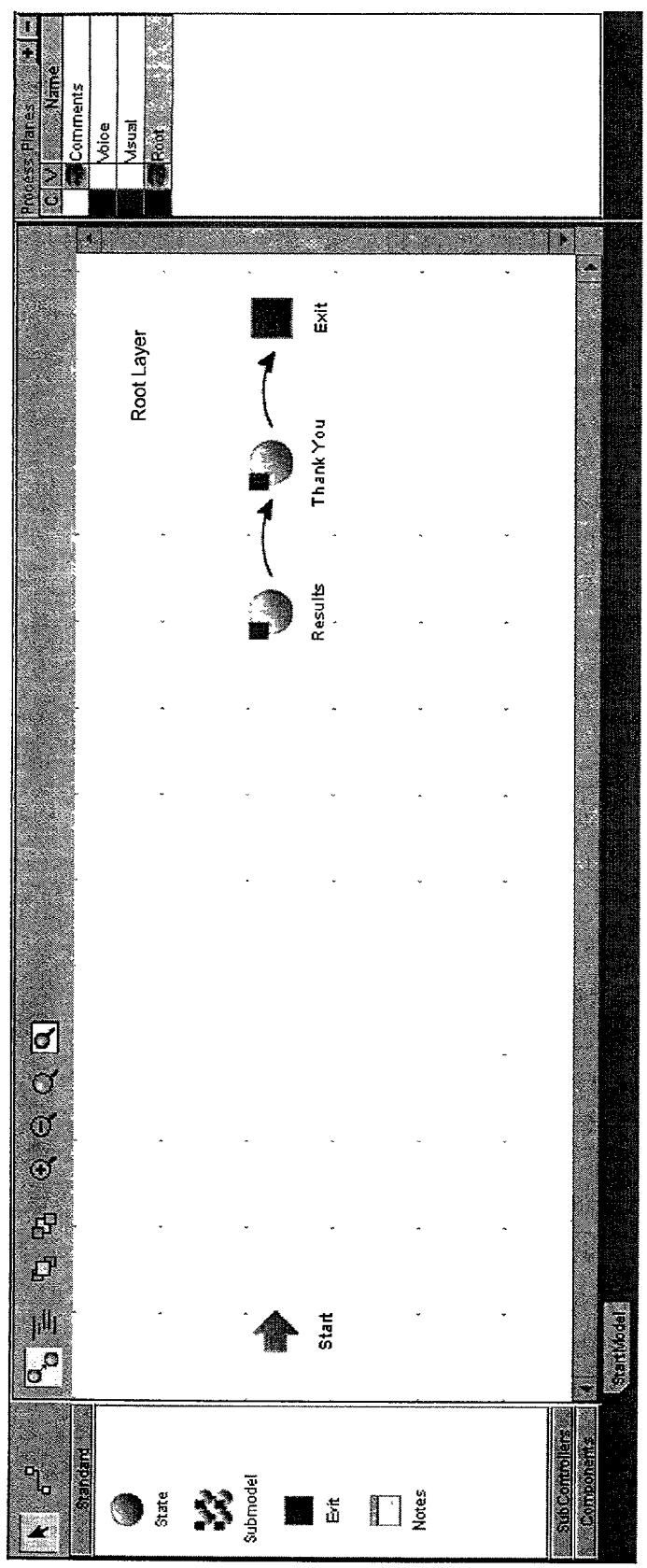
Figure 96:
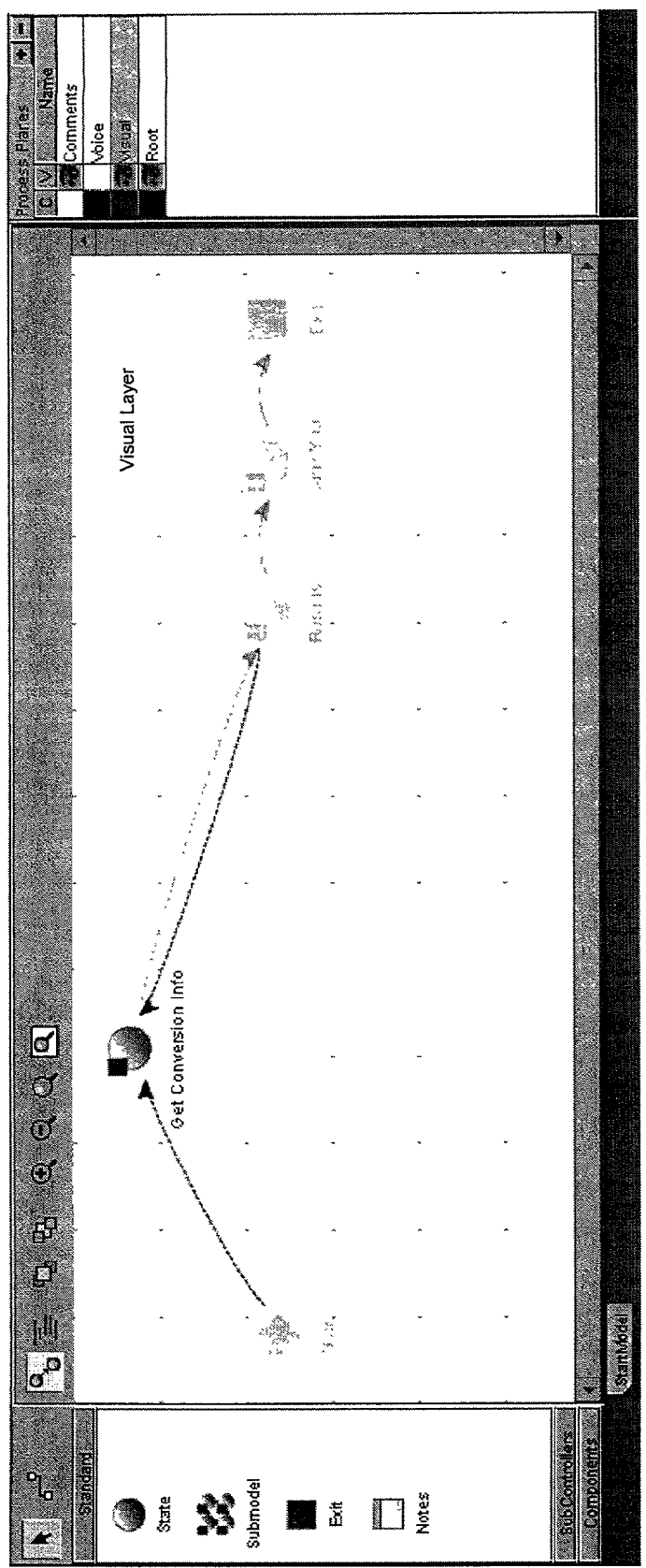
Figure 97:
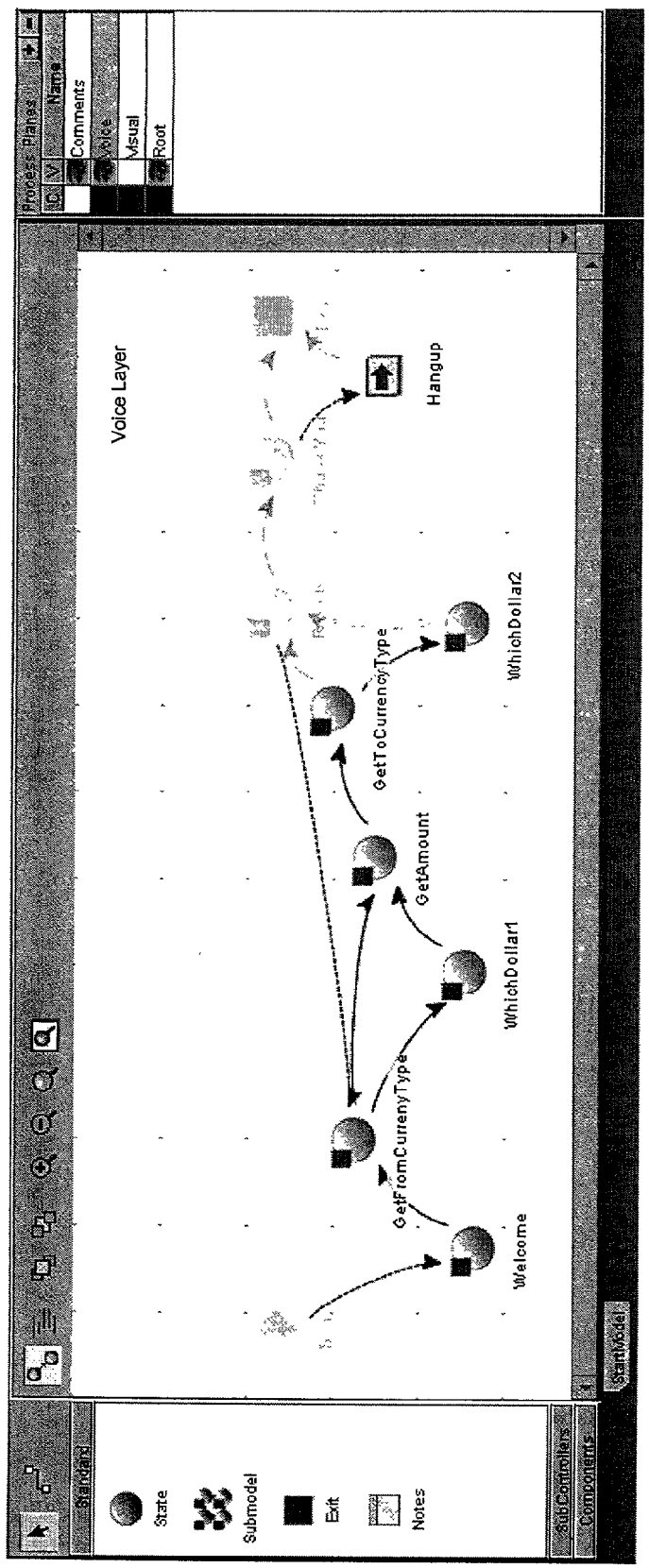

The completed controller is shown in FIGS. 80 through 93. FIG. 94 shows the complete controller, with all layers activated. FIG. 95 shows the root layer. FIG. 96 shows the Visual layer. FIG. 97 shows the Voice layer. In the preferred embodiment, a unique color is assigned to each layer. For example, for the "root" layer, the color may be "black"; for the "Voice" layer, the color may be red; and for the "Visual" layer, the color may be green. Only the transitions and the text underneath the states are assigned the colors. For transitions that occur between states in the same layer, the transition is drawn as a solid line. For transitions that occur between states in different layers, the transition is drawn as a dotted line.

D. Variables and Actions (Tying the Application Together)

Figure 98:
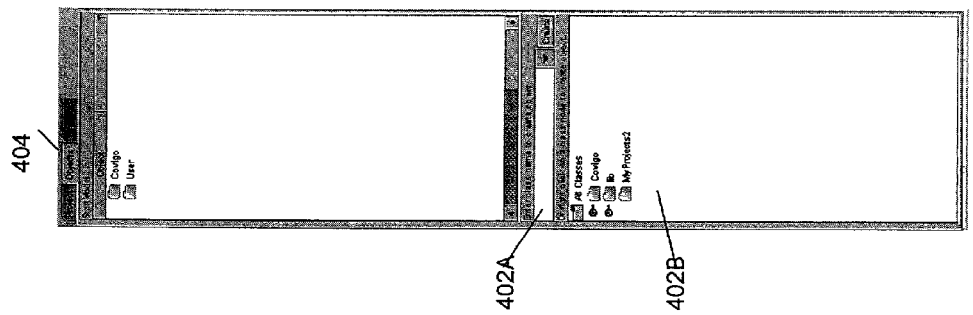
FIG. 98 illustrates an example of a graphical interface for the objects tree associated with the IDE described in the current invention.

As the pieces of the application flow (i.e. views, interaction flows, and data sources) are developed, they should be integrated to form a coherent application. Integration involves the following steps:

1. Assigning end user input to model variables
2. Invoking methods to store, retrieve, or transform data
3. Configuring transitions Step 1. Assigning end-user input to model variables When an end-user provides information to an application, the input is stored in a local variable. Variables returned by a view are local in scope, and inaccessible outside the state. Thus, the controller may need to store the local variable so that other states in the controller can access the response. Assigning the value of the local variable to a model variable is called "posting." To post a variable, the developer first creates a model variable by selecting the objects tree 404, as shown in FIG. 98. A variable is created by typing the name of the variable type (the class) into the text entry field 402A and pressing the "Create" button. Variables of the types provided by the system 100 may be created by right clicking on the class name in region 402B of FIG. 98.

In the currency conversion example, there are five total variables that have been declared for the application:

(1) fromCurrency—the input currency;
(2) toCurrency—the output currency;
(3) fromAmount—the input amount;
(4) toAmount—the output amount; and
(5) again—do another conversion or exit the application.

Figure 99:
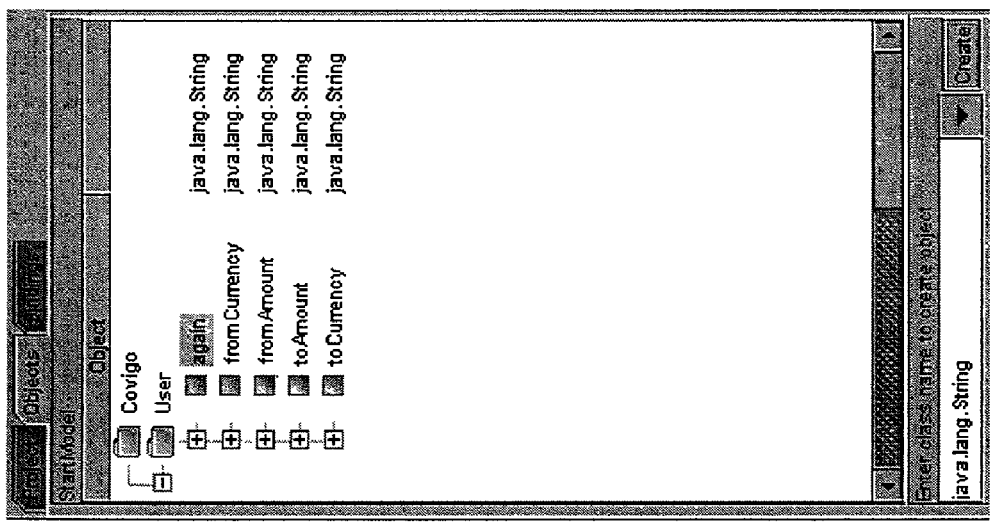
FIG. 99 illustrates an example of model variables that must be declared in the currency converter application.

As shown in FIG. 99, these model variables should be declared because they may need to be accessed between states.

These variables are represented in CML as follows (in italics):

```
<Model xmlns:cml="http://www.covigo.com" name="StartModel" type="Default">
    <ModelInterface cml:id="26">
        <ModelVarDef cml:id="91" name="fromCurrency" comment="From Currency Type"/>
        <ModelVarDef cml:id="92" name="toCurrency" comment="To Currency Type"/>
        <ModelVarDef cml:id="93" name="again" comment="Variable to hold user's choice of again or exit"/>
        <ModelVarDef cml:id="94" name="fromAmount" comment="Amount to convert"/>
        <ModelVarDef cml:id="135" name="toAmount" comment=""/>
    </ModelInterface>
</Model>
```

The <ModelInterface> element describes the model variables that have been defined for this controller. For each model variable that was created, a <ModelVarDef> element was added. The <ModelVarDef> takes four attributes. The "name" attribute defines the name of the model variable. The "comment" attribute is used to store information about the variable. This becomes important for sub-controllers because model variables are how different sub-controllers communicate with one another. During the call to a sub-controller, the GUI can display information held in the "comment" attribute during variable mapping (this will be discussed in greater detail below). Finally, there are the "in" and "out" attributes, which are also used in conjunction with sub-controller calls. It specifies the direction of data flow (i.e., whether data can flow into/out of the model via the model variable).

To set a declared model variable equal to the input, the developer uses a "Set" action. Like all actions, a "Set" action is associated with a state or transition—in this case, a state. For example, in the visual "Get Conversion Info" state, the view (user-interaction) returns three items: fromCurrency, toCurrency, and fromAmount. Each item requires a "Set" action to set its value to a model variable. The developer selects the state in editor 408 and drags the "Set" button from the actions palette 410A into the actions list 410C (see FIG.

43). While the "Set" action is selected, the developer configures it in the properties panel 410B. FIG. 43 illustrates how to set the Model object (fromCurrency) to the user's HTTP input (fromCurrency).

This action would be reflected in CML as follows (additions in italics):

```
<DefaultController cml:name = "Get Conversion Info" cml:id = "3">
    <PROPERTY cml:name = "preAction" cml:class = "ListAction"
    cml:id = "49"/>
    <PROPERTY cml:name = "action" cml:class = "ListAction"
    cml:id = "50">
        <Set Variable Action cml:id = "107" srcVar =
        "from Currency">
            <PROPERTY cml:name = "dstVar" cml:ref = "91"/>
        </Set VariableAction>
        <TransitionAction cml:id = "13" target = "Results"/>
    </PROPERTY>
    <PROPERTY cml:name = "postAction" cml:class = "ListAction"
    cml:id = "51"/>
</DefaultController>
```

The <SetVariableAction> is the element that defines the set action. It takes on three attributes. The "defaultValue" attribute specifies the default value that the model variable will take in the event that the source variable is undefined. The "optional" attribute is a true/false value to specify whether it is required that the action fail in the event that a source variable is defined. The "optional" and the "defaultValue" attributes work together. The three scenarios are as follows:

1. If "optional" is "true" and there is no "defaultValue" specified, then run-time skips the set action and continue with the next action.
2. If "optional" is "true" and there is a "defaultValue" specified, then run-time assigns the specified model variable with the value in "defaultValue".
3. If "optional" is "false", then "defaultValue" is ignored and the set action will fail if the source variable is undefined. In this case, it also skips the succeeding actions.

Finally, there is the "srcVar" attribute. The value of this attribute is the name of the variable that exists in the view. For example, in HTML, this would be the name of a request variable that gets posted back to the workflow when the user presses a "submit" button.

There is also a property called "destVar". It is specified by the <PROPERTY cml:name="destVar"> element. This will be a reference to the model variable in which to store the value of the set action (if the set action is performed). In the above example, the "cml:ref" attribute specifies an "id" of "91". So now, the developer may look for the object in the CML file that has a "cml:id" of "91". This happens to be a <ModelVarDef> whose variable name is "fromCurrency". Thus, developer assigns the view variable called "fromCurrency" to the model variable called "fromCurrency".

Similarly, the developer adds the set actions for toCurrency and fromAmount. This adds the following code:

```
<SetVariableAction                              cml:id="108"
    srcVar="fromAmount">
    <PROPERTY cml:name="dstVar" cml:ref="94"/>
</SetVariableAction>
<SetVariableAction cml:id="109" srcVar="toCurrency">
    <PROPERTY cml:name="dstVar" cml:ref="92"/>
</SetVariableAction>
```

In the voice application, the three items above are collected in five possible states: "GetFromCurrencyType," "WhichDollar1," "GetToCurrencyType," "WhichDollar2," and "GetAmount." Like the visual application, the voice application returns the input currency in a variable called "fromCurrency." This HTTP input will also be set to the model variable "fromCurrency." Note that it is acceptable (and more efficient) to use the same model variable to store input from different channels and modes.

Thus, the following "Set" actions are added into the list of actions in the appropriate state:

```
<DefaultController cml:name = "GetFromCurrencyType" cml:id = "6">
    . . .
        <Set VariableAction cml:id = "103" srcVar = "from Currency">
            <PROPERTY cml:name = "dstVar" cml.ref = "91 "/>
        </Set VariableAction>
    . . .
    </DefaultController>
<DefaultController cml:name = "GetAmount" cml:id = "7">
    . . .
        <Set VariableAction cml:id = "106" defaultValue = "1" optional = "True"
srcVar = "amount">
            <PROPERTY cml:name = "dstVar" cml:ref = "94"/>
        </Set VariableAction>
    . . .
    </DefaultController>
<DefaultController cml:name = "GetToCurrencyType" cml:id = "8">
    . . .
        <Set VariableAction cml:id = "111" srcVar = "to Currency">
            <PROPERTY cml:name = "dstVar" cml:ref = "92"/>
        </Set VariableAction>
    . . .
</DefaultController>
        <DefaultController cml:name = "WhichDollar1" cml:id = "9">
    . . .
        <Set VariableAction cml:id = "113" defaultValue = "usd" optional = "True"
srcVar = "dollar">
            <PROPERTY cml:name = "dstVar" cml:ref = "91"/>
        </SetVariableAction>
    . . .
</DefaultController>
        <DefaultController cml:name = "WhichDollar2" cml:id = "10">
    . . .
        <SetVariableAction cml:id = "110" srcVar = "dollar">
```

-continued

```
        <PROPERTY cml:name = "dstVar" cml:ref = "92"/>
    </SetVariableAction>
    ...
</DefaultController>
```

Figures 100, 101:
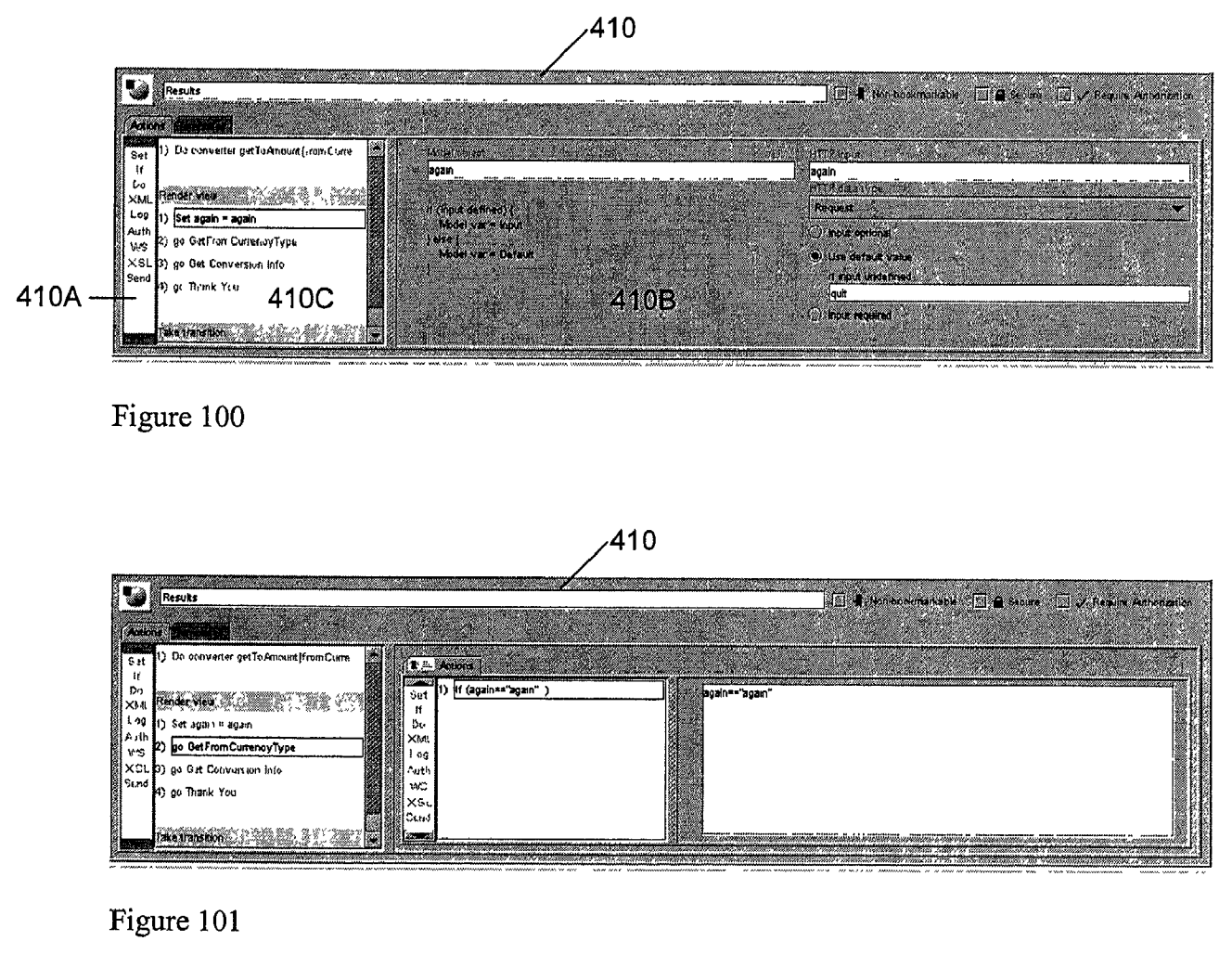

The last state that asks the end user for input is the "Results" state. This state has both visual and voice templates, and both templates return the HTTP user input in a variable named "again." This means the state requires only one "Set" action for both channels, as shown in FIG. 100. This corresponds to the following code (in italics):

```
<DefaultController cml:name = "Results" cml:id = "4">
    <SetVariableAction cml:id = "105"
        defaultValue = "quit" optional = "True"
srcVar = "again">
        <PROPERTY cml:name = "dstVar"
            cml:ref = "93"/>
    </SetVariableAction>
</DefaultController>
```

Step 2. Invoking Methods to Store, Retrieve, or Transform Data

The developer next integrates the data source/object and the flow together. This integration is achieved by selecting the state in which the data is necessary. In the currency conversion example, the state requiring the integrated data is the "Results" state. The data conversion is added to the pre-actions of the "Results" state. This means that when the state is entered, the data will first be converted so that the conversion result will be displayed to the user. The developer adds a "Do" action to call a data object's method. This is achieved by dragging the "Do" button from actions palette 410A into the list 410 C and configuring its properties in panel 410B. To configure the properties, the developer selects the converter data object in the object tree. This object handles the conversion into the output currency, and its creation is described in the Data Model section below. The developer drags the object's getToAmount method from the tree into the "Do" field of the properties panel. This brings up a list of parameters to the method and a field for the return type. The developer then drags the appropriate model variables into these fields, as shown in FIG. 44.

This would be represented in CML as the following (in italics):

```
<DefaultController cml:name = "Results" cml:id = "4">
    <PROPERTY cml:name = "preAction" cml:class = "ListAction" cml:id = "41">
        <BindingAction cml:id = "100" methodName = "getToAmount">
            <PROPERTY cml:name = "retVar" cml:ref = "135"/>
            <PROPERTY cml:name = "paramTypes" cml:class = "java.util.ArrayList"
cml:id = "101">
                <java.lang.String cml:value = java.lang.String">java.lang.String
</java.lang.String>
                <java.lang.String cml:value = java.lang.String">java.lang.String
</java.lang.String>
                <java.lang.String cml:value = java.lang.String">java.lang.String
</java.lang.String>
                <java.lang.String cml:value = SQLSource">SQLSource"> SQLSource
</java.lang.String>
            </PROPERTY>
            <PROPERTY cml:name = "params" cml:class = ParameterList" cml:id = "102">
                <java.lang.String cml:value = "from Currency">from Currency
</java.lang.String>
                <java.lang.String cml:value = "to Currency">toCurrency
</java.lang.String>
                <java.lang.String cml:value = "fromAmount">fromAmount
</java.lang.String>
                <ModelVarDef cml:ref = "89"/>
            </PROPERTY>
                <PROPERTY cml:name = "objRef" cml:ref = "98"/>
        </BindingAction>
    <PROPERTY>
            ...
<DefaultController>
```

The action is expressed as a <BindingAction> element. Because it is a pre-action, it is a "child" of the "preAction" <PROPERTY>. The <BindingAction> contains four major objects (expressed as <PROPERTY> elements): the return value, the parameter types, the parameters themselves, and the object on which to operate. The first has an attribute cml:name="retVar" and a cml:ref attribute whose value matches the cml:id attribute of a model variable. The second has an attribute cml:name="paramTypes" and a list of children enumerating the types of parameters which are expected. Since this particular system operates using Java, the parameter types are all Java objects; this may not be the case for other implementations. The list of parameters passed into the object's method is denoted by the cml:name="params" attribute. It contains a list of children that refer to declared model variables. Lastly, the object contains an cml:name="objRef" attribute and a reference to the declared object (i.e., the model variable).

The developer may then configure the service by calling the data object. Data sources are implemented as Java classes, and data objects are implemented as Java methods. The CML generated for calling the data sources is similar to that of the action above, as both are calls to a method of a Java object. The back-end integration with the controller is now complete.

Step 3. Configuring Transitions

To complete the application flow, the developer may now configure the transitions. Many states, such as the "Results" state, have multiple transitions leaving the state. The developer may specify logic for the controller so that it knows which transition to take. For the majority of cases the logic comprises a simple conditional. For example, the "Results" state has three transitions to: GetFromCurrencyType (voice), Get Conversion Info (visual), and Thank You (voice and visual). Transitions can also have other actions. In this example, the developer adds an "If" action into the GetFromCurrencyType transition's action list, as seen in FIG. 101. This transition should be taken only if, in the voice application, the end user says he would like to do another conversion. If this is the case, the value of the "again" variable will be "again." This is expressed in the "If" action as a Java expression. The conditional is represented in state's actions as a <Custom Action> as follows (in italics):

```
<PROPERTY cml:name = "action" cml:class = "ListAction" cml:id = "42">
    <SetVariableAction cml:id = "105" defaultValue = "quit" optional = "True" srcVar = "again">
        <PROPERTY cml:name = "dstVar" cml:ref = "93 "/>
    </SetVariableAction>
    <TransitionAction cml:id = "87" layer = "Voice" target = "GetFromCurrencyType">
        <CustomAction cml:id = "114" code = "again == "again" "/>
    </TransitionAction>
    <TransitionAction cml:id = "88" layer = "Visual" target = "Get Conversion Info"/>
    <TransitionAction cml:id = "14" target = "ThankYou"/>
</PROPERTY>
```

The same process is repeated for the "Get Conversion Info" and "Thank You" transitions, with the following result (in italics):

```
<PROPERTY cml:name = "action" cml:class = "ListAction" cml:id = "42">
    <SetVariableAction cml:id = "105" defaultValue = "quit" optional = "True" srcVar = "again">
        <PROPERTY cml:name = "dstVar" cml:ref = "93"/>
    </SetVariableAction>
    <TransitionAction cml:id = "87" layer = "Voice" target = "GetFromCurrencyType">
        <CustomAction cml:id = "114" code = "again =="again" "/>
    </TransitionAction>
    <TransitionAction cml:id = "88" layer = "Visual" target = "Get Conversion Info">
        <CustomAction cml:id = "115" code = "again == "Back""/>
    </TransitionAction>
    <TransitionAction cml:id = "14" target = "ThankYou">
        <CustomAction cml:id = "116" code = "again == "quit""/>
    </TransitionAction>
</PROPERTY>
```

The <CustomAction> element takes an attribute called "code" that contains an expression to evaluate. The order of execution is from first to last. If any of the actions fail, then the next block of actions in the state will get executed. So, in this example, the application first executes the transition to the "GetFromCurrencyType" state. In that transition, there is a conditional action. If this action evaluates to "true", then the transition finishes and control is transferred to the "GetFromCurrencyType" state. If the condition fails, then the application returns control back to the "Results" state and executes the next action in the list, which is a transition action to the "Get Conversion Info" state. The process continues through each transition until one is taken.

Figure 102:
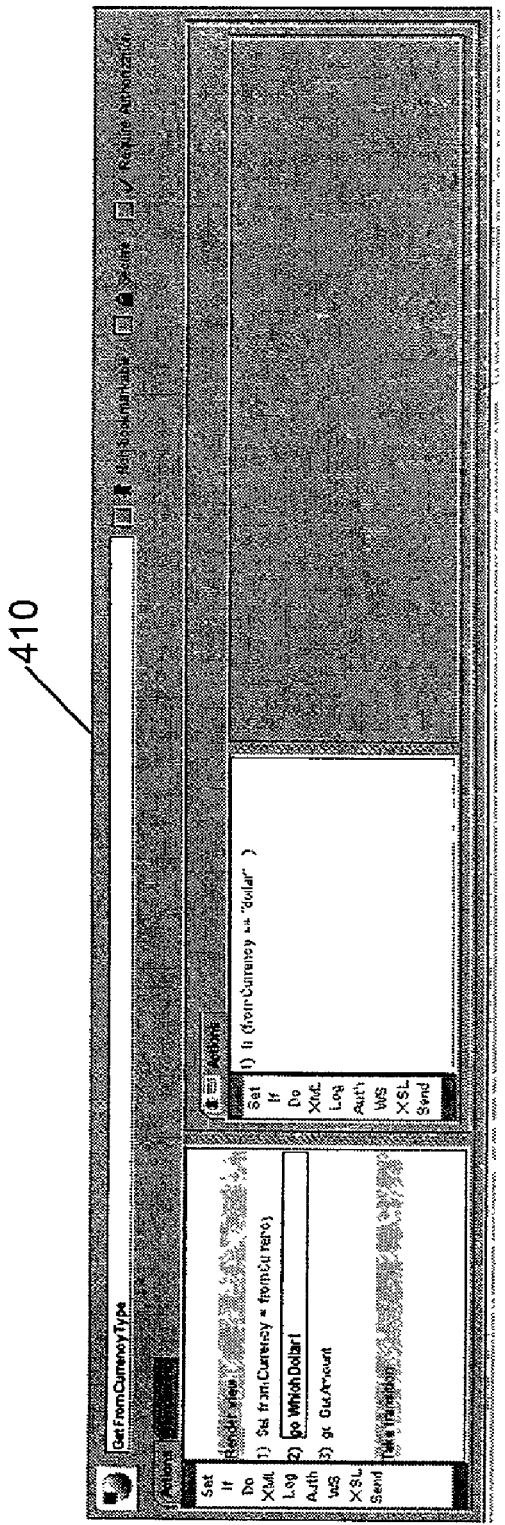
FIG. 102 illustrates an embodiment of the actions palette user interface with a 'transition' action.

The other four states that need conditions on the transitions are: Start, GetFromCurrencyType, GetToCurrencyType, and ThankYou. GetFromCurrencyType and GetToCurrencyType both check if the user responded with the ambiguous "dollar" response, on the transitions to WhichDollar1 and WhichDollar2. The condition for GetFromCurrencyType is shown in FIG. 102. If the response is not ambiguous, the application always takes the following transition; that transition does not need a conditional. Because the actions are executed in order, the transitions to WhichDollar1 and WhichDollar2 need to appear first, as demonstrated in FIG. 102. The finished CML for these states (with additions in italics):

The real-time application flow is now completed, and the applications views may be created.

E. Creating Views

Figure 38:
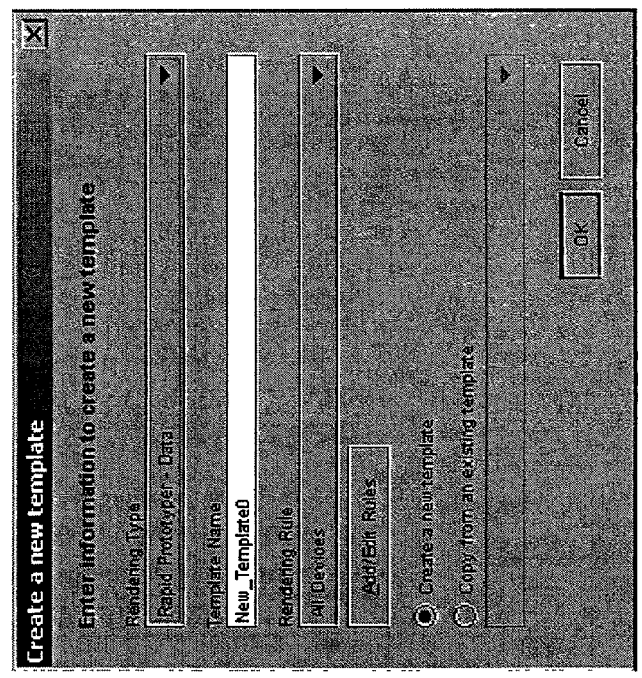
FIG. 38 is an example of a dialog box associated with the IDE of current invention for creating a data view template.
Figure 103:
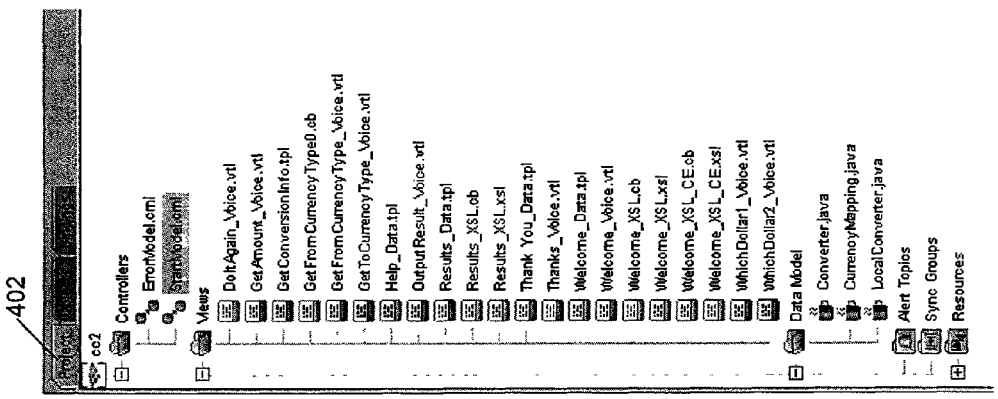
FIG. 103 is an embodiment of the project tree user interface illustrating a plurality of views for the currency converter application.

Views are the interface between the user and the application. They are associated with states in the application. One view is associated with one state, although one state may be associated with zero or more views. A view may be associated with a state in one of three ways: by configuring the environment settings to automatically add a view(s) when a state is created, by manually creating a view, or by associating an existing view. This is accomplished using the view list as shown in FIG. 37. To manually create a view, the developer presses button 410D in FIG. 37. A dialog box appears to configure the type of view needed, as shown in FIG. 38. The "Rendering Type" is the type of rendering technology used. The "Template Name" is the user-defined name for the view. The "Rendering Rule" is a rule which must be satisfied in order for this view to be rendered to the end user. To associate an existing view with a state, the developer places the existing views into the "Templates" directory of the current project. These views will then appear in the project tree 402, as shown in FIG. 103. Then the developer drags and drops the desired view into the view list area of the state. The same dialog box in FIG. 38 will appear so that the view can be configured.

```
DefaultController cml:name = "GetFromCurrencyType" cml:id = "6">
    <PROPERTY cml:name = "preAction" cml:class = "ListAction" cml:id = "33"/>
        <PROPERTY cml:name = "action" cml:class = "ListAction" cml:id = "34">
            <SetVariableAction cml:id = "103" srcVar = "fromCurrency">
                <PROPERTY cml:name = "dstVar" cml:ref = "91"/>
            </SetVariableAction>
            <TransitionAction cml:id = "19" layer = "Voice" target = "WhichDollar1">
                <CustomAction cml:id = "104" code = "from Currency == "dollar" "/>
            </TransitionAction>
            <TransitionAction cml:id = "16" layer = "Voice" target = "GetAmount"/>
        </PROPERTY>
        <PROPERTY cml:name = "postAction" cml:class = "ListAction" cml:id = "35"/>
    </DefaultController>
<DefaultController cml:name = "GetToCurrencyType" cml:id = "8">
    <PROPERTY cml:name = "preAction" cml:class = "ListAction" cml:id = "57"/>
    <PROPERTY cml:name = "action" cml:class = "ListAction" cml:id = "58">
        <SetVariableAction cml:id = "111" srcVar = "toCurrency">
            <PROPERTY cml:name = "dstVar" cml:ref = "92"/>
        </SetVariableAction>
        <TransitionAction cml:id = "21" layer = "Voice" target = "WhichDollar2">
            <CustomAction cml:id = "112" code = "toCurrency == "dollar" "/>
        </TransitionAction>
        <TransitionAction cml:id = "18" target = "Results"/>
    <PROPERTY>
    <PROPERTY cml:name = "postAction" cml:class = "ListAction" cml:id = "59"/>
</DefaultController>
```

In the currency converter example, the first visual state that requires a view is the "Get Conversion Info" state. The added view is called "GetConversionInfo.tpl". The additions to the CML file are shown below:

```
<ListView cml:name = "Get Conversion Info" cml:id = "48">
    <DeviceBasedView cml:id = "85" template = "GetConversionInfo.tpl">
        <PROPERTY cml:name = "view" cml:class = "DefaultView" cml:id = "86"
template = "GetConversionInfo.tpl"/>
        <PROPERTY cml:name = "deviceType" cml:class = "DeviceTypeLocator"
ruleName = "All Devices"/>
    </DeviceBasedView>
</ListView>
```

As shown above, a <ListView> element is added. Note that the name of this view represented by the "cml:name" attribute matches the state's view in the <DefaultController> element. This is how views are associated with the target view. In this case, we added a view to the "Get Conversion Info" state, so the "cml:name" value for <ListView> will also be "Get Conversion Info". The <ListView> element itself is a collection of views. Otherwise, the application can output the <DeviceBasedView> in place of the <ListView> element. However, the <ListView> element is added in order to have a collection of views, with each view having a detection rule.

The <DeviceBasedView> element represents one single view. The <DeviceBasedView> takes two properties, a "view" and a "deviceType". This is represented as additional <PROPERTY> elements under the <DeviceBasedView> element. An unlimited number of views may be associated with a state. Each additional view will be a new <DeviceBasedView> entry under the <ListView> element.

The "view" property takes two attributes, "template" and "cml:class". The "template" attribute specifies the name of the template. In this case, it is "Welcome.tpl". For this type of view, this name is a filename that exists on the file system. For other types of views, it might identify some other resource by name. The "cml:class" attribute identifies the type of view this is. For this particular state, the type is "DefaultView". "DefaultView" is the "Rapid Prototype" view in the user-interface.

The "deviceType" property has one important attribute called "ruleName". The "ruleName" attribute identifies the rule, by name, by which to determine whether the view is the correct one to display. The rule can evaluate many different factors such as the type of device connecting. In this case, the rule name is "All Devices". There is a corresponding file that will contain information about what this rule means (i.e., how the rule should be evaluated). This file is the "global.def" file. An example file is shown below.

For the views having behavior that can be modified with properties, those properties will be found in the attributes. For example, the CustomDevice tag includes a property called "userAgent". As a result, there is a corresponding "userAgent" attribute in the element. Hence, there can be multiple rules that use the same element tag. In the above example, the "Nokia Browser" and "UP Browser" rules use the same "CustomDevice" element tag. The difference between the two is that one has "Nokia" for the "userAgent" attribute and the other has "UP" for the value of the "userAgent" attribute.

For each state, the developer will add all necessary templates. FIG. 38 illustrates a data template added to the state. Once the templates are created, they can be configured in the rapid data view editor 412, shown in FIG. 21. The developer will drag in and configure the appropriate primitives. Primitives are the basic building blocks of the user interface. Whatever will be displayed or played to the user will be fit into the appropriate primitive.

In the "Get Conversion Info" state, the file contents (GetConversionInfo.tpl) are generated in TPL as follows:

```
<?xml version="1.0" standalone="no"?><View title="9577329894233965" maxitems="" name="" version="2.61">
<List defaultvalue="" listtype="option" varname="fromCurrency" overide_global_destination="false" listmode="dynamic" display_static_list="true" title="5361492279974671">
<ListItem dest="$ {baseurl}" buttonlabel="^currencyList^" value="^currencyList^">^visibleCurrencyList^</ListItem>
</List>
<ResponseHeaderList>
</ResponseHeaderList>
<MetaDataList>
</MetaDataList>
<NavigationActionList>
```

```
<?xml version = "1.0"?>
<?covigoml version = "1.0"?>
<java.util.HashMap cml:id = "1">
    <java.util.TreeMap cml:name = "Template Rules" cml:id = "2">
        <AnyDevice cml:name = "All Devices" cml:id = "3"/>
        <CodeGeneratedClientDevice cml:id = "4"
            cml:name = "CLDC-MIDP Code Generator" targetType = "text/java-midp"/>
        <CustomDevice cml:name = "Custom Device"
            cml:id = "5" userAgent = "Custom Device"/>
        <HtmlDevice cml:name = "Html Devices" cml:id = "6"/>
        <CustomDevice cml:name = "Nokia Browser"
            cml:id = "7" userAgent = "Nokia"/>
        <CodeGeneratedClientDevice cml:id = "8"
            cml:name = "PJava Code Generator" targetType = "text/java-awt"/>
        <CustomDevice cml:name = "UP Browser" cml:id = "9"
            userAgent = "UP"/>
        <VoiceDevice cml:name = "Voice Devices" cml:id = "10"/>
    </java.util.TreeMap>
</java.util.HashMap>
```

The file contains a set of Java class implementations that execute the code to determine whether the rule is satisfied or not. The other attributes are parameters that can modify the behavior of the rule implementation. The "cml:name" attribute describes the name of the rule by which the views in the CML file reference. So, for example, a rule name of "All Devices" would refer to the "cml:name" of "All Devices" in this "global.def" file. The associated Java class that executes the code is AnyDevice. For this class, the implementation would succeed in execution, resulting in the engine choosing the template.

```
<Action scope="local" name="OK" dest="${baseurl}" overrideglobal="false" method="post" buttonlabel="415746435947454" type="accept">
<PostData name="dataSessionState" value="main">
<PostData name="fromCurrency" value="$(fromCurrency)"/>
<PostData name="fromAmount" value-"$(fromAmount)"/>
<PostData name="toCurrency" value="$(toCurrency)"/>
</Action>
</NavigationActionList>
```

```
<Input title="9714909659225" name="Amount"
format="N*" mode="text"
varname="fromAmount" default-
value="2798152269586387">
<Text>34542647762854994</Text>
</Input>
<List defaultvalue=" " listtype="option"
varname="toCurrency"
overide_global_destination="false" listmode="dynamic"
display_static_list="true"
title="7755028846727147">
<ListItem dest="$ {baseurl}" buttonlabel="^currencyList^"
value="^currencyList^">^visibleCurrencyList^</ListItem>
</List>
</View>
```

Figure 104:
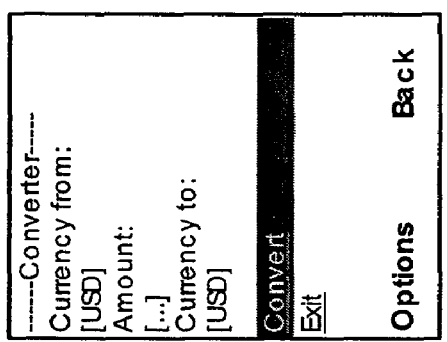
FIG. 104 illustrates an embodiment of a view that would be rendered on a WAP device in the currency converter application.

This view would be rendered on a WAP device having an interface similar to that shown in FIG. 104.

Figure 105:
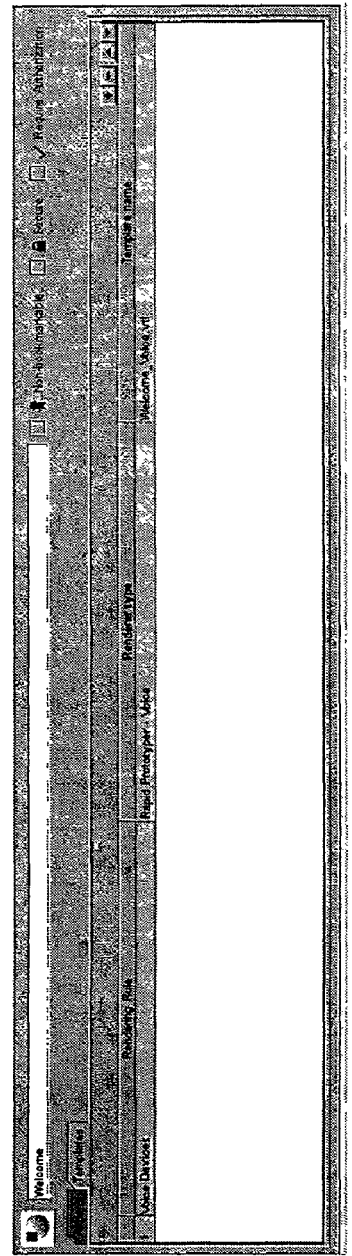
FIG. 105 illustrates an embodiment of user interface palette for creating a voice view template.

The first voice view appears in the "Welcome" state. The voice view is added to the state's list of templates, similar to how the rapid data template above. This is shown in FIG. 105. The voice template is developed in the rapid voice view editor 414, shown in FIG. 22. The view is stored in a file with a *.vtl extension. The finished view for the Welcome state is stored as a VTL file, Welcome_Voice.vtl, as follows:

```
<?xml version="1.0" encoding="UTF-8"?>
<VoiceDoc version="2.6">
<VoiceTemplate next="SERVER" id="Welcome">
<Play>
<Prompt promptType="initial">
<Audio prompt="change.wav">
</Audio>
<Audio prompt="welcome_currency.wav">
</Audio>
</Prompt>
</Play>
</VoiceTemplate>
<VoiceTemplate id="SERVER">
</VoiceTemplate>
</VoiceDoc>
```

This view is linked to the Welcome state in the CML file, as follows:

```
<ListView cml:name = "Welcome" cml:id = "122">
    <DeviceBasedView cml:id = "123" template = "Welcome_Voice.vtl">
        <PROPERTY cml:name = "view" cml:class = "VoiceView" cml:id = "124"
template = "Welcome_Voice.vtl"/>
        <PROPERTY cml:name = "deviceType" cml:class = "DeviceTypeLocator"
ruleName = "Voice Devices"/>
    </DeviceBasedView>
</ListView>
```

The output of this view is the contents of the audio files change.wav and welcome_currency.wav. In this case, the end user will hear "[sound of jingling change] Welcome to the Currency Converter! You can say 'Help' at any time for assistance."

The process of developing the views for the remaining voice-only states is similar to that of the Welcome state. The next state, the "Results" state, is used for both visual and voice applications. Visual and voice applications require different views, since one relies on text and the other relies on audio files. This means that the "Results" state must have multiple views. There can also be several visual views; the application developer can create a special visual view for a specific device or browser. (For example, a PDA, such as a Palm Pilot, is capable of more sophisticated information display than a current Internet-enabled cell phone. A developer may want to take advantage of the larger screen size and display more information on the PDA than on the phone. This would warrant a different view for the PDA.) The run-time engine implementing CML processor will select the appropriate template at run-time.

Figure 106:
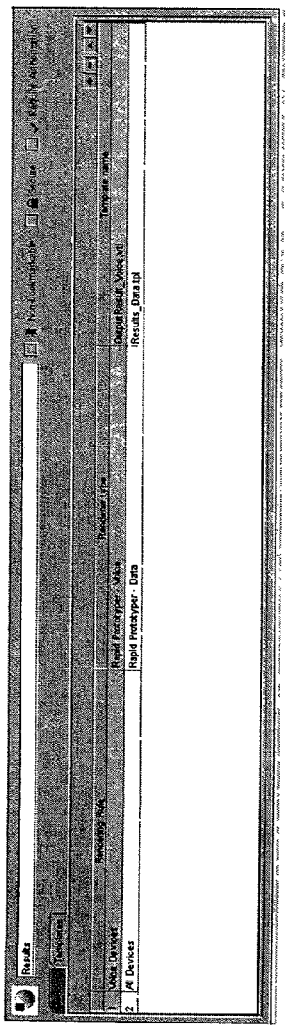
FIG. 106 illustrates an embodiment of how the view list user interface of the "Results" state will appear in the currency converter example.

FIG. 106 illustrates how the view list in the "Results" state will appear. Like transitions, the order of the views determines how the workflow engine 132 will decide which view to render. The engine checks if the rendering rule of the first view in the list has been satisfied. If it has, it renders the view and moves onto executing the actions in the state. If the rule has not been satisfied, the engine moves to the next view, checks if the view's rendering rule has been satisfied, and so on.

F. Data Modeling

After the visually creating the interaction flow diagram and views, a developer may integrate the necessary data resources for the application. In the currency converter example, the application gathers conversion information (input currency, amount, output currency) as input and processes the data accordingly. This requires integration with a back-end database. The application needs to (1) find out the conversion rate between the two currencies and (2) calculate the conversion.

In this non-limiting example, the conversion rate table is stored in an Oracle™ database. The table uses U.S. dollars as a base currency. The table contains the conversion rates from U.S. dollars to other currencies. To make the conversion, the application first retrieves the conversion rate between the input currency and the base currency. Next, the application converts the input currency amount into the base currency. The application then retrieves the conversion rate between the base currency and the output currency, and calculates the amount in the output currency. The calculation can be represented as follows:

(Input amount)*(Base->Input currency rate)/(Base->Output currency rate)

Figure 107:
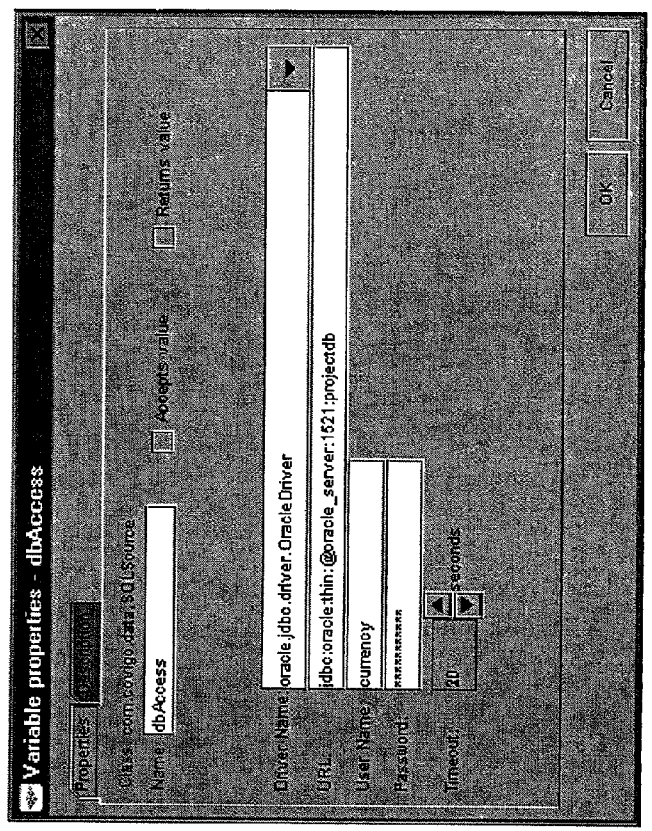
FIG. 107 illustrates an embodiment of user interface for configuring a data source in the currency converter application.

The developer will begin integration design by adding a data source in the objects tree 404, as shown in FIG. 41. The data source is then configured in the interface shown in FIG. 107. Configuring the data source includes providing the following information: (i) "Name"—the name of the data source; (ii) "Driver Name"—the Java Database Connectivity (JDBC) driver used to connect to the database; (iii) "URL"—the location of database; (iv) "User Name" and "Password"—the user access information for the database; and (v) "Timeout"—how long to keep the connection to the database.

The "Driver Name" is the class that implements the JDBC driver interface. In this example, it is "oraclejdbc.driver.OracleDriver", which is the JDBC driver to an Oracle™ database. The "URL" is a driver-specific text string that gets passed to the JDBC driver. It describes specifics on how to connect to a database (such as machine names and port numbers). The "User Name" and "Password" pair specifies the login information to connect to the database (if security is enabled on the database). The "Timeout" field specifies the number for a session to hold on to the database connection. Note that when the timeout expires, the database connection is not closed. On the server, there is a pool of database connections that maintains a constant connection to the database. The "Timeout" field only specifies when to return the session's database connection back to the database connection pool.

The data adapter is essentially a Java class whose interface is exposed in the GUI. When a developer declares such a data adapter, it shows up in the project tree 402, as shown in FIG. 103. When that data adapter node is expanded, there is a list of Java methods. These methods can then be used in conjunction with the "method call" action. If a method in the built-in adapters is not enough, then developers can extend the class using Java's "extend" keyword. In the extended class, developers can override methods to perform more sophisticated data manipulation than the standard data adapters provide. In this example, the class has not been extended. The SQL data adapter includes methods such as "executeQuery( )", "executeUpdate( )", "getRowByIndex( )", "getColumnByIndex( )", "getRows( )", and "getcolumns( )".

So, for example, a developer could execute a query by creating an "execute method" action and then dragging the "executeQuery( )" method in the tree into the "execute method" action. Then, as one of the parameters, the developer could pass "select USD_RATE from CURRENCIES where SYMBOL='JPY'" as the query to perform. The results will be cached for later retrieval by a "getRows( )" that returns a collection of rows, with each row having a collection of column entries.

In this example application, an external class was created that calls the "executeQuery( )" directly. The developer creates a method that accepts a "SQLSource" object. This object's "executeQuery( )" method is then called with the appropriate query. Then, a "getItemAt(0, 0)" call is performed to retrieve the first item in the first row. The item is converted by a "Double" since it was returned as a "String". At that point, it is multiplied with the dollar value to return the dollar amount of the conversion. Finally, this method is used via the "execute method" action. An "execute method" action is dropped into the actions panel. Then, the "getToAmount( )" method, which does the query and the post-processing, is dragged into the panel. The developer may then specify the parameters, including the "SQLSource" object, can by dragging them into the fields. So, when the "execute method" action executes, the query will be performed.

The code executes all the steps necessary for the conversion. The code also sets the value of a model variable to the conversion result. One non-limiting example of Java code that may be used for this currency conversion example appears below:

```
import java.io.*;
import SQLSource;
//import java.sql.*;
public class Converter implements Serializable{
    /**
     * Default Constructor
     */
    public Converter(){
        super();
    }
    // Add your methods here
    public String getToAmount(String fromCurr, String toCurr, String
            fromAmt, SQLSource dbAccess) {
        System.out.println("dbAccess: "+dbAccess+" fromCurr: "+fromCurr+" toCurr: "+toCurr+" fromAmt: "+fromAmt);
        if( fromCurr == null || fromCurr.equals("") ||
    toCurr == null || toCurr.equals("") ||
    fromAmt == null || fromAmt.equals("") ||
            dbAccess == null)
    return "0";
        double USDRateFrom = 0.0;
        double USDRateTo = 0.0;
        String sqlRateFrom = "select USD_RATE from CURRENCIES where SYMBOL
="'
            + fromCurr.toUpperCase() + "'";
        System.out.println(sqlRateFrom);
        String sqlRateTo = "select USD_RATE from CURRENCIES where SYMBOL =
"'
            + toCurr.toUpperCase() + "'";
        System.out.println(sqlRateTo);
        try {
            dbAccess.executeQuery(sqlRateFrom);
            if (dbAccess.getItemAt(0,0) != null) {
              USDRateFrom = Double.parseDouble(dbAccess.getItemAt(0,0));
              System.out.println("USDRateFrom: " + USDRateFrom);
            }
            dbAccess.executeQuery(sqlRateTo);
            if (dbAccess.getItemAt(0,0) != null) {
              USDRateTo = Double.parseDouble(dbAccess.getItemAt(0,0));
              System.out.println("USDRateTo: " + USDRateTo);
            }
            double result = (USDRateFrom * Double.parseDouble(fromAmt)) / USDRateTo;
            java.text.DecimalFormat format = new java.text.DecimalFormat("#.#");
            /*format.setMaximumFractionDigits(2);*/
            String res = format.format(result);
            return res;
        } catch(Exception e){
```

```
        System.out.println("Error Encountered while retrieving conversion rates.
Look at the stack trace");
            e.printStackTrace();
            return "0";
        }
    }
}
```

G. Componentization

If the currency converter is needed as part of a larger travel portal, the developer of the converter can componentize the application before integrating it into the portal.

Figure 108:
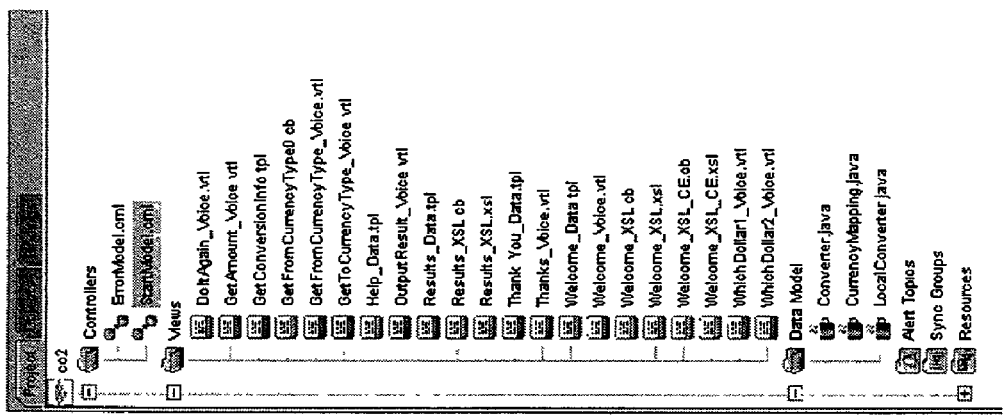
FIG. 108 embodiment of user interface listing all the controller, view, and model elements of the currency converter application that comprise the currency converter component.

The currency converter component would be comprised of the following, as shown in FIG. 108:

(i) the interaction flow for the converter, i.e., the Start-Model controller of the application, as seen under the "Controllers" folder;

(ii) back-end data adapters and bindings, i.e. the SQL adapter and Java classes used for performing the conversion, as seen under the "Data Model" folder;

(iii) the presentation layer, i.e. all the views in the project, as seen under the "Views" folder;

(iv) all media in the component, i.e. strings and images used in the visual application interface, as well as audio files and speech recognition grammars used in the voice application, all under the "Resources" folder;

(v) a visual icon representing the component, selected in the componentization wizard;

(vi) a description that defines the behavior of the component;

(vii) a functional black-box interface that allows variables to be passed in and out of the component; and (vii) instructions on how to assemble the resources in the component into the application using that component.

Items (i)-(viii) are stored in any suitable archive file format. The archive file format used in the present implementation is a Java JAR file.

Figure 109:
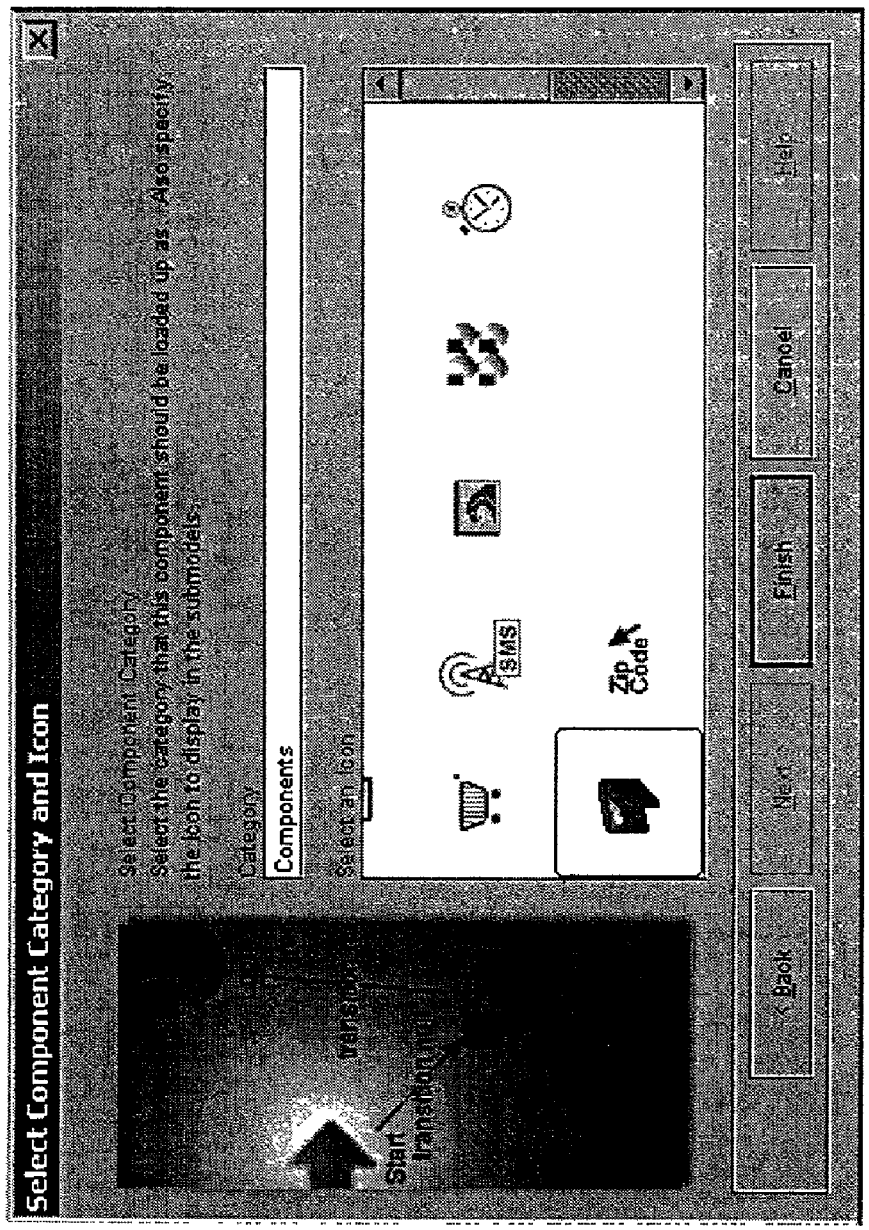
FIG. 109 is an embodiment of a graphical interface for selecting the desired icon for a component during the componentization process.
Figure 110:
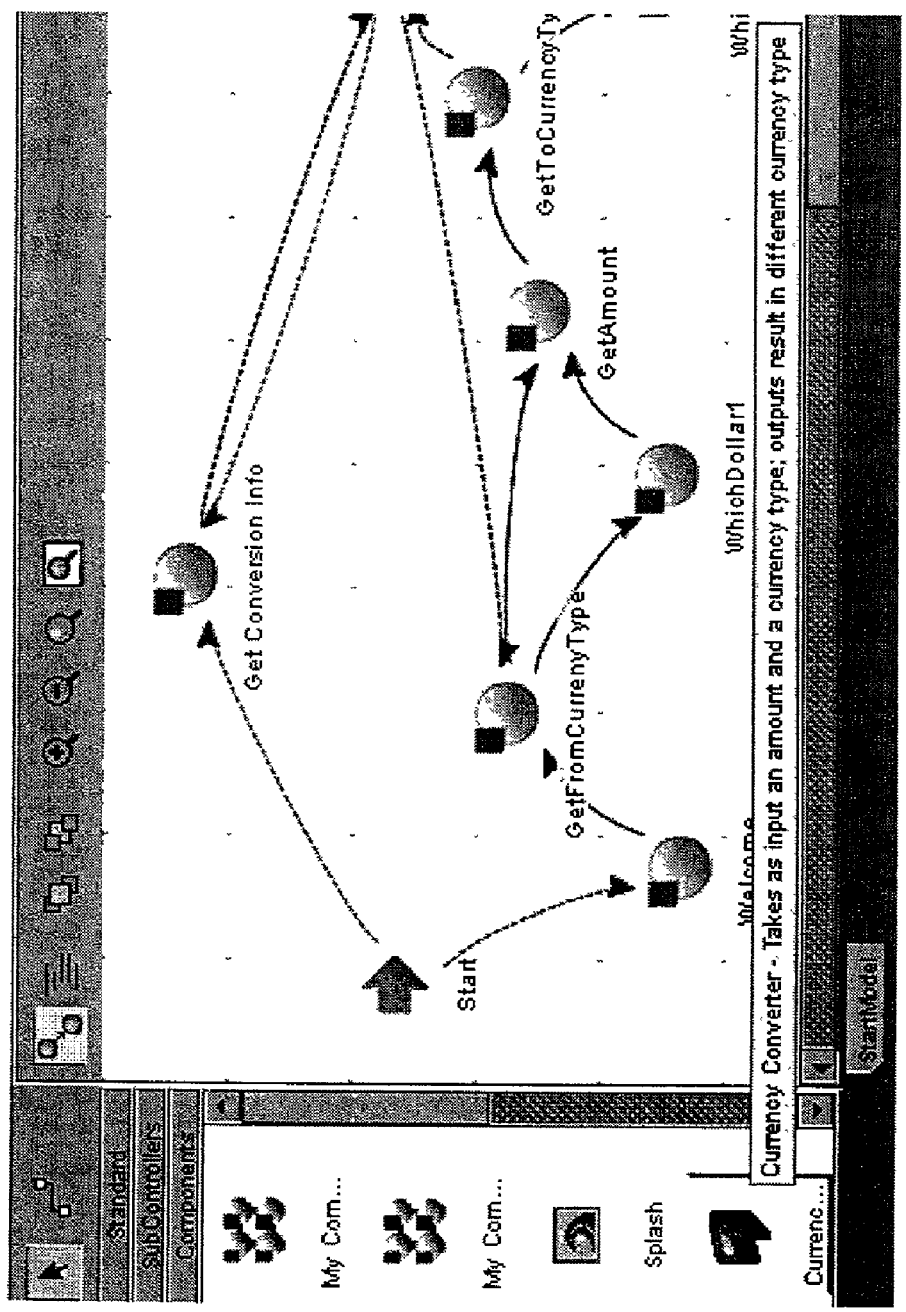
FIG. 110 an user interface embodiment illustrating how the selected icon for a component appears in the components palette of the controller editor after componentization process has been completed.

To componentize the application, the developer selects the Componentization option in the Tools menu on the application menu bar. A wizard appears to guide the developer through the process, as shown in FIGS. 56 and 57. The developer first enters high-level information about the component, as seen in FIG. 56, and then selects a visual icon for the component, as seen in FIG. 109. When created, the component appears in the "Components" palette, in the interaction flow editor, as seen in FIG. 110. The archive (JAR file) for the component is stored in known location where the IDE looks for all components. In this case, the component can be found in a "components" subdirectory where the IDE was installed.

Figure 111:
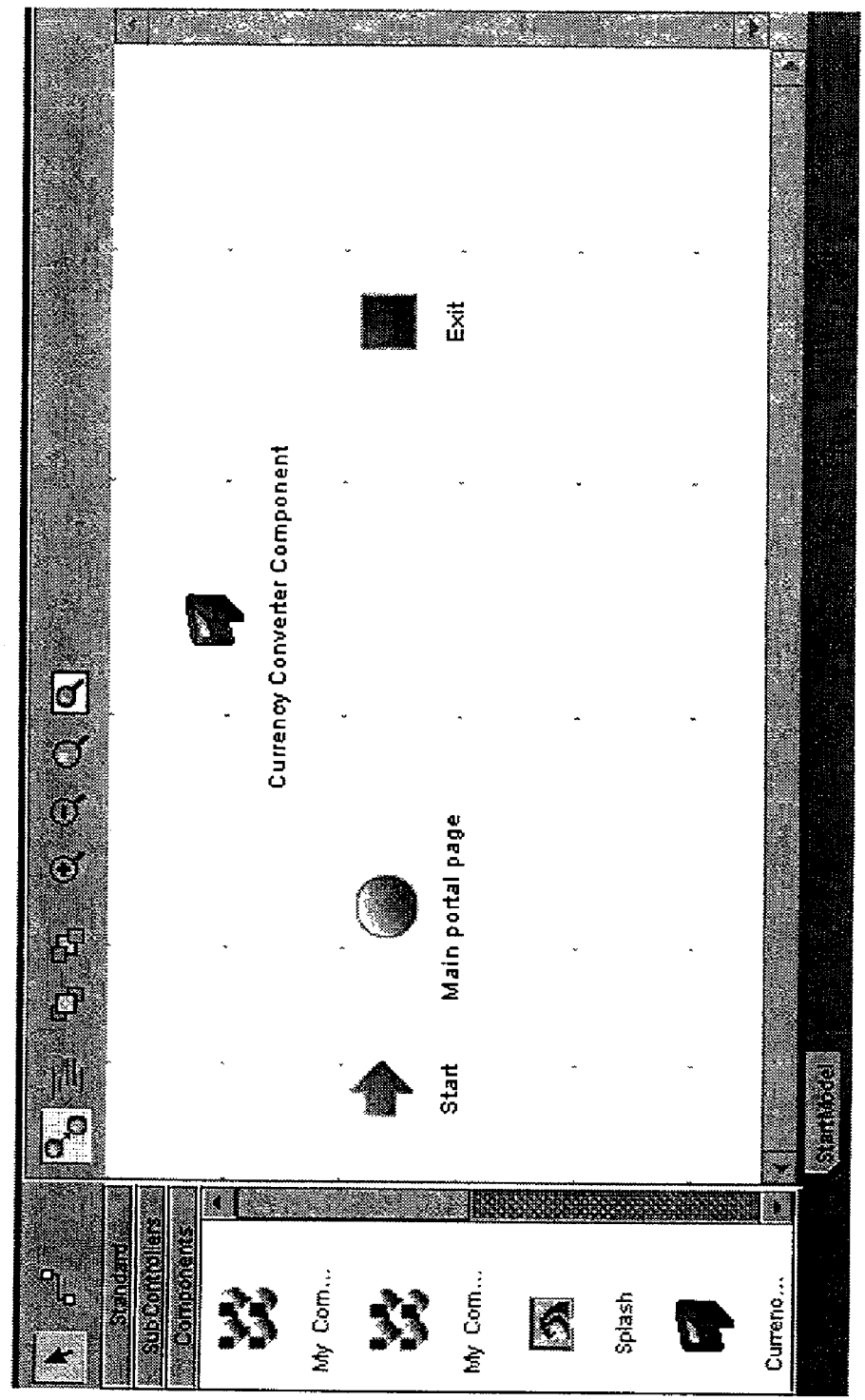
FIG. 111 an user interface embodiment illustrating how a component's icon appears in the controller editor for use.
Figure 112:
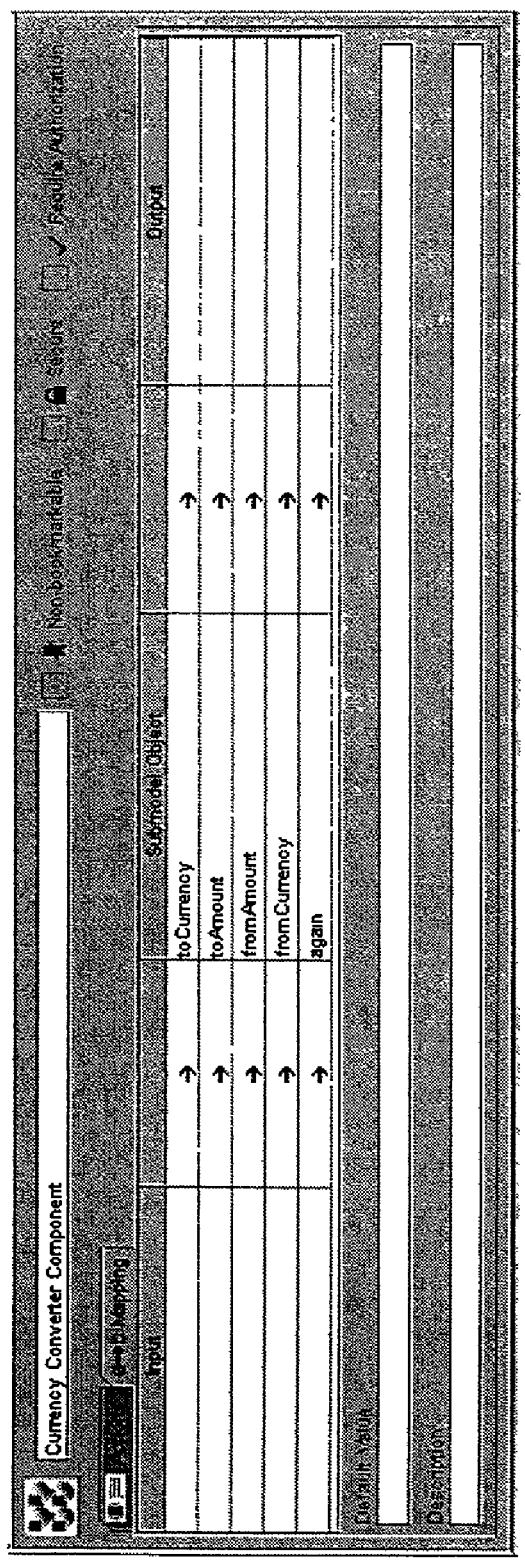
FIG. 112 is an embodiment of a graphical interface for specifying the variables that will be passed in and out of a component during a component use.

To use the currency converter component, the portal developer must first have the archive file for the component available for his particular instance of the IDE. This is the same location as where newly created components appear. The component will appear in the developer's interaction flow palette, as shown in FIG. 111. The developer can then drag in and connect the component in the interaction flow like any other state. The developer may then configure which variables from the current controller will be passed in to the component and which variables from the component will be passed to the current controller, as seen in FIG. 112. The Mapping panel lists all the variables in the component. Passing a variable into the component assigns its current value to that of the component's variable. The value of a component's variable can also be assigned to one of the current component's variables when the component exits.

As should be appreciated by one of ordinary skill in the art, the above-described invention provides a system and method for the rapid, visual development of applications which may operate in a multi-channel environment in multiple modes. The system 100 provides a visual development tool for rapidly building voice and data applications that may operate across multiple network standards, devices, browsers and languages. The system 100 satisfies the unique needs of multi-channel and multi-modal applications, and provides a simplified development environment that specifically allows the rapid building of such applications.

It should be understood that the inventions described herein are provided by way of example only and that numerous changes, alterations, modifications, and substitutions may be made without departing from the spirit and scope of the inventions as delineated within the following claims.

XI. SCHEMA DEFINITION FILE: CML1.XSD

```
<?xml version="1.0" encoding="UTF-8"?>
<xs:schema xmlns:cml="http://www.covigo.com" xmlns:xs=
"http://www.w3.org/2001/XMLSchema" elementFormDefault=
"unqualified" attributeFormDefault="qualified"targetNamespace=
"http://www.covigo.com">
    <xs:element name= "CMLType">
        <xs:complexType>
            <xs:annotation>
                <xs:documentation>Define internal attributes used by
cml</xs:documentation>
            </xs:annotation>
            <xs:attribute name="cml:id" type="xs:byte"
            use="required"/>
            <xs:attribute name="cml:ref" type="xs:byte"
            use="optional"/>
            <xs:attribute name="cml:name" type="xs:string"
            use="optional"/>
            <xs:attribute name="cml:class" type="xs:string"
            use="optional"/>
        </xs:complexType>
    </xs:element>
</xs:schema>
```

XII. SCHEMA DEFIINITION FILE: CML.XSD

```
<?xml version="1.0" encoding="UTF-8"?>
<!-- edited with XML Spy v4.1 U (http://www.xmlspy.com) by Paul
Syrtsov (Covigo Inc.) -->
<xs:schema xmlns:xs="http://www.w3.org/2001/XMLSchema"
xmlns:cml="http://www.covigo.com" elementFormDefault=
"unqualified">
    <xs:import namespace="http://www.w3.org/XML/1998/
namespace"schemaLocation="cml1.xsd"/>
    <xs:element name="Model">
        <xs:complexType>
            <xs:all minOccurs="1" maxOccurs="unbounded">
                <xs:element name="ModelInterface"
type="ModelInterfaceType"/>
                <xs:element name="DataBindingInterface"
type="DataBindingInterfaceType"/>
                <xs:element name="PROPERTY"
type="PROPERTYType"/>
                <xs:element name="ListView" type="ListViewType"/>
                <xs:element name="DefaultController"
```

```
type="DefaultControllerType"/>
        </xs:all>
        <xs:attribute name="name" type="xs:string" use="required"/>
        <xs:attribute name="type" type="xs:string" use="required"/>
    </xs:complexType>
</xs:element>
<xs:complexType name="ModelInterfaceType">
    <xs:sequence>
        <xs:element name="ModelVarDef" type=
"ModelVarDefType" minOccurs="0" maxOccurs="unbounded"/>
    </xs:sequence>
    <xs:attribute name="cml:id" type="xs:byte"/>
</xs:complexType>
<xs:complexType name="ModelVarDefType">
    <xs:attribute name="cml:id" type="xs:byte" use="required"/>
    <xs:attribute name="name" type="xs:string" use="required"/>
    <xs:attribute name="scope" type="xs:string"/>
    <xs:attribute name="comment" type="xs:string"/>
    <xs:attribute name="className" type="xs:string"/>
</xs:complexType>
<xs:complexType name="DataBindingInterfaceType">
    <xs:sequence>
        <xs:element name="DataBinding" type="DataBindingType"/>
    </xs:sequence>
    <xs:attribute name="cml:id" type="xs:byte" use="required"/>
</xs:complexType>
<xs:complexType name="DataBindingType">
    <xs:sequence>
        <xs:element name="PROPERTY" type="PROPERTYType"
minOccurs="1" maxOccurs="unbounded"/>
    </xs:sequence>
    <xs:attribute name="cml:name" type="xs:string"
use="required"/>
    <xs:attribute name="cml:id" type="xs:byte" use="required"/>
    <xs:attribute name="methodName" type="xs:string"
use="required"/>
</xs:complexType>
<xs:complexType name="PROPERTYType">
    <xs:sequence>
        <xs:any namespace="http://www.w3.org/1999/xhtml"
processContents="skip" minOccurs="0" maxOccurs="unbounded"/>
    </xs:sequence>
    <xs:attribute name="cml:name" type="xs:string"
use="required"/>
    <xs:attribute name="cml:class" type="xs:string"
use="required"/>
    <xs:attribute name="cml:id" type="xs:byte"/>
    <xs:attribute name="cml:ref" type="xs:byte"/>
</xs:complexType>
<xs:complexType name="ListViewType">
    <xs:sequence>
        <xs:element name="DeviceBasedView"
type="DeviceBasedViewType"/>
    </xs:sequence>
    <xs:attribute name="cml:name" type="xs:string"
use="required"/>
    <xs:attribute name="cml:id" type="xs:byte" use="required"/>
</xs:complexType>
<xs:complexType name="DeviceBasedViewType">
    <xs:sequence>
        <xs:element name="PROPERTY" type="PROPERTYType"/>
    </xs:sequence>
    <xs:attribute name="cml:id" type="xs:byte" use="required"/>
    <xs:attribute name="template" type="xs:string"
use="required"/>
</xs:complexType>
<xs:complexType name="DefaultControllerType">
    <xs:sequence>
        <xs:element name="PROPERTY" type="PROPERTYType"
minOccurs="1" maxOccurs="unbounded"/>
    </xs:sequence>
    <xs:attribute name="cml:name" type="xs:string"
use="required"/>
    <xs:attribute name="cml:id" type="xs:byte" use="required"/>
</xs:complexType>
<xs:complexType name="BindingActionType">
    <xs:sequence>
        <xs:element name="PROPERTY" type="PROPERTYType"
minOccurs="1" maxOccurs="unbounded"/>
    </xs:sequence>
        <xs:attribute name="cml:id" type="xs:byte" use="required"/>
        <xs:attribute name="methodName" type="xs:string"
use="required"/>
    </xs:complexType>
    <xs:complexType name="CustomActionType">
        <xs:attribute name="cml:id" type="xs:byte" use="required"/>
        <xs:attribute name="code" type="xs:string" use="required"/>
    </xs:complexType>
    <xs:complexType name="SetVariableActionType">
        <xs:sequence>
            <xs:element name="PROPERTY" type="PROPERTYType"/>
        </xs:sequence>
        <xs:attribute name="cml:id" type="xs:byte" use="required"/>
        <xs:attribute name="srcVar" type="xs:string"
use="required"/>
    </xs:complexType>
    <xs:complexType name="TransitionActionType">
        <xs:choice>
            <xs:element name="CustomAction" type=
"CustomActionType" minOccurs="0" maxOccurs="1"/>
            <xs:element name="BindingAction" type=
"BindingActionType" minOccurs="0" maxOccurs="1"/>
        </xs:choice>
        <xs:attribute name="cml:id" type="xs:byte" use="required"/>
        <xs:attribute name="target" type="xs:string" use="required"/>
    </xs:complexType>
    <xs:complexType name="StringType">
        <xs:attribute name="cml:value" type="xs:string"
use="required"/>
    </xs:complexType>
</xs:schema>
```

XIII. DOCUMENT TYPE DEFINITION: TPL.DTD

```
<?xml version="1.0" encoding="UTF-8"?>
...
<!--Used for GUI - when Studio needs to show actions-->
<!ELEMENT NavigationActionList (Action+)>
<!-- This is used for GUI as a wrapper for all Actions -->
<!ATTLIST NavigationActionList
    overrideglobal CDATA #IMPLIED
>
<!--Element to say which action needs to happen when the end user
presses a button or a page expires-->
<!ELEMENT Action (PostData*)>
<!ATTLIST Action
    name CDATA #IMPLIED
    method (get | post) #IMPLIED
    type (accept | help | prev | soft1 | soft2 | send | delete | options |
reset) #IMPLIED
    buttonlabel CDATA #IMPLIED
    dest CDATA #REQUIRIED
    scope (global | local) #REQUIRED
>
<!--Like HTML <a>-->
<!ELEMENT Anchor (#PCDATA | PostData)*>
<!ATTLIST Anchor
    title CDATA #IMPLIED
    method (get | post) #IMPLIED
    dest CDATA #REQUIRED
>
<!--Like HTML <hr>-->
<!ELEMENT Break EMPTY>
<!ELEMENT Image (ImageData+)>
<!ATTLIST Image
    align (none | top | middle | bottom) #IMPLIED
    family CDATA #IMPLIED
<!--Contains information about an image-->
<!ELEMENT ImageData EMPTY>
<!ATTLIST ImageData
    title CDATA #IMPLIED
    type (bmp | wbmp | gif | jpg) #REQUIRED
    dest CDATA #REQUIRED
    height CDATA #IMPLIED
    width CDATA #IMPLIED
>
<!--Widget that accepts textual input from end user-->
<!-- ICONs for HDML not added - not common across all languages -->
<!ELEMENT Input (Text*, Image*, Break*)>
<!ATTLIST Input
```

```
        name CDATA #IMPLIED
        title CDATA #IMPLIED
        varname CDATA #REQUIRED
        format CDATA #IMPLIED
        defaultvalue CDATA #IMPLIED
>
<!--Wrapper for both option & navigation lists-->
<!--Like HTML <select>-->
<!ELEMENT List (ListItem+)>
<!ATTLIST List
        defaultvalue CDATA #IMPLIED
        varname CDATA #REQUIRED
        title CDATA #IMPLIED
        listtype (navigation | option) #IMPLIED
        blabeldata CDATA #IMPLIED
        overridedest CDATA #IMPLIED
        display_static_list CDATA #IMPLIED
>
<!--List item, like HTML <li>-->
<!ELEMENT ListItem (#PCDATA)>
<!ATTLIST ListItem
        value CDATA #REQUIRED
        buttonlabel CDATA #IMPLIED
        dest CDATA #REQUIRED
        dynamicdata CDATA #REQUIRED
        blabeldata CDATA #REQUIRED
>
<!--Container for all text, image, anchors, breaks, etc.-->
<!--Defines text & styles for text, defines links, creates lists-->
<!ELEMENT Para (Text | Anchor | Image | Break)+>
<!ATTLIST Para
        align (center | left | right | none) #IMPLIED
        wrap (wrap | nowrap | none) #IMPLIED
        paratype (hrule | regular) #IMPLIED
>
<!--Specifies which name-value pairs gathered in the current view
to post back to the server-->
<!ELEMENT PostData EMPTY>
<!ATTLIST PostData
        name CDATA #REQUIRED
        value CDATA #REQUIRED
>
<!--Table which can contain images or text-->
<!--Like HTML <table>-->
<!ELEMENT Table (TableRow+)>
<!ATTLIST Table
        title CDATA #IMPLIED
        colcount CDATA #REQUIRED
        align (center| left | right | none) #IMPLIED
>
<!--Specifies contents of a table cell-->
<!--Like HTML <td>, except using attributes to specify
row & col numbers-->
<!ELEMENT TableRow (Text | Image | Break | Anchor)+>
<!ATTLIST TableRow
        col CDATA #REQUIRED
        row CDATA #REQUIRED
>
<!--Text with style formatting-->
<!ELEMENT Text (#PCDATA)>
<!ATTLIST Text
        style (bold | italic | small | big | strong | emphasis | underline)
        #IMPLIED
>
<!--Timer - for <timer> in WML-->
<!ELEMENT Timer EMPTY>
<!ATTLIST Timer
        name CDATA #IMPLIED
        value CDATA #REQUIRED
        dest CDATA #REQUIRED
>
<!--Like HTML <meta>-->
<!--Contains commands for the gateway or device for cache expiration
(how long until), specifying tags for gateway, etc.-->
<!--Can be used to send proprietary information-->
<!--To device-->
<!ELEMENT MetaDataList (MetaData+)>
<!ELEMENT MetaData EMPTY>
<!ATTLIST MetaData
        type (name | http-equiv) #IMPLIED
        value CDATA #REQUIRED
        content CDATA #REQUIRED
        forua (true | false) #IMPLIED
>
<!--When sending a name-value pair back to server, the developer may
want to send the version number, character set, locale information, etc.-->
<!--Any HTTP response header can be sent using
<ResponseHeaderList>-->
<!--To server-->
<!ELEMENT ResponseHeaderList (ResponseHeader+)>
<!--Collection member in <ResponseHeaderList>-->
<!ELEMENT ResponseHeader EMPTY>
<!ATTLIST ResponseHeader
        name CDATA #REQUIRED
        value CDATA #REQUIRED
>
<!--Container for all types of elements-->
<!--Top-level element for TPL-->
<!ELEMENT View (Timer?, Para*, Input*, List*, Table*, Action*)>
<!ATTLIST View
        name CDATA #IMPLIED
        title CDATA #IMPLIED
        layout CDATA #IMPLIED
        class CDATA #IMPLIED
        newcontext (true | false) #IMPLIED
        maxitems CDATA #IMPLIED
>
```

XIV. DOCUMENT TYPE DEFINITION: VTL.DTD

```
<?xml version="1.0" encoding="UTF-8"?>
<!--Top level element-->
<!ELEMENT VoiceDoc (VoiceDocGlobals?, VoiceTemplate+)>
<!--Project level settings, to be used for providing generic error
handling or help throughout the application-->
<!ELEMENT VoiceDocGlobals ANY>
<!ATTLIST VoiceDoc
        xmlns CDATA #REQUIRED
>
<!--Top level element for current view-->
<!ELEMENT VoiceTemplate (Input | Play | Confirmation | Object |
Menu | Pause)*>
<!ATTLIST VoiceTemplate
        id ID #REQUIRED
        next IDREF #IMPLIED
>
<!--Input primitive-->
<!ELEMENT Input (Prompt?, Prompt?, Error*, Event*)>
<!ATTLIST Input
        name CDATA #REQUIRED
        grammar CDATA #REQUIRED
>
<!--Play primitive-->
<!ELEMENT Play (Prompt?, Error*, Event*)>
<!--Confirmation primitive-->
<!ELEMENT Confirmation (Prompt?, Prompt?, Prompt?,
ConfirmingItem+, Error*, Event*)>
<!ATTLIST Confirmation
        name CDATA #REQUIRED
        confirmGrammar CDATA #REQUIRED
        confirmGrammarSlot CDATA #REQUIRED
        confirmPositiveAnswer CDATA #REQUIRED
        identifyGrammar CDATA #REQUIRED
        identifyGrammarSlot CDATA #REQUIRED
>
<!--Used for Confirmation primitive-->
<!--Specifies which items (preceding primitives) you want to confirm-->
<!ELEMENT ConfirmingItem (Prompt?)>
<!ATTLIST ConfirmingItem
        formID IDREF #REQUIRED
        answer CDATA #REQUIRED
        resultAudioFormat (audio | tts) #REQUIRED
>
<!--Menu primitive-->
<!ELEMENT Menu (Prompt?, MenuItem*, Error*, Event*)>
<!ATTLIST Menu
        name CDATA #REQUIRED
        grammar CDATA #REQUIRED
>
<!--Menu item used in Menu primitive-->
```

-continued
```
<!ELEMENT MenuItem (Prompt?)>
<!ATTLIST MenuItem
        answer CDATA #REQUIRED
        next IDREF #REQUIRED
>
<!--Importing Speech Objects-->
<!--Import primitive-->
<!ELEMENT Object (Param*, Error*, Event*)>
<!ATTLIST Object
        name CDATA #REQUIRED
        classid CDATA #REQUIRED
        data CDATA #IMPLIED
>
<!--Used by Import primitive-->
<!--Parameter for a speech object-->
<!--Can be any object-->
<!ELEMENT Param (Param*)>
<!ATTLIST Param
        name CDATA #REQUIRED
        type CDATA #IMPLIED
        expr CDATA #IMPLIED
>
<!--In Play, Input, Menu - wherever a prompt is played-->
<!ELEMENT Prompt (Audio? | TTS? | Break?)*>
<!ATTLIST Prompt
        bargein (true | false) #IMPLIED
        promptType (initial | confirm | result | correction | identify |choice |
        reentry | event | error) #REQUIRED
>
<!--Audio file-->
<!ELEMENT Audio EMPTY>
<!ATTLIST Audio
        prompt CDATA #REQUIRED
        transcription CDATA #IMPLIED
>
<!--TTS identified by the prompt attribute-->
<!ELEMENT TTS EMPTY>
<!ATTLIST TTS
        prompt CDATA #REQUIRED
>
<!--Pause-->
<!--In a prompt-->
<!ELEMENT Break EMPTY>
<!ATTLIST Break
        time CDATA #REQUIRED
>
<!--Pause-->
<!--Is an element-->
<!ELEMENT Pause EMPTY>
<!ATTLIST Pause
        duration CDATA #REQUIRED
>
<!--Prompt to play in the event of an error-->
<!ELEMENT Error (Prompt)?>
<!ATTLIST Error
        errorType (noinput | nomatch) #REQUIRED
        count CDATA #IMPLIED
>
<!--Plays a prompt for any event, but generally used for Help-->
<!ELEMENT Event (Prompt?)?>
<!ATTLIST Event
        eventType CDATA #REQUIRED
        next IDREF #IMPLIED
        stateName CDATA #IMPLIED
>
<!--For setting top-level attribute values for prompts-->
<!ELEMENT DefaultAttributes EMPTY>
<!ATTLIST DefaultAttributes
        bargein (true | false) #IMPLIED
>
```

What is claimed is:

1. In a system for visually building multi-channel applications, non-transitory a computer-readable medium having computer-executable modules comprising:
a first module adapted to allow a developer to visually design workflow describing a multi-channel application capable of operating over a plurality of channels, the workflow comprising a plurality of layers, wherein each of said layers corresponds to at least one channel of said multi-channel application, wherein said workflow comprises a plurality of states and a plurality of transitions, wherein each layer includes states and transitions common to at least one channel of said multi-channel application;
a second module adapted to allow a developer to design views for said multi-channel application; and
a third module adapted to allow a developer to integrate data sources within said multi-channel application.

2. The computer-readable medium of claim 1, further comprising:
an interactive development environment for allowing a developer to interact with said first, second and third modules to design said multi-channel application.

3. The computer-readable medium of claim 2 wherein said interactive development environment comprises a graphical user interface for allowing a developer to visually interact with said first, second and third module.

4. The computer-readable medium of claim 1 wherein said system is adapted to allow a developer to design multi-modal applications.

5. The computer-readable medium of claim 1, wherein said system is adapted to allow a developer to design multi-channel applications including at least two channels selected from the group comprising voice channels, web channels, and wireless web channels.

6. A computer system for visually building multi-channel applications, comprising:
a processing unit
a graphical user interface (GUT) comprising a user interface selection device and a display for displaying an interactive development environment for visually designing workflow describing a multi-channel application capable of operating over a plurality of channels,
said environment being adapted to allow a developer to independently design said workflow in a plurality of layers, wherein each layer includes states and transitions common
to at least one channel of said multi-channel application.

7. The computer system of claim 6 wherein said GUI is used for independently displaying and designing said plurality of layers.

8. The computer system of claim 7 wherein said GUI is adapted to independently display a root layer including states common to each of said channels of said multi-channel application, and to allow a developer to visually design said root layer.

9. The computer system of claim 8 wherein said GUI is further adapted to independently display a voice layer including states common to a voice channel of said multi-channel application, and to allow a developer to visually design said voice layer.

10. The computer system of claim 9 wherein said GUI is further adapted to independently display a visual layer including states common to a visual channel of said multi-channel application, and to allow a developer to visually design said visual layer.

11. The computer system of claim 10 wherein said GUI is further adapted to display combinations of said root, voice and visual layers.

12. A computer system for visually building a multi-channel application capable of operating over a plurality of channels, comprising:

a processing unit a graphical user interface adapted to allow a user to visually build a single workflow describing a multi-channel application capable of operating over a plurality of channels, the workflow comprising a plurality of layers, wherein each of said layers corresponds to at least one channel of said multi-channel application, wherein said single workflow comprises a plurality of states and a plurality of transitions, wherein each layer includes states and transitions common to at least one channel of said multi-channel application; and a module for converting said visually built workflow into a markup language.

13. The computer system of claim 12 wherein said markup language comprises an XML-based language.

14. The computer system of claim 12 wherein said graphical user interface is adapted to allow a user to visually build a single workflow for a multi-channel application capable of operating in a plurality of modes.

15. The computer system of claim 12 further comprising:
a second graphical user interface adapted to allow a developer to build views of multi-channel application; and
a second module adapted to convert said built views into a markup language.

16. The computer system of claim 15 wherein said markup language comprises an XML-based language.

17. A method of building a multi-channel application, comprising the steps of:
providing a visual development environment;
designing an application workflow within said visual development environment in a plurality of layers, said application workflow comprising a plurality of states and a plurality of transitions, wherein said application workflow describes a multi-channel application capable of operating over a plurality of channels, wherein the application workflow comprises a plurality of layers, wherein each layer includes states and transitions common to at least one channel of said multi-channel application;
linking said states; and
converting said application workflow into an application descriptor for delivering the application over at least one of the plurality of channels.

18. The method of claim 17 further comprising the step of:
designing a presentation of said application within said visual development environment.

19. The method of claim 18 further comprising the step of:
internationalizing said presentation of said application within said visual development environment.

20. The method of claim 19 further comprising the step of:
integrating data sources into said application by use of said visual development environment.

21. The method of claim 17 further comprising the step of:
componentizing a plurality of said states and transitions into a reusable sub-model within said visual development environment.

22. The method of claim 19 further comprising the step of:
packaging said application workflow into a reusable component within said visual development environment.

* * * * *

UNITED STATES PATENT AND TRADEMARK OFFICE
CERTIFICATE OF CORRECTION

| | | |
|---|---|---|
| PATENT NO. | : 7,917,888 B2 | |
| APPLICATION NO. | : 10/054623 | |
| DATED | : March 29, 2011 | |
| INVENTOR(S) | : Chong et al. | |

It is certified that error appears in the above-identified patent and that said Letters Patent is hereby corrected as shown below:

In Column 4, Lines 15-16, delete "interuationalizable" and insert -- internationalizable --, therefor.

In Column 4, Line 39, delete "a another" and insert -- an another --, therefor.

In Column 5, Line 50, delete "project" and insert -- project. --, therefor.

In Column 5, Line 53, delete "a over-all" and insert -- an over-all --, therefor.

In Column 8, Line 6, delete "intermationalization" and insert -- internationalization --, therefor.

In Column 9, Line 12, delete "embodiment" and insert -- is an embodiment --, therefor.

In Column 9, Line 18, delete "an" and insert -- is an --, therefor.

In Column 9, Line 22, delete "an" and insert -- is an --, therefor.

In Column 10, Line 53, delete "Data model." and insert -- Data model: --, therefor.

In Column 11, Line 16, delete "(I10n)" and insert -- (l10n) --, therefor.

In Column 15, Line 43, delete "EDE" and insert -- IDE --, therefor.

In Column 16, Line 35, delete "fimctionality" and insert -- functionality --, therefor.

In Column 16, Line 59, delete "finction" and insert -- function --, therefor.

In Column 18, Line 2, delete "finction." and insert -- function. --, therefor.

In Column 18, Line 19, delete "are" and insert -- area --, therefor.

Signed and Sealed this
Fifteenth Day of January, 2013

David J. Kappos
*Director of the United States Patent and Trademark Office*

CERTIFICATE OF CORRECTION (continued)
U.S. Pat. No. 7,917,888 B2

In Column 23, Line 67, delete "Windows Operating System ™" and insert -- Windows Operating System ™, --, therefor.

In Column 28, under "Description", Line 30, delete "name)" and insert -- name). --, therefor.

In Column 29, Line 41, delete "filly" and insert -- fully --, therefor.

In Column 30, Line 16, delete "fuinctional" and insert -- functional --, therefor.

In Column 33, under "Children", Line 1, delete "VoiceDoeGlobals?" and insert -- VoiceDocGlobals? --, therefor.

In Column 33, under "Children", Line 26, delete "(Prompt)?" and insert -- "(Prompt?) --, therefor.

In Column 33, Line 51, delete "Inport," and insert -- Import, --, therefor.

In Column 36, Line 19, delete "Extensivle" and insert -- Extensible --, therefor.

In Column 39, Line 1, delete "modularizationn" and insert -- modularization --, therefor.

In Column 39, Line 43, delete "ofjava" and insert -- of java --, therefor.

In Column 45, Lines 26-27, delete "Adding Classes" and insert the same as heading.

In Column 46, Lines 57-59, delete ""getRowByindex( )", "getColurnnByIndex( )", "getRows( )", "getcolumns( )"" and insert -- "getRowByIndex( )", "getColumnByIndex( )", "getRows( )", "getColumns( )" --, therefor.

In Column 47, Line 35, delete ""getcolumns( )"" and insert -- "getColumns( )" --, therefor.

In Column 47, Line 66, delete ""getcolumns( )"" and insert -- "getColumns( )" --, therefor.

In Column 48, Line 65, delete "finctional" and insert -- functional --, therefor.

In Column 51, Line 66, delete "module retrieves" and insert -- module 20 --, therefor.

In Column 54, Line 34, delete "proceeding" and insert -- (proceeding --, therefor.

In Column 54, Line 43, delete ""mnages"" and insert -- "Images" --, therefor.

In Column 60, Line 41, delete "'output amount'" and insert -- 'output amount'. --, therefor.

In Column 61, Line 12, delete "'output amount'" and insert -- 'output amount'. --, therefor.

In Column 67, under Table-continued, Lines 4-5, delete "cml:jid="39"/>" and insert -- cml: id="39"/> --, therefor.

In Column 74, Line 22, delete "cml:ref-"94"/>" and insert -- cml:ref="94"/> --, therefor.

In Column 74, Line 25, delete "cml:ref-"92"/>" and insert -- cml:ref="92"/> --, therefor.

In Column 76, in Table, Line 13, delete "SQLSource">SQLSource">SQLSource" and insert -- "SQLSource">SQLSource --, therefor.

In Column 76, in Table, Line 16, delete "ParameterList"" and insert -- "ParameterList" --, therefor.

In Column 76, in Table, Line 27, delete "<PROPERTY>" and insert -- </PROPERTY> --, therefor.

In Column 76, in Table, Line 30, delete "<DefaultController>" and insert -- </DefaultController> --, therefor.

In Column 79, in Table, Line 1, delete "DefaultController" and insert -- <DefaultController --, therefor.

In Column 79, in Table, Line 24, delete "<PROPERTY>" and insert -- </PROPERTY> --, therefor.

In Column 81, in Table, Line 15, delete "<CustonDevice" and insert -- <CustomDevice --, therefor.

In Column 82, in Table, Line 60, delete ""main">" and insert -- "main"/> --, therefor.

In Column 82, Line 63, delete "value- "$" and insert -- value= "$ --, therefor.

In Column 84, Lines 60-61, delete ""oraclejdbc.driver" and insert -- "oracle.jdbc.driver --, therefor.

In Column 85, Lines 19-20, delete ""getRowByIndex( )", "getColumnByIndex( )", "getRows( )", and "getcolumns( )"." and insert -- "getRowByIndex( )", "getColumnByIndex( )", "getRows( )", and "getColumns( )". --, therefor.

In Column 86, Line 1, delete "SYMBOL= 'JPY"" and insert -- SYMBOL= "JPY" --, therefor.

In Column 86, Line 9, delete ""getItemAt(0, 0)"" and insert -- "getItemAt(0, 0)" --, therefor.

In Column 88, Line 50, delete "DEFIINITION" and insert -- DEFINITION --, therefor.

In Column 90, Line 56, below "IMPLIED" insert -- > --.

In Column 92, Line 6, delete "<--When" and insert -- "<!--When --, therefor.

CERTIFICATE OF CORRECTION (continued)
U.S. Pat. No. 7,917,888 B2

In Column 92, Line 61, delete "<--Menu" and insert -- <!--Menu --, therefor.

In Column 93, Line 6, delete "<--Importing" and insert -- <!--Importing --, therefor.

In Column 93, Line 7, delete "<--Import" and insert -- <!--Import --, therefor.

In Column 93, Line 20, delete "<--In Play," and insert -- <!--In Play, --, therefor.

In Column 93, Line 21, delete "<ELEMENT" and insert -- "<!ELEMENT --, therefor.

In Column 93, Line 44, delete "<--Prompt" and insert -- <!--Prompt --, therefor.

In Column 93, Line 49, delete "<--Plays" and insert -- <!--Plays --, therefor.

In Column 94, Line 32, in Claim 6, delete "unit" and insert -- unit, --, therefor.

In Column 94, Line 34, in Claim 6, delete "(GUT)" and insert -- (GUI) --, therefor.

In Column 95, Line 1, in Claim 12, delete "unit" and insert -- unit, --, therefor.